US012308511B2

(12) United States Patent
Oh et al.

(10) Patent No.: US 12,308,511 B2
(45) Date of Patent: May 20, 2025

(54) ANTENNA AND ELECTRONIC DEVICE INCLUDING THE SAME

(71) Applicant: Samsung Electronics Co., Ltd., Gyeonggi-do (KR)

(72) Inventors: Dongjun Oh, Gyeonggi-do (KR); Shinho Yoon, Gyeonggi-do (KR); Myeongjun Kong, Gyeonggi-do (KR); Jaebong Chun, Gyeonggi-do (KR); Soonho Hwang, Gyeonggi-do (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 168 days.

(21) Appl. No.: 17/965,201

(22) Filed: Oct. 13, 2022

(65) Prior Publication Data
US 2023/0085200 A1  Mar. 16, 2023

Related U.S. Application Data

(63) Continuation of application No. PCT/KR2022/013096, filed on Sep. 1, 2022.

(30) Foreign Application Priority Data
Sep. 7, 2021  (KR) ........................ 10-2021-0119285

(51) Int. Cl.
*H01Q 1/24*    (2006.01)
*H01Q 1/38*    (2006.01)
(Continued)

(52) U.S. Cl.
CPC ............. *H01Q 1/243* (2013.01); *H01Q 1/38* (2013.01); *H01Q 1/48* (2013.01); *H01Q 5/10* (2015.01);
(Continued)

(58) Field of Classification Search
CPC ............. H04M 1/0235; H04M 1/0268; H04M 1/0277; H04M 2201/38; H04M 1/0249;
(Continued)

(56) References Cited

U.S. PATENT DOCUMENTS 9,337,528 B2   5/2016   Hammond
10,629,982 B2  4/2020   Kim et al.
(Continued)

FOREIGN PATENT DOCUMENTS

CN   111430924 A   7/2020
EP   4246714 A1   9/2023
(Continued)

OTHER PUBLICATIONS

International Search Report dated Dec. 12, 2022.
Extended European Search Report dated Nov. 14, 2024.

*Primary Examiner* — Tuan D Nguyen
(74) *Attorney, Agent, or Firm* — Cha & Reiter, LLC

(57) ABSTRACT

According to certain embodiments, an electronic device comprises: a first housing including a plurality of conductive portions electrically separated from each other and disposed on at least a portion of a side surface of the first housing; a second housing slidably coupled to the first housing; a flexible display supported by the first housing and the second housing and having a display area that is changable by sliding the second housing; and a wireless communication circuit disposed in the first housing and configured to transmit and receive wireless signals in a plurality of frequency bands via the plurality of conductive portions, wherein the plurality of conductive portions includes a first conductive portion and a second conductive portion, wherein the first conductive portion and the second conductive portion have a U shape or C shape and are electrically (Continued)

separated from each other, and wherein the first conductive portion is spaced apart from the first housing.

20 Claims, 51 Drawing Sheets

(51) Int. Cl.
    *H01Q 1/48*     (2006.01)
    *H01Q 5/10*     (2015.01)
    *H01Q 5/335*     (2015.01)
    *H01Q 13/10*     (2006.01)
    *H01Q 21/30*     (2006.01)
    *H04M 1/02*     (2006.01)

(52) U.S. Cl.
    CPC ............. *H01Q 5/335* (2015.01); *H01Q 13/10* (2013.01); *H01Q 21/30* (2013.01); *H04M 1/0235* (2013.01); *H04M 1/0268* (2013.01); *H04M 1/0277* (2013.01); *H04M 2201/38* (2013.01)

(58) Field of Classification Search
    CPC .. H04M 1/0245; H04M 1/0214; H01Q 1/243; H01Q 1/38; H01Q 1/48; H01Q 5/10; H01Q 5/335; H01Q 13/10; H01Q 21/30; H01Q 9/42; H01Q 1/28; G09F 9/301
    See application file for complete search history.

(56) References Cited

U.S. PATENT DOCUMENTS

| | | |
|---|---|---|
| 2011/0275333 A1 | 11/2011 | Kim et al. |
| 2016/0064804 A1 | 3/2016 | Kim et al. |
| 2016/0142083 A1 | 5/2016 | Kim et al. |
| 2017/0117616 A1 | 4/2017 | Chen et al. |
| 2018/0366812 A1 | 12/2018 | Kim et al. |
| 2021/0219437 A1 | 7/2021 | Kim et al. |
| 2022/0053653 A1 | 2/2022 | Jung et al. |
| 2022/0115772 A1 | 4/2022 | Kim et al. |
| 2022/0321687 A1 | 10/2022 | Kong et al. |
| 2022/0329278 A1 | 10/2022 | Yoon et al. |

FOREIGN PATENT DOCUMENTS

| | | |
|---|---|---|
| EP | 4246715 A1 | 9/2023 |
| KR | 10-2012-0119834 A | 10/2012 |
| KR | 10-2016-0057142 A | 5/2016 |
| KR | 10-1687632 B1 | 12/2016 |
| KR | 10-2017-0048723 A | 5/2017 |
| KR | 10-2018-0137993 A | 12/2018 |
| KR | 10-2042264 B1 | 11/2019 |
| KR | 10-2019-0143029 A | 12/2019 |
| KR | 10-2177285 B1 | 11/2020 |
| KR | 10-2259104 B1 | 6/2021 |
| KR | 10-2295237 B1 | 8/2021 |
| KR | 10-2021-0116380 A | 9/2021 |

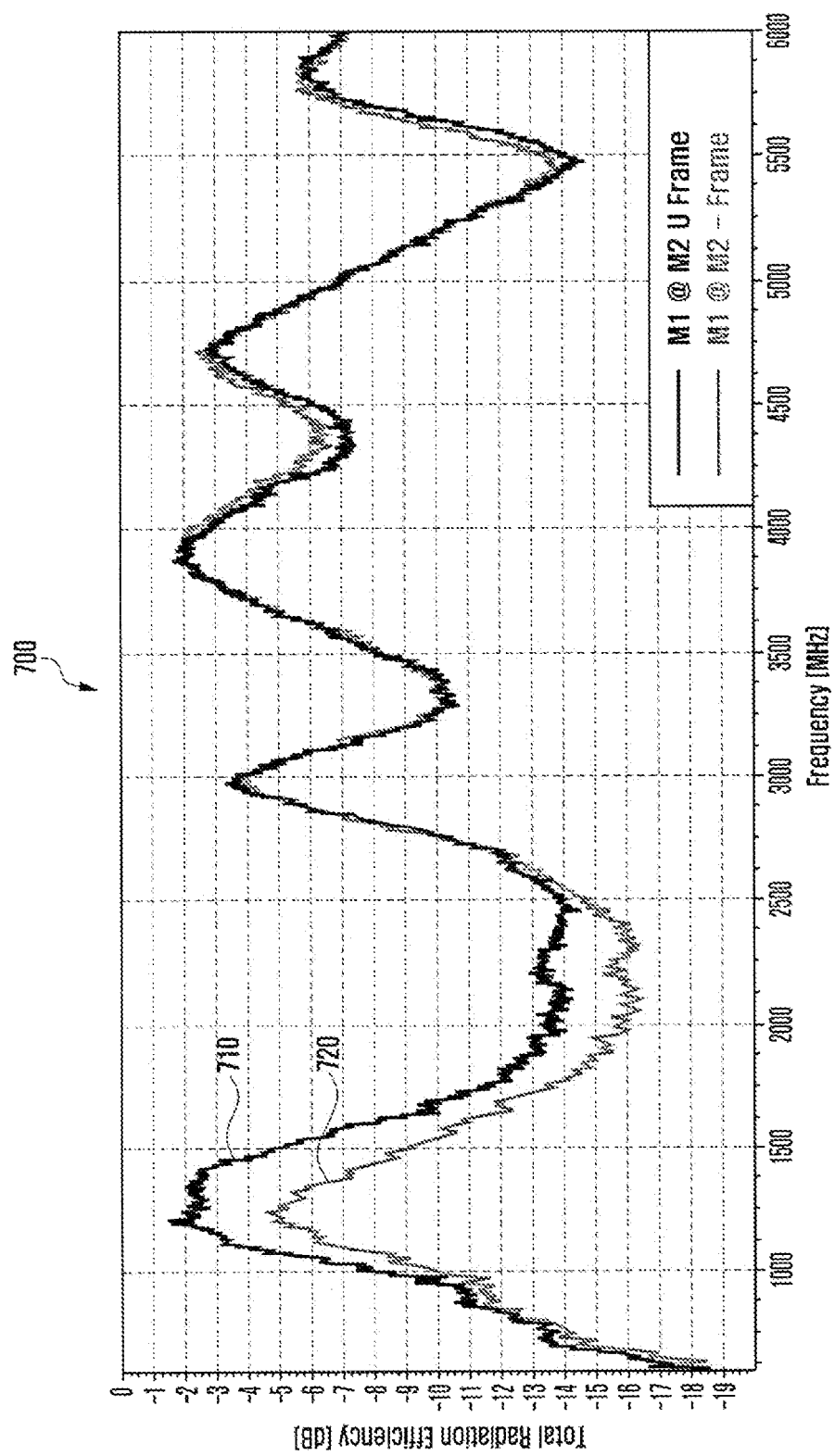

FIG. 10B
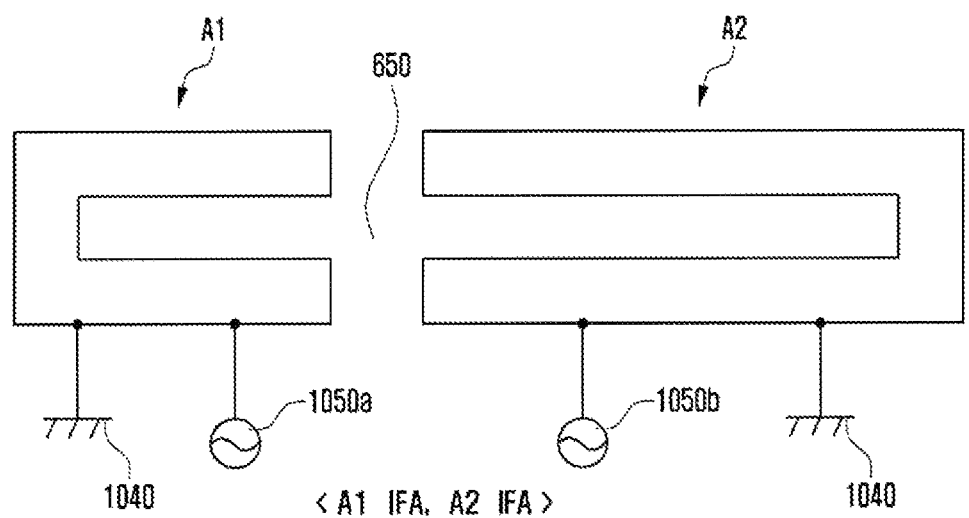
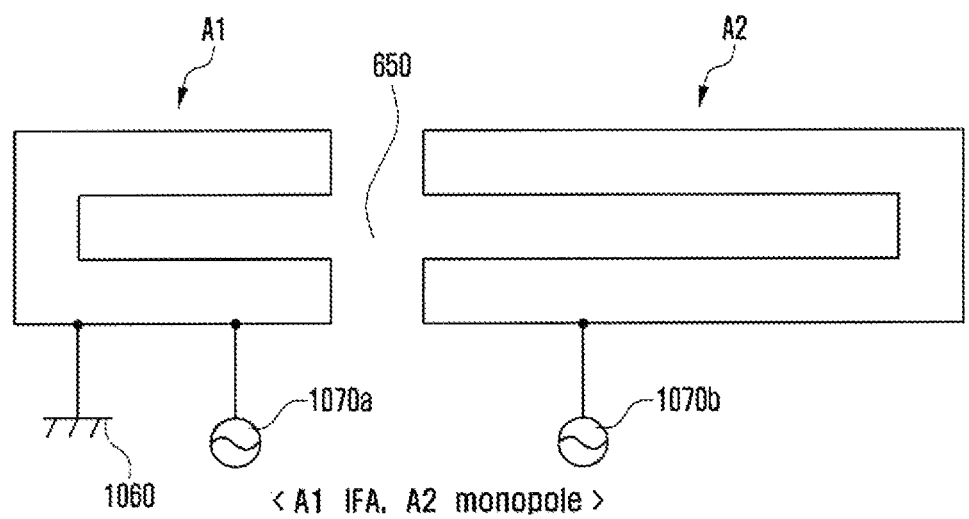

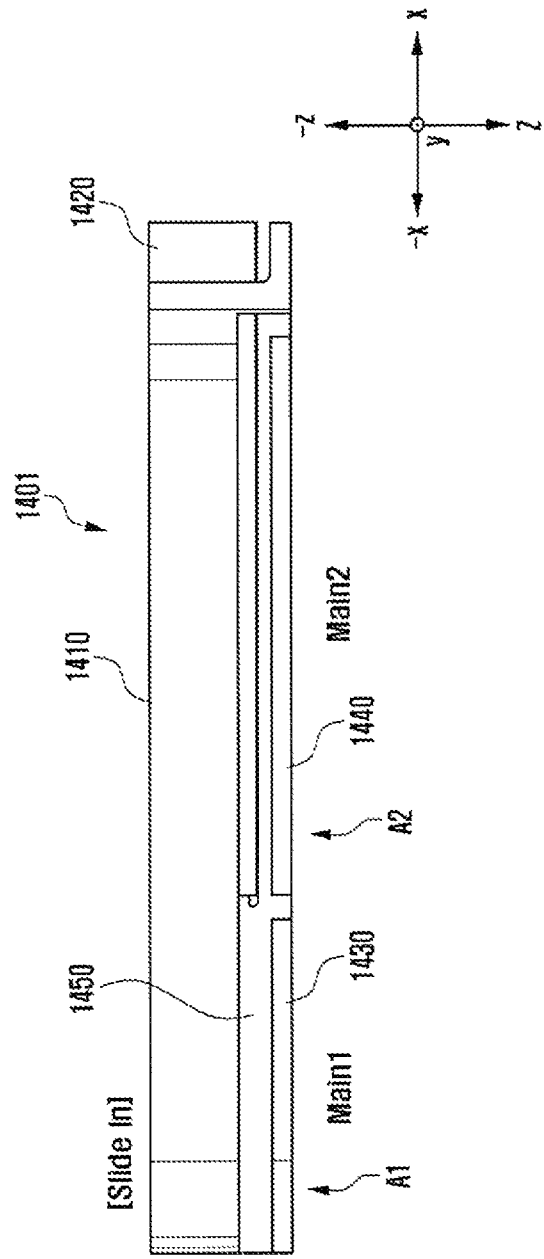

# ANTENNA AND ELECTRONIC DEVICE INCLUDING THE SAME

CROSS-REFERENCE TO RELATED APPLICATION(S)

This application is a continuation of International Application No. PCT/KR2022/013096, which was filed on Sep. 1, 2022, and claims priority to Korean Patent Application No. 10-2021-0119285, filed on Sep. 7, 2021, in the Korean Intellectual Property Office, the disclosure of which are incorporated by reference herein their entirety.

BACKGROUND

Technical Field

Various embodiments of the disclosure relate to an antenna and an electronic device including the same.

Description of Related Art

Electronic devices are preferably thin and rigid.

A common dilemma in electronic devices is portability versus screen size. To keep an electronic device portable, it is generally desirable to limit the dimensions of the electronic device. However, limiting the dimensions of the electronic device imposes limitations on size of the display.

Flexible displays allow the user to enjoy a larger screen while maintaining portability. When the device is not in use, the user can minimize the size of the electronic device. When the device is in user, the user can expand the size of the electronic device and the display. For example, as part of a deformable structure, an electronic device may have an operating structure capable of changing the display area of a flexible display by supporting housings that operate in a sliding manner with respect to each other (e.g., a rollable structure or a slidable structure).

A rollable electronic device may include a first housing (e.g., a first housing structure, a base housing, a base bracket, or a base structure) and a second housing (e.g., a second housing structure, a slide housing, a slide bracket, or a slide structure), which are movably coupled to each other in a manner of being at least partially fitted together. Antennas may be configured with conductive portions of the first housing and/or the second housing of the rollable electronic device. However, since the first housing and/or the second housing operate in a sliding manner, interference may occur between the antennas provided in the first housing and/or the second housing.

Certain embodiments of the disclosure are capable of providing an electronic device in which antennas may be configured with conductive portions of the first housing and/or the second housing, a sufficient electrical length to operate in a low band is provided, and no interference occurs between the antennas.

SUMMARY

According to certain embodiments, an electronic device comprises: a first housing including a plurality of conductive portions electrically separated from each other and disposed on at least a portion of a side surface of the first housing; a second housing slidably coupled to the first housing; a flexible display supported by the first housing and the second housing and having a display area that is changable by sliding the second housing; and a wireless communication circuit disposed in the first housing and configured to transmit and receive wireless signals in a plurality of frequency bands via the plurality of conductive portions, wherein the plurality of conductive portions includes a first conductive portion and a second conductive portion, wherein the first conductive portion and the second conductive portion have a U shape or C shape and are electrically separated from each other, and wherein the first conductive portion is spaced apart from the first housing.

According to certain embodiments, an electronic device comprises: a housing including a plurality of conductive portions electrically separated from each other and disposed on at least a portion of a side surface of the housing; a display disposed in a space defined by the housing; and a wireless communication circuit configured to transmit and/or receive wireless signals in a plurality of frequency bands via the plurality of conductive portions, wherein the plurality of conductive portions include a first conductive portion and a second conductive portion which are located on at least one side surface of the housing, wherein the first conductive portion and the second conductive portion have a U shape or C shape, and wherein the housing is spaced apart from the first conductive portion.

BRIEF DESCRIPTION OF THE DRAWINGS

In connection with the description of the drawings, the same or similar components may be denoted by the same or similar reference numerals.

FIG. 7 is a diagram showing performance of the first antenna A1 using the first conductive portion according to the shape of the second conductive portion used as the second antenna A2.

FIG. 10B is a diagram showing an example of the configurations of the first antenna A1 and the second antenna A2.

FIG. 14 is a view illustrating a slide-in (e.g., screen reduction) state of an electronic device according to certain embodiments of the disclosure.

DETAILED DESCRIPTION

An electronic device according to certain embodiments of the disclosure may provide improved antenna radiation performance. In addition, with a switching structure in which an antenna operates according to the state of the electronic device (e.g., when a user holds the electronic device), it is possible to suppress deterioration in radiation performance of the antenna.

According to certain embodiments of the disclosure, an electronic device may include more antennas.

Certain embodiments of the disclosure are capable of providing an antenna having a sufficient electrical length to smoothly operate in a low band and an electronic device including the same.

Certain embodiments of the disclosure are capable of providing an electronic device including antennas that are capable of suppressing degradation in radiation performance by appropriately switching according to the state of the electronic device while avoiding interference due to a sliding structure between housings and a conductive structure of a flexible display.

In addition, various effects directly or indirectly identified through the disclosure may be provided.

Figure 1:
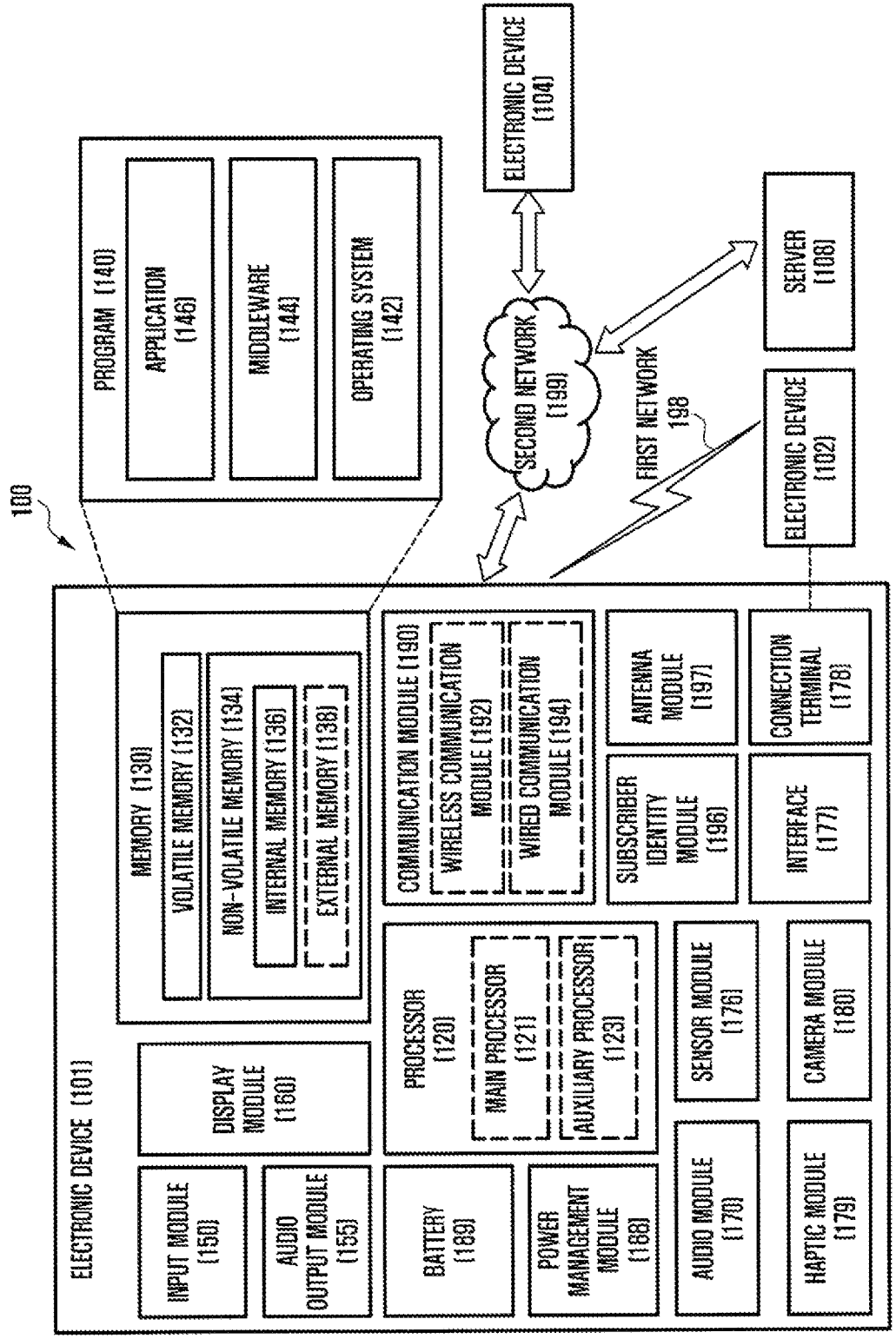
FIG. 1 is a block diagram illustrating an electronic device according to certain embodiments of the disclosure within a network environment.

FIG. 1 describes an electronic device where certain embodiments of this disclosure can be practiced.

Electronic Device

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The term "processor" shall be understood to refer to both the singular and plural contexts.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Electronic devices preferably have dimensions that allows the electronic device to be carried in a user's pocket or purse. However, the foregoing also limits the size of the display module 160. However, flexible displays allow the user to enjoy both portability and larger display sizes. That is, the electronic device can have a first state where the electronic device size is minimized, and a second state where the size of the display size is maximized. When the user is carrying the electronic device, the user can place the electronic device in the first state. When the user is actually looking at the display, the user can place the electronic device in the second state.

Certain electronic devices with flexible displays can include a housing that includes a first housing and second housing that is slidably connected to the first housing. The first state can be considered the slide-in state (FIGS. 2 and 3), and the second state can be considered the slide-out state (FIG. 4).

Housing with Flexible Display

Figure 2:
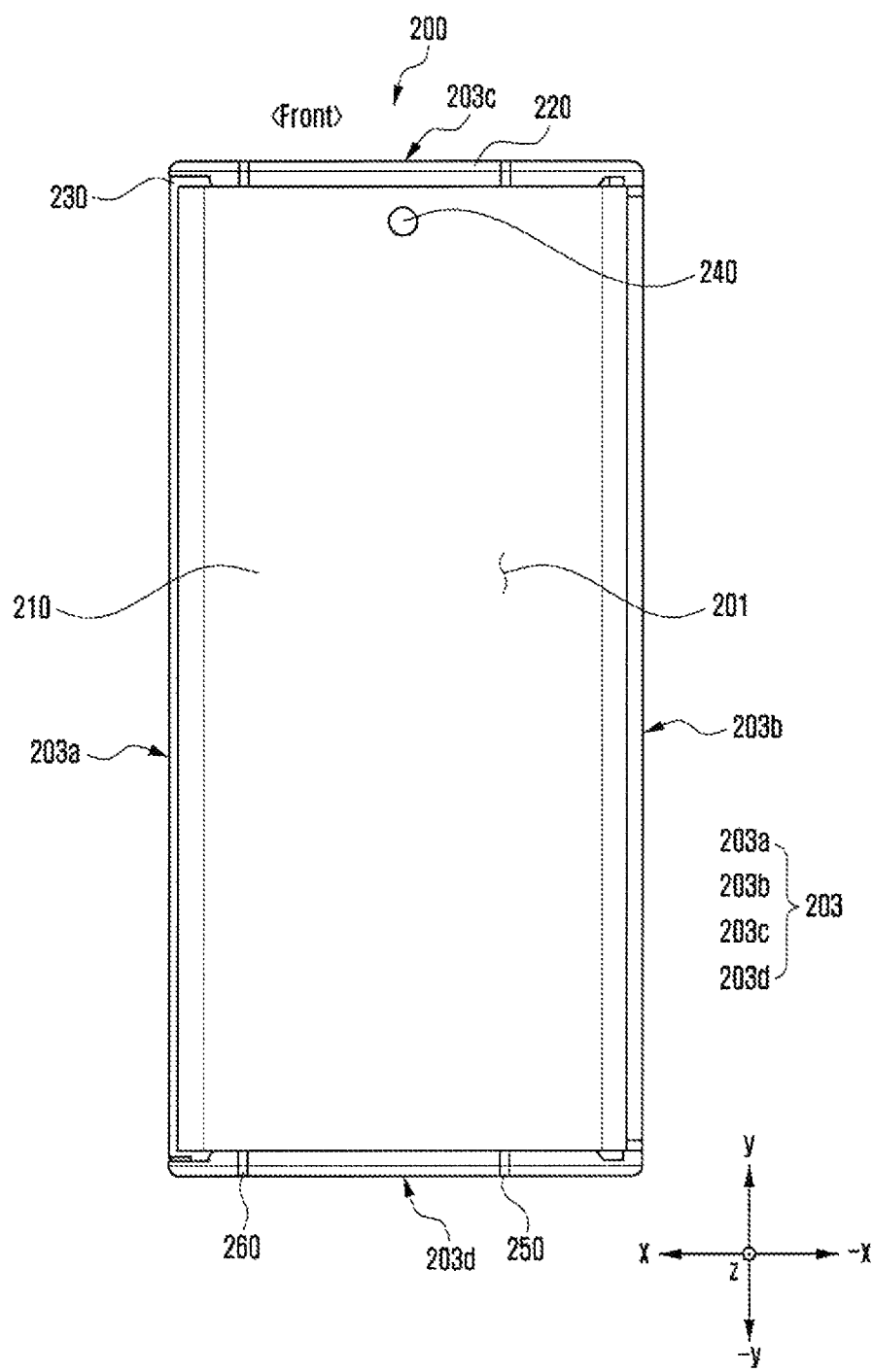
FIG. 2 is a view illustrating the front surface (e.g., a first surface) of an electronic device in a slide-in state according to certain embodiments of the disclosure.
Figure 3:
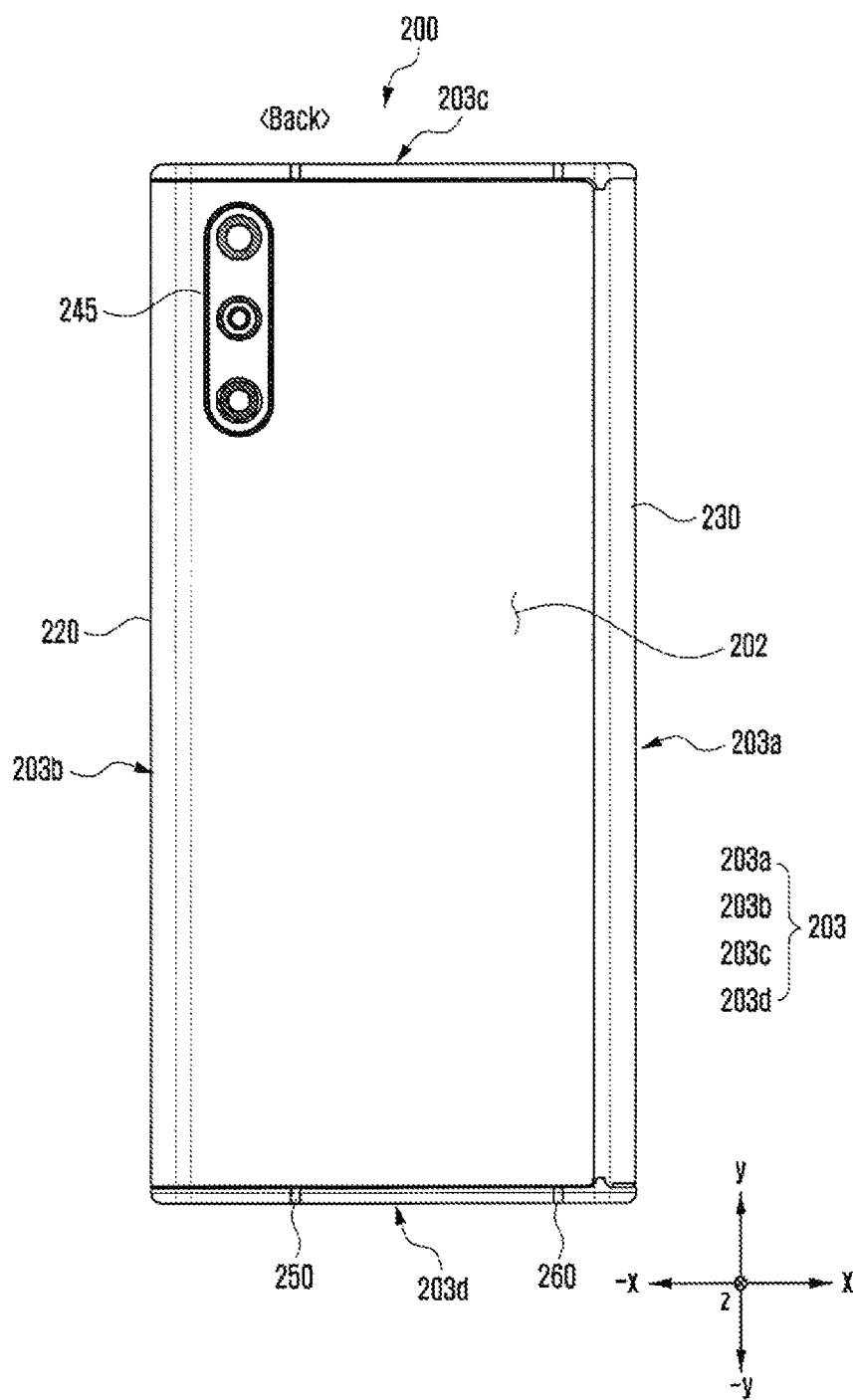
FIG. 3 is a view illustrating the rear surface (e.g., a second surface) of the electronic device in a slide-in state according to certain embodiments of the disclosure.

FIG. 2 is a view illustrating the front surface 201 (e.g., a first surface) of an electronic device 200 in a slide-in state according to certain embodiments of the disclosure. FIG. 3 is a view illustrating the rear surface 202 (e.g., a second surface) of the electronic device 200 in the slide-in state according to certain embodiments of the disclosure. FIG. 4 is a view illustrating the front surface 201 (e.g., the first surface) of the electronic device 200 in a slide-out state according to certain embodiments of the disclosure.

Figure 4:
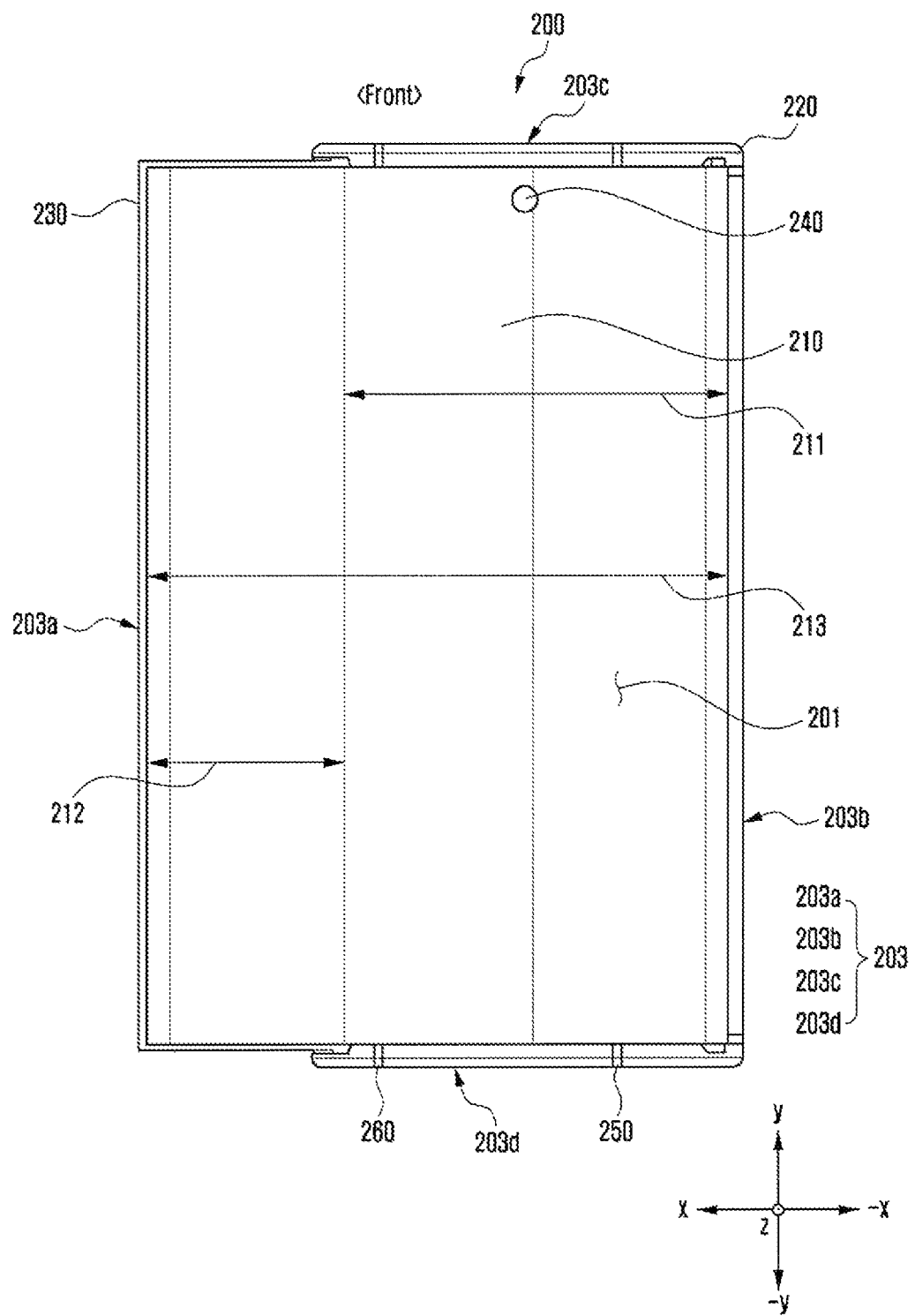
FIG. 4 is a view illustrating the front surface (e.g., the first surface) of the electronic device in a slide-out state according to certain embodiments of the disclosure.

The electronic device 200 of FIGS. 2 to 4 may be at least partially similar to the electronic device 101 of FIG. 1, or may further include other embodiments of the electronic device.

Referring to FIGS. 2 to 4, the electronic device 200 may include a first housing 220 (e.g., a first housing structure or a base housing), a second housing 230 (e.g., a second housing structure or a slide housing) coupled to the first housing 220 to be movable by a predetermined reciprocating distance from the first housing 220 in a predetermined first direction (e.g., the x-axis direction) and second direction (e.g., the −x-axis direction), and a flexible display (e.g., an expandable display) 210 disposed to be supported by at least a portion of the first housing 220 and at least a portion of the second housing 230.

The electronic device 200 may include a bendable member or a bendable support member (e.g., the bendable member 520 in FIG. 5) (e.g., a multi joint hinge module) (e.g., a multi-bar structure), which at least partially defines the same plane as at least a portion of the first housing 220 in the slide-out state and is at least partially accommodated into the internal space of the second housing 230 in the slide-in state.

Figure 5:
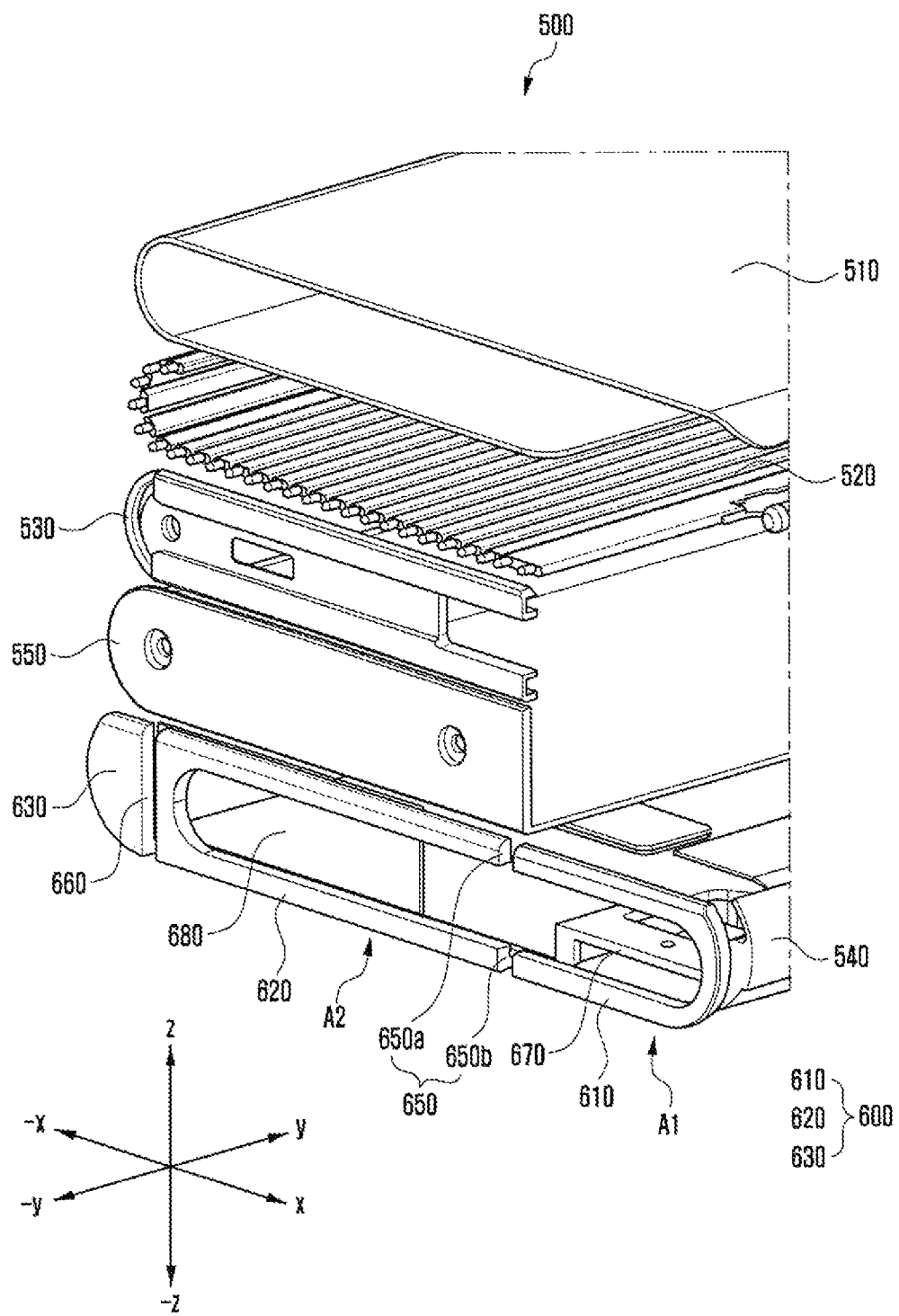
FIG. 5 is an exploded perspective view of the electronic device according to certain embodiments of the disclosure.

In the slide-in state (e.g., a screen-reduced state), at least a portion of the flexible display 210 may be disposed to be invisible from the outside by being accommodated in the internal space of the second housing 230 while being supported by the bendable member (e.g., the bendable member 520 in FIG. 5). The slide-in state may be suitable for carrying the electronic device 200.

In the slide-out state, at least a portion of the flexible display 210 may be disposed to be visible from the outside while being supported by the bendable member (e.g., the bendable member 520 in FIG. 5), which at least partially defines the same plane as the first housing 220. In the slide-out state, the size of the flexible display 210 is maximized.

The electronic device 200 may include a front surface 201 (e.g., a first surface), a rear surface 202 (e.g., a second surface) facing away from the front surface 201, and a side surface 203 surrounding the space between the front surface 201 and the rear surface 202. As an example, the side surface 203 may include a first side surface 203a, a second side surface 203b, a third side surface 203c, and a fourth side surface 203d. The first side surface 203a may be disposed in the space between the front surface 201 and the rear surface 202 in a first direction (e.g., the x-axis direction) of the electronic device 200. The second side surface 203b may be disposed in the space between the front surface 201 and the rear surface 202 in a second direction (e.g., the −x-axis direction) of the electronic device 200. The third side surface 203c may be disposed in the space between the front surface 201 and the rear surface 202 in a third direction (e.g., the y-axis direction) of the electronic device 200. The fourth side surface 203d may be disposed in the space between the front surface 201 and the rear surface 202 in a fourth direction (e.g., the −y-axis direction) of the electronic device 200.

The members configuring the first side surface 203a, the second side surface 203b, the third side surface 203c, and the fourth side surface 203d may be at least partially formed of a conductive material (e.g., metal).

The electronic device 200 may include a plurality of electronic components (e.g., camera modules 240 and 245, a sensor module (e.g., the sensor module 176 in FIG. 1), a printed circuit board, and/or a battery (e.g., the battery 189 in FIG. 1)), which are disposed in the internal space of the first housing 220.

The areas of the front surface 201 and the rear surface 202 of the electronic device 200 may vary depending on the slide-in state and the slide-out state. According to an embodiment, in the rear surface 202, the electronic device 200 may include a first rear cover disposed on at least a portion of the first housing 220 and a second rear cover disposed on at least a portion of the second housing 230.

The electronic device 200 may include a flexible display 210 disposed to be supported by at least a portion of the first housing 220 and at least a portion of the second housing 230.

The flexible display 210 may include a first portion 211 (e.g., a flat portion) (e.g., a fixed region) which is always visible from the outside, and a second portion 212 (e.g., a bendable portion) (e.g., an expansion region) which extends from the first portion 211 and is at least partially slid into the internal space of the second housing 230 so that at least a portion thereof is not visible from the outside in the slide-in state.

The first portion 211 may be disposed to be supported by the first housing 220, and the second portion 212 may be disposed to be at least partially supported by the bendable member (e.g., the bendable member 520 in FIG. 5).

In the state in which the second housing 230 is slid out in the predetermined first direction (e.g., the x-axis direction), the flexible display 210 may extend from the first portion 211 while being supported by the bendable member (e.g., the bendable member 520 in FIG. 5), may define substantially the same plane as the first portion 211, and may be disposed to be visible from the outside.

The second portion 212 of the flexible display 210 may be slid into the internal space of the second housing 230 and disposed to be invisible from the outside in the state in which the second housing 230 is slid in the predetermined second direction (e.g., the −x-axis direction). Accordingly, in the electronic device 200, as the second housing 230 moves in a sliding manner in a predetermined direction from the first housing 220, the display area 213 of the flexible display 210 may be variable. As another example, at least a portion of the second portion 212 may be visible from the outside through at least a portion of the rear surface 202.

The first housing 220 and the second housing 230 may be operated with respect to each other in a sliding manner such that the entire width is variable. The electronic device 200 may be configured to have a first width from the first side surface 203a to the second side surface 203b in the slide-in state. The electronic device 200 may be configured such that, in the slide-out state, a portion of the bendable member (e.g., the bendable member 520 in FIG. 5) slid into the internal space of the second housing 230 is moved to additionally have a second width, whereby the electronic device 200 has a third width greater than the first width. For example, in the slide-in state, the flexible display 210 may have a display area substantially corresponding to the first width, and in the slid-out state, the flexible display 210 may have an expanded display area 213 substantially corresponding to the third width.

The slide-out operation of the electronic device 200 may be performed through a user's manipulation. For example, the second housing 230 may be slid out in the predetermined first direction (e.g., the x-axis direction) through manipulation of a locker exposed through the rear surface 202 of the electronic device. In this case, the rocker may regulate the second housing 230 in order to maintain the second housing 230, which is pressed in the slide-out direction (e.g., the x-axis direction), in the slide-in state.

In some embodiments, the electronic device 200 may be shifted from the slide-in state to the slide-out state through the user's manipulation that presses the outer surface of the flexible display 210 in the predetermined first direction (the x-axis direction). In some embodiments, the second housing 230 may be automatically operated via a drive mechanism (e.g., a drive motor, a reduction module, and/or a gear assembly) disposed in the internal space of the first housing 220 and/or the internal space of the second housing 230. The electronic device 200 may be set to control the operation of the second housing 230 via the drive mechanism when an event for shifting between the slide-in state and the slide-out state of the electronic device is detected via a processor (e.g., the processor 120 in FIG. 1). In some embodiments, the processor of the electronic device 200 (e.g., the processor 120 in FIG. 1) may control the flexible display 210 to display an object in various ways and execute an application to correspond to the display area of the flexible display 210 changed according to the slide-in state, the slide-out state, or the intermediate state (e.g., including a free stop state).

The electronic device 200 may include at least one of a sound output device (e.g., the sound output module 155 in FIG. 1), a sensor module (e.g., the sensor module 176 in FIG. 1), a camera module 245, a connector port (e.g., a connection terminal 178 in FIG. 1), a key input device (not illustrated), or an indicator (not illustrated), which are disposed in the internal space of the first housing 220. As another embodiment, the electronic device 200 may be configured such that at least one of the above-mentioned components is omitted or other components are additionally included.

The sensor module (e.g., the sensor module 176 in FIG. 1) may generate an electrical signal or a data value corresponding to the internal operating state or the external environmental state of the electronic device 200. The sensor module (e.g., the sensor module 176) may further include at least one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor. For example, the sensor module (e.g., the sensor module 176 in FIG. 1) may include a first sensor module (e.g., a proximity sensor or an illuminance sensor) disposed on the front surface 201 of the electronic device 200. For example, the sensor module (e.g., the sensor module 176 in FIG. 1) may include a second sensor module (e.g., a heart rate monitoring (HRM) sensor) disposed on the rear surface 202 of the electronic device 200. The first sensor module may be disposed under the flexible display 210 on the front surface 201 of the electronic device 200.

The camera modules 240 and 245 may include a first camera module 240 disposed on the front surface 201 of the electronic device 200 and a second camera module 245 disposed on the rear surface 202 of the electronic device 200. The electronic device 200 may include a flash located near the second camera module 245. The camera modules 240 and 245 may include one or more lenses, image sensors, and/or an image signal processors. The first camera module 240 may be disposed under the flexible display 210, and may be configured to image a subject through a portion of an active region of the flexible display 210. The flash may include, for example, a light-emitting diode or a xenon lamp.

The first camera module 240 among the camera modules and some sensor modules among the sensor modules (e.g., the sensor module 176 in FIG. 1) may be disposed to detect an external environment through the flexible display 210. For example, the first camera module 240 or the some sensor modules may be disposed in the internal space of the electronic device 200 to be in contact with the external environment through a transmission region or an opening perforated in the flexible display 210.

The region of the flexible display 210 that faces the first camera module 240 may be configured as a transmission region having a predetermined transmittance as a portion of a content display region. The transmission region may have a transmittance in the range of about 5% to about 20%. The transmission region may include a region overlapping an effective region (e.g., the view angle region) of the first camera module 240 through which light imaged by an image sensor to generate an image passes. For example, the transmission region of the flexible display 210 may include a region having a lower pixel density and/or a lower wiring density than the surrounding region. For example, the transmission region may replace the above-mentioned opening. For example, some camera modules may include an under display camera (UDC). In some embodiments, some sensor modules may be disposed to perform the function thereof without being visually exposed through the flexible display 210 in the internal space of the electronic device 200.

The side surface of the first housing and/or the second housing can be used as antennas. However, since the first housing and/or the second housing operate in a sliding manner, interference may occur between the antennas.

FIG. 5 is an exploded perspective view of an electronic device 500 in accordance with an embodiment of the disclosure. The electronic device 500 includes a flexible display 520 disposed on a bendable member 520. The bendable member 520 moves about a guide rail 530 in the second housing 550. Conductive portions 620 and 630 may be disposed on side surfaces of the electronic device. Moreover, conductive portion 610 may be disposed on a side surface of the first housing 540. Spaces 650a, 650b, and 660 may electrically separate conductive portions 610, 620, and 630.

The electronic device 200 may include at least one conductive portion, the first conductive portion 610 in as a first antenna A1. The first antenna A1 can be an antenna structure or an antenna radiator and is electrically connected to a wireless communication circuit (e.g., the wireless communication module 192 in FIG. 1) disposed in the first space of the first housing 220. The electronic device 500 may include at least one second conductive portion, the second conductive portion 620 as a second antenna A2 and at least one third conductive portion 630 as a third antenna.

Between the first conductive portion 610 and the second conductive portion 620, a first space (e.g., a first split portion) 250 may be located. The first conductive portion 610 and the second conductive portion 620 may be electrically separated from each other by the first space 650.

Between the second conductive portion 620 and the third conductive portion 630, a second space (e.g., a second split portion) 660 may be located. The second conductive portion 620 and the third conductive portion 630 in may be electrically separated from each other by space 660.

As another example, when the third conductive portion (e.g., the third conductive portion 630 in FIG. 5) is formed of a non-conductive material, the second space 660 may be omitted.

FIG. 5 is an exploded perspective view of the electronic device according to certain embodiments of the disclosure.

Referring to FIG. 5, an electronic device 500 (e.g., the electronic device 101 in FIG. 1 or the electronic device 200 in FIGS. 2 to 4) according to certain embodiments of the disclosure may include a flexible display 510 (e.g., the flexible display 210 in FIGS. 2 and 4), a bendable member 520 (e.g., a multi joint hinge module) (e.g., a multi-bar structure), a guide rail 530, a first housing 540 (e.g., the first housing 220 in FIGS. 2 to 4) (e.g., a first housing structure, a base housing, a base bracket, or a base structure), a second housing 550 (e.g., the second housing 230 in FIGS. 2 to 4) (e.g., a second housing structure, a slide housing, a slide bracket, or a slide structure), and a plurality of conductive portions 600 that constitute at least two U-frame antennas.

In an embodiment of the disclosure, a U-frame antenna may mean a U-shaped or C-shaped antenna. The term "U frame" or "C frame" are used to generally describe a semi-oval shape or perimeter.

A printed circuit board (e.g., a PCB), a camera module (e.g., the camera module 245 in FIG. 3), or a sensor module (e.g., the sensor module 176 in FIG. 3) may be disposed in the internal space of the first housing 540.

The bendable member 520 may be disposed such that one end is fixed to the first housing 540 and the other end is accommodated in the internal space of the second housing 550 to be at least partially rotatable. For example, the bendable member 520 may be at least partially accommodated in the internal space of the second housing 550 in the slide-in state. For example, the bendable member 520 may be at least partially slid out from the internal space to define substantially the same plane as the first housing 540 in the slide-out state. Accordingly, the display area (e.g., the display area 213 in FIG. 4) of the flexible display 510 supported by the first housing 540 or the bendable member 520 may be variable in response to the sliding operation.

The guide rail 530 may be disposed on a side surface of the second housing 550 to guide the movement of the bendable member 520 in the internal space of the second housing 550.

The plurality of conductive portions 600 may include a first conductive portion 610, a second conductive portion 620, or a third conductive portion 630 that constitute antennas. As an example, the first antenna A1 may be configured with at least a portion of the U-shaped or C-shaped first conductive portion 610. As an example, the second antenna A2 may be configured with at least a portion of the U-shaped or C-shaped second conductive portion 620. In an embodiment, the third conductive portion 630 may replaced with a non-conductive member having the same shape.

A first space (e.g., a first split portion) 650 (e.g., the first space 250 in FIG. 2) may be located between the first conductive portion 610 and the second conductive portion 620, electrically separating the first conductive portion 610 and the second conductive portion 620. The first conductive portion 610 and the second conductive portion 620 may be electrically separated by the first space 650.

Between the second conductive portion 620 and the third conductive portion 630, a second space (e.g., a second split portion) 660 (e.g., the second space 260 in FIG. 2) may be located. The second conductive portion 620 and the third conductive portion 630 may be electrically separated by the second space 650. As another example, when the third conductive portion 630 replaced with a non-conductive member, the second space 660 may be omitted.

The U-shaped or C-shaped first antenna A1 and second antenna A2 may be disposed to face each other.

Since the second conductive portion 620 has the U shape or C shape, the first space 650 may include two sub-spaces 650a and 650b such that the second conductive portion 620 and the first conductive portion 610 are split from each other. As an example, the two sub-spaces 650a and 650b may be located on the same line with reference to the z-axis direction. As an example, the two sub-spaces 650a and 650b may be located on different lines with reference to the z-axis direction.

At least a portion of the first conductive portion 610 may operate as a radiator of the first antenna A1 and may be disposed on the third side surface (e.g., the third side surface 203c in FIGS. 2 to 4) and/or the fourth side surface (e.g., the fourth side surface 203d in FIGS. 2 to 4) of the electronic device 500 (e.g., the electronic device 200 in FIGS. 2 to 4).

At least a portion of the second conductive portion 620 may operate as a radiator of the second antenna A2 and may be disposed on the third side surface (e.g., the third side surface 203c in FIGS. 2 to 4) and/or the fourth side surface (e.g., the fourth side surface 203d in FIGS. 2 to 4) of the electronic device 500 (e.g., the electronic device 200 in FIGS. 2 to 4).

The first conductive portion 610 may include a first space (e.g., a first split portion) 670. For example, the first conductive portion 610 may define a U-shaped or C-shaped electrical path with the first space 670. As an example, the first space 670 may be filled with a non-conductive material.

The second conductive portion 620 may include a second space (e.g., a second split portion) 680. For example, the second conductive portion 620 may define a U-shaped or C-shaped electrical path with the second space 680. As an example, the second space 680 may be filled with a non-conductive material (e.g., a non-conductive material).

In an embodiment, the first space 670 and the second space 680 may be slits that are open at one side. For example, the first space 670 and the second space 680 may be disposed such that the open portions thereof face each other.

Figure 6A:
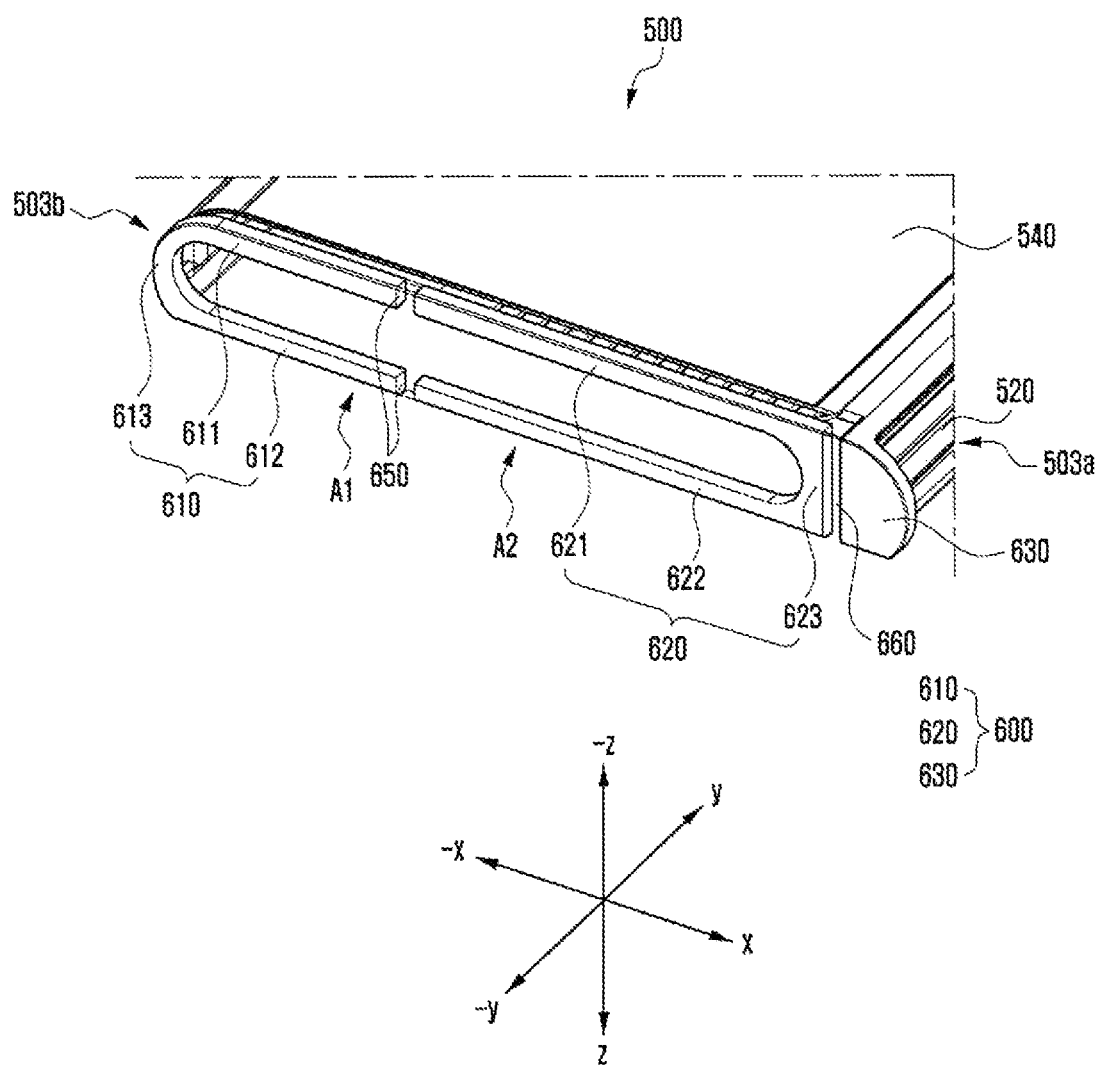
FIGS. 6A and 6B illustrate frame antennas of the electronic device according to certain embodiments of the disclosure, in which a first antenna A1 using a first conductive portion and a second antenna A2 using a second conductive portion are illustrated.
Figure 6B:
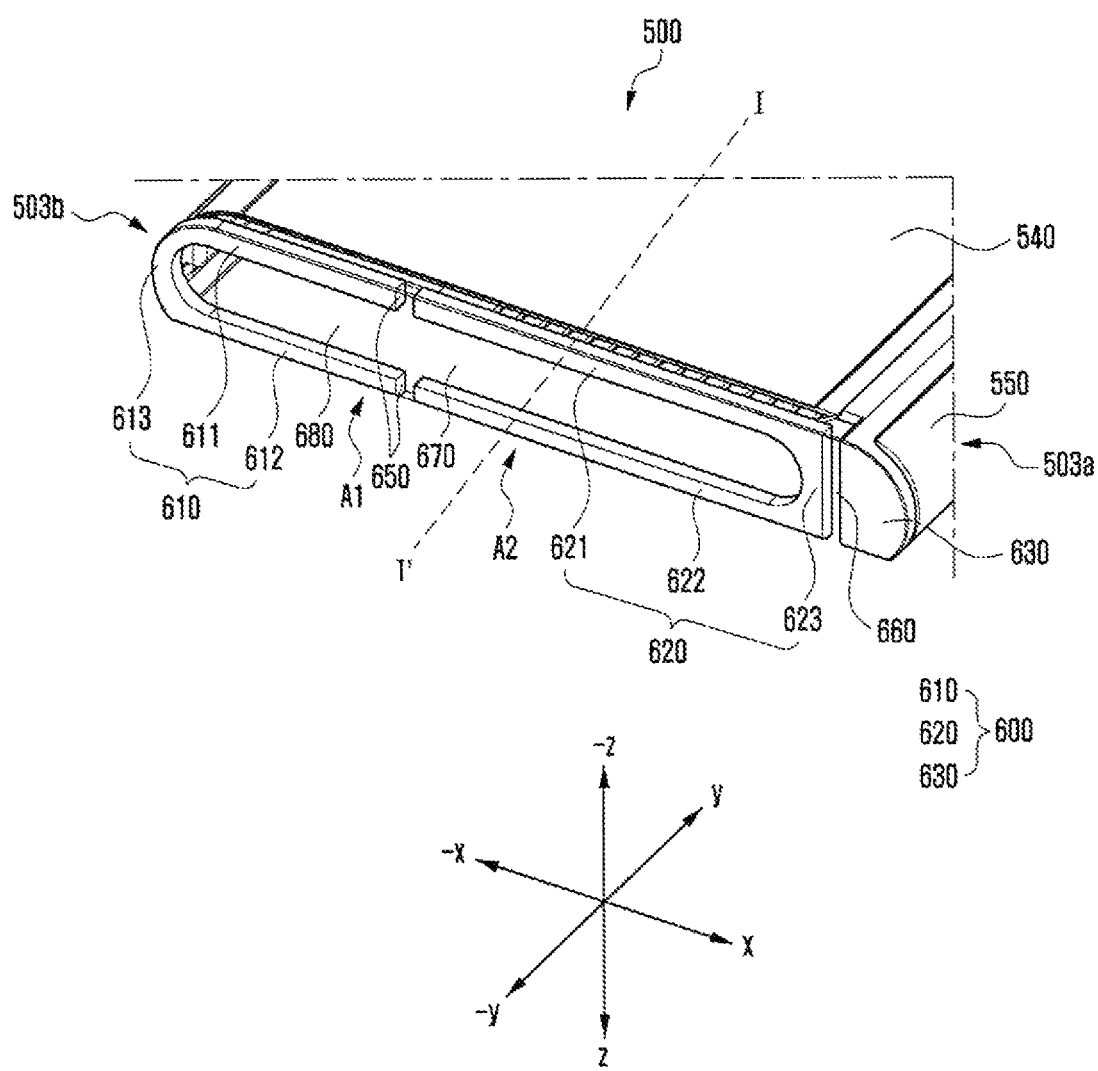

FIGS. 6A and 6B illustrate frame antennas of the electronic device according to certain embodiments of the disclosure, in which the first antenna A1 using the first conductive portion 610 and the second antenna A2 using the second conductive portion are illustrated.

The plurality of conductive portions 600 may include a first conductive portion 610, a second conductive portion 620, or a third conductive portion 630 disposed on a side surface of the first housing 540 (e.g., the first housing 220 in FIG. 1) (e.g., the third side surface 203c or the fourth side surface 203d of the electronic device 200 in FIGS. 2 to 4). The first conductive portion 610 and the second conductive portion 620 may be disposed to be split from each other. The second conductive portion 620 and the third conductive portion 630 may be disposed to be split from each other. In FIG. 6A, the bendable member 520 disposed inside the second housing 550 is visible, and in FIG. 6B, the bendable member 520 is covered by the second housing 550.

A side bezel structure (a support member or a side structure) of the first housing 540 may be formed of a conductive material, so that the first conductive portion 610 and the second conductive portion 620 may be provided. A portion of a side bezel structure (a support member or a side structure) of the first housing 540 is used as an antenna radiator, wherein the first conductive portion 610 and the second conductive portion 620 may be used as antenna radiators. In an embodiment, the first conductive portion 610 and the second conductive portion 620 may be a portion of the first housing 540. The first conductive portion 610 may be used as the first antenna A1, and the second conductive portion 620 may be used as the second antenna A2.

In the slide-in state, the first conductive portion 610 and the second conductive portion 620 may be electrically separated from other portions of the housing 540 (e.g., the first housing 220 in FIGS. 2 to 4) that include a conductive material. For example, slits 670 and 680 or spaces may be provided between the first conductive portion 610 and the second conductive portion 620 and other portions including the conductive material of the first housing 540, and non-conductive members may be disposed in the slits 670 and 680 or the spaces. For example, the first conductive portion 610 and the second conductive portion 620 and other portions including the conductive material of the first housing 540 may be coupled to each other by non-conductive members. The first conductive portion 610 may include a first space (e.g., a first split portion) 670. For example, the first conductive portion 610 may define a U-shaped or C-shaped electrical path with the first space 670. As an example, the first space 670 may be filled with a non-conductive material (e.g., a non-conductive material).

The second conductive portion 620 may include a second space (e.g., a second split portion) 680. For example, the second conductive portion 620 may define a U-shaped or C-shaped electrical path with the second space 680. As an example, the second space 680 may be filled with a non-conductive material (e.g., a non-conductive material).

The first conductive portion 610 may include a first portion 611 configured in a predetermined width to have a length in the first direction (e.g., the x-axis direction), a second portion 612 spaced apart from the first portion 611 by a predetermined interval and configured in a predetermined width to have a length in the first direction (e.g., the x-axis direction), and a third portion 613 interconnecting one end of the first portion 611 and one end of the second portion 612.

The first portion 611, the second portion 612, and the third portion 613 of the first conductive portion 610 may be configured integrally. The first conductive portion 610 may be configured in the U shape or C shape in which the first portion 611, the second portion 612, and the third portion 613 are electrically connected to each other.

In some embodiments, the lengths of the first portion 611 and the second portion 612 of the first conductive portion 610 may be substantially equal to each other. In some embodiments, the lengths of the first portion 611 and the second portion 612 of the first conductive portion 610 may be different from each other.

The third portion 613 of the first conductive portion 610 may be disposed at a position adjacent to the second side surface 503b (e.g., the second side surface 203b of FIGS. 2 to 4) of the electronic device 500.

The second conductive portion 620 may include a first portion 621 configured in a predetermined width to have a length in the second direction (e.g., the −x-axis direction), a second portion 622 spaced apart from the first portion 621 by a predetermined interval and configured in a predetermined width to have a length in the second direction (e.g., the −x-axis direction), and a third portion 623 interconnecting one end of the first portion 621 and one end of the second portion 622.

The first portion 621, the second portion 622, and the third portion 623 of the second conductive portion 620 may be configured integrally. The second conductive portion 620 may be configured in the U shape or C shape in which the first portion 621, the second portion 622, and the third portion 623 are electrically connected to each other.

In some embodiments, the lengths of the first portion 621 and the second portion 622 of the second conductive portion 620 may be substantially equal to each other. In some embodiments, the lengths of the first portion 621 and the second portion 622 of the second conductive portion 620 may be different from each other.

The third portion 623 of the second conductive portion 620 may be disposed at a position adjacent to the first side surface 503a (e.g., the first side surface 203a in FIGS. 2 to 4) of the electronic device 500.

The first conductive portion 610 and the second conductive portion 620 are disposed in the regions that are not covered by the first housing 540 and the second housing 550 in the slide-in state, but are always exposed to the outside, which may help to exhibit stable radiation performance of the first antenna A1 and the second antenna A2 regardless of the sliding operation of the second housing 550.

The third conductive portion 630 may be split from the first conductive portion 610 and the second conductive portion 620, and may be configured integrally with or coupled to another portion of the first housing 540. As an example, the third conductive portion 630 may have substantially the same shape as the cross section of the first side surface 503a cut in the x-axis direction.

As an embodiment, between the first conductive portion 610 and the second conductive portion 620, a first space (e.g., a first split portion) 650 may be located. The first conductive portion 610 and the second conductive portion 620 may be electrically separated by the first space 650. Between the second conductive portion 620 and the third conductive portion 630, a second space (e.g., a second split portion) 660 may be located. The second conductive portion 620 and the third conductive portion 630 may be electrically separated by the second space 650. As another example, when the third conductive portion 630 replaced with a non-conductive member, the second space 660 may be omitted.

In the electronic device 500 according to exemplary embodiments of the disclosure, at a position not involved in the sliding operation, the first antenna A1 and the second antenna A2 are configured in a shape having a sufficient electrical length, which may help to exhibit smooth radiation performance in a predetermined frequency band (e.g., a low band) required by the antennas.

According to certain embodiments of the disclosure, in the electronic device 500, the first antenna A1 and the second antenna A2, which use the first conductive portion 610 and the second conductive portion 620, respectively, which are disposed on a side surface of the first housing 540, may be disposed to face each other.

The lengths or electrical lengths of the first portion 611 of the first conductive portion 610 and the second portion 621 of the second conductive portion 620 may be different from each other.

The lengths or electrical lengths of the second portion 612 of the first conductive portion 610 and the second portion 622 of the second conductive portion 620 may be different from each other.

The lengths or electrical lengths of the third portion 613 of the first conductive portion 610 and the second portion 623 of the second conductive portion 620 may be different from each other. The lengths of the third portion 613 of the first conductive portion 610 and the second portion 623 of the second conductive portion 620 may be substantially equal to each other.

The first conductive portion 610 and the second conductive portion 620 may be used as antenna radiators, which operate in at least one frequency band, by being electrically connected to a wireless communication circuit (e.g., the wireless communication module 192 in FIG. 1).

In an embodiment, the wireless communication circuit (e.g., the wireless communication module 192 in FIG. 1) may be configured to transmit and/or receive wireless signals in a low band, mid band, high band or ultra-high band via the first conductive portion 610 and/or the second conductive portion 620.

The wireless communication circuit (e.g., the wireless communication module 192 in FIG. 1) may include a switching circuit, wherein the switching circuit may be replaced with a variable circuit (e.g., a tunable IC) including a plurality of lumped elements.

The first antenna A1 and the second antenna A2 may be used as antennas operating in different frequency bands. For example, the first antenna A1 and the second antenna A2 may be used as antennas operating in the same frequency band. The electronic device 500 according to certain embodiments of the disclosure may further include an antenna other than the first antenna A1 using the first conductive portion 610 and the second antenna A2 using the second conductive portion 620. The other antenna may be configured with a laser direct structuring (LDS) pattern. The other antenna may be used as an antenna operating in a frequency band different from those of the first antenna A1 and the second antenna A2 by being electrically connected to the wireless communication circuit (e.g., the wireless communication module 192 of FIG. 1).

The electronic device 500 may include at least one processor (e.g., the processor 120 in FIG. 1) which detects state information and functionally controls a switching circuit of the wireless communication circuit (e.g., the wireless communication module 192 in FIG. 1) based on the detected state information. The at least one processor (e.g., the processor 120 in FIG. 1) may control the switching circuit in order to operate the first antenna A1 or the second antenna A2 in a frequency band in which relatively excellent performance may be exhibited based on holding information of the electronic device 500 by the user. In some embodiments, the at least one processor (e.g., the processor 120 in FIG. 1) may control the switching circuit in order to select the first antenna A1 or the second antenna A2 based on a regional operating frequency band or a received electric field strength.

Figure 6C:
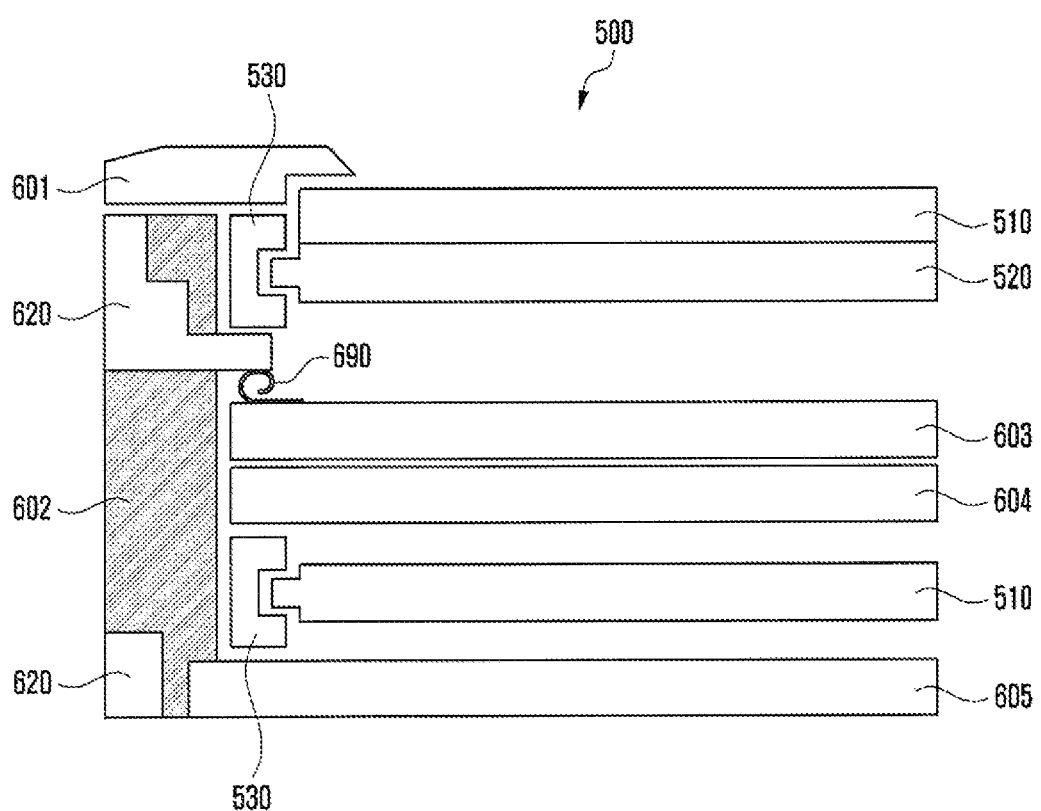
FIG. 6C is a cross-sectional view taken along line I-I' of FIG. 6B.

FIG. 6C is a cross-sectional view taken along line I-I' of FIG. 6B. Referring to FIG. 6C, the electronic device 500 according to certain embodiments of the disclosure may include a front cover 601, a flexible display 510 (e.g., the flexible display 510 in FIG. 5), a bendable member 520 (e.g., the bendable member 520), a second conductive portion 620 (e.g., the second conductive portion 620 in FIGS. 5 and 6A), a non-conductive material 602 (e.g., a non-conductive material), a guide rail 530 (e.g., the guide rail 530 in FIG. 5), a printed circuit board 603, a bracket 604, a rear cover 605, and/or a feeder 690.

The front cover 601 may be disposed to cover an edge (e.g., a bezel region) of the flexible display 510. The front cover 601 may prevent foreign matter from being introduced. The second space 680 provided in the second conductive portion 620 may be filled with a non-conductive material 602 (e.g., a non-conductive material). A printed circuit board 603 may be disposed above the bracket 604, and a wireless communication circuit may be disposed on the printed circuit board 603.

As an embodiment, in a first state (e.g., the slide-in state) of the electronic device 500, at least a portion of the flexible display 510 may be located inside the second housing 550. In an embodiment, a feeder 690 may be disposed between the second conductive portion 620 and the printed circuit board 603. The wireless communication circuit disposed on the printed circuit board 603 and the feeder 690 may be electrically connected to each other. The second antenna A2 and the wireless communication circuit of the printed circuit board 603 may be electrically connected to each other via the feeder 690.

Figure 6D:
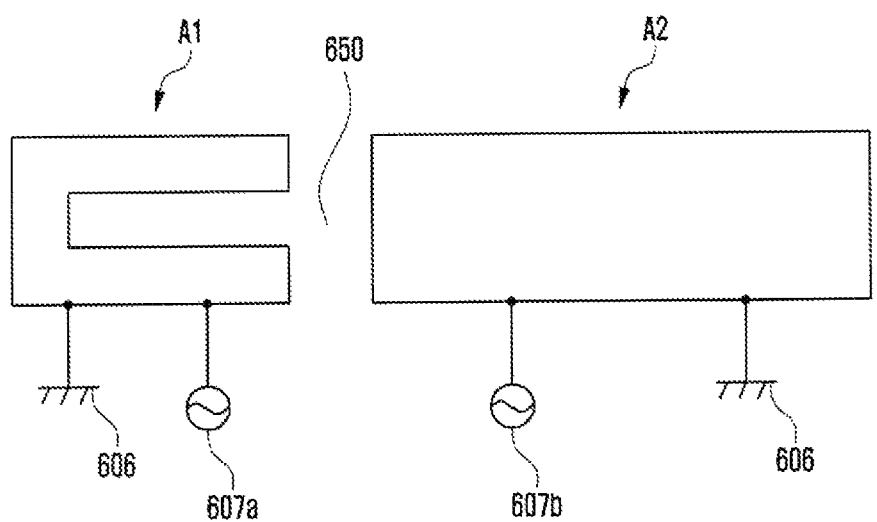
FIGS. 6D and 6E are views illustrating feeders and grounds of an antenna.
Figure 6E:
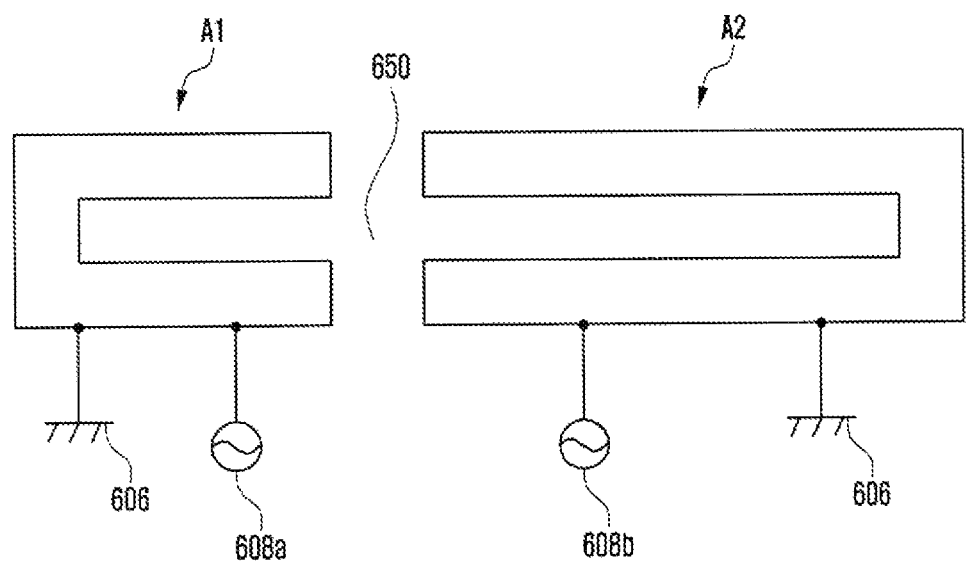

FIGS. 6D and 6E are views illustrating feeders and grounds of the antenna.

Referring to FIG. 6D, the first antenna A1 (e.g., the first conductive portion 610 in FIG. 5) may be configured in the U shape or C shape. The second antenna A2 (e.g., the second conductive portion 620 in FIG. 5) may be configured in a bar type. A first space (e.g., a first split portion) 650 may be disposed between the first antenna A1 (e.g., the first conductive portion 610 in FIG. 5) and the second antenna A2 (e.g., the second conductive portion 620 in FIG. 5) to electrically separate the first antenna A1 (e.g., the first conductive portion 610 in FIG. 5) and the second antenna A2 (e.g., the second conductive portion 620 in FIG. 5) from each other.

The U-shaped or C-shaped first antenna A1 (e.g., the first conductive portion 610 in FIG. 5) may be electrically connected to a ground 606 and a first feeder 607*a*. The bar type second antenna A2 (e.g., the second conductive portion 620 in FIG. 5) may be electrically connected to the ground 606 and the second feeder 607*b*.

Referring to FIG. 6E, the first antenna A1 (e.g., the first conductive portion 610 in FIG. 5) may be configured in the U shape or C shape. The second antenna A2 (e.g., the second conductive portion 620 in FIG. 5) may be configured in the U shape or C shape. A first space (e.g., a first split portion) 650 may be disposed between the first antenna A1 (e.g., the first conductive portion 610 in FIG. 5) and the second antenna A2 (e.g., the second conductive portion 620 in FIG. 5) to electrically separate the first antenna A1 (e.g., the first conductive portion 610 in FIG. 5) and the second antenna A2 (e.g., the second conductive portion 620 in FIG. 5) from each other.

The U-shaped or C-shaped first antenna A1 may be electrically connected to the ground 606 and a first feeder 608*a*. The U-shaped or C-shaped second antenna A2 may be electrically connected to the ground 606 and a second feeder 608*b*.

FIG. 7 is a diagram (700) showing performance of the first antenna A1 using the first conductive portion according to the shape of the second conductive portion used as the second antenna A2.

Referring to FIGS. 6A, 6B, and 7, it can be seen that, when the U-shaped or C-shaped first antenna A1 and second antenna A2 are configured with a plurality of conductive portions 600 (graph 710)) and when the first antenna A1 is configured in a U shape or a C shape and the second antenna A2 is configured in a bar type (graph 710), the radiation performance of the first antenna A1 in the operating frequency band of the first antenna A1 is improved. For example, it can be seen that, when the first antenna A1 and the second antenna A2 are configured as U-shaped or CC-shaped antennas, the radiation performance of the first antenna is improved in the frequency band of about 1000 MHz to about 1500 MHz (e.g., a middle frequency band). For example, since the second antenna A2 is configured in the U shape or C shape, interference with the first antenna A1 may be reduced and the radiation efficiency of the first antenna A1 may be increased.

Figure 8:
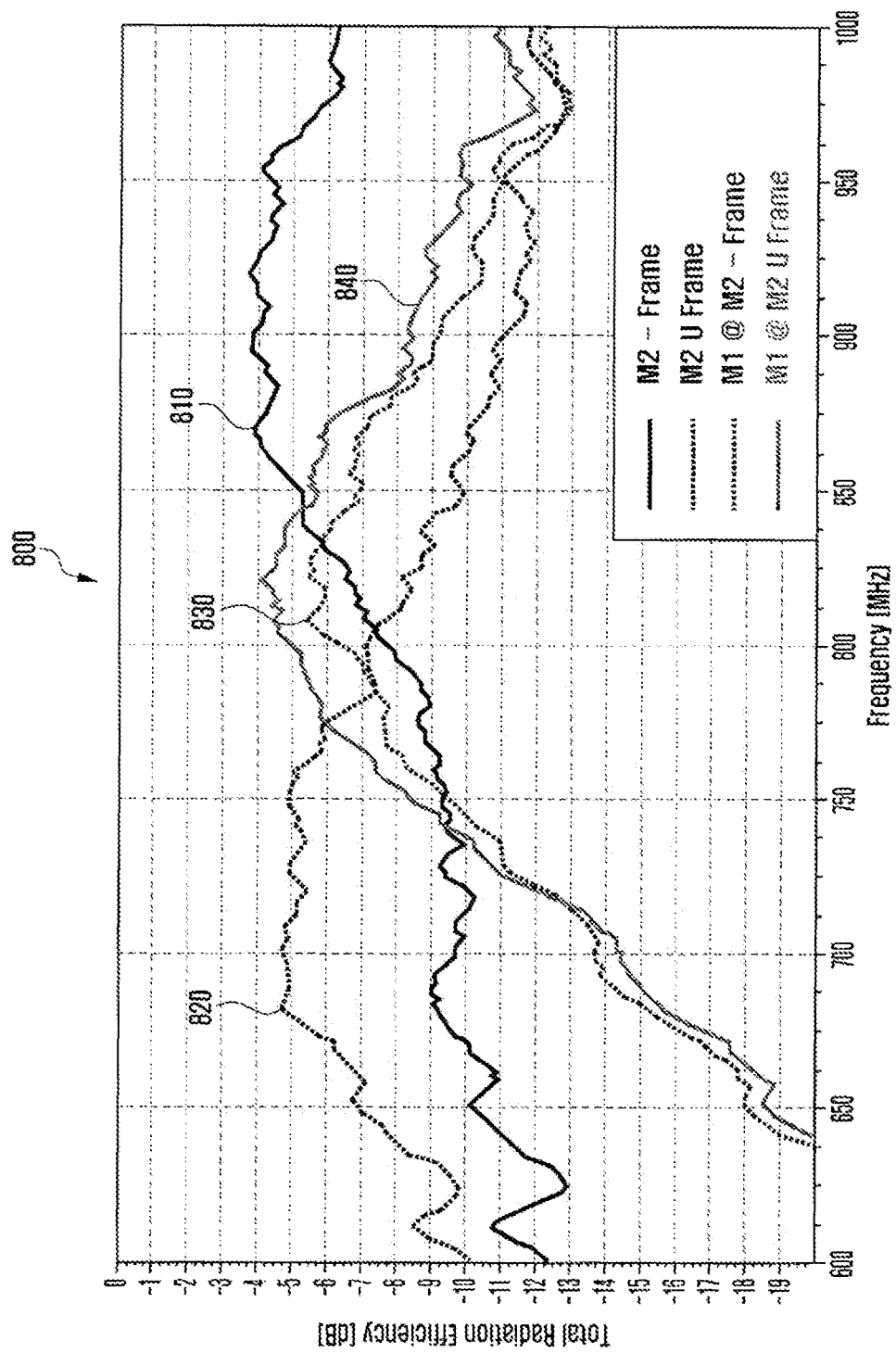
FIG. 8 is a diagram showing performance of the first antenna A1 using the first conductive portion according to the shape of the second conductive portion used as the second antenna when configuring a low band.

FIG. 8 is a diagram (800) showing performance of the first antenna A1 using the first conductive portion according to the shape of the second conductive portion used as the second antenna A2 when configuring a low band.

Referring to FIGS. 6A, 6B, and 8, it can be seen that the performance of the first antenna A1 is changed according to the shape of the second antenna A2 when configuring a low band.

As an embodiment, it can be seen that, compared to the case in which the second antenna A2 is configured in a bar type (graph 810), when the second antenna A2 is configured in the U shape or C shape (graph 820), the radiation performance of the first antenna A1 is improved.

As an embodiment, it can be seen that, compared to the case in which the first antenna A1 and the second antenna A2 are configured in the bar type (graph 830), when the first antenna A1 and the second antenna A2 are configured in the U shape or C shape (graph 840), the radiation performance of the first antenna A1 is improved in an about 800 MHz band.

Figure 9:
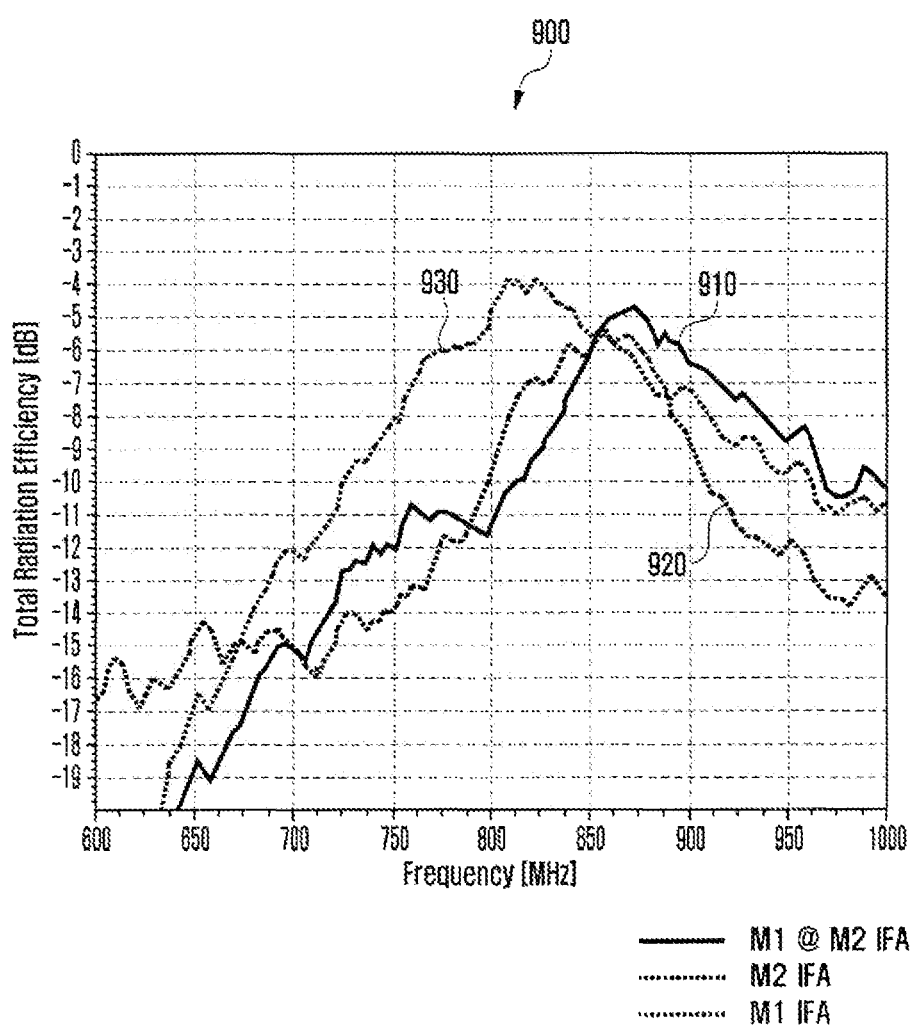
FIG. 9 is a diagram showing changes in antenna performance according to the types of the first antenna and the second antenna.

FIG. 9 is a diagram showing changes in antenna performance according to the types of the first antenna M1 and the second antenna M2.

Referring to FIGS. 6A, 6B, and 9, when comparing the case in which the first antenna A1 and the second antenna A2 are configured in an inverted F antenna (IFA) type (graph 910), the case in which only the second antenna A2 is configured in the IFA type without the first antenna A1 (graph 920), and the case in which only the first antenna A1 is configured in the IFA type without the second antenna A2 (graph 930), it can be seen that, compared to the case in which the first antenna A1 or the second antenna A2 is configured alone in the electronic device (e.g., the electronic device 200 in FIGS. 2 to 4 or the electronic device 500 of FIGS. 5 and 6B), when the first antenna A1 and the second antenna A2 are simultaneously implemented in the IFA type in the electronic device, the radiation performance of the first antenna A1 and the second antenna A2 is reduced in an about 800 MHz band. In the case in which the first antenna A1 and the second antenna A2 are configured in the U shape or C shape, if the antennas are configured in the same type as each other when the first antenna A1 and the second antenna A2 have a resonance in adjacent bands, effects on the first antenna A1 and the second antenna A2 increase so that the radiation performance may decrease.

Figure 10A:
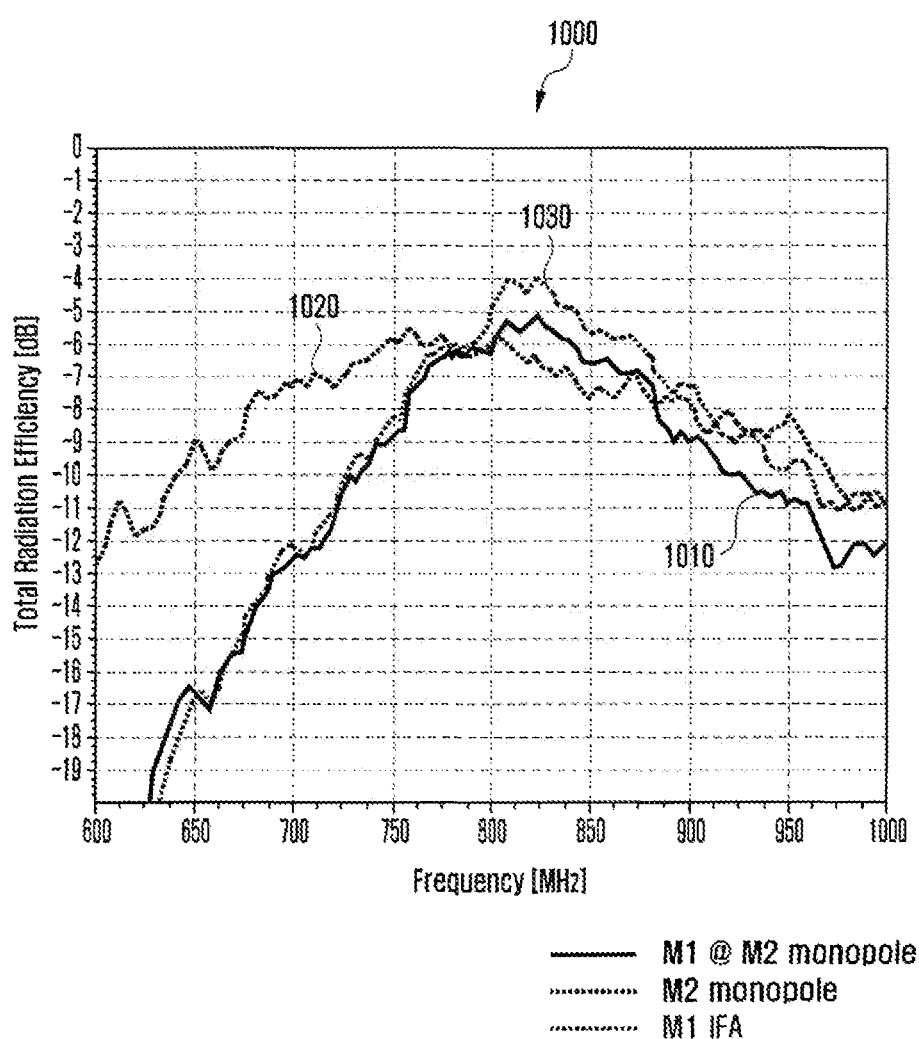
FIG. 10A is a diagram (1000) showing effects according to the types of antennas when the first antenna A1 using the first conductive portion and the second antenna A2 using the second conductive portion operate in adjacent frequency bands.

FIG. 10A is a diagram (1000) showing effects according to the types of antennas when the first antenna A1 using the first conductive portion and the second antenna A2 using the second conductive portion operate in adjacent frequency bands. FIG. 10B is a view illustrating an example of the configurations of the first antenna A1 and the second antenna A2.

Referring to FIGS. 6A, 6B, 10A, and 10B, the first antenna A1 (e.g., the first conductive portion 610 in FIG. 5) may be configured in the U shape or C shape. The second antenna A2 (e.g., the second conductive portion 620 in FIG. 5) may be configured in the U shape or C shape. A first space (e.g., a first split portion) 650 may be disposed between the first antenna A1 (e.g., the first conductive portion 610 in FIG. 5) and the second antenna A2 (e.g., the second conductive portion 620 in FIG. 5) to electrically separate the first antenna A1 (e.g., the first conductive portion 610 in FIG. 5) and the second antenna A2 (e.g., the second conductive portion 620 in FIG. 5) from each other.

The U-shaped or C-shaped first antenna A1 may be electrically connected to a ground 1040 and a first feeder 1050*a*. The U-shaped or C-shaped second antenna A2 may be electrically connected to the ground 1040 and a second feeder 1050*b*.

The U-shaped or C-shaped first antenna A1 may be electrically connected to a ground 1060 and a first feeder 1070*a*. The U-shaped or C-shaped second antenna A2 may be electrically connected to a second feeder 1070*b*.

When comparing the case in which the first antenna A1 is configured in an IFA type and the second antenna A2 is configured in a monopole type (graph 1010), the case in which only the second antenna A2 is configured in the monopole type in an electronic device (e.g., the electronic device 200 in FIGS. 2 to 4 or the electronic device 500 in FIGS. 5 and 6B) without the first antenna A1 (graph 1020), and the case in which the first antenna A1 is configured in the inverted F antenna (IFA) type in the electronic device without the second antenna A2 (graph 1030), it can be seen that, in the case in which the first antenna A1 or the second antenna A2 is configured alone in the electronic device and the case in which the first antenna A1 is implemented in the IFA type and the second antenna A2 is implemented in the monopole type in the electronic device, the radiation performances of the first antenna A1 and the second antenna A2 are similar to each other in an about 800 MHz band. According to an embodiment, in the case in which the first antenna A1 and the second antenna A2 are configured in the U shape or C shape, if the antennas are configured in different types when the first antenna A1 and the second antenna A2 have a resonance in adjacent bands, effects on the first antenna A1 and the second antenna A2 may decrease.

Figure 11:
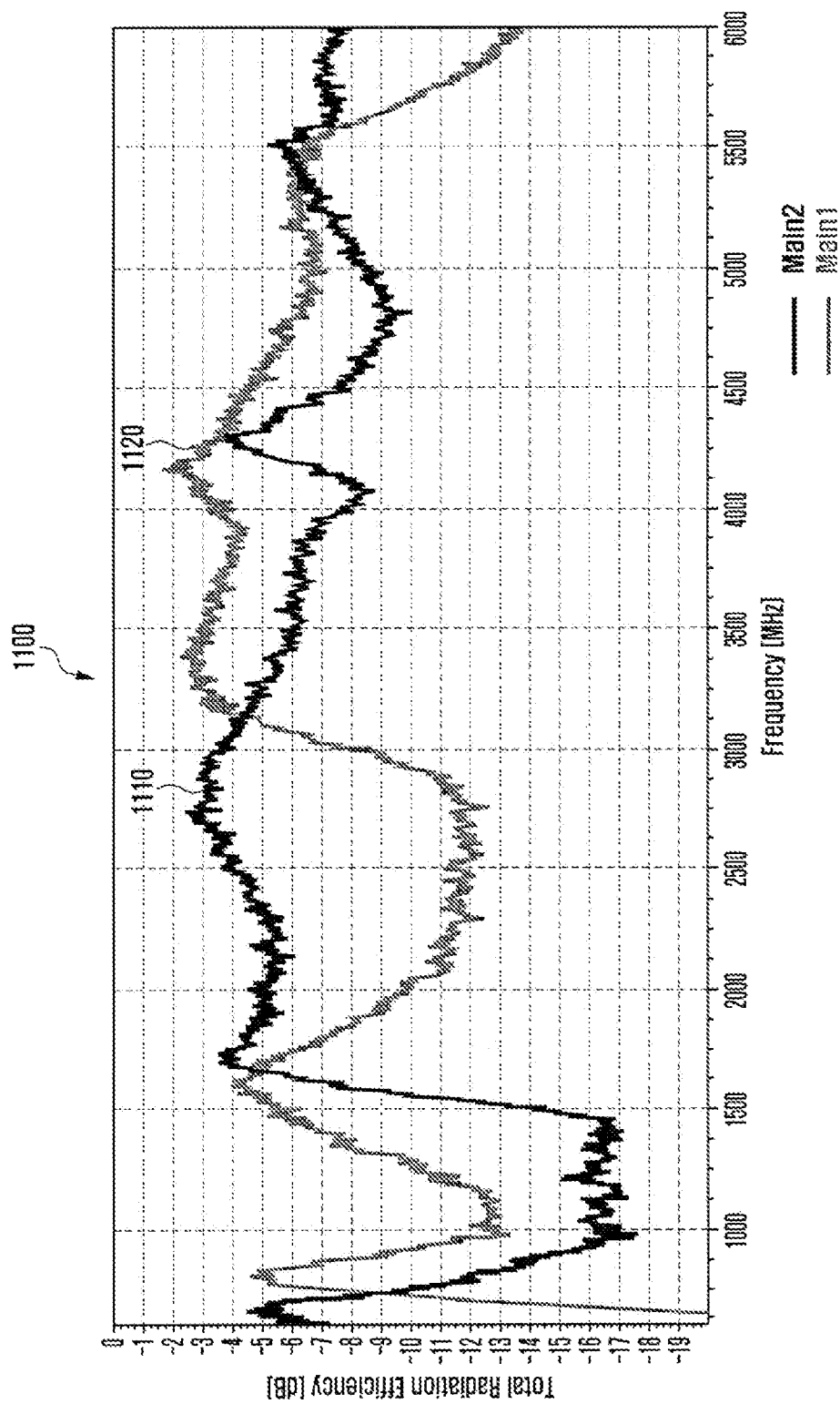
FIG. 11 is a diagram showing that various frequency bands are satisfied and a carrier aggregation (CA) design is supported with frame antennas (the first antenna and the second antenna).

FIG. 11 is a diagram (1100) showing that the first antenna A1 and a second antenna A2 configured in the U shape or C shape satisfy various frequency bands and support a carrier aggregation (CA) design.

Referring to FIGS. 6A, 6B, and 11, the first antenna A1 may be configured in the U shape or C shape, and the second antenna A2 may be configured in the U shape or C shape.

As an embodiment, referring to the radiation performance of the first antenna A1 (graph 1120) and the radiation performance of the second antenna A2 (graph 1110) when the first antenna A1 operates in the first frequency band and the second antenna A2 operates in the second frequency band, the first antenna A1 and the second antenna A2 may form different frequency bands to satisfy all bands. In addition, since the first antenna A1 and the second antenna A2 form different frequency bands, it is possible to facilitate a carrier aggregation (CA) design.

Figure 12:
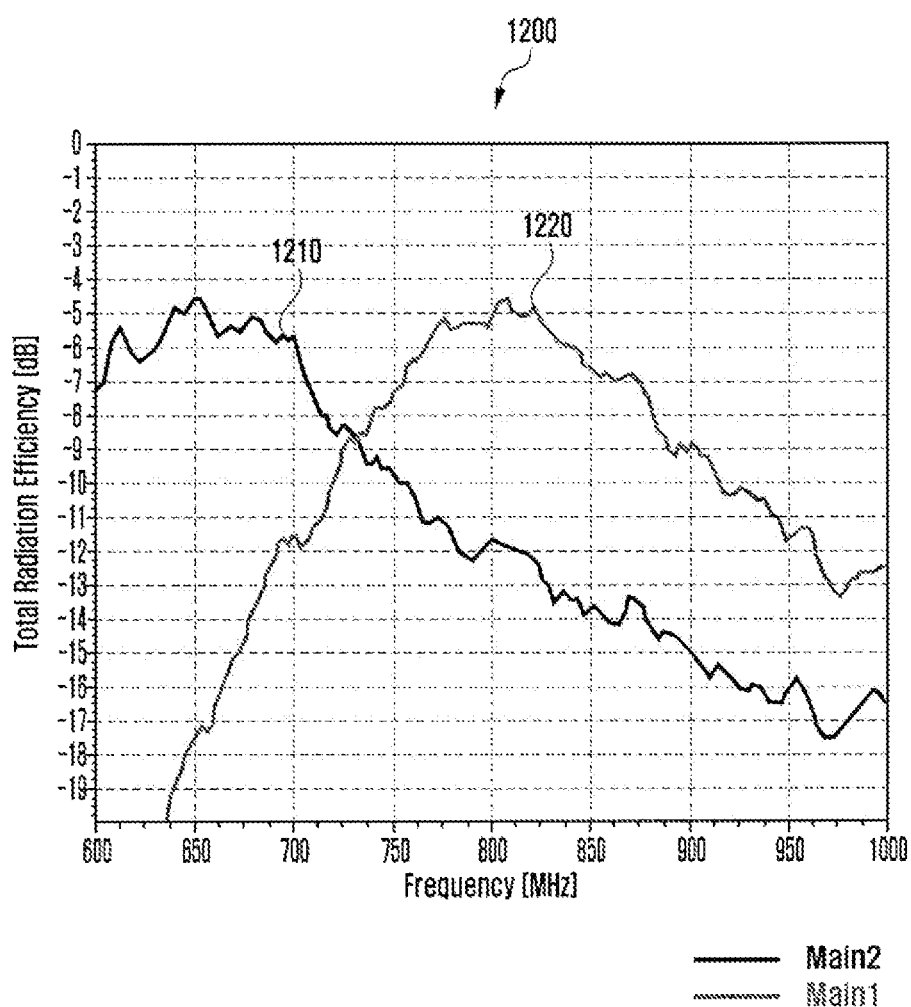
FIG. 12 is a diagram showing that a low-low E-UTRAN new radio-dual connectivity (ENDC) design is supported with frame antennas (the first antenna and the second antenna).

FIG. 12 is a view (1200) showing that the first antenna A1 and the second antenna configured in the U shape or C shape support a low-low E-UTRAN new radio-dual connectivity (ENDC) design.

Referring to FIGS. 6A, 6B, and 12, the first antenna A1 may be configured in the U shape or C shape, and the second antenna A2 may be configured in the U shape or C shape.

As an embodiment, referring to the radiation performance of the first antenna A1 (graph 1220) and the radiation performance of the second antenna A2 (graph 1210) when a low band resonance is formed in each of the first antenna A1 and the second antenna A2, it is possible to facilitate the low-low ENDC design by forming a low band resonance in each of the first antenna A1 and the second antenna A2.

Figure 13A:
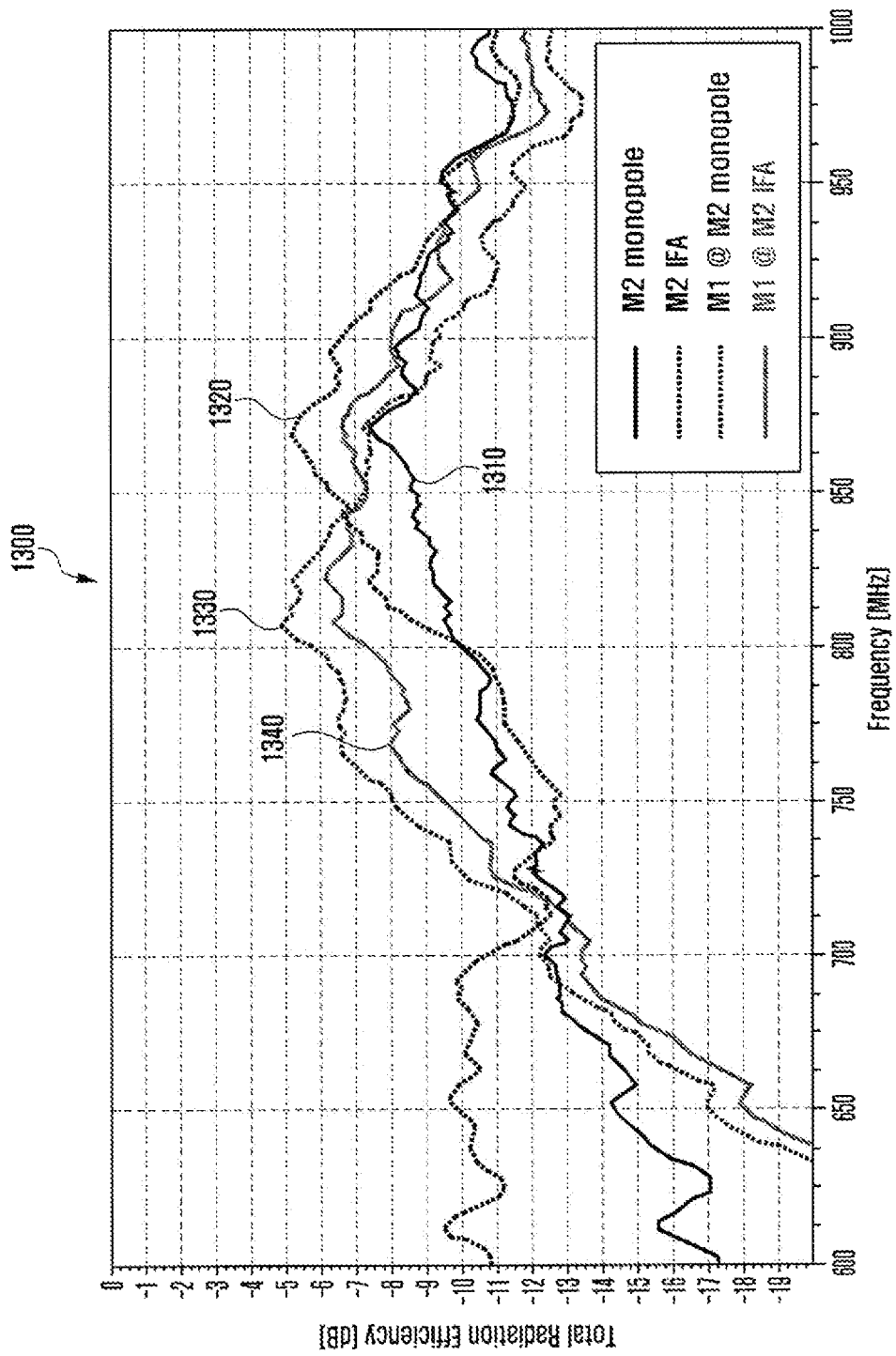
FIG. 13A is a diagram (1300) showing advantageous antenna structures according to modes at the time of low band switching.

FIG. 13A is a diagram (1300) showing advantageous antenna structures according to modes during low band switching.

Figure 13B:
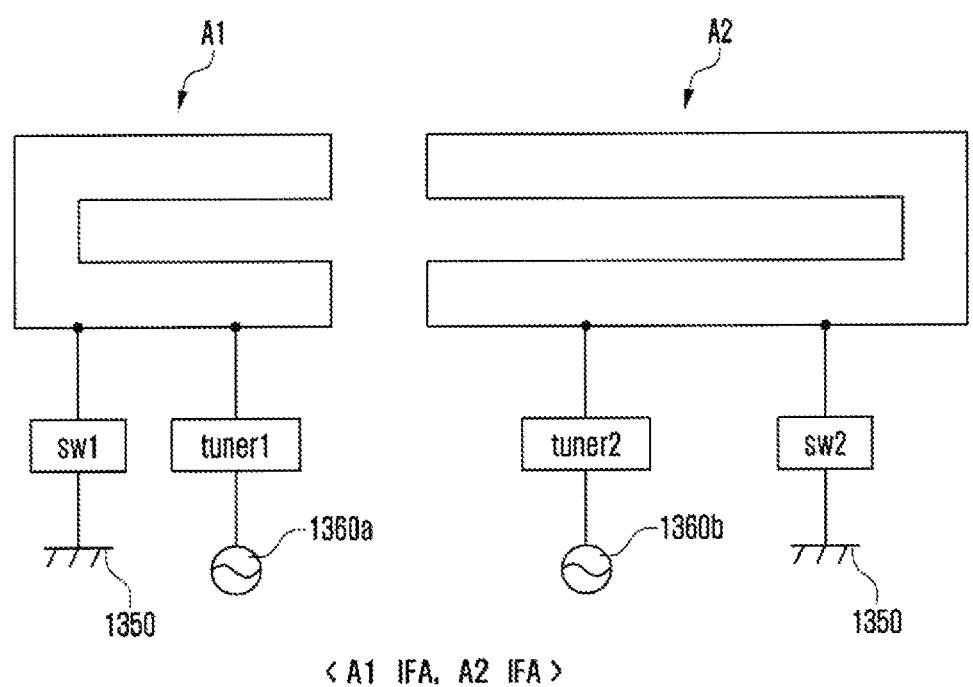
FIG. 13B is a view showing an example of the configurations of the first antenna A1 and the second antenna A2.

FIG. 13B is a diagram showing an example of the configurations of the first antenna A1 and the second antenna A2.

Referring to FIGS. 6A, 6B, 13A, and 13B, the first antenna A1 may be configured in the U shape or C shape, and the second antenna A2 may be configured in the U shape or C shape.

The first antenna A1 (e.g., the first conductive portion 610 in FIG. 5) may be configured in the U shape or C shape. The second antenna A2 (e.g., the second conductive portion 620 in FIG. 5) may be configured in the U shape or C shape. A first space (e.g., a first split portion) 650 may be disposed between the first antenna A1 (e.g., the first conductive portion 610 in FIG. 5) and the second antenna A2 (e.g., the second conductive portion 620 in FIG. 5) to electrically separate the first antenna A1 (e.g., the first conductive portion 610 in FIG. 5) and the second antenna A2 (e.g., the second conductive portion 620 in FIG. 5) from each other.

The U-shaped or C-shaped first antenna A1 may be electrically connected to a ground 1350 and a first feeder 1360a. The U-shaped or C-shaped second antenna A2 may be electrically connected to the ground 1350 and a second feeder 1360b. As an embodiment, an advantageous antenna structure according to each mode may be selected during low band switching. Referring to the case in which the second antenna A2 is configured in a monopole type (graph 1310), the case in which the second antenna is configured in an inverted F antenna (IFA) type (graph 1320), the case in which the first antenna A1 and the second antenna A2 are configured in the monopole type (graph 1330), and the case in which the first antenna A1 and the second antenna A2 are configured in the IFA type (graph 1340), it can be seen that the radiation performance varies depending on the antenna structure during low band switching.

As shown in Table 1 below, when the first antenna A1 and the second antenna A2 are switched, an antenna may be selected with an advantageous structure in a stand-alone mode or a carrier aggregation (CA) mode.

When a U-shaped or C-shaped first conductive portion (e.g., the first conductive portion 610 in FIG. 5) (e.g., the first antenna A1) and a U-shaped or C-shaped second conductive portion (e.g., the second conductive portion 620 in FIG. 5) (e.g., the second antenna A2) is applied, and switches and tuners (tuner1 and tuner2) (e.g., a feeder) are used, the antenna structure corresponding to a range within a low band and may operate in an L-L ENDC mode. As shown in Table 1 below, the structures of the first antenna A1 and the second antenna A2 may be changed depending on turning-on/off of a first switch sw1 and a second switch sw2. For example, in the CA mode, since isolation is required between the antennas, the antenna type may be changed by turning off the second switch sw2. For example, when operating an antenna structure in a middle band and a high band, as illustrated in FIG. 13, it is possible to selectively use an antenna structure that is excellent in performance in a specific band through turning-on/off of the first switch sw1 and the second switch sw2.

TABLE 1

| Mode | SW1 | Tuner1 | Tuner2 | SW2 | Main2 Ant. Type |
| --- | --- | --- | --- | --- | --- |
| L-L ENDC | On | On | On | On | IFA |
| L Switching S.A. | On | On | On | On | IFA |
| L Switching C.A. | On | On | Off | On | Monopole |
| M-H Switching | — | — | On | On-Off | IFA↔Monopole (MB) (HB) |

Figure 15:
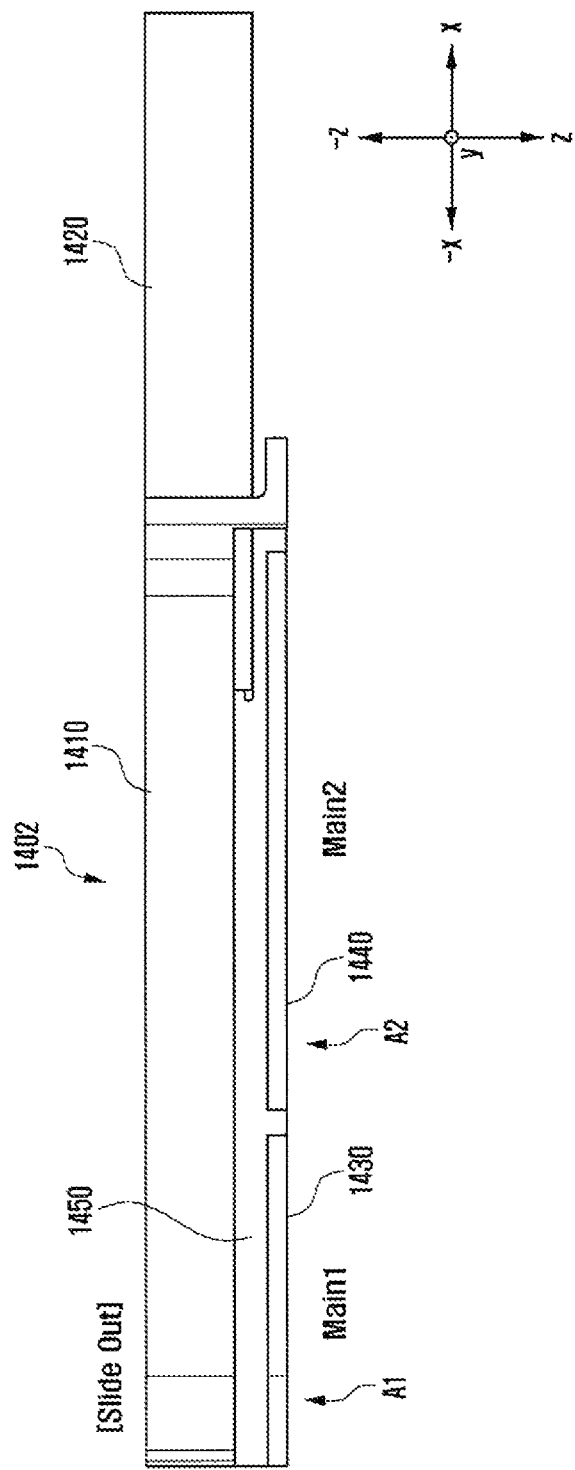
FIG. 15 is a view illustrating a slide-out (e.g., screen expansion) state of an electronic device according to certain embodiments of the disclosure.

FIG. 14 is a view illustrating a slide-in (e.g., screen reduction) state (1401) of an electronic device according to certain embodiments of the disclosure. FIG. 15 is a view illustrating a slide-out (e.g., screen expansion) state (1402) of the electronic device according to certain embodiments of the disclosure.

Referring to FIGS. 14 and 15, an electronic device (e.g., the electronic device 200 in FIGS. 2 to 4 or the electronic device 500 in FIGS. 5 and 6A) according to certain embodiments of the disclosure may include a first housing 1410 (e.g., the first housing 220 in FIGS. 2 to 4 or the first housing 540 in FIGS. 5 and 6B), a second housing 1420 (e.g., the second housing 230 in FIGS. 2 to 4 or the second housing 550 in FIGS. 5 and 6B), a first conductive portion 1430 (e.g., the first conductive portion 610 in FIGS. 5 and 6B) serving as a first antenna A1, and a second conductive portion 1440 (e.g., the second conductive portion 620 in FIGS. 5 and 6B) serving as a second antenna A2.

In an embodiment, between the first conductive portion 1430 (e.g., the first conductive portion 610 in FIGS. 5 and 6B) and the second conductive portion 1440 (e.g., the second conductive portion 620 in FIGS. 5 and 6B) serving as the second antenna A2, a space 1450 may be disposed. The space 1450 may be filled with a non-conductive material (e.g., a non-conductive material). The first conductive portion 1430 (e.g., the first conductive portion 610 in FIGS. 5 and 6B) and the second conductive portion 1440 (e.g., the second conductive portion 620 in FIGS. 5 and 6B) may be electrically separated from each other by the space 1450.

The electronic device (e.g., the electronic device 200 in FIGS. 2 to 4 or the electronic device 500 in FIGS. 5 and 6B) according to certain embodiments of the disclosure may include a first antenna A1 and a second antenna A2.

The electronic device (e.g., the electronic device 200 in FIGS. 2 to 4) according to certain embodiments of the disclosure may be in the slide-in (e.g., screen reduction) state (1401) or the slide-out (e.g., screen expansion) state (1402) according to the sliding of the second housing 1420 (e.g., the second housing 230 in FIGS. 2 to 4 or the second housing 550 in FIGS. 5 and 6B).

The first antenna A1 and the second antenna A2 may be disposed on the side surface of the first housing 1410 to secure a predetermined antenna radiation performance regardless of the slide-in (e.g., screen reduction) state (1401) or the slide-out (e.g., screen expansion) state (1402) of the electronic device.

Figure 16:
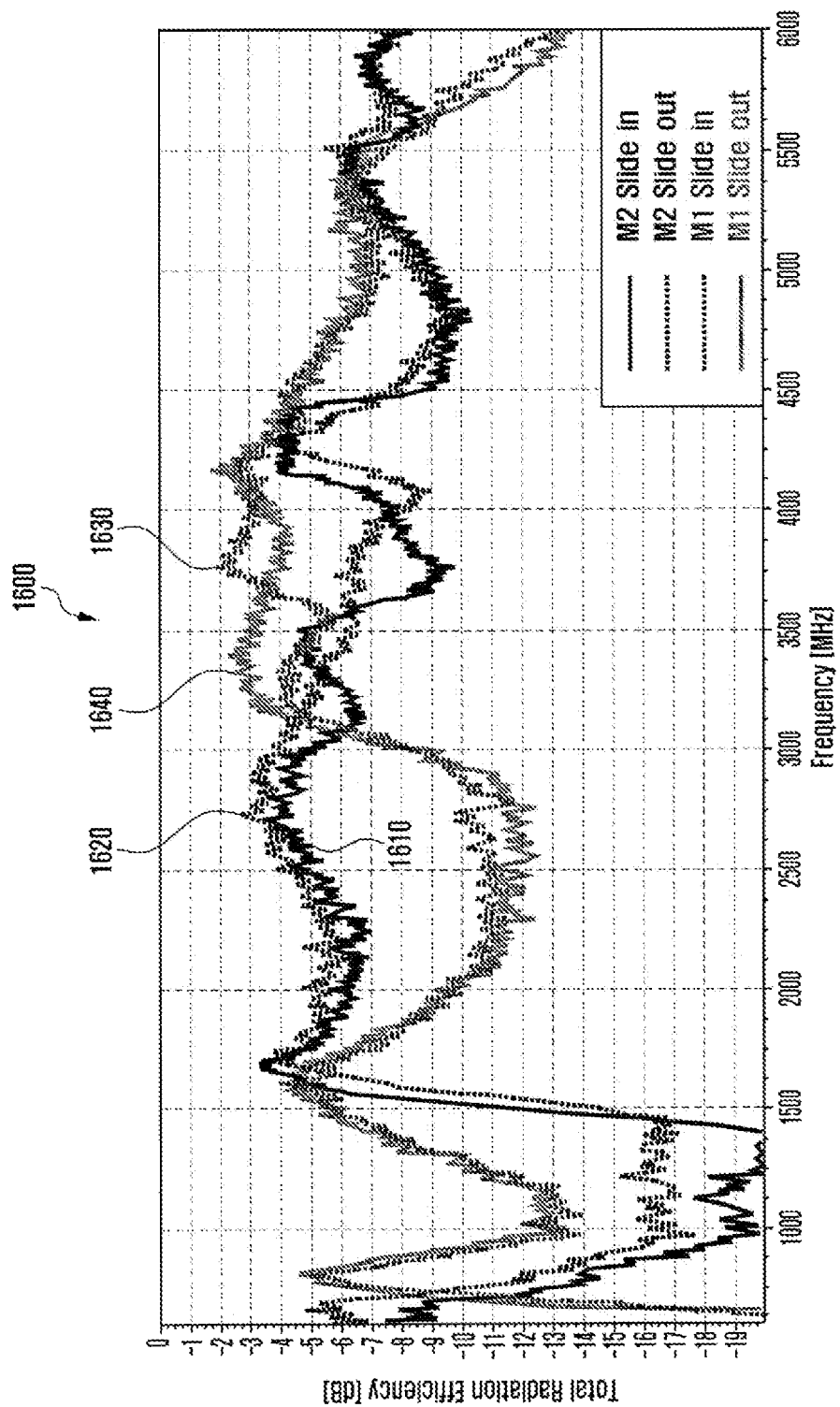
FIG. 16 is a diagram showing performances of frame antennas (the first antenna and the second antenna) according to the slide-in (e.g., screen reduction) state and slide-out (e.g., screen expansion) state of an electronic device.

FIG. 16 is a diagram (1600) showing performances of the first antenna and the second antenna according to the slide-in (e.g., screen reduction) state and slide-out (e.g., screen expansion) state of an electronic device.

Referring to FIGS. 14, 15, and 16, referring to the radiation performance of the second antenna A2 in the slide-in (e.g., the screen reduction) state (1401) of the electronic device according to an embodiment of the disclosure (graph 1610), the radiation performance of the second antenna A2 in the slide-out (e.g., screen expansion) state (1402) of the electronic device (graph 1620), the radiation performance of the first antenna A1 in the slide-in (e.g., screen reduction) state (1401) of the electronic device (graph 1630), and the radiation performance of the first antenna A1 in the slide-out (e.g., scree expansion) state (1402) of the electronic device (graph 1640), it can be seen that the change in antenna performance is insensitive to the slide-in (e.g., screen reduction) state (1401) or the slide-out (e.g., screen expansion) state (1402) of the electronic device.

As an embodiment, it can be seen that, in the slide-out (e.g., screen expansion) state (1402) of the electronic device, the change in the antenna performance is insensitive since the second housing 1420 and the first antenna A1 do not overlap and the second antenna A2 has a small overlapping area. In the slide-in (e.g., screen reduction) state (1401) of the electronic device, the second housing 1420 overlap the first antenna A1 and the second antenna A2, but, due to the U shape or C shape, the overlapping area is relatively smaller than that of the bar type, the antennas may be insensitive in the change in performance. However, it can be seen that although the performance of the second antenna A2 is somewhat deteriorated in the low band, the resonant frequency is not substantially shifted. For example, by configuring the U-shaped or C-shaped first antenna A1 and second antenna A2 in the electronic device, it is possible to secure substantially constant antenna radiation performance regardless of the slide-in (e.g., screen reduction) state (1401) and the slide-out (e.g., screen expansion) state (1402) of the electronic device).

Figure 17:
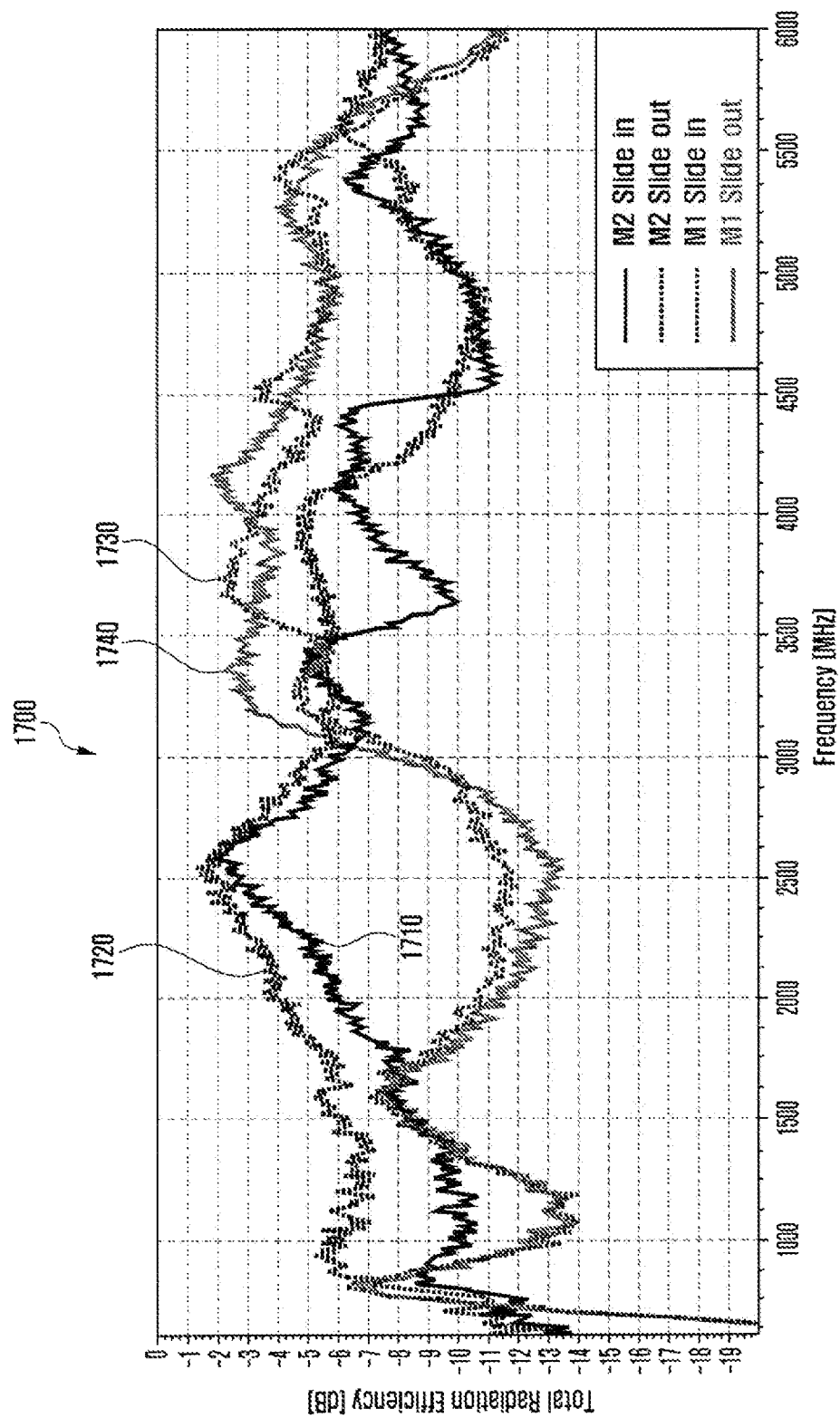
FIG. 17 is a diagram showing performances of bar type antennas according to the slide-in (e.g., screen reduction) state and slide-out (e.g., screen expansion) state of an electronic device.

FIG. 17 is a diagram (1700) showing performances of bar type antennas according to the slide-in (e.g., screen reduction) state and slide-out (e.g., screen expansion) state of an electronic device.

Referring to FIG. 17, the first antenna A1 of the electronic device may be configured in the U shape or C shape. The second antenna A2 may be configured in the bar type. When the first antenna A1 is configured in the U shape or C shape and the second antenna A2 is configured in the bar shape, there may be a large deviation in radiation performance between the slide-in (e.g., screen reduction) state and the slide-out (e.g., screen expansion) state.

As an embodiment, referring to the radiation performance of the bar type second antenna A2 in the slide-in (e.g., screen reduction) state (graph 1710) of the electronic device, the radiation performance of the bar type first antenna A1 in the slide-out (e.g., screen expansion) state (graph 1730), the radiation performance of the bar type second antenna A2 in the slide-out (e.g., screen expansion) state, and the radiation performance of the bar type first antenna A1 in the slide-in (e.g., screen reduction) state (graph 1740), it can be seen that there is a large deviation in variation in the radiation performance of the antennas A1 and A2 between the slide-in (e.g., screen reduction) state and the slide-out (e.g., screen expansion) state. In the slide-in (e.g., the screen reduction) state, the bar type antenna has a large overlapping area relative to the housing (e.g., the second housing). Thus, a deviation in radiation performance of the antennas A1 and A2 may increase between the slide-in (e.g., screen reduction) state and the slide-out (e.g., screen expansion state).

Figure 18:
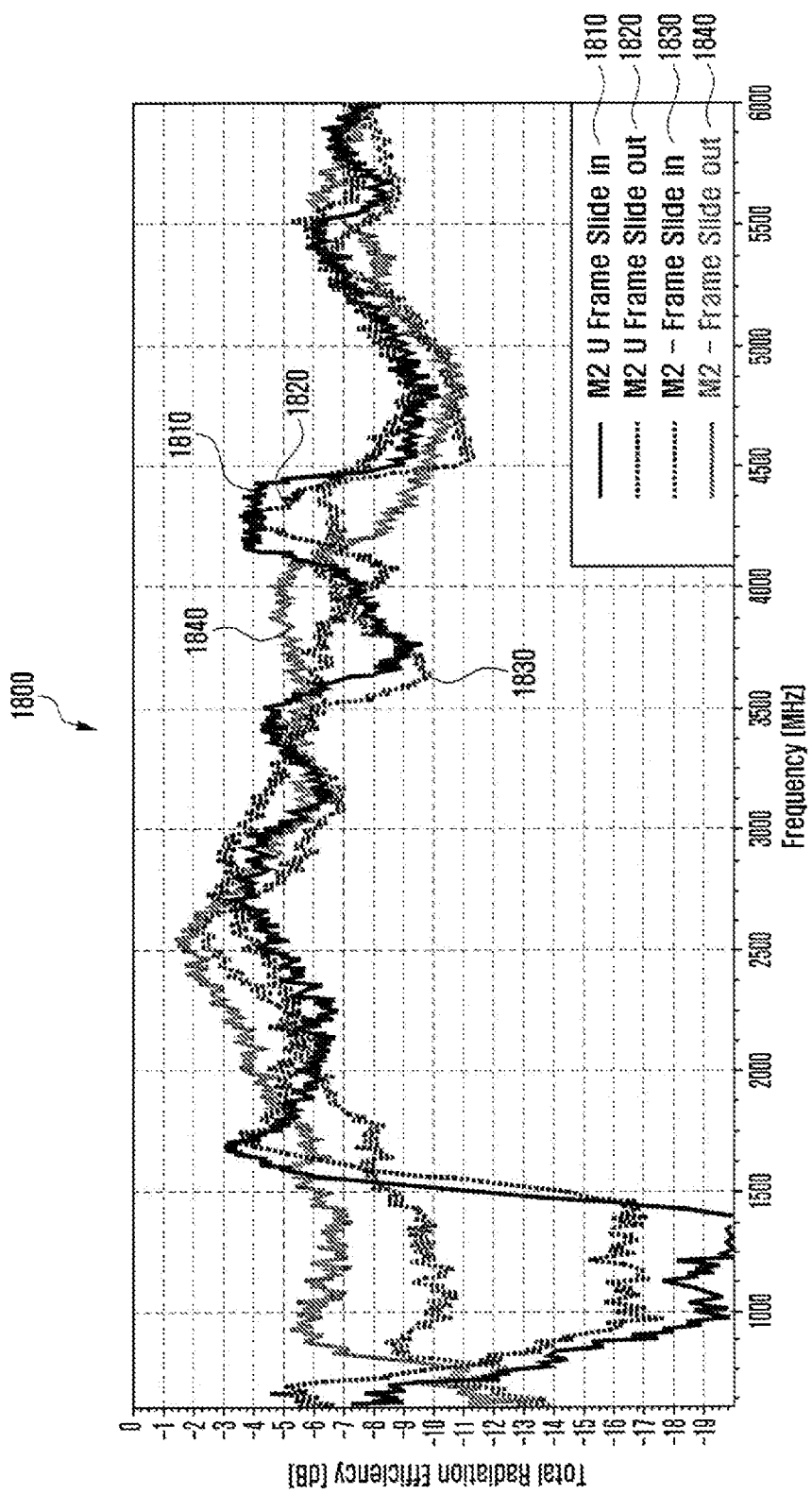
FIG. 18 is a diagram showing in comparison performances of frame antennas (the first antenna and the second antenna) and a bar type antenna according to the slide-in (e.g., screen reduction) state and slide-out (e.g., screen expansion) state of an electronic device.

FIG. 18 is a diagram (1800) showing in comparison the performance of first and second antennas configured in a U shape or C shape and those configured in a bar type in the slide-in (e.g., screen reduction) and slide-out (e.g., screen expansion) states of an electronic device.

Referring to FIG. 18, The first antenna A1 of the electronic device may be configured in the U shape or C shape, and the second antenna A1 may be configured in the U shape or C shape. As another embodiment, the first antenna A1 of the electronic device may be configured in the U shape or C shape, and the second antenna A2 may be configured in the bar type.

As an embodiment, when the second antenna A2 is configured in the bar type and when the second antenna A2 is configured in the U shape or C shape, a difference in the radiation performance of the second antenna A2 may occur between the slide-in (e.g., screen reduction) state and the slide-out (e.g., screen expansion) state of the electronic device.

As an embodiment, referring to the radiation performance of the U-shaped or C-shaped second antenna A2 (graph 1810) and the radiation performance of the bar type second antenna A2 (graph 1830) in the slide-in (e.g., screen reduction) state, it can be seen that the antenna radiation performance is improved in the low band when the second antenna A2 has the U shape or C shape.

As an embodiment, referring to the radiation performance of the U-shaped or C-shaped second antenna A2 (graph 1820) and the radiation performance of the bar type second antenna A2 (graph 1840) in the slide-out (e.g., screen expansion) state, it can be seen that the antenna radiation performance is improved when the second antenna A2 has the U shape or C shape.

As an embodiment, it can be seen that, when the second antenna A2 is configured in the bar type, the area in which the second antenna A2 and the second housing overlap in a slide-in (e.g., screen reduction) state is large, so that the band performance is low. In addition, it can be seen that the U-shaped or C-shaped second antenna A2 is more advantageous in securing a 700 MHz band performance than the bar type second antenna A2.

Figure 19:
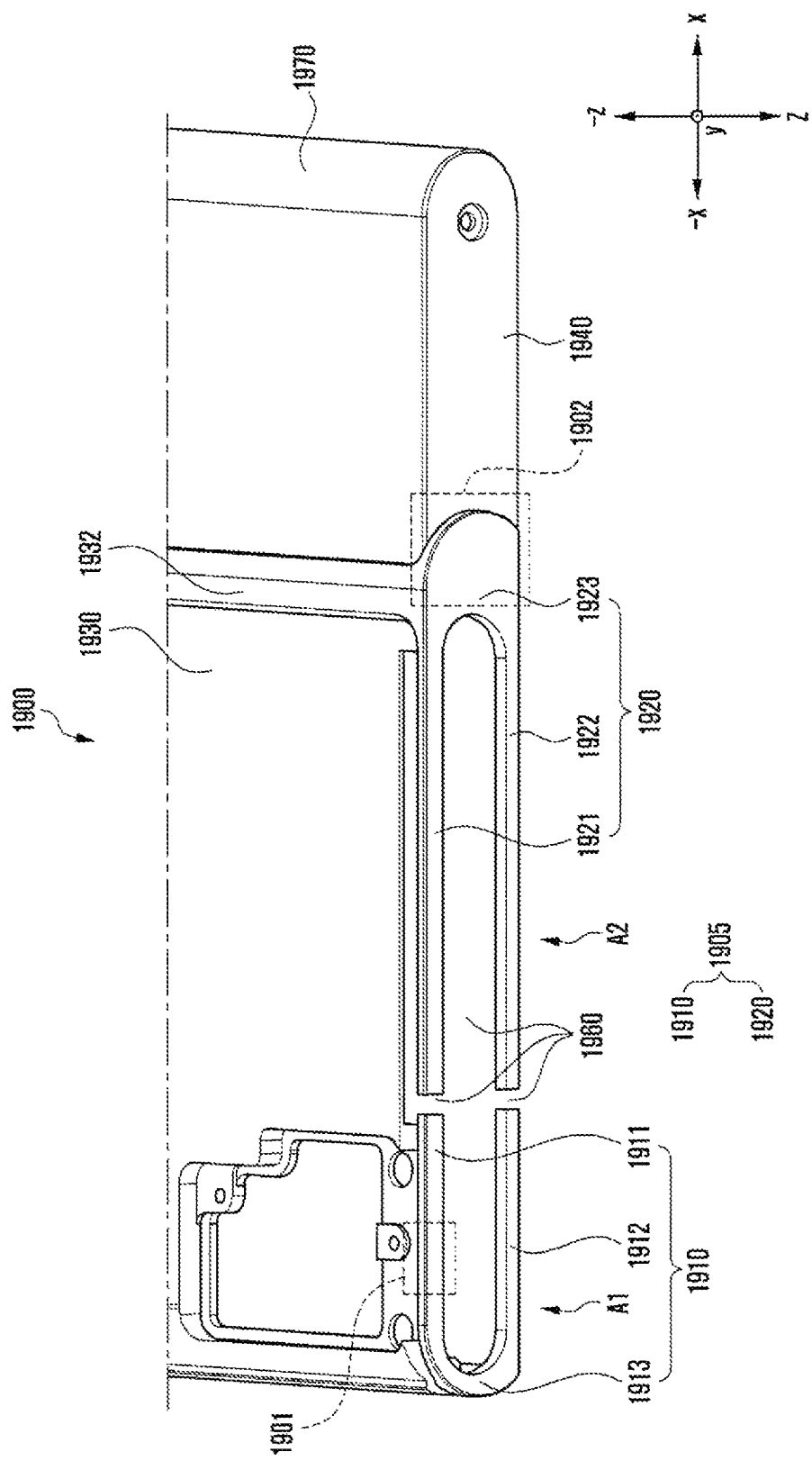
FIG. 19 is a view illustrating frame antennas of an electronic device according to certain embodiments of the disclosure.

FIG. 19 is a view illustrating a frame antenna of an electronic device 1900 according to certain embodiments of the disclosure.

Referring to FIG. 19, the electronic device 1900 (e.g., the electronic device 500 in FIG. 6B) according to certain embodiments of the disclosure may include a first housing 1930 (e.g., the first housing 540 in FIG. 6B), a second housing 1970 (e.g., the second housing 550 in FIG. 6B), and a plurality of conductive portions 1905 (e.g., the plurality of conductive portions 600 in FIG. 6B).

The first housing 1930 may include a support member 1932 (e.g., the bracket 604 in FIG. 6C). The support member 1932 may include, for example, a conductive member or a non-conductive member.

The plurality of conductive portions 1905 may include a first conductive portion 1910, a second conductive portion 1920, and a third conductive portion 1940. As an example, the first conductive portion 1910 and the second conductive portion 1920 may be disposed to face each other. In an embodiment, a space 1960 may be disposed between the first conductive portion 1910 and the second conductive portion 1920.

The first conductive portion 1910 may include a first portion 1911 configured in a predetermined width to have a length in the first direction (e.g., the x-axis direction), a second portion 1912 spaced apart from the first portion 1911 by a predetermined interval and configured in a predetermined width to have a length in the first direction (e.g., the x-axis direction), and a third portion 1913 interconnecting one end of the first portion 1911 and one end of the second portion 1912.

The first portion 1911, the second portion 1912, and the third portion 1913 of the first conductive portion 1910 may be configured integrally. The first conductive portion 1910 may be configured in the U shape or C shape in which the first portion 1911, the second portion 1912, and the third portion 1913 are electrically connected to each other.

In some embodiments, the lengths of the first portion 1911 and the second portion 1912 of the first conductive portion 1910 may be substantially equal to each other. In some embodiments, the lengths of the first portion 1911 and the second portion 1912 of the first conductive portion 1910 may be different from each other.

The third portion 1913 of the first conductive portion 1910 may be disposed at a position adjacent to the second side surface (e.g., the second side surface 503b in FIG. 6B) (e.g., the second side surface 203b in FIGS. 2 to 4) of the electronic device 1900 (e.g., the electronic device 500 in FIGS. 5 and 6B).

The second conductive portion 1920 may include a first portion 1921 configured in a predetermined width to have a length in the second direction (e.g., the –x-axis direction), a second portion 1922 spaced apart from the first portion 1921 by a predetermined interval and configured in a predetermined width to have a length in the second direction (e.g., the –x-axis direction), and a third portion 1923 interconnecting one end of the first portion 1921 and one end of the second portion 1922.

The first portion 1921, the second portion 1922, and the third portion 1923 of the second conductive portion 1920 may be configured integrally. The second conductive portion 1920 may be configured in the U shape or C shape in which the first portion 1921, the second portion 1922, and the third portion 1923 are electrically connected to each other.

In some embodiments, the lengths of the first portion 1921 and the second portion 1922 of the second conductive portion 1920 may be substantially equal to each other. In some embodiments, the lengths of the first portion 1921 and the second portion 1922 of the second conductive portion 1920 may be different from each other.

The third portion 1923 of the second conductive portion 1920 may be coupled to or configured integrally with the support member 1932 to be electrically connected to the support member 1932. For example, the third portion 1923 may be electrically connected to a conductive portion included in the support member 1932.

The second conductive portion 1920 may be electrically connected 1902 to the support member 1932. As an example, at least a portion of the first portion 1921 of the second conductive portion 1920 and the support member 1932 may be electrically connected to each other (1902). As an example, at least a portion of the third portion 1923 of the second conductive portion 1920 and the support member 1932 may be electrically connected to each other (1902).

Figure 20:
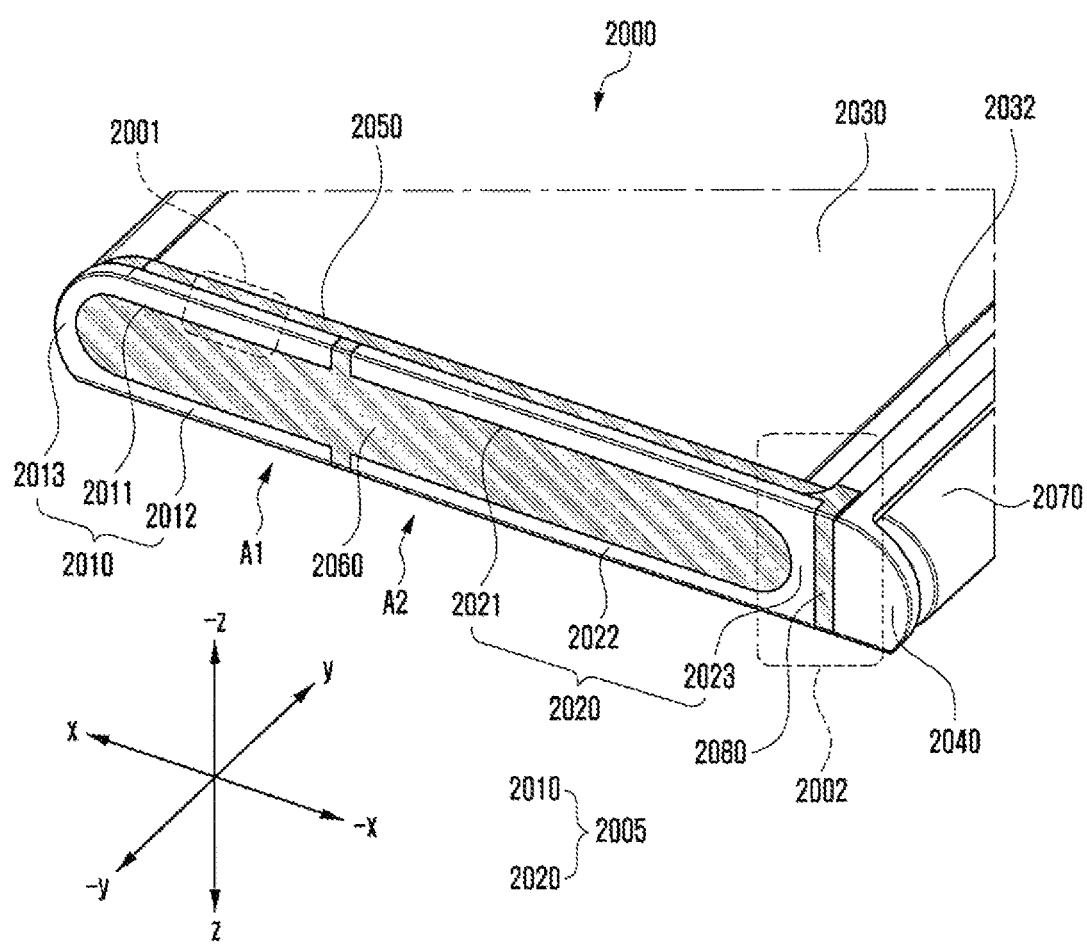
FIG. 20 is a view illustrating frame antennas of an electronic device according to certain embodiments of the disclosure.

FIG. 20 is a view illustrating a frame antenna of an electronic device 2000 according to certain embodiments of the disclosure.

Referring to FIG. 20, the electronic device 2000 (e.g., the electronic device 1900 in FIG. 19) according to certain embodiments of the disclosure may include a first housing 2030 (e.g., the first housing 1930 in FIG. 19), a second housing 2070, and a plurality of conductive portions 2005 (e.g., the plurality of conductive portions 1905 in FIG. 19).

The plurality of conductive portions 2005 (e.g., the plurality of conductive portions 1905 in FIG. 19) may include a first conductive portion 2010 (e.g., the first conductive portion 1910 in FIG. 19), a second conductive portion 2020 (e.g., the second conductive portion 1920 in FIG. 19), or a third conductive portion 2040 (e.g., the third conductive portion 1940 in FIG. 19). As an example, the first conductive portion 2010 and the second conductive portion 2020 may be disposed to face each other. In an embodiment, the third conductive portion 2040 may be formed of a non-conductive material.

As an embodiment, between the first conductive portion 2010 and the second conductive portion 2020, a first space (e.g., a first split portion) 2060 may be located. The first space 2060 and slits (e.g., the first space 670 and the second space 680 in FIG. 5) may be filled with a non-conductive material (e.g., a non-conductive material). The first conductive portion 2010 and the second conductive portion 2020 may be electrically split by the first space 2060.

As an embodiment, between the second conductive portion 2020 and the third conductive portion 2030, a second space (e.g., a second split portion) 2080 may be located. The second space 2080 may be filled with a non-conductive material (e.g., a non-conductive material). The second conductive portion 2020 and the third conductive portion 2040 may be electrically split by the second space 2080. As another example, when the third conductive portion 2040 replaced with a non-conductive member, the second space 2080 may be omitted. For example, the second conductive portion 2020 may not be electrically connected to the support member 2032 (e.g., the bracket 604 in FIG. 6C).

The first conductive portion 2010 may include a first portion 2011 configured in a predetermined width to have a length in the first direction (e.g., the x-axis direction), a second portion 2012 spaced apart from the first portion 2011 by a predetermined interval and configured in a predetermined width to have a length in the first direction (e.g., the x-axis direction), and a third portion 2013 interconnecting one end of the first portion 2011 and one end of the second portion 2012.

The first portion 2011, the second portion 2012, and the third portion 2013 of the first conductive portion 2010 may be configured integrally. The first conductive portion 2010 may be configured in the U shape or C shape in which the first portion 2011, the second portion 2012, and the third portion 2013 are electrically connected to each other.

In some embodiments, the lengths of the first portion 2011 and the second portion 2012 of the first conductive portion 2010 may be substantially equal to each other. In some embodiments, the lengths of the first portion 2011 and the second portion 2012 of the first conductive portion 2010 may be different from each other.

The third portion 2013 of the first conductive portion 2010 may be disposed at a position adjacent to the second side surface (e.g., the second side surface 503b in FIG. 6B) (e.g., the second side surface 203b in FIGS. 2 to 4) of the electronic device 2000 (e.g., the electronic device 500 in FIGS. 5 and 6B).

As an embodiment, an insulating portion 2050 may be disposed between the first conductive portion 2010 and the support member 2032, and thus the first conductive portion 2010 and the support member 2032 may be spaced apart and electrically split from each other.

The second conductive portion 2020 may include a first portion 2021 configured in a predetermined width to have a length in the second direction (e.g., the −x-axis direction), a second portion 2022 spaced apart from the first portion 2021 by a predetermined interval and configured in a predetermined width to have a length in the second direction (e.g., the −x-axis direction), and a third portion 2023 interconnecting one end of the first portion 2021 and one end of the second portion 2022.

The first portion 2021, the second portion 2022, and the third portion 2023 of the second conductive portion 2020 may be configured integrally. The second conductive portion 2020 may be configured in the U shape or C shape in which the first portion 2021, the second portion 2022, and the third portion 2023 are electrically connected to each other.

In some embodiments, the lengths of the first portion 2021 and the second portion 2022 of the second conductive portion 2020 may be substantially equal to each other. In some embodiments, the lengths of the first portion 2021 and the second portion 2022 of the second conductive portion 2020 may be different from each other.

The third portion 2023 of the second conductive portion 2020 may be disposed at a position adjacent to the first side surface (e.g., the first side surface 503a in FIG. 6B) (e.g., the first side surface 203a in FIGS. 2 to 4) of the electronic device 2000 (e.g., the electronic device 500 in FIGS. 5 and 6B).

As an embodiment, an insulating portion 2050 may be disposed between the second conductive portion 2020 and the support member 2032, and thus the second conductive portion 2020 and the support member 2032 may be spaced apart and electrically split from each other (2002).

In an embodiment, a non-conductive member such as a polymer may be disposed on the insulating portion 2050. The first conductive portion 2010 and the second conductive portion 2020 may be coupled to the support member 2032 via the non-conductive member.

In an embodiment, the third conductive portion 2040 may be coupled to or configured integrally with the support member 2032.

The first conductive portion 2010 may include a first space (e.g., a first split portion) (e.g., the first space 670 in FIG. 6B). For example, the first conductive portion 2010 may define a U-shaped or C-shaped electrical path with the first space (e.g., the first space 670 in FIG. 6B). For example, the first space (e.g., the first space 670 in FIG. 6B) may be filled with a non-conductive material.

The second conductive portion 2020 may include a second space (e.g., a second split portion) (e.g., the second space 680 in FIG. 6B). For example, the second conductive portion 2020 may define a U-shaped or C-shaped electrical path with the second space (e.g., the second space 680 in FIG. 6B). For example, the second space (e.g., the second space 680 in FIG. 6B) may be filled with a non-conductive material.

Figure 21:
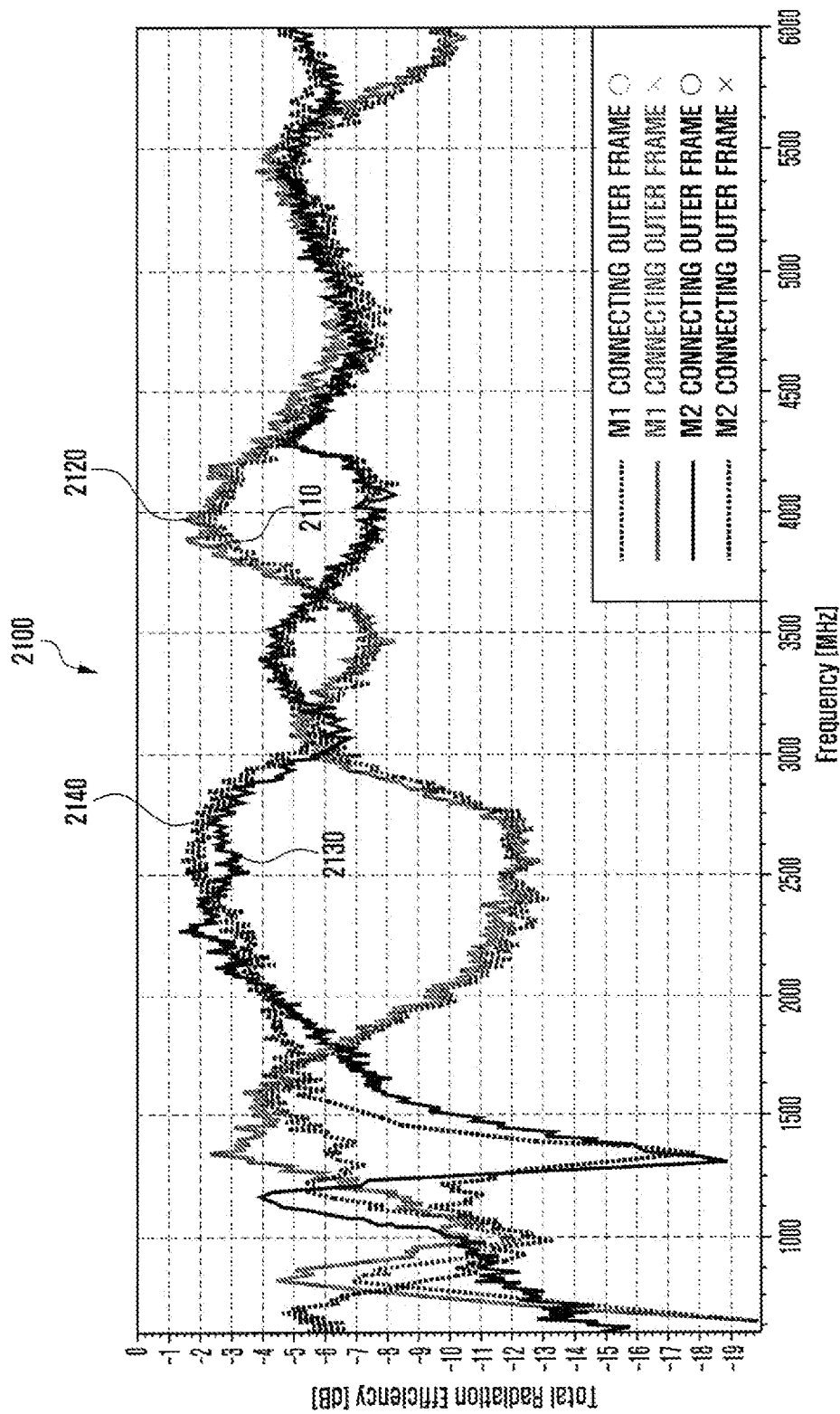
FIG. 21 is a diagram showing changes in antenna performance depending on presence or absence of a contact between frame antennas (the first antenna and the second antenna) and a housing (e.g., a support member) according to certain embodiments of the disclosure.

FIG. 21 is a diagram (2100) showing changes in antenna performance according to the presence or absence of contact between the U-shaped or C-shaped first and second antennas and the support member according to certain embodiments of the disclosure.

Referring to FIGS. 19, 20, and 21, as an embodiment, referring to the antenna radiation performance when the first conductive portion 1910 serving as the first antenna A1 is electrically connected (1901) to the support member 1932 or 2032 (graph 2010) and the antenna radiation performance when the first conductive portion 2010 serving as the first antenna A1 is split from the support member (graph 2020) in comparison, it can be seen that, when the second portion 2020 is split from the support member 2032, the radiation performance of the first antenna A1 is improved.

As an embodiment, in FIG. 21, the support member 2032 (e.g., an outer frame) and the second conductive portion 2020 may be electrically connected to each other. The first antenna A1 and the second antenna A2 when the second conductive portion 2020 is connected to the support member 2032 and when the second conductive portion 2020 is not connected to the support member 2032 are illustrated. For example, when the second conductive portion 2020 is split, the performances of the first antenna A1 and the second antenna A2 may be improved.

As an embodiment, referring to the antenna performance when the second conductive portion 1920 serving as the second antenna A2 is electrically connected to the support member 2032 (1902) (2030 graph) and the antenna performance when the second conductive portion 2020 serving as the second antenna A2 is split from the support member (e.g., the first housing 2030) (2002) (graph 2040) in comparison, it can be seen that the antenna radiation performance is improved when the second conductive portion 2020 serving as the second antenna A2 is split from support member 2032 (e.g., the first housing 2030) (2002).

Figure 22:
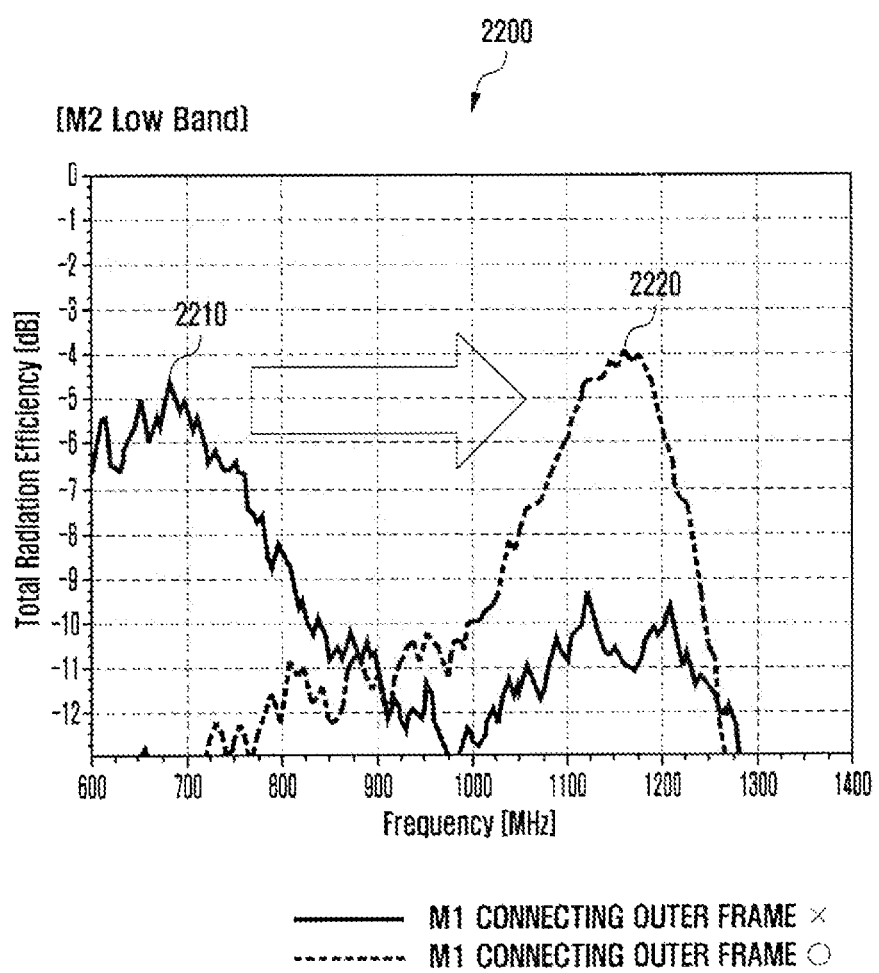
FIG. 22 is a diagram (2200) illustrating changes in performance of a U-shaped or C-shaped second antenna using a second conductive portion according to certain embodiments of the disclosure.

FIG. 22 is a diagram (2200) showing changes in performance of a U-shaped or C-shaped second antenna using a second conductive portion according to certain embodiments of the disclosure.

Referring to FIGS. 19 and 21, as an embodiment, when the second conductive portion 1920 (e.g., the second conductive portion 2020 in FIG. 20) is electrically connected to the support member 2032 (1901) (e.g., when electrically connected (2001) in FIG. 20), the ground (GND) may be shortened, so that the resonance length of the antenna may be shortened. In this case, it can be seen that, even if the first antenna A1 is split from the support member 1932 (e.g., the first housing 1930) (e.g., the first housing 2030 of FIG. 20), the low band performance of the first antenna A1 is deteriorated when the second antenna A2 is electrically connected to the support member 1932 (e.g., the support member 2032 of FIG. 20).

As an embodiment, referring to the radiation performance of the second antenna A2 when the second conductive portion 1920 is electrically connected to the support member 1932 (1901)(graph 2220) and the radiation performance of the second antenna A2 when the second conductive portion 1920 is split from the support portion 1932 (2001) (graph 2210) in comparison, it can be seen that the low band (e.g., about 700 MHz) performance of the first antenna A1 is reduced by about 2 dB. In addition, it can be seen that the resonance frequency of the second antenna A2 is upwardly shifted by about 400 MHz in the low band. Accordingly, when the second conductive portion 1920 is split from the support member 1932, the antenna radiation performance may be improved.

Figure 23:
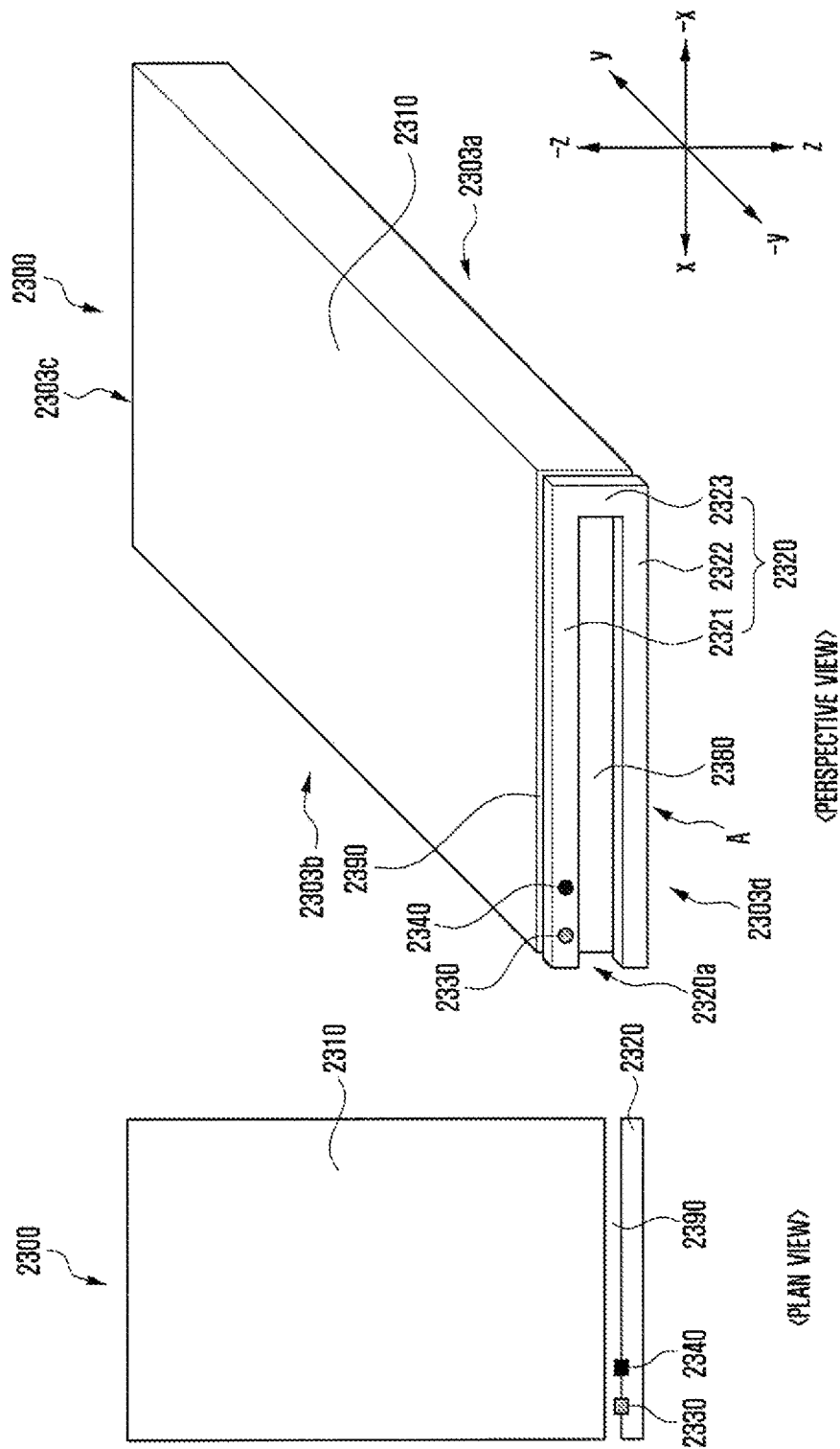
FIG. 23 is a view illustrating a U-shaped or C-shaped antenna A of an electronic device according to certain embodiments of the disclosure.

FIG. 23 is a view illustrating a U-shaped or CC-shaped antenna A of an electronic device 2300 according to certain embodiments of the disclosure. In describing the electronic device 2300 of FIG. 23, a description of components which are the same as or similar to those of the antennas A1 and A2 of the electronic device 500 of FIG. 5 and the antennas of FIGS. 6A and 6B may be omitted. A description of components which are the same as or similar to those of the antennas A1 and A2 and the space 1450 of FIGS. 14 and 15 may be omitted.

Referring to FIG. 23, the electronic device 2300 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a housing 2310 (e.g., the support member 2032 in FIG. 20), and/or a conductive portion 2320 serving as an antenna A. A space 2390 may be disposed between the housing 2310 (e.g., the support member 2032 in FIG. 20) and the conductive portion 2320. The electronic device 2300 may be a bar type electronic device including a display in which the size of the display region is fixed. The electronic device 2300 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

In an embodiment, the conductive portion 2320 (e.g., the first conductive portion 610 or the second conductive portion 620 in FIG. 5) may be disposed on at least one side surface (2303a, 2303b, 2303c, or 2303d) (e.g., the third side surface 203c and/or the fourth side surface 203d in FIGS. 2 to 4) of the electronic device 2300.

As an embodiment, FIG. 23 illustrates that the conductive portion 2320 is disposed on the fourth side surface 2303d as an example. As another example, the conductive portion 2320 may be disposed on the first side surface 2303a, the second side surface 2303b, or the third side surface 2303c.

The conductive portion 2320 may include a first portion 2321 configured in a predetermined width to have a length in the first direction (e.g., the x-axis direction), a second portion 2322 spaced apart from the first portion 2321 by a predetermined interval and configured in a predetermined width to have a length in the first direction (e.g., the x-axis direction), and a third portion 2323 interconnecting one end of the first portion 2321 and one end of the second portion 2322.

The first portion 2321, the second portion 2322, and the third portion 2323 of the conductive portion 2320 may be configured integrally. The conductive portion 2320 may be configured in the U shape or C shape in which the first portion 2321, the second portion 2322, and the third portion 2323 are electrically connected to each other.

The conductive portion 2320 may include a slit 2380 (e.g., an opening) provided between the first portion 2321 and the second portion 2322. The slit 2380 may be filled with a non-conductive material (e.g., a non-conductive material). The space 2390 may be filled with a non-conductive material (e.g., a non-conductive material).

The third portion 2323 of the conductive portion 2320 may be disposed adjacent to the first side surface 2303a of the electronic device 2300. An opening 2320a in the conductive portion 2320 may be disposed at a position adjacent to the second side surface 2303b of the electronic device 2300.

In an embodiment, the housing 2310 (e.g., the support member 2032 of FIG. 20) and the conductive portion 2320 are spaced apart from each other by a predetermined interval, and the housing 2310 (e.g., the support member 2032 of FIG. 20) and the conductive portion 2320 may be split from each other.

In some embodiments, the lengths of the first portion 2321 and the second portion 2322 of the conductive portion 2320 may be substantially equal to each other. In some embodiments, the lengths of the first portion 2321 and the second portion 2322 of the conductive portion 2320 may be different from each other.

As an embodiment, a feed point 2330 and a ground point 2340 may be located in the first portion 2321 of the conductive portion 2320 serving as the antenna A. For example, the feed point 2330 may be located adjacent to the second side surface 2303b of the electronic device 2300. As an example, the ground point 2340 may be located to be more distant than the feed point 2330 in the second direction (e.g., the −x-axis direction).

The conductive portion 2320 may be used as the antenna A that operates in at least one frequency band by being electrically connected to a wireless communication circuit (e.g., the wireless communication module 192 in FIG. 1) at the feed point 2330.

In an embodiment, the wireless communication circuit (e.g., the wireless communication module 192 in FIG. 1) may be configured to transmit and/or receive wireless signals in a low band, mid band, high band or ultra-high band via the conductive portion 2320.

The electronic device 2300 according to certain embodiments of the disclosure may further include an antenna other than the antenna A using the conductive portion 2320. For example, the other antenna may be configured with at least a portion of the housing 2310. As another example, the other antenna may be configured with a laser direct structuring (LDS) pattern. The other antenna may be used as an antenna operating in a frequency band different from that of the antenna A configured with the conductive portion 2320 by being electrically connected to the wireless communication circuit (e.g., the wireless communication module 192 in FIG. 1).

Figure 24:
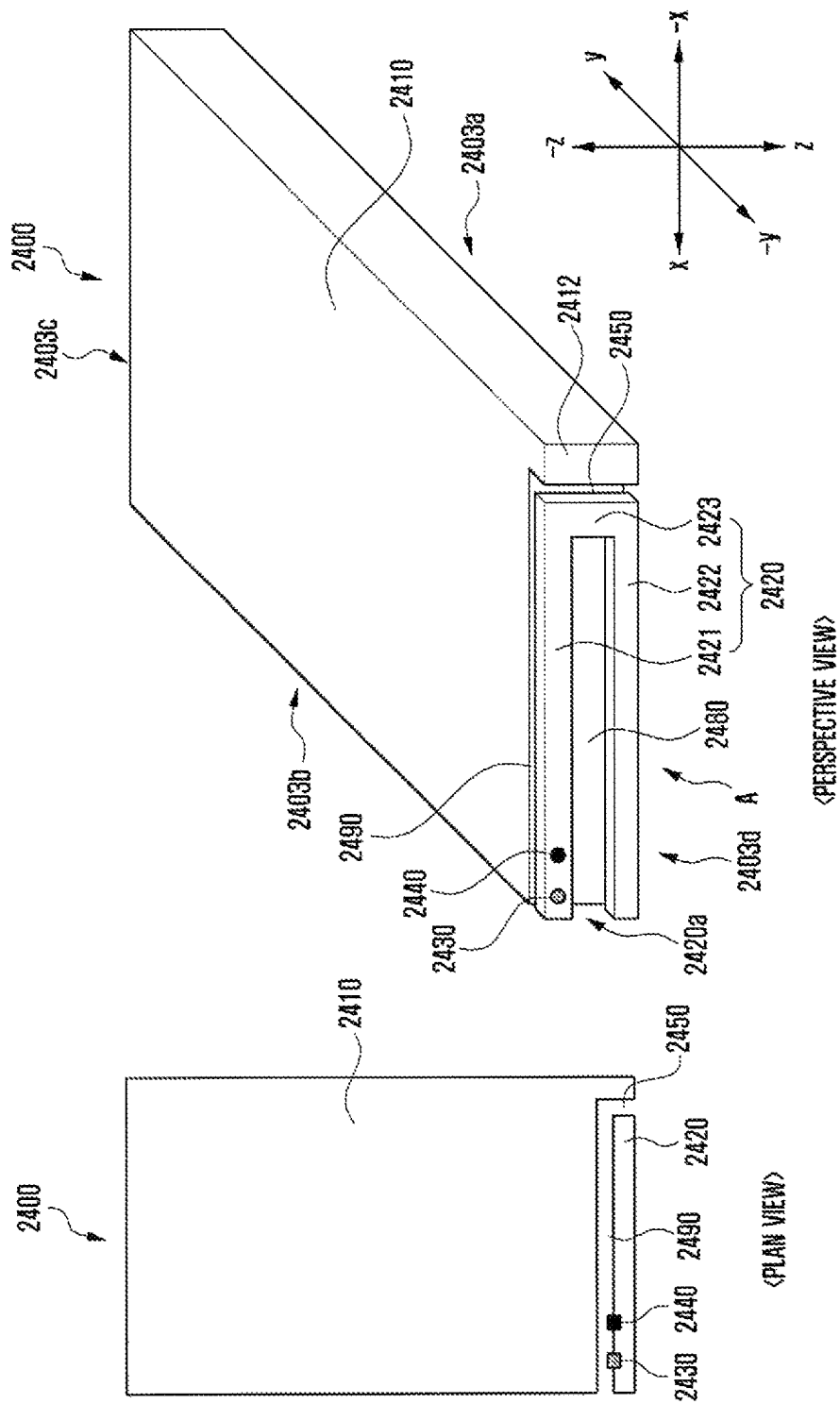
FIG. 24 is a view illustrating a U-shaped or C-shaped antenna of an electronic device according to certain embodiments of the disclosure.

FIG. 24 is a view illustrating a U-shaped or CC-shaped antenna of an electronic device 2400 according to certain embodiments of the disclosure. In describing the electronic device 2400 of FIG. 24, a description of components which are the same as (or similar to) those of the electronic device 2300 of FIG. 23 may be omitted.

Referring to FIG. 24, the electronic device 2400 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a housing 2410 (e.g., the support member 2032 in FIG. 20), and/or a conductive portion 2420 (e.g., the first conductive portion 610 or the second conductive portion 620 in FIG. 5) (e.g., the conductive portion 2320 in FIG. 23) serving as an antenna A. A space 2490 may be disposed between the housing 2410 (e.g., the support member 2032 in FIG. 20) and the conductive portion 2420.

The electronic device 2400 may be a bar type electronic device including a display in which the size of the display region is fixed. The electronic device 2400 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

In an embodiment, the conductive portion 2420 (e.g., the first conductive portion 610 or the second conductive portion 620 in FIG. 5) (e.g., the conductive portion 2320 in FIG. 23) may be disposed on at least one side surface (2403a, 2403b, 2403c, or 2403d) (e.g., the third side surface 203c and/or the fourth side surface 203d in FIGS. 2 to 4) of the electronic device 2400.

As an embodiment, FIG. 24 illustrates that the conductive portion 2420 is disposed on the fourth side surface 2403d as an example. As another example, the conductive portion 2420 may be disposed on the first side surface 2403a, the second side surface 2403b, or the third side surface 2403c.

The conductive portion 2420 may include a first portion 2421 configured in a predetermined width to have a length in the first direction (e.g., the x-axis direction), a second portion 2422 spaced apart from the first portion 2421 by a predetermined interval and configured in a predetermined width to have a length in the first direction (e.g., the x-axis direction), and a third portion 2423 interconnecting one end of the first portion 2421 and one end of the second portion 2422.

The first portion 2421, the second portion 2422, and the third portion 2423 of the conductive portion 2420 may be configured integrally. The conductive portion 2420 may be configured in the U shape or C shape in which the first portion 2421, the second portion 2422, and the third portion 2423 are electrically connected to each other.

The third portion 2423 of the conductive portion 2420 may be disposed adjacent to the first side surface 2403a of the electronic device 2400. An opening 2420a in the conductive portion 2420 may be disposed at a position adjacent to the second side surface 2403b of the electronic device 2400.

As an example, a space 2490 may be disposed between the housing 2410 (e.g., the support member 2032 in FIG. 20) and the conductive portion 2420. The housing 2410 (e.g., the support member 2032 of FIG. 20) and the conductive portion 2420 are spaced apart from each other by a predetermined interval, and the housing 2410 (e.g., the support member 2032 of FIG. 20) and the conductive portion 2420 may be split from each other. For example, the conductive portion 2420 may be electrically floated.

The conductive portion 2420 may include a slit 2480 (e.g., an opening) provided between the first portion 2421 and the second portion 2422. The slit 2480 may be filled with a non-conductive material (e.g., a non-conductive material). The space 2490 may be filled with a non-conductive material (e.g., a non-conductive material).

As an embodiment, a portion 2412 of the housing 2410 (e.g., the support member 2032 of FIG. 20) may protrude to be parallel to the conductive portion 2420. The third portion 2423 of the conductive portion 2420 may be spaced apart from the portion 2412 of the housing 2410 (e.g., the support member 2032 in FIG. 20) by a predetermined interval, so that the housing 2410 (e.g., the support member 2032 FIG. 20) and the conductive portion 2420 may be split from each other. For example, the split position 2450 may be filled with a non-conductive material (e.g., a non-conductive material). Since the space 2490 and the split position 2450 are filled with a non-conductive material (e.g., a non-conductive material), so that the housing 2410 (e.g., the support member 2032 in FIG. 20) and the conductive portion 2420 may be electrically split from each other. As another example, when the conductive portion 2420 is configured with a non-conductive portion, the space 2490 may be omitted. As another example, the conductive portion 2420 may be coupled to or configured integrally with the housing 2410 (e.g., the support member 2032 in FIG. 20).

In some embodiments, the lengths of the first portion 2421 and the second portion 2422 of the conductive portion 2420 may be substantially equal to each other. In some embodiments, the lengths of the first portion 2421 and the second portion 2422 of the conductive portion 2420 may be different from each other.

The first portion 2421 and the feed point 2430 and the ground point 2440 of the conductive portion 2420 serving as the antenna A may be electrically connected to each other. As an example, the feed point 2430 may be electrically connected to the first portion 2421 at a position adjacent to the second side surface 2403b of the electronic device 2400. As an example, the ground point 2440 may be located to be more distant than the feed point 2430 in the second direction (e.g., the −x-axis direction).

The conductive portion 2420 may be used as the antenna A that operates in at least one frequency band by being electrically connected to a wireless communication circuit (e.g., the wireless communication module 192 in FIG. 1) at the feed point 2430.

In an embodiment, the wireless communication circuit (e.g., the wireless communication module 192 in FIG. 1) may be configured to transmit and/or receive wireless signals in a low band, mid band, high band or ultra-high band via the conductive portion 2420.

The electronic device 2400 according to certain embodiments of the disclosure may further include an antenna other than the antenna A using the conductive portion 2420. For example, the other antenna may be configured with at least a portion of the housing 2410. As another example, the other antenna may be configured with a laser direct structuring (LDS) pattern. The other antenna may be used as an antenna operating in a frequency band different from that of the antenna A configured with the conductive portion 2420 by being electrically connected to the wireless communication circuit (e.g., the wireless communication module 192 in FIG. 1).

Figure 25:
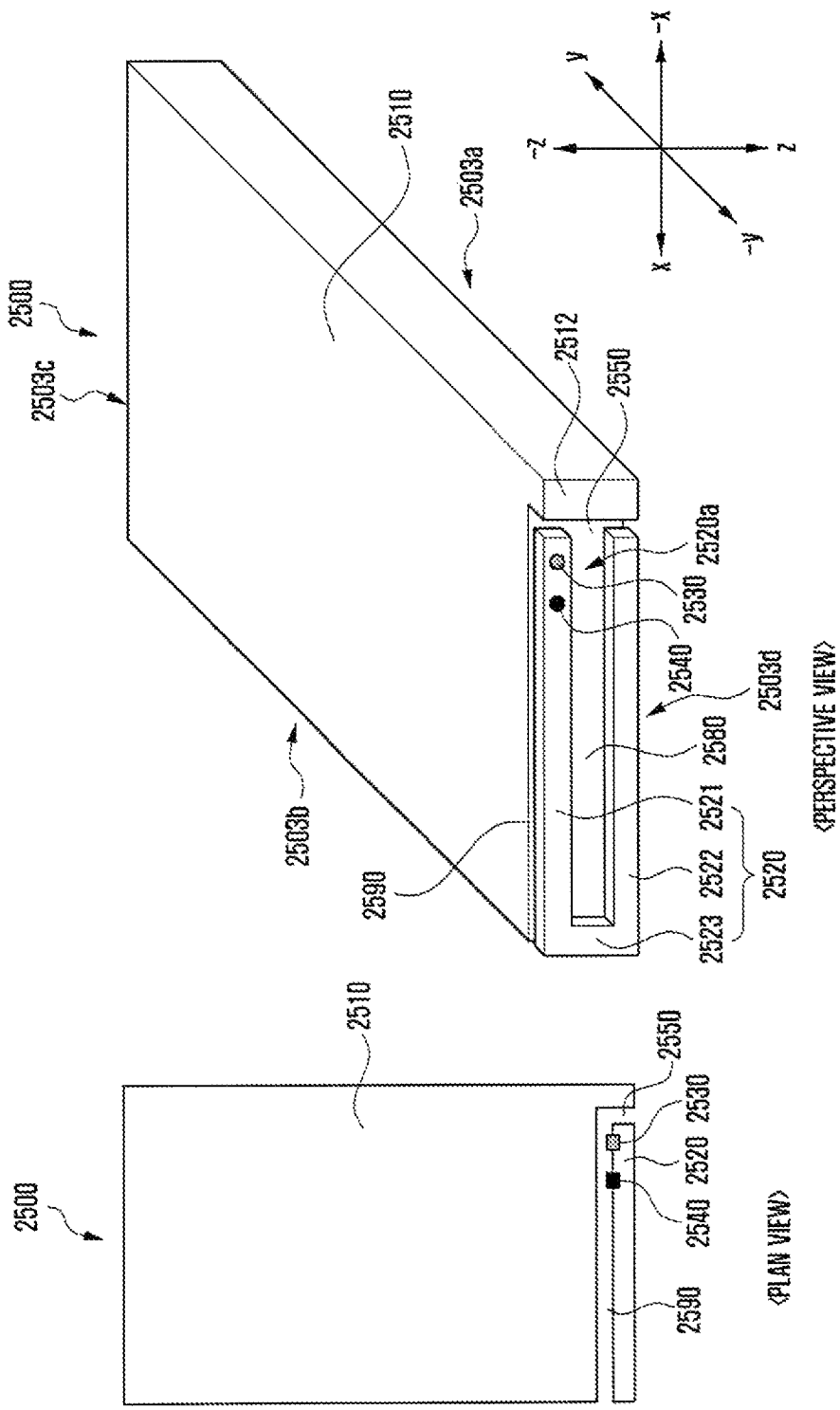
FIG. 25 is a view illustrating a U-shaped or C-shaped antenna of an electronic device according to certain embodiments of the disclosure.

FIG. 25 is a view illustrating a U-shaped or CC-shaped antenna of an electronic device 2500 according to certain embodiments of the disclosure. In describing the electronic device 2400 of FIG. 25, a description of components which are the same as (or similar to) those of the electronic device 2300 of FIG. 23 or the electronic device 2400 of FIG. 24 may be omitted.

Referring to FIG. 25, the electronic device 2500 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a housing 2510 (e.g., the support member 2032 in FIG. 20), and/or a conductive portion 2520 (e.g., the first conductive portion 610 or the second conductive portion 620 of FIG. 5) (e.g., the conductive portion 2320 in FIG. 23 or the conductive portion 2420 in FIG. 24) serving as an antenna. A space 2590 may be disposed between the housing 2510 (e.g., the support member 2032 in FIG. 20) and the conductive portion 2520.

The electronic device 2500 may be a bar type electronic device including a display in which the size of the display region is fixed. The electronic device 2500 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

In an embodiment, the conductive portion 2520 may be disposed on at least one side surface (2403*a*, 2403*b*, 2403*c*, or 2403*d*) (e.g., the third side surface 203*c* and/or the fourth side surface 203*d* in FIGS. 2 to 4) of the electronic device 2500.

As an embodiment, FIG. 25 illustrates that the conductive portion 2520 is disposed on the fourth side surface 2503*d* as an example. As another example, the conductive portion 2520 may be disposed on the first side surface 2503*a*, the second side surface 2503*b*, or the third side surface 2503*c*.

The conductive portion 2520 may include a first portion 2521 configured in a predetermined width to have a length in the first direction (e.g., the x-axis direction), a second portion 2522 spaced apart from the first portion 2521 by a predetermined interval and configured in a predetermined width to have a length in the first direction (e.g., the x-axis direction), and a third portion 2523 interconnecting one end of the first portion 2521 and one end of the second portion 2522.

The first portion 2521, the second portion 2522, and the third portion 2523 of the conductive portion 2520 may be configured integrally. The conductive portion 2520 may be configured in the U shape or C shape in which the first portion 2521, the second portion 2522, and the third portion 2523 are electrically connected to each other. The third portion 2523 of the conductive portion 2520 may be disposed adjacent to the second side surface 2503*b* of the electronic device 2500. An opening 2520*a* in the conductive portion 2520 may be disposed at a position adjacent to the first side surface 2503*a* of the electronic device 2500.

As an example, a space 2590 may be disposed between the housing 2510 (e.g., the support member 2032 in FIG. 20) and the conductive portion 2520. The housing 2510 (e.g., the support member 2032 of FIG. 20) and the conductive portion 2520 are spaced apart from each other by a predetermined interval, and the housing 2510 (e.g., the support member 2032 of FIG. 20) and the conductive portion 2520 may be split from each other. For example, the conductive portion 2520 may be electrically floated.

The conductive portion 2520 may include a slit 2580 (e.g., an opening) provided between the first portion 2521 and the second portion 2522. The slit 2580 may be filled with a non-conductive material (e.g., a non-conductive material). The space 2590 may be filled with a non-conductive material (e.g., a non-conductive material).

As an embodiment, a portion 2512 of the housing 2510 (e.g., the support member 2032 of FIG. 20) may protrude to be parallel to the conductive portion 2520. The opening 2520*a* in the conductive portion 2520 may be spaced apart from the portion 2512 of the housing 2510 (e.g., the support member 2032 in FIG. 20) by a predetermined interval, so that the housing 2510 (e.g., the support member 2032 FIG. 20) and the conductive portion 2520 may be split from each other. For example, the split position 2550 may be filled with a non-conductive material (e.g., a non-conductive material). Since the space 2590 and the split position 2550 are filled with a non-conductive material (e.g., a non-conductive material), so that the housing 2510 (e.g., the support member 2032 in FIG. 20) and the conductive portion 2520 may be electrically split from each other. As another example, when the conductive portion 2520 is configured with a non-conductive portion, the space 2590 may be omitted. As another example, the conductive portion 2520 may be coupled to or configured integrally with the housing 2510 (e.g., the support member 2032 in FIG. 20).

In some embodiments, the lengths of the first portion 2521 and the second portion 2522 of the conductive portion 2520 may be substantially equal to each other. In some embodiments, the lengths of the first portion 2521 and the second portion 2522 of the conductive portion 2520 may be different from each other.

The first portion 2521 of the conductive portion 2520 serving as the antenna A may be electrically connected to the feed point 2430 and the ground point 2540. As an example, the feed point 2530 may be electrically connected to the first portion 2521 at a position adjacent to the first side surface 2503*a* of the electronic device 2500. For example, the ground point 2540 may be electrically connected to the first portion 2521 to be more distant than the feed point 2530 in the first direction (e.g., the x-axis direction).

The first portion 2521 and the feed point 2530 and the ground point 2540 of the conductive portion 2520 serving as the antenna A may be electrically connected to each other. As an example, the feed point 2530 may be electrically connected to the first portion 2521 at a position adjacent to the first side surface 2503*a* of the electronic device 2500. As an example, the ground point 2540 may be located to be more distant than the feed point 2530 in the first direction (e.g., the x-axis direction).

The conductive portion 2520 may be used as the antenna A that operates in at least one frequency band by being electrically connected to a wireless communication circuit (e.g., the wireless communication module 192 in FIG. 1) at the feed point 2530.

In an embodiment, the wireless communication circuit (e.g., the wireless communication module 192 in FIG. 1) may be configured to transmit and/or receive wireless signals in a low band, mid band, high band or ultra-high band via the conductive portion 2520.

The electronic device 2500 according to certain embodiments of the disclosure may further include an antenna other than the antenna A using the conductive portion 2520. For example, the other antenna may be configured with at least a portion of the housing 2510. As another example, the other antenna may be configured with a laser direct structuring (LDS) pattern. The other antenna may be used as an antenna operating in a frequency band different from that of the antenna A configured with the conductive portion 2520 by being electrically connected to the wireless communication circuit (e.g., the wireless communication module 192 in FIG. 1).

Figure 26:
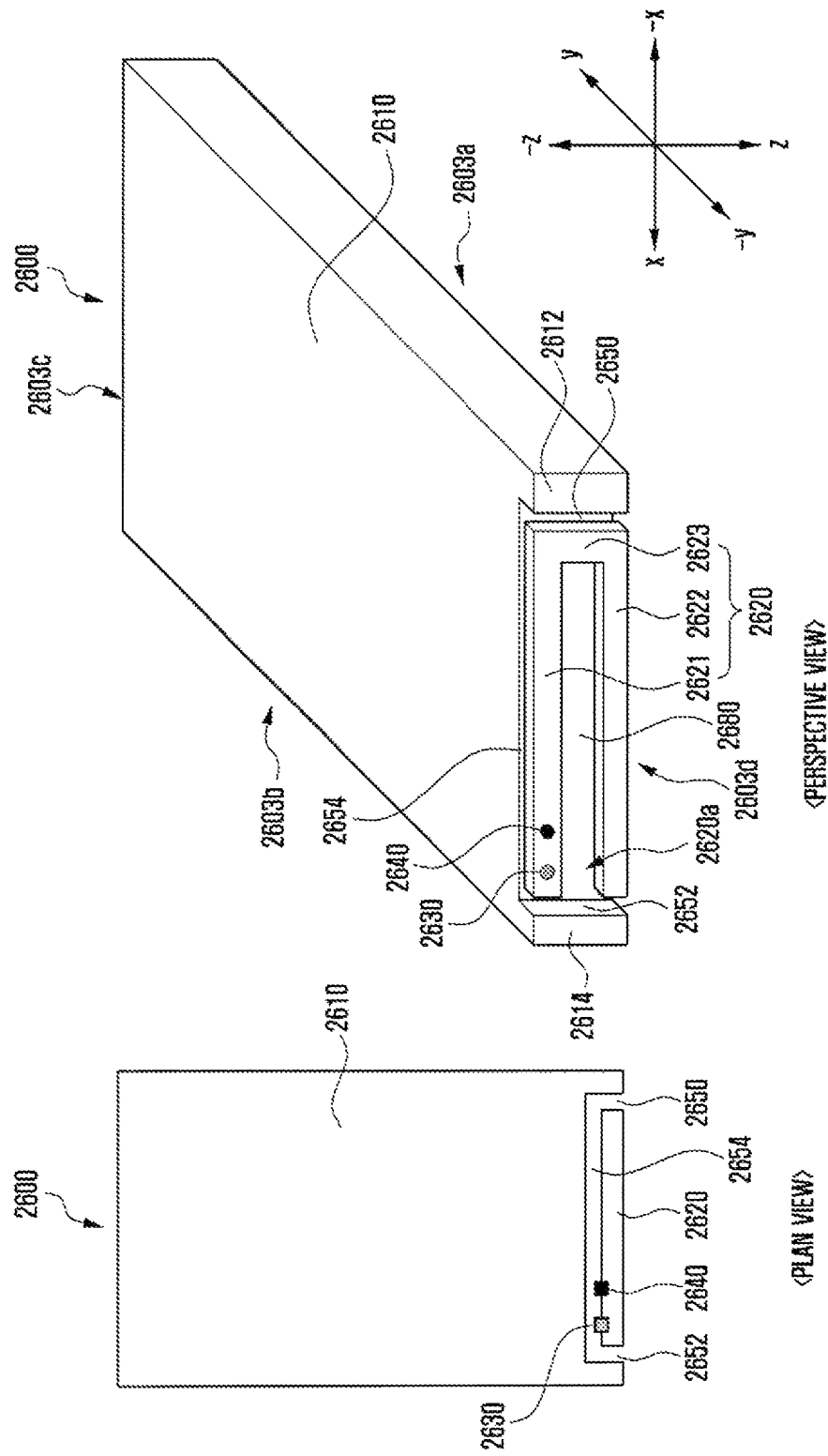
FIG. 26 is a view illustrating a U-shaped or C-shaped antenna of an electronic device according to certain embodiments of the disclosure.

FIG. 26 is a view illustrating a U-shaped or CC-shaped antenna of an electronic device 2600 according to certain embodiments of the disclosure. In describing the electronic device 2600 of FIG. 26, a description of components which are the same as (or similar to) those of the electronic device 2400 of FIG. 24 or the electronic device 2500 of FIG. 25 may be omitted.

Referring to FIG. 26, the electronic device 2600 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a housing 2610 (e.g., the support member 2032 in FIG. 20), and a first conductive portion 2620 (e.g., the first conductive portion 610 or the second conductive portion 620 of FIG. 5) (e.g., the conductive portion 2320 in FIG. 23, the conductive portion 2420 in FIG. 24, or the conductive portion 2520 in FIG. 25) serving as an antenna A. In an embodiment, spaces 2650, 2652, and 2654 may be disposed in the housing 2610 (e.g., the support member 2032 in FIG. 20).

The electronic device 2600 may be a bar type electronic device including a display in which the size of the display region is fixed. The electronic device 2600 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

In an embodiment, the first conductive portion 2620 (e.g., the first conductive portion 610 or the second conductive portion 620 in FIG. 5) (e.g., the conductive portion 2320 in FIG. 23) may be disposed on at least one side surface (2603*a*, 2603*b*, 2603*c*, or 2603*d*) (e.g., the third side surface 203*c* and/or the fourth side surface 203*d* in FIGS. 2 to 4) of the electronic device 2600. The fourth side surface 2603*d* may include the first conductive portion 2620, the second conductive portion 2612, or the third conductive portion 2614. In an embodiment, between the first conductive portion 2620 and the second conductive portion 2612, a first space (e.g., a first split portion) 2650 may be located. As another example, between the first conductive portion 2620 and the third conductive portion 2614, a second space (e.g., a second split portion) 2652 may be located. Between the first conductive portion 2620 and the housing 2610 (e.g., the support member 2032 in FIG. 20), a third space (e.g., a third split portion) 2654 may be located.

As another example, when the second conductive portion 2612 or the third conductive portion 2614 is configured with a non-conductive member, the first space 2650 or the second space 2652 may be omitted. As another example, the second conductive portion 2612 or the third conductive portion 2614 may be coupled to or configured integrally with the housing 2610 (e.g., the support member 2032 in FIG. 20). For example, the first conductive portion 2620 may be in a floating state.

The conductive portion 2620 may include a first portion 2621 configured in a predetermined width to have a length in the first direction (e.g., the x-axis direction), a second portion 2622 spaced apart from the first portion 2621 by a predetermined interval and configured in a predetermined width to have a length in the first direction (e.g., the x-axis direction), and a third portion 2623 interconnecting one end of the first portion 2621 and one end of the second portion 2622.

The first portion 2621, the second portion 2622, and the third portion 2623 of the conductive portion 2620 may be configured integrally. The conductive portion 2620 may be configured in the U shape or C shape in which the first portion 2621, the second portion 2622, and the third portion 2623 are electrically connected to each other.

The third portion 2623 of the conductive portion 2620 may be disposed adjacent to the first side surface 2603*a* of the electronic device 2600. An opening 2620*a* in the conductive portion 2620 may be disposed at a position adjacent to the second side surface 2603*b* of the electronic device 2600.

The third portion 2623 of the first conductive portion 2620 may be spaced apart from the second conductive portion 2612 by a predetermined interval. The opening 2620*a* in the first conductive portion 2620 may be spaced apart from the third conductive portion 2614 by a predetermined interval.

As an embodiment, a portion in which the third portion 2623 of the first conductive portion 2620 and the second conductive portion 2612 may be spaced apart from each other by a predetermined interval may be the first space 2650. A portion in which the opening 2620*a* in the first conductive portion 2620 and the third conductive portion 2614 are spaced apart from each other by a predetermined interval may be the second space 2652. A portion in which the first conductive portion 2620 and the housing 2610 (e.g., the support member 2032 in FIG. 20) are spaced apart from each other by a predetermined interval may be the third space 2654.

The first conductive portion 2620 may include a slit 2680 (e.g., an opening) provided between the first portion 2621 and the second portion 2622. The slit 2680 may be filled with a non-conductive material (e.g., a non-conductive material).

The first space 2650, the second space 2652, and the third space 2654 may be filled with a non-conductive material (e.g., a non-conductive material). The first space 2650 or the second space 2652 may be filled with a non-conductive material (e.g., a non-conductive material) to provide a non-conductive member. As another example, the non-conductive member disposed in the first space 2650 or the second space 2652 and the non-conductive member disposed in the third space 2654 may be coupled to or configured integrally with each other.

In some embodiments, the lengths of the first portion 2621 and the second portion 2622 of the conductive portion 2620 may be substantially equal to each other. In some embodiments, the lengths of the first portion 2621 and the second portion 2622 of the conductive portion 2620 may be different from each other.

The first portion 2621 and the feed point 2630 and the ground point 2640 of the conductive portion 2620 serving as the antenna A may be electrically connected to each other. For example, the feed point 2630 may be located adjacent to the second side surface 2603*b* of the electronic device 2600. As an example, the ground point 2640 may be located to be more distant than the feed point 2630 in the second direction (e.g., the −x-axis direction).

The conductive portion 2620 may be used as the antenna A operating in at least one frequency band by being electrically connected to a wireless communication circuit (e.g., the wireless communication module 192 in FIG. 1).

In an embodiment, the wireless communication circuit (e.g., the wireless communication module 192 in FIG. 1) may be configured to transmit and/or receive wireless signals in a low band, mid band, high band or ultra-high band via the conductive portion 2620.

The electronic device 2600 according to certain embodiments of the disclosure may further include an antenna other than the antenna A using the conductive portion 2620. As an example, the other antenna may be configured with at least a portion of the housing 2610 (e.g., the support member 2032 in FIG. 20). As another example, the other antenna may be configured with a laser direct structuring (LDS) pattern. The other antenna may be used as an antenna operating in a frequency band different from that of the antenna A configured with the conductive portion 2620 by being electrically connected to the wireless communication circuit (e.g., the wireless communication module 192 in FIG. 1).

Figure 27:
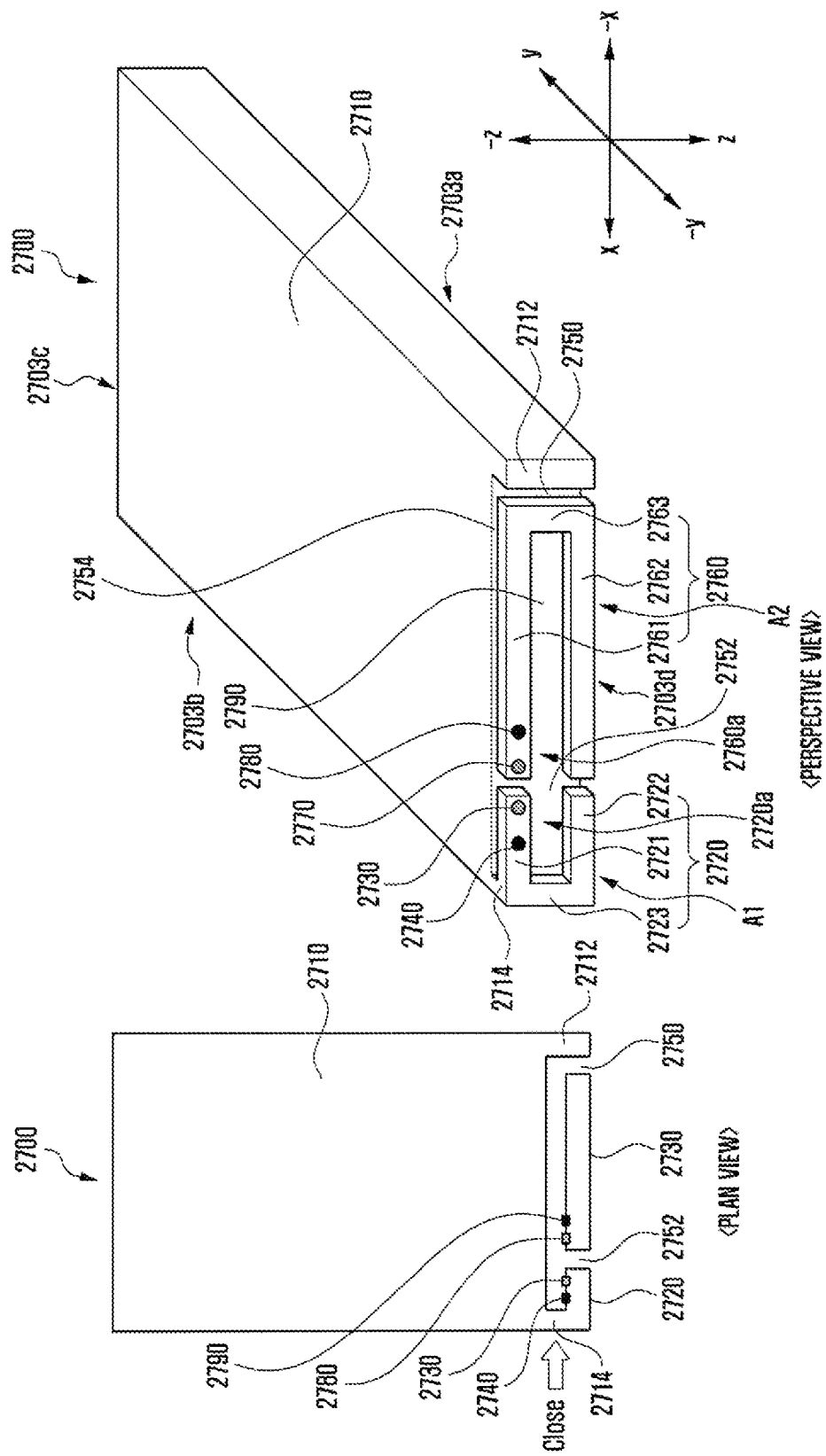
FIG. 27 is a view illustrating a plurality of frame antennas of an electronic device according to certain embodiments of the disclosure.

FIG. 27 is a view illustrating a plurality of frame antennas of an electronic device 2700 according to certain embodiments of the disclosure. In describing the electronic device 2700 of FIG. 27, a description of components which are the same as or similar to those of the antennas A1 and A2 of the electronic device 500 of FIG. 5 and the antennas of FIGS. 6A and 6B may be omitted.

Referring to FIG. 27, the electronic device 2700 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a housing 2710 (e.g., the support member 2032 in FIG. 20), and/or a plurality of conductive portions 2720, 2760, and 2712 serving as antennas. Spaces 2750, 2752, and 2754 may be disposed in the housing 2710 (e.g., the support member 2032 in FIG. 20). As an embodiment, a plurality of antennas may be configured with the plurality of conductive portions 2720, 2760, and 2712.

The electronic device 2700 may be a bar type electronic device including a display in which the size of the display region is fixed. The electronic device 2700 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The plurality of conductive portions 2720, 2760, and 2712 may include a first conductive portion 2720 serving as the first antenna A1, and a second conductive portion 2760 and a third conductive portion 2712 serving as the second antenna A2.

As an embodiment, a plurality of U frame antennas (e.g., the first antenna A1 and the second antenna A2) may be configured with the plurality of conductive portions 2720, 2760, and 2712.

The first conductive portion 2720 serving as the first antenna A1, the second conductive portion 2760 serving as the second antenna A2, and the third conductive portion 2712 may be disposed on at least one of the side surfaces 2703*a*, 2703*b*, 2703*c*, and 2703*d* (e.g., the third side surface 203*c* and/or the fourth side surface 203*d* in FIGS. 2 to 4) of the electronic device 2700.

The fourth side surface 2703*d* of the electronic device 2700 may include the first conductive portion 2720, the second conductive portion 2760, or the third conductive portion 2712. In an embodiment, between the first conductive portion 2720 and the third conductive portion 2712, a first space (e.g., a first split portion) 2750 may be located. Between the first conductive portion 2720 and the second conductive portion 2760, a second space (e.g., a second split portion) 2752 may be located. Between the second conductive portion 2760 and the housing 2710 (e.g., the support member 2032 in FIG. 20), a third space (e.g., a third split portion) 2754 may be located. The third space 2754 may also be located between at least a portion of the first conductive portion 2720 and the housing 2710 (e.g., the support member 2032 in FIG. 20).

As another example, when the second conductive portion 2760 or the third conductive portion 2712 is configured with a non-conductive member, the first space 2750 or the second space 2752 may be omitted. As another example, the first conductive portion 2720 or the third conductive portion 2712 may be coupled to or configured integrally with the housing 2710 (e.g., the support member 2032 in FIG. 20). For example, the second conductive portion 2760 may be in a floating state.

The first conductive portion 2720 may include a first portion 2721 configured in a predetermined width to have a length in the first direction (e.g., the x-axis direction), a second portion 2722 spaced apart from the first portion 2721 by a predetermined interval and configured in a predetermined width to have a length in the first direction (e.g., the x-axis direction), and a third portion 2723 interconnecting one end of the first portion 2721 and one end of the second portion 2722. The first portion 2721, the second portion 2722, and the third portion 2723 of the first conductive portion 2720 may be configured integrally. The first conductive portion 2720 may be configured in the U shape or C shape in which the first portion 2721, the second portion 2722, and the third portion 2723 are electrically connected to each other.

The third portion 2723 of the first conductive portion 2720 may be disposed adjacent to the second side surface 2703*b* of the electronic device 2700. An opening 2720*a* in the first conductive portion 2720 may be disposed to face the first side surface 2703*a* of the electronic device 2700.

The second conductive portion 2760 may include a first portion 2761 configured in a predetermined width to have a length in the first direction (e.g., the x-axis direction), a second portion 2762 spaced apart from the first portion 2761 by a predetermined interval and configured in a predetermined width to have a length in the first direction (e.g., the x-axis direction), and a third portion 2763 interconnecting one end of the first portion 2761 and one end of the second portion 2762.

The first portion 2761, the second portion 2762, and the third portion 2763 of the second conductive portion 2760 may be configured integrally. The second conductive portion 2760 may be configured in the U shape or C shape in which the first portion 2761, the second portion 2762, and the third portion 2763 are electrically connected to each other.

The third portion 2763 of the second conductive portion 2760 may be disposed adjacent to the first side surface 2703*a* of the electronic device 2700. An opening 2760*a* in the second conductive portion 2760 may be disposed to face the second side surface 2703*b* of the electronic device 2700.

The opening 2720*a* in the first conductive portion 2720 and the opening 2760*a* in the second conductive portion 2760 may be disposed to face each other. The opening 2720*a* in the first conductive portion 2720 and the opening 2760*a* in the second conductive portion 2760 may be disposed with a predetermined interval therebetween. The first conductive portion 2720 and the second conductive portion 2760 may be disposed with a predetermined interval therebetween, so that the first conductive portion 2720 and the second conductive portion 2760 may be split from each other. The second conductive portion 2760 and the third conductive portion 2712 may be disposed with a predetermined interval therebetween, so that the second conductive portion 2760 and the third conductive portion 2712 may be split from each other.

As an embodiment, a portion in which the third portion 2763 of the second conductive portion 2760 and the third conductive portion 2712 are spaced apart from each other by a predetermined interval may be the first space 2750. A portion in which the opening 2720a in the first conductive portion 2720 and the opening 2760a in the second conductive portion 2760 are spaced apart from each other by a predetermined interval may be the second space 2752. A portion in which the second conductive portion 2760 and the housing 2710 (e.g., the support member 2032 in FIG. 20) are spaced apart from each other by a predetermined interval may be the third space 2754.

The second conductive portion 2760 and the third conductive portion 2712 may be electrically split from each other by the first space 2750. In an embodiment, between the first portion 2721 and the second portion 2722 of the first conductive portion 2720 and between the first portion 2761 and the second portion 2762 of the second conductive portion 2760, a slit 2790 (e.g., the slits 670 and 680 in FIG. 5) (e.g., openings) may be provided. The slit 2790 may be filled with a non-conductive material (e.g., a non-conductive material).

The first space 2750, the second space 2752, and the third space 2754 may be filled with a non-conductive material (e.g., a non-conductive material). The first space 2750 or the second space 2752 may be filled with a non-conductive material (e.g., a non-conductive material) to provide a non-conductive member. In addition, the third space 2754 may be filled with a non-conductive material (e.g., a non-conductive material) to provide a non-conductive member. As another example, the non-conductive member disposed in the first space 2750 or the second space 2752 and the non-conductive member disposed in the third space 2754 may be coupled to or configured integrally with each other. As an example, a portion 2714 of the first conductive portion 2720 may be electrically connected to the housing 2710 (e.g., the support member 2032 in FIG. 20).

In some embodiments, the lengths of the first portion 2721 and the second portion 2722 of the first conductive portion 2720 may be substantially equal to each other. In some embodiments, the lengths of the first portion 2721 and the second portion 2722 of the first conductive portion 2720 may be different from each other.

The first portion 2721 and the first feed point 2730 and the first ground point 2740 of the first conductive portion 2720 serving as the first antenna A1 may be electrically connected to each other. As an example, the first ground point 2740 may be electrically connected to the first portion 2721 at a position adjacent to the second side surface 2703b of the electronic device 2700. As an example, the first feed point 2730 may be electrically connected to the first portion 2721 to be more distant than the first ground point 2740 in the second direction (e.g., the −x-axis direction). As an example, the first feed point 2730 may be located adjacent to the opening 2720a. The first ground point 2740 may be located to be more distant than the first feed point 2730 in the first direction (e.g., the x-axis direction).

In some embodiments, the lengths of the first portion 2761 and the second portion 2762 of the second conductive portion 2760 may be substantially equal to each other. In some embodiments, the lengths of the first portion 2761 and the second portion 2762 of the second conductive portion 2760 may be different from each other.

The first portion 2761 and the second feed point 2770 and the second ground point 2780 of the second conductive portion 2760 serving as the second antenna A2 may be electrically connected to each other. As an example, the second ground point 2780 may be electrically connected to the first portion 2761 at a position adjacent to the second side surface 2703b of the electronic device 2800. As an example, the second feed point 2770 may be electrically connected to the first portion 2761 to be more distant than the second ground point 2780 in the first direction (e.g., the x-axis direction). As an example, the second feed point 2770 may be located adjacent to the opening 2760a. The second ground point 2780 may be located to be more distant than the second feed point 2770 in the second direction (e.g., the −x-axis direction).

The first conductive portion 2720 may be used as the first antenna A1 that operates in at least one frequency band by being electrically connected to a wireless communication circuit (e.g., the wireless communication module 192 in FIG. 1) at the first feed point 2730. The second conductive portion 2760 may be used as a second antenna A2 that operates in at least one frequency band by being electrically connected to a wireless communication circuit (e.g., the wireless communication module 192 in FIG. 2) at the second feed point 2770.

In an embodiment, the wireless communication circuit (e.g., the wireless communication module 192 in FIG. 1) may be configured to transmit and receive wireless signals in a low band, mid band, high band or ultra-high band via the first conductive portion 2720 and/or the second conductive portion 2760.

The electronic device 2700 according to certain embodiments of the disclosure may further include an antenna other than the first antenna A1 using the first conductive portion 2720 and the second antenna A2 using the second conductive portion 2760. As an example, the other antenna may be configured with at least a portion of the housing 2710 (e.g., the support member 2032 in FIG. 20). As another example, the other antenna may be configured with a laser direct structuring (LDS) pattern. The other antenna may be used as an antenna operating in a frequency band different from those of the first antenna A1 configured with the first conductive portion 2720 and the second antenna A2 configured with the second conductive portion 2760 by being electrically connected to the wireless communication circuit (e.g., the wireless communication module 192 of FIG. 1).

Figure 28:
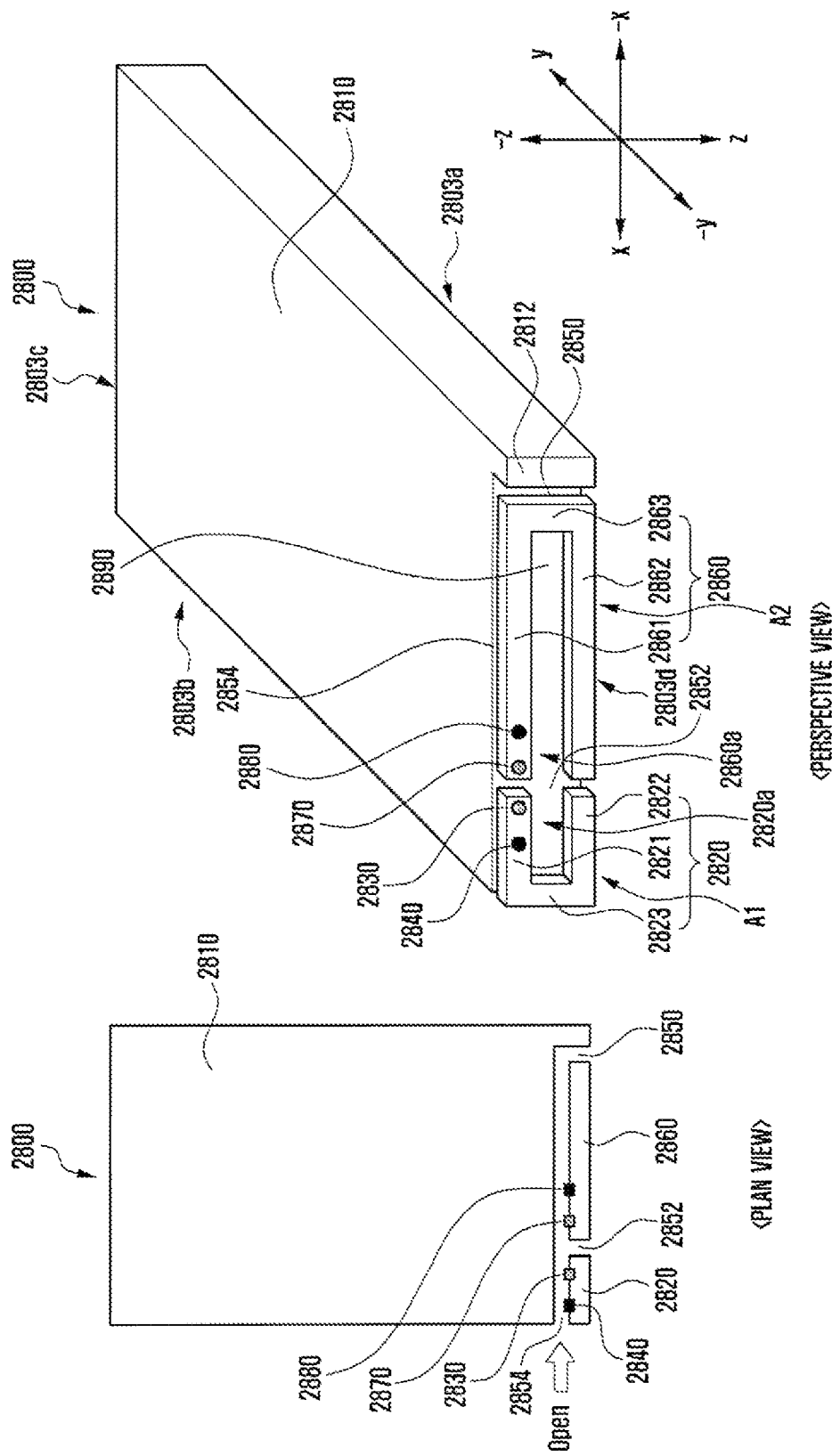
FIG. 28 is a view illustrating a plurality of frame antennas (a first antenna and a second antenna) of an electronic device according to certain embodiments of the disclosure.

FIG. 28 is a view illustrating a plurality of U-frame antennas (a first antenna and a second antenna) of an electronic device 2800 according to certain embodiments of the disclosure. In describing the electronic device 2800 of FIG. 28, a description of components which are the same as (or similar to) those of the electronic device 2700 of FIG. 27 may be omitted.

Referring to FIG. 28, the electronic device 2800 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a housing 2810 (e.g., the support member 2032 in FIG. 20), and a plurality of conductive portions 2820, 2860, and 2812 (e.g., the plurality of conductive portions 2720 and 2760 in FIG.

27) serving as antennas. Spaces 2850, 2852, and 2854 may be disposed in the housing 2810 (e.g., the support member 2032 in FIG. 20). As an embodiment, a plurality of antennas may be configured with the plurality of conductive portions 2820, 2860, and 2812.

The electronic device 2800 may be a bar type electronic device including a display in which the size of the display region is fixed. The electronic device 2800 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The plurality of conductive portions 2820, 2860, and 2812 may include a first conductive portion 2820 serving as the first antenna A1, and a second conductive portion 2860 and a third conductive portion 2812 serving as the second antenna A2.

As an embodiment, a plurality of frame antennas (e.g., the first antenna A1 and the second antenna A2) may be configured with the plurality of conductive portions 2820, 2860, and 2812.

The first conductive portion 2820 serving as the first antenna A1, the second conductive portion 2860 serving as the second antenna A2, and the third conductive portion 2812 may be disposed on at least one of the side surfaces 2803a, 2803b, 2803c, and 2803d (e.g., the third side surface 203c and/or the fourth side surface 203d in FIGS. 2 to 4) of the electronic device 2800.

The fourth side surface 2803d of the electronic device 2800 may include the first conductive portion 2820, the second conductive portion 2860, or the third conductive portion 2812. In an embodiment, between the first conductive portion 2820 and the third conductive portion 2812, a first space (e.g., a first split portion) 2850 may be located. Between the first conductive portion 2820 and the second conductive portion 2860, a second space (e.g., a second split portion) 2852 may be located. Between the first and second conductive portions 2820 and 2860 and the housing 2810 (e.g., the support member 2032 in FIG. 20), a third space (e.g., a third split portion) 2854 may be located.

As another example, when the second conductive portion 2860 or the third conductive portion 2812 is configured with a non-conductive member, the first space 2850 or the second space 2852 may be omitted. As another example, the third conductive portion 2812 may be coupled to or configured integrally with the housing 2810 (e.g., the support member 2032 in FIG. 20). For example, the first conductive portion 2820 and the second conductive portion 2860 may be split from each other so that the first conductive portion 2820 and the second conductive portion 2860 may be in a floating state.

The first conductive portion 2820 may include a first portion 2821 configured in a predetermined width to have a length in the first direction (e.g., the x-axis direction), a second portion 2822 spaced apart from the first portion 2821 by a predetermined interval and configured in a predetermined width to have a length in the first direction (e.g., the x-axis direction), and a third portion 2823 interconnecting one end of the first portion 2821 and one end of the second portion 2822.

The first portion 2821, the second portion 2822, and the third portion 2823 of the first conductive portion 2820 may be configured integrally. The first conductive portion 2820 may be configured in the U shape or C shape in which the first portion 2821, the second portion 2822, and the third portion 2823 are electrically connected to each other.

The third portion 2823 of the first conductive portion 2820 may be disposed adjacent to the second side surface 2803b of the electronic device 2800. An opening 2820a in the first conductive portion 2820 may be disposed to face the first side surface 2803a of the electronic device 2800.

The second conductive portion 2860 may include a first portion 2861 configured in a predetermined width to have a length in the first direction (e.g., the x-axis direction), a second portion 2862 spaced apart from the first portion 2861 by a predetermined interval and configured in a predetermined width to have a length in the first direction (e.g., the x-axis direction), and a third portion 2863 interconnecting one end of the first portion 2861 and one end of the second portion 2862.

The first portion 2861, the second portion 2862, and the third portion 2863 of the second conductive portion 2860 may be configured integrally. The second conductive portion 2860 may be configured in the U shape or C shape in which the first portion 2861, the second portion 2862, and the third portion 2863 are electrically connected to each other.

The third portion 2863 of the second conductive portion 2860 may be disposed adjacent to the first side surface 2803a of the electronic device 2800. An opening 2860a in the second conductive portion 2860 may be disposed to face the second side surface 2803b of the electronic device 2800.

The opening 2820a in the first conductive portion 2820 and the opening 2860a in the second conductive portion 2860 may be disposed to face each other. The opening 2820a in the first conductive portion 2820 and the opening 2860a in the second conductive portion 2860 may be disposed with a predetermined interval therebetween.

The first conductive portion 2820 and the second conductive portion 2860 may be disposed with a predetermined interval therebetween, so that the first conductive portion 2820 and the second conductive portion 2860 may be split from each other. The second conductive portion 2860 and the third conductive portion 2812 may be disposed with a predetermined interval therebetween, so that the second conductive portion 2860 and the third conductive portion 2812 may be split from each other.

In an embodiment, the first conductive portion 2820 may be spaced apart from the housing 2810 (e.g., the support member 2032 of FIG. 20) by a predetermined interval, so that the first housing 2810 (e.g., the support member 2032 of FIG. 20) and the first conductive portion 2820 may be split from each other. The second conductive portion 2860 may be spaced apart from the housing 2810 (e.g., the support member 2032 of FIG. 20) by a predetermined interval, so that the first housing 2810 (e.g., the support member 2032 of FIG. 20) and the second conductive portion 2860 may be split from each other.

As an embodiment, a portion in which the third portion 2863 of the second conductive portion 2860 and the third conductive portion 2812 are spaced apart from each other by a predetermined interval may be the first space 2850. A portion in which the opening 2820a in the first conductive portion 2820 and the opening 2860a in the second conductive portion 2860 are spaced apart from each other by a predetermined interval may be the second space 2852. A portion in which the first and second conductive portions 2820 and 2860 and the housing 2810 (e.g., the support member 2032 in FIG. 20) are spaced apart from each other by a predetermined interval may be the third space 2854.

The second conductive portion 2860 and the third conductive portion 2812 may be electrically split from each other by the first space 2850. In an embodiment, between the first portion 2821 and the second portion 2822 of the first conductive portion 2820 and between the first portion 2861 and the second portion 2862 of the second conductive portion 2860, a slit 2890 (e.g., the slits 670 and 680 in FIG. 5) (e.g., openings) may be provided. The slit 2890 may be filled with a non-conductive material (e.g., a non-conductive material).

The first space 2850, the second space 2852, and the third space 2854 may be filled with a non-conductive material (e.g., a non-conductive material). The first space 2850 or the second space 2852 may be filled with a non-conductive material (e.g., a non-conductive material) to provide a non-conductive member. As another example, the non-conductive member disposed in the first space 2850 or the second space 2852 and the non-conductive member disposed in the third space 2854 may be coupled to or configured integrally with each other.

In some embodiments, the lengths of the first portion 2821 and the second portion 2822 of the first conductive portion 2820 may be substantially equal to each other. In some embodiments, the lengths of the first portion 2821 and the second portion 2822 of the first conductive portion 2820 may be different from each other.

The first portion 2821 and the first feed point 2830 and the first ground point 2840 of the first conductive portion 2820 serving as the first antenna A1 may be electrically connected to each other. As an example, the first ground point 2840 may be electrically connected to the first portion 2821 at a position adjacent to the second side surface 2803b of the electronic device 2800. As an example, the first feed point 2830 may be electrically connected to the first portion 2821 to be more distant than the first ground point 2840 in the second direction (e.g., the −x-axis direction). As an example, the first feed point 2830 may be located adjacent to the opening 2820a. The first ground point 2840 may be located to be more distant than the first feed point 2830 in the first direction (e.g., the x-axis direction).

In some embodiments, the lengths of the first portion 2861 and the second portion 2862 of the second conductive portion 2860 may be substantially equal to each other. In some embodiments, the lengths of the first portion 2861 and the second portion 2862 of the second conductive portion 2860 may be different from each other. The first portion 2861 and the second feed point 2870 and the second ground point 2880 of the second conductive portion 2860 serving as the second antenna A2 may be electrically connected to each other. As an example, the second feed point 2880 may be electrically connected to the first portion 2861 at a position adjacent to the second side surface 2803b of the electronic device 2800. For example, the second feed point 2870 may be electrically connected to the second ground point 2880. As an example, the second feed point 2870 may be located adjacent to the opening 2860a. The second ground point 2880 may be located to be more distant than the second feed point 2870 in the second direction (e.g., the −x-axis direction). The first feed point 2830 of the first conductive portion 2820 may be disposed adjacent to the opening 2820a, and the second feed point 2870 of the second conductive portion 2860 may be disposed adjacent to the opening 2860a. The first feed point 2830 of the first conductive portion 2820 and the second feed point 2870 of the second conductive portion 2860 may be disposed adjacent to each other with a predetermined interval therebetween.

The first conductive portion 2820 may be used as the first antenna A1 that operates in at least one frequency band by being electrically connected to a wireless communication circuit (e.g., the wireless communication module 192 in FIG. 1) at the first feed point 2830. The second conductive portion 2860 may be used as a second antenna A2 that operates in at least one frequency band by being electrically connected to a wireless communication circuit (e.g., the wireless communication module 192 in FIG. 2) at the second feed point 2870.

In an embodiment, the wireless communication circuit (e.g., the wireless communication module 192 in FIG. 1) may be configured to transmit and receive wireless signals in a low band, mid band, high band or ultra-high band via the first conductive portion 2820 and/or the second conductive portion 2860.

The electronic device 2800 according to certain embodiments of the disclosure may further include an antenna other than the first antenna A1 using the first conductive portion 2820 and the second antenna A2 using the second conductive portion 2860. As an example, the other antenna may be configured with at least a portion of the housing 2810 (e.g., the support member 2032 in FIG. 20). As another example, the other antenna may be configured with a laser direct structuring (LDS) pattern. The other antenna may be used as an antenna operating in a frequency band different from those of the first antenna A1 configured with the first conductive portion 2820 and the second antenna A2 configured with the second conductive portion 2860 by being electrically connected to the wireless communication circuit (e.g., the wireless communication module 192 of FIG. 1).

Figure 29:
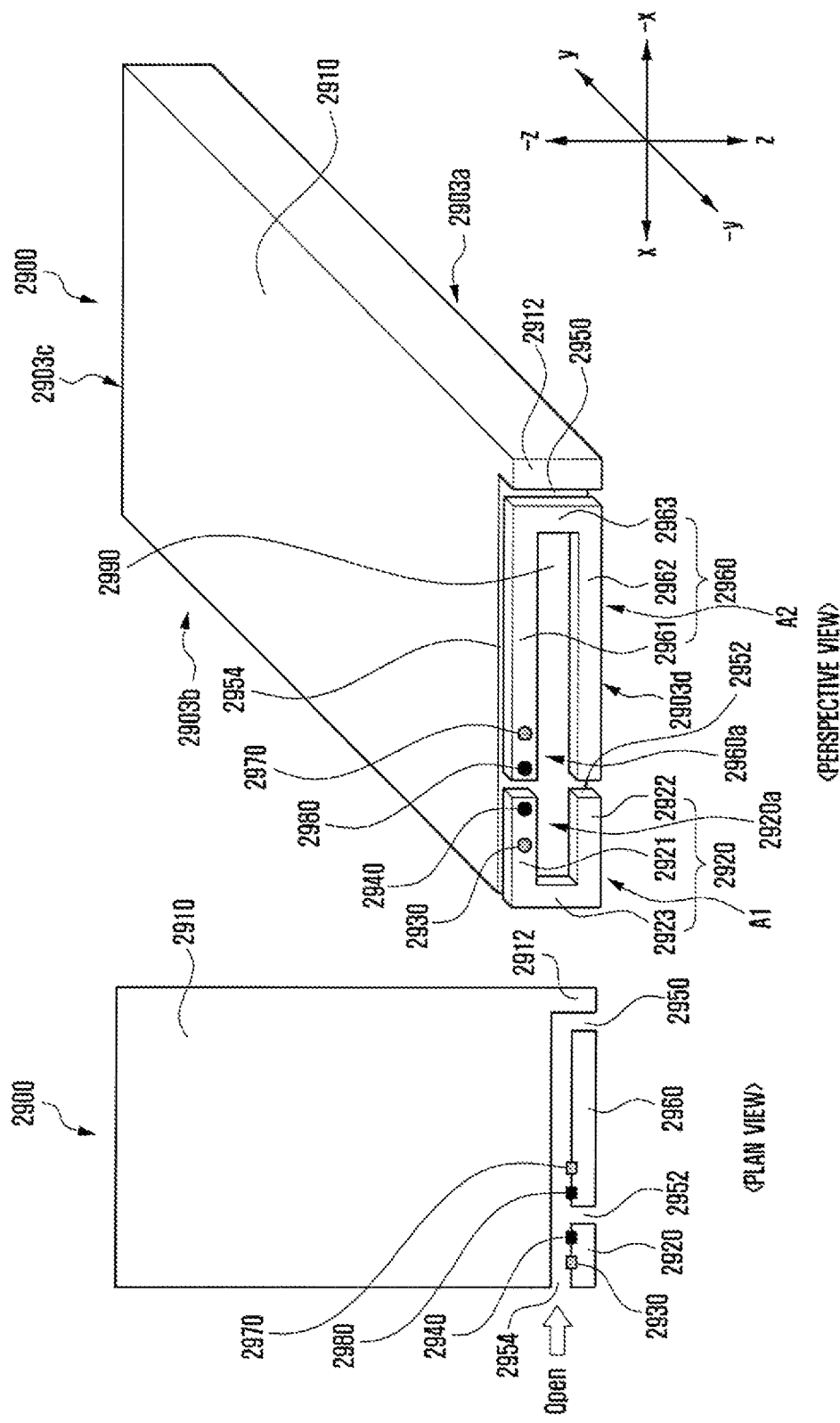
FIG. 29 is a view illustrating a plurality of frame antennas (a first antenna and a second antenna) of an electronic device according to certain embodiments of the disclosure.

FIG. 29 is a view illustrating a plurality of frame antennas (a first antenna and a second antenna) of an electronic device 2900 according to certain embodiments of the disclosure. In describing the electronic device 2900 of FIG. 29, a description of components which are the same as or similar to those of the antennas of the electronic device 2800 of FIG. 28 may be omitted.

Referring to FIG. 29, the electronic device 2900 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a housing 2910 (e.g., the support member 2032 in FIG. 20), and a plurality of conductive portions 2920, 2960, and 2912 (e.g., the plurality of conductive portions 2720 and 2760 in FIG. 27 or the plurality of conductive portions 2820 and 2860 in FIG. 28) serving as antennas. Spaces 2950, 2952, and 2954 may be disposed in the housing 2910 (e.g., the support member 2032 in FIG. 20). As an embodiment, a plurality of antennas may be configured with the plurality of conductive portions 2920, 2960, and 2912.

The electronic device 2900 may be a bar type electronic device including a display in which the size of the display region is fixed. The electronic device 2900 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The plurality of conductive portions 2920, 2960, and 2912 may include a first conductive portion 2920 serving as the first antenna A1, and a second conductive portion 2960 and a third conductive portion 2912 serving as the second antenna A2.

As an embodiment, a plurality of frame antennas (e.g., the first antenna A1 and the second antenna A2) may be configured with the plurality of conductive portions 2920, 2960, and 2912.

The first conductive portion 2920 serving as the first antenna A1, the second conductive portion 2960 serving as the second antenna A2, and the third conductive portion 2912 may be disposed on at least one of the side surfaces 2903*a*, 2903*b*, 2903*c*, and 2903*d* (e.g., the third side surface 203*c* and/or the fourth side surface 203*d* in FIGS. 2 to 4) of the electronic device 2900.

The fourth side surface 2903*d* of the electronic device 2900 may include the first conductive portion 2920, the second conductive portion 2960, or the third conductive portion 2912. In an embodiment, between the first conductive portion 2920 and the third conductive portion 2912, a first space (e.g., a first split portion) 2950 may be located. Between the first conductive portion 2920 and the second conductive portion 2960, a second space (e.g., a second split portion) 2952 may be located. Between the first and second conductive portions 2920 and 2960 and the housing 2910 (e.g., the support member 2032 in FIG. 20), a third space (e.g., a third split portion) 2954 may be located.

As another example, when the second conductive portion 2960 or the third conductive portion 2912 is configured with a non-conductive member, the first space 2950 or the second space 2952 may be omitted. As another example, the third conductive portion 2912 may be coupled to or configured integrally with the housing 2910 (e.g., the support member 2032 in FIG. 20). For example, the first conductive portion 2920 and the second conductive portion 2960 may be split from each other so that the first conductive portion 2920 and the second conductive portion 2960 may be in a floating state.

The first conductive portion 2920 may include a first portion 2921 configured in a predetermined width to have a length in the first direction (e.g., the x-axis direction), a second portion 2922 spaced apart from the first portion 2921 by a predetermined interval and configured in a predetermined width to have a length in the first direction (e.g., the x-axis direction), and a third portion 2923 interconnecting one end of the first portion 2921 and one end of the second portion 2922.

The first portion 2921, the second portion 2922, and the third portion 2923 of the first conductive portion 2920 may be configured integrally. The first conductive portion 2920 may be configured in the U shape or C shape in which the first portion 2921, the second portion 2922, and the third portion 2923 are electrically connected to each other.

The third portion 2923 of the first conductive portion 2920 may be disposed adjacent to the second side surface 2903*b* of the electronic device 2900. An opening 2920*a* in the first conductive portion 2920 may be disposed to face the first side surface 2903*a* of the electronic device 2900.

The second conductive portion 2960 may include a first portion 2961 configured in a predetermined width to have a length in the first direction (e.g., the x-axis direction), a second portion 2962 spaced apart from the first portion 2961 by a predetermined interval and configured in a predetermined width to have a length in the first direction (e.g., the x-axis direction), and a third portion 2963 interconnecting one end of the first portion 2961 and one end of the second portion 2962.

The first portion 2961, the second portion 2962, and the third portion 2963 of the second conductive portion 2960 may be configured integrally. The second conductive portion 2960 may be configured in the U shape or C shape in which the first portion 2961, the second portion 2962, and the third portion 2963 are electrically connected to each other.

The third portion 2963 of the second conductive portion 2960 may be disposed adjacent to the first side surface 2903*a* of the electronic device 2900. An opening 2960*a* in the second conductive portion 2960 may be disposed to face the second side surface 2903*b* of the electronic device 9800.

The opening 2920*a* in the first conductive portion 2920 and the opening 2960*a* in the second conductive portion 2960 may be disposed to face each other. The opening 2920*a* in the first conductive portion 2920 and the opening 2960*a* in the second conductive portion 2960 may be disposed with a predetermined interval therebetween.

The first conductive portion 2920 and the second conductive portion 2960 may be disposed with a predetermined interval therebetween, so that the first conductive portion 2920 and the second conductive portion 2960 may be split from each other. The second conductive portion 2960 and the third conductive portion 2912 may be disposed with a predetermined interval therebetween, so that the second conductive portion 2960 and the third conductive portion 2912 may be split from each other.

In an embodiment, the first conductive portion 2920 may be spaced apart from the housing 2910 (e.g., the support member 2032 of FIG. 20) by a predetermined interval, so that the first housing 2910 (e.g., the support member 2032 of FIG. 20) and the first conductive portion 2920 may be split from each other. For example, the first conductive portion 2920 may be in an electrically floating state. The second conductive portion 2960 may be spaced apart from the housing 2910 (e.g., the support member 2032 of FIG. 20) by a predetermined interval, so that the first housing 2910 (e.g., the support member 2032 of FIG. 20) and the second conductive portion 2960 may be split from each other. For example, the second conductive portion 2960 may be in an electrically floating state.

In some embodiments, the lengths of the first portion 2921 and the second portion 2922 of the first conductive portion 2920 may be substantially equal to each other. In some embodiments, the lengths of the first portion 2921 and the second portion 2922 of the first conductive portion 2920 may be different from each other.

As an embodiment, a portion in which the third portion 2963 of the second conductive portion 2960 and the third conductive portion 2912 are spaced apart from each other by a predetermined interval may be the first space 2950. A portion in which a slit 2920*a* (e.g., an opening) in the first conductive portion 2920 and a slit 2960*a* (an opening) in the second conductive portion 2960 are spaced apart from each other by a predetermined interval may be the second space 2952. A portion in which the first and second conductive portions 2920 and 2960 and the housing 2910 (e.g., the support member 2032 in FIG. 20) are spaced apart from each other by a predetermined interval may be the third space 2954.

The second conductive portion 2960 and the third conductive portion 2912 may be electrically split from each other by the first space 2950. In an embodiment, between the first portion 2921 and the second portion 2922 of the first conductive portion 2920 and between the first portion 2961 and the second portion 2962 of the second conductive portion 2960, a slit 2990 (e.g., the slits 670 and 680 in FIG. 5) may be provided. The slit 2990 may be filled with anon-conductive material (e.g., a non-conductive material).

The first space 2950, the second space 2952, and the third space 2954 may be filled with a non-conductive material (e.g., a non-conductive material). The first space 2950 or the second space 2952 may be filled with a non-conductive material (e.g., a non-conductive material) to provide a non-conductive member. As another example, the non-conductive member disposed in the first space 2950 or the second space 2952 and the non-conductive member disposed in the third space 2954 may be coupled to or configured integrally with each other.

The first portion 2921 and the first feed point 2930 and the first ground point 2940 of the first conductive portion 2920 serving as the first antenna A1 may be electrically connected to each other. As an example, the first feed point 2930 may be electrically connected to the first portion 2921 at a position adjacent to the second side surface 2903b of the electronic device 2900. As an example, the first ground point 2940 may be electrically connected to the first portion 2921 to be more distant than the first feed point 2930 in the second direction (e.g., the −x-axis direction). As an example, the first ground point 2940 may be located adjacent to the slit 2920a. The first feed point 2930 may be located to be more distant than the first ground point 2940 in the first direction (e.g., the x-axis direction).

In some embodiments, the lengths of the first portion 2961 and the second portion 2962 of the second conductive portion 2960 may be substantially equal to each other. In some embodiments, the lengths of the first portion 2961 and the second portion 2962 of the second conductive portion 2960 may be different from each other.

The first portion 2961 and the second feed point 2970 and the second ground point 2980 of the second conductive portion 2960 serving as the second antenna A2 may be electrically connected to each other. As an example, the second ground point 2970 may be electrically connected to the first portion 2961 at a position adjacent to the slit 2960a. As an example, the second feed point 2970 may be electrically connected to the first portion 2961 to be more distant than the second ground point 2980 in the second direction (e.g., the −x-axis direction).

The first ground point 2940 of the first conductive portion 2920 may be disposed adjacent to the slit 2920a, and the second ground point 2980 of the second conductive portion 2960 may be disposed adjacent to the slit 2960a. The first ground point 2940 of the first conductive portion 2920 and the second ground point 2980 of the second conductive portion 2960 may be disposed adjacent to each other with a predetermined interval therebetween.

The first conductive portion 2920 may be used as the first antenna A1 that operates in at least one frequency band by being electrically connected to a wireless communication circuit (e.g., the wireless communication module 192 in FIG. 1) at the first feed point 2930. The second conductive portion 2960 may be used as a second antenna A2 that operates in at least one frequency band by being electrically connected to a wireless communication circuit (e.g., the wireless communication module 192 in FIG. 2) at the second feed point 2970.

In an embodiment, the wireless communication circuit (e.g., the wireless communication module 192 in FIG. 1) may be configured to transmit and receive wireless signals in a low band, mid band, high band or ultra-high band via the first conductive portion 2920 and/or the second conductive portion 2960.

The electronic device 2900 according to certain embodiments of the disclosure may further include an antenna other than the first antenna A1 using the first conductive portion 2920 and the second antenna A2 using the second conductive portion 2960. As an example, the other antenna may be configured with at least a portion of the housing 2910 (e.g., the support member 2032 in FIG. 20). As another example, the other antenna may be configured with a laser direct structuring (LDS) pattern. The other antenna may be used as an antenna operating in a frequency band different from those of the first antenna A1 configured with the first conductive portion 2920 and the second antenna A2 configured with the second conductive portion 2960 by being electrically connected to the wireless communication circuit (e.g., the wireless communication module 192 of FIG. 1).

Figure 30:
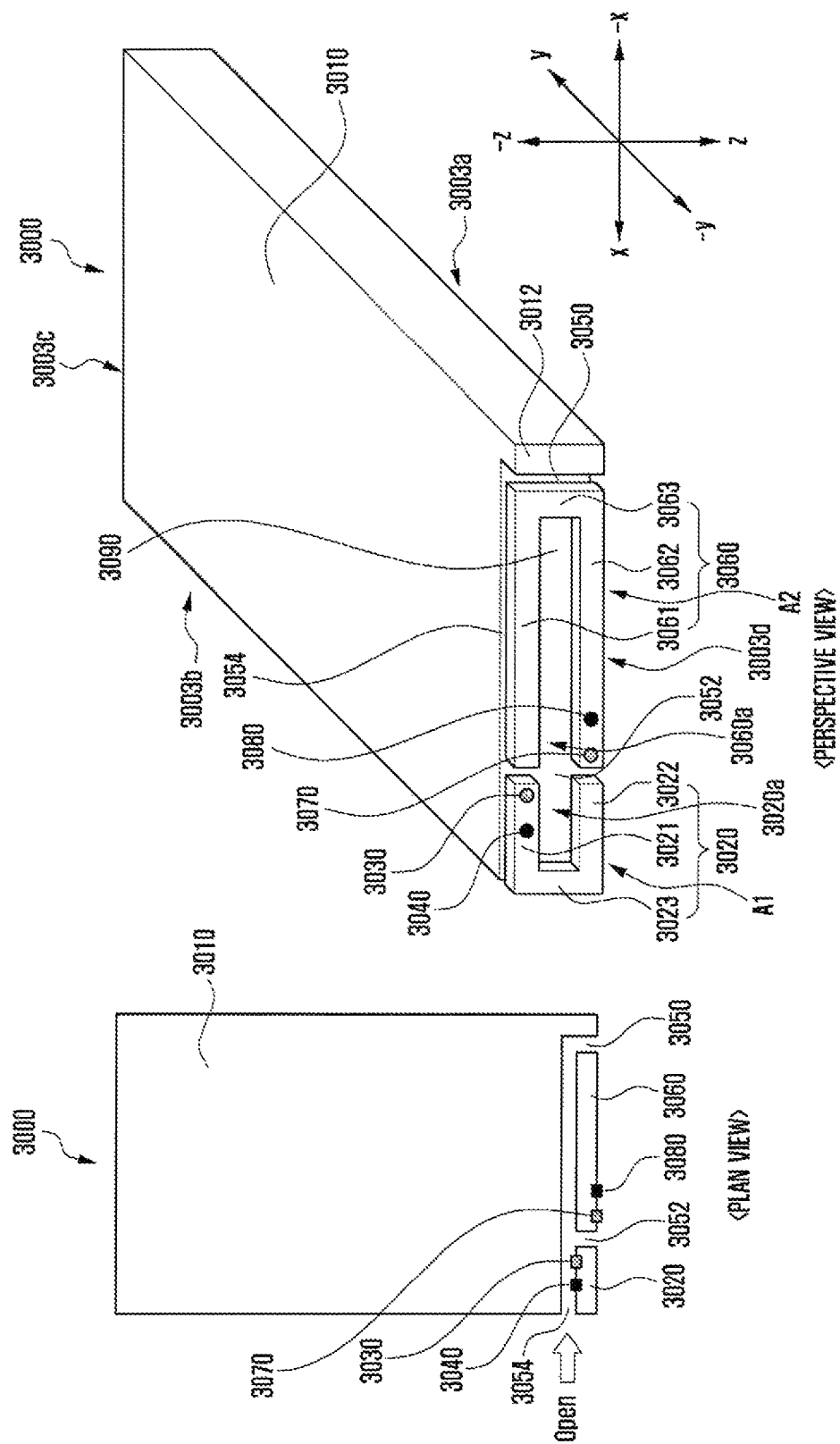
FIG. 30 is a view illustrating a plurality of frame antennas (a first antenna and a second antenna) of an electronic device according to certain embodiments of the disclosure.

FIG. 30 is a view illustrating a plurality of frame antennas (a first antenna and a second antenna) of an electronic device 3000 according to certain embodiments of the disclosure. In describing the electronic device 3000 of FIG. 30, a description of components which are the same as or similar to those of the antennas of the electronic device 2800 of FIG. 28 or the antennas of the electronic device 2900 of FIG. 29 may be omitted.

Referring to FIG. 30, the electronic device 3000 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a housing 3010 (e.g., the support member 2032 in FIG. 20), and a plurality of conductive portions 3020, 3060, and 3012 (e.g., the plurality of conductive portions 2720 and 2760 in FIG. 27, the conductive portions 2820 and 2860 in FIG. 28, or the plurality of conductive portions 2920 and 2960 in FIG. 29) serving as antennas. Spaces 3050, 3052, and 3054 may be disposed in the housing 3010 (e.g., the support member 2032 in FIG. 20). As an embodiment, a plurality of antennas may be configured with the plurality of conductive portions 3020, 3060, and 3012.

The electronic device 3000 may be a bar type electronic device including a display in which the size of the display region is fixed. The electronic device 3000 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The plurality of conductive portions 3020, 3060, and 3012 may include a first conductive portion 3020 serving as the first antenna A1, and a second conductive portion 3060 and a third conductive portion 3012 serving as the second antenna A2.

As an embodiment, a plurality of frame antennas (e.g., the first antenna A1 and the second antenna A2) may be configured with the plurality of conductive portions 3020, 3060, and 3012.

The first conductive portion 3020 serving as the first antenna A1, the second conductive portion 3060 serving as the second antenna A2, and the third conductive portion 3012 may be disposed on at least one of the side surfaces 3003a, 3003b, 3003c, and 3003d (e.g., the third side surface 203c and/or the fourth side surface 203d in FIGS. 2 to 4) of the electronic device 3000.

The fourth side surface 3003d of the electronic device 3000 may include the first conductive portion 3020, the second conductive portion 3060, or the third conductive portion 3012. In an embodiment, between the first conductive portion 3020 and the third conductive portion 3012, a first space (e.g., a first split portion) 3050 may be located. Between the first conductive portion 3020 and the second conductive portion 3060, a second space (e.g., a second split portion) 3052 may be located. Between the first and second conductive portions 3020 and 3060 and the housing 3010 (e.g., the support member 2032 in FIG. 20), a third space (e.g., a third split portion) 3054 may be located.

As another example, when the second conductive portion 3060 or the third conductive portion 3012 is configured with a non-conductive member, the first space 3050 or the second space 3052 may be omitted. As another example, the third conductive portion 3012 may be coupled to or configured integrally with the housing 2810 (e.g., the support member 2032 in FIG. 20). For example, the first conductive portion 3020 and the second conductive portion 3060 may be split from each other, and the first conductive portion 3020 and the second conductive portion 3060 may be in a floating state.

The first conductive portion 3020 may include a first portion 3021 configured in a predetermined width to have a length in the first direction (e.g., the x-axis direction), a second portion 3022 spaced apart from the first portion 3021 by a predetermined interval and configured in a predetermined width to have a length in the first direction (e.g., the x-axis direction), and a third portion 3023 interconnecting one end of the first portion 3021 and one end of the second portion 3022.

The first portion 3021, the second portion 3022, and the third portion 3023 of the first conductive portion 3020 may be configured integrally. The first conductive portion 3020 may be configured in the U shape or C shape in which the first portion 3021, the second portion 3022, and the third portion 3023 are electrically connected to each other.

The third portion 3023 of the first conductive portion 3020 may be disposed adjacent to the second side surface 3003*b* of the electronic device 3000. A slit 3020*a* in the first conductive portion 3020 may be disposed to face the first side surface 3003*a* of the electronic device 3000.

The second conductive portion 3060 may include a first portion 3061 configured in a predetermined width to have a length in the first direction (e.g., the x-axis direction), a second portion 3062 spaced apart from the first portion 3061 by a predetermined interval and configured in a predetermined width to have a length in the first direction (e.g., the x-axis direction), and a third portion 3063 interconnecting one end of the first portion 3061 and one end of the second portion 3062.

The first portion 3061, the second portion 3062, and the third portion 3063 of the second conductive portion 3060 may be configured integrally. The first conductive portion 3060 may be configured in the U shape or C shape in which the first portion 3061, the second portion 3062, and the third portion 3063 are electrically connected to each other.

The third portion 3063 of the second conductive portion 3060 may be disposed adjacent to the first side surface 3003*a* of the electronic device 3000. A slit 3060*a* in the second conductive portion 3060 may be disposed to face the second side surface 3003*b* of the electronic device 3000.

The slit 3020*a* in the first conductive portion 3020 and the slit 3060*a* in the second conductive portion 3060 may be disposed to face each other. The slit 3020*a* in the first conductive portion 3020 and the slit 3060*a* in the second conductive portion 3060 may be disposed with a predetermined interval therebetween.

The first conductive portion 3020 and the second conductive portion 3060 may be disposed with a predetermined interval therebetween, so that the first conductive portion 3020 and the second conductive portion 3060 may be split from each other. The second conductive portion 3060 and the third conductive portion 3012 may be disposed with a predetermined interval therebetween, so that the second conductive portion 3060 and the third conductive portion 3012 may be split from each other.

In an embodiment, the first conductive portion 3020 may be spaced apart from the housing 3010 (e.g., the support member 2032 of FIG. 20) by a predetermined interval, so that the first housing 3010 and the first conductive portion 3020 may be split from each other. For example, the first conductive portion 3020 may be in an electrically floating state. The second conductive portion 3060 may be spaced apart from the housing 3010 (e.g., the support member 2032 of FIG. 20) by a predetermined interval, so that the first housing 3010 (e.g., the support member 2032 of FIG. 20) and the second conductive portion 3060 may be split from each other. For example, the second conductive portion 3060 may be in an electrically floating state.

In some embodiments, the lengths of the first portion 3021 and the second portion 3022 of the first conductive portion 3020 may be substantially equal to each other. In some embodiments, the lengths of the first portion 3021 and the second portion 3022 of the first conductive portion 3020 may be different from each other.

As an embodiment, a portion in which the third portion 3063 of the second conductive portion 3060 and the third conductive portion 3012 are spaced apart from each other by a predetermined interval may be the first space 3050. A portion in which the slit 3020*a* in the first conductive portion 3020 and the slit 3060*a* in the second conductive portion 3060 are spaced apart from each other by a predetermined interval may be the second space 3052. A portion in which the first and second conductive portions 3020 and 3060 and the housing 3010 (e.g., the support member 2032 in FIG. 20) are spaced apart from each other by a predetermined interval may be the third space 3054.

The second conductive portion 3060 and the third conductive portion 3012 may be electrically split from each other by the first space 3050. In an embodiment, between the first portion 3021 and the second portion 3022 of the first conductive portion 3020 and between the first portion 3061 and the second portion 3062 of the second conductive portion 3060, a slit 3090 (e.g., the slits 670 and 680 in FIG. 5) may be provided. The slit 3090 may be filled with anon-conductive material (e.g., a non-conductive material).

The first space 3050, the second space 3052, and the third space 3054 may be filled with a non-conductive material (e.g., a non-conductive material). The first space 3050 or the second space 3052 may be filled with a non-conductive material (e.g., a non-conductive material) to provide a non-conductive member. As another example, the non-conductive member disposed in the first space 3050 or the second space 3052 and the non-conductive member disposed in the third space 3054 may be coupled to or configured integrally with each other.

The first portion 3021 and the first feed point 3030 and the first ground point 3040 of the first conductive portion 3020 serving as the first antenna A1 may be electrically connected to each other. As an example, the first ground point 3040 may be electrically connected to the first portion 3021 at a position adjacent to the second side surface 3003*b* of the electronic device 3000. As an example, the first feed point 3030 may be electrically connected to the first portion 3021 to be more distant than the first ground point 3040 in the second direction (e.g., the −x-axis direction). As an example, the first feed point 3030 may be located adjacent to the slit 3020*a*. The first ground point 3040 may be located to be more distant than the first feed point 3030 in the first direction (e.g., the x-axis direction).

In some embodiments, the lengths of the first portion 3061 and the second portion 3062 of the second conductive portion 3060 may be substantially equal to each other. In some embodiments, the lengths of the first portion 3061 and the second portion 3062 of the second conductive portion 3060 may be different from each other.

The second portion 3062 and the second feed point 3070 and the second ground point 3080 of the second conductive portion 3060 serving as the second antenna A2 may be electrically connected to each other. As an example, the second feed point 3070 may be electrically connected to the second portion 3062 at a position adjacent to the slit 3060a. As an example, the second ground point 3080 may be electrically connected to the second portion 3062 to be more distant than the second ground point 3080 in the second direction (e.g., the −x-axis direction).

The first feed point 3030 and the first ground point 3040 of the first conductive portion 3020 serving as the first antenna A1 may be electrically connected to the first portion 3021. The second feed point 3070 and the second ground point 3080 of the second conductive portion 3060 serving as the second antenna A2 may be electrically connected to the second portion 3062.

As an embodiment, when the fourth side surface 3003d of the electronic device 3000 is viewed, a first height at which the first feed point 3030 and the first ground point 3040 electrically connected to the first conductive portion 3020 are located and a second height at which the second feed point 307 and the second ground point 3080 of the second conductive portion 3060 are located may be different from each other with reference to the z-axis. The first feed point 3030 and the first ground point 3040 may be located at the first height from the fourth side surface 3003d. The second feed point 3070 and the second ground point 3080 may be located at the second height lower than the first height from the fourth side surface 3003d.

The first feed point 3030 of the first conductive portion 3020 may be disposed adjacent to the slit 3020a, and the second feed point 3070 of the second conductive portion 3060 may be disposed adjacent to the slit 3060a. The first feed point 3030 of the first conductive portion 3020 and the second feed point 3070 of the second conductive portion 3060 may be disposed with a predetermined interval therebetween.

The first conductive portion 3020 may be used as the first antenna A1 that operates in at least one frequency band by being electrically connected to a wireless communication circuit (e.g., the wireless communication module 192 in FIG. 1) at the first feed point 3030. The second conductive portion 3060 may be used as a second antenna A2 that operates in at least one frequency band by being electrically connected to a wireless communication circuit (e.g., the wireless communication module 192 in FIG. 2) at the second feed point 3070.

In an embodiment, the wireless communication circuit (e.g., the wireless communication module 192 in FIG. 1) may be configured to transmit and receive wireless signals in a low band, mid band, high band or ultra-high band via the first conductive portion 3020 and/or the second conductive portion 3060.

The electronic device 3000 according to certain embodiments of the disclosure may further include an antenna other than the first antenna A1 using the first conductive portion 3020 and the second antenna A2 using the second conductive portion 3060. As an example, the other antenna may be configured with at least a portion of the housing 3010 (e.g., the support member 2032 in FIG. 20). As another example, the other antenna may be configured with a laser direct structuring (LDS) pattern. The other antenna may be used as an antenna operating in a frequency band different from those of the first antenna A1 configured with the first conductive portion 3020 and the second antenna A2 configured with the second conductive portion 3060 by being electrically connected to the wireless communication circuit (e.g., the wireless communication module 192 of FIG. 1).

Figure 31:
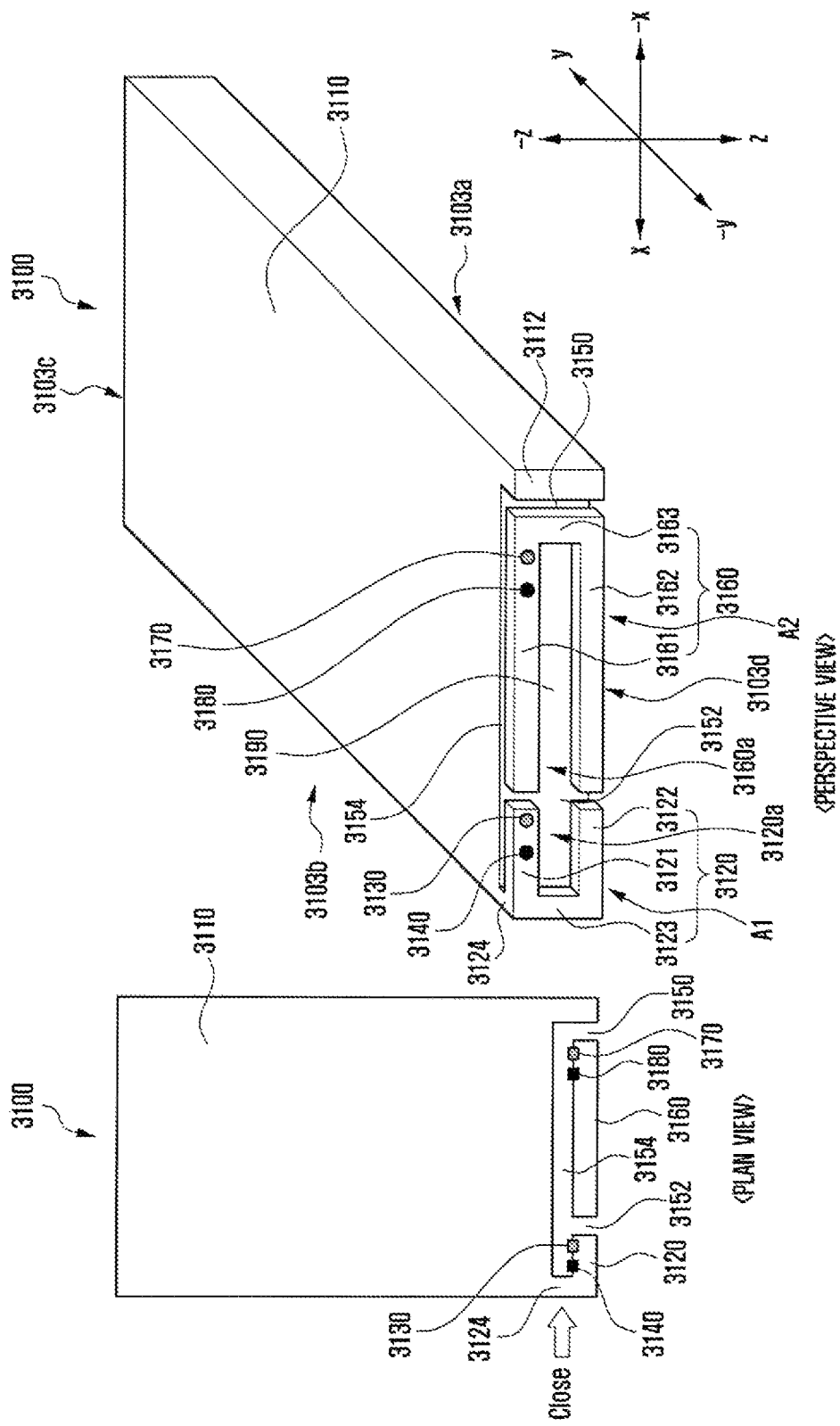
FIG. 31 is a view illustrating a plurality of frame antennas (a first antenna and a second antenna) of an electronic device according to certain embodiments of the disclosure.

FIG. 31 is a view illustrating a plurality of frame antennas (a first antenna and a second antenna) of an electronic device 3100 according to certain embodiments of the disclosure. In describing the electronic device 3100 of FIG. 31, a description of components which are the same as or similar to those of the antennas of the electronic device 2700 of FIG. 27 may be omitted.

Referring to FIG. 31, the electronic device 3100 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a housing 3110 (e.g., the support member 2032 in FIG. 20), and a plurality of conductive portions 3120 and 3160 (e.g., the plurality of conductive portions 2720 and 2760 in FIG. 27, the conductive portions 2820 and 2860 in FIG. 28, the plurality of conductive portions 2920 and 2960 in FIG. 29, or the plurality of conductive portions 3020, 3060, and 3012 in FIG. 30) serving as antennas. Spaces 3150, 3152, and 3154 may be disposed in the housing 3110 (e.g., the support member 2032 in FIG. 20). As an embodiment, a plurality of antennas may be configured with the plurality of conductive portions 3120, 3160, and 3112.

The electronic device 3100 may be a bar type electronic device including a display in which the size of the display region is fixed. The electronic device 3100 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The plurality of conductive portions 3120, 3160, and 3112 may include a first conductive portion 3120 serving as a first antenna A1, and a second conductive portion 3160 and a third conductive portion 3112 serving as a second antenna A2.

As an embodiment, a plurality of frame antennas (e.g., the first antenna A1 and the second antenna A2) may be configured with the plurality of conductive portions 3120, 3160, and 3112.

The first conductive portion 3120 serving as the first antenna A1, the second conductive portion 3160 serving as the second antenna A2, and the third conductive portion 3112 may be disposed on at least one of the side surfaces 3103a, 3103b, 3103c, and 3103d (e.g., the third side surface 203c and/or the fourth side surface 203d in FIGS. 2 to 4) of the electronic device 3100.

The fourth side surface 3103d of the electronic device 3100 may include the first conductive portion 3120, the second conductive portion 3160, or the third conductive portion 3112. In an embodiment, between the first conductive portion 3120 and the third conductive portion 3112, a first space (e.g., a first split portion) 3150 may be located. Between the first conductive portion 3120 and the second conductive portion 3160, a second space (e.g., a second split portion) 3152 may be located. Between the second conductive portion 3160 and the housing 3110 (e.g., the support member 2032 in FIG. 20), a third space (e.g., a third split portion) 3154 may be located. The third space 3154 may also be located between at least a portion of the first conductive portion 3120 and the housing 3110 (e.g., the support member 2032 in FIG. 20).

As another example, when the second conductive portion 3160 or the third conductive portion 3112 is configured with a non-conductive member, the first space 3150 or the second space 3152 may be omitted. As another example, the first conductive portion 3120 or the third conductive portion 3112 may be coupled to or configured integrally with the housing 3110 (e.g., the support member 2032 in FIG. 20). For example, the second conductive portion 3160 may be in a floating state.

The first conductive portion 3120 may include a first portion 3121 configured in a predetermined width to have a length in the first direction (e.g., the x-axis direction), a second portion 3122 spaced apart from the first portion 3121 by a predetermined interval and configured in a predetermined width to have a length in the first direction (e.g., the x-axis direction), and a third portion 3123 interconnecting one end of the first portion 3121 and one end of the second portion 3122.

The first portion 3121, the second portion 3122, and the third portion 3123 of the first conductive portion 3120 may be configured integrally. The first conductive portion 3120 may be configured in the U shape or C shape in which the first portion 3121, the second portion 3122, and the third portion 3123 are electrically connected to each other.

The third portion 3123 of the first conductive portion 3120 may be disposed adjacent to the second side surface 3103b of the electronic device 3100. A slit 3120a in the first conductive portion 3120 may be disposed to face the first side surface 3103a of the electronic device 3100.

The second conductive portion 3160 may include a first portion 3161 configured in a predetermined width to have a length in the first direction (e.g., the x-axis direction), a second portion 3162 spaced apart from the first portion 3161 by a predetermined interval and configured in a predetermined width to have a length in the first direction (e.g., the x-axis direction), and a third portion 3163 interconnecting one end of the first portion 3161 and one end of the second portion 3162.

The first portion 3161, the second portion 3162, and the third portion 3163 of the second conductive portion 3160 may be configured integrally. The first conductive portion 3160 may be configured in the U shape or C shape in which the first portion 3161, the second portion 3162, and the third portion 3163 are electrically connected to each other.

The third portion 3163 of the second conductive portion 3160 may be disposed adjacent to the first side surface 3103a of the electronic device 3100. A slit 3160a in the second conductive portion 3160 may be disposed to face the second side surface 3103b of the electronic device 3100.

The slit 3120a in the first conductive portion 3120 and the slit 3160a in the second conductive portion 3160 may be disposed to face each other. The slit 3120a in the first conductive portion 3120 and the slit 3160a in the second conductive portion 3160 may be disposed with a predetermined interval therebetween.

The first conductive portion 3120 and the second conductive portion 3160 may be disposed with a predetermined interval therebetween, so that the first conductive portion 3120 and the second conductive portion 3160 may be split from each other. The second conductive portion 3160 and the third conductive portion 3112 may be disposed with a predetermined interval therebetween so that the second conductive portion 3160 and the third conductive portion 3112 may be split from each other.

As an embodiment, a portion in which the third portion 3163 and the second conductive portion 3160 and the third conductive portion 3112 are spaced apart from each other by a predetermined interval may be the first space 3150. A portion in which the slit 3120a in the first conductive portion 3120 and the slit 3160a in the second conductive portion 3160 are spaced apart from each other by a predetermined interval may be the second space 3152. A portion in which the second conductive portion 3160 and the housing 3110 (e.g., the support member 2032 in FIG. 20) are spaced apart from each other by a predetermined interval may be the third space 3154.

The second conductive portion 3160 and the third conductive portion 3112 may be electrically split from each other by the first space 3150. In an embodiment, between the first portion 3121 and the second portion 3122 of the first conductive portion 3120 and between the first portion 3161 and the second portion 3162 of the second conductive portion 3160, a slit 3190 (e.g., the slits 670 and 680 in FIG. 5) may be provided. The slit 3190 may be filled with anon-conductive material (e.g., a non-conductive material).

The first space 3150, the second space 3152, and the third space 3154 may be filled with a non-conductive material (e.g., a non-conductive material). The first space 3150 or the second space 3152 may be filled with a non-conductive material (e.g., a non-conductive material) to provide a non-conductive member. As another example, the non-conductive member disposed in the first space 3150 or the second space 3152 and the non-conductive member disposed in the third space 3154 may be coupled to or configured integrally with each other.

As an embodiment, a portion 3124 of the first conductive portion 3120 may be electrically connected to the housing 3110 (e.g., the support member 2032 in FIG. 20).

In some embodiments, the lengths of the first portion 3121 and the second portion 3122 of the first conductive portion 3120 may be substantially equal to each other. In some embodiments, the lengths of the first portion 3121 and the second portion 3122 of the first conductive portion 3120 may be different from each other.

The first portion 3121 and the first feed point 3130 and the first ground point 3140 of the first conductive portion 3120 serving as the first antenna A1 may be electrically connected to each other. As an example, the first ground point 3140 may be electrically connected to the first portion 3121 at a position adjacent to the second side surface 2803b of the electronic device 3100. As an example, the first feed point 3130 may be electrically connected to the first portion 3121 to be more distant than the first ground point 3140 in the second direction (e.g., the −x-axis direction). As an example, the first feed point 3130 may be located adjacent to the slit 3120a. The second ground point 3140 may be located to be more distant than the first feed point 3130 in the first direction (e.g., the x-axis direction).

In some embodiments, the lengths of the first portion 3161 and the second portion 3162 of the second conductive portion 3160 may be substantially equal to each other. In some embodiments, the lengths of the first portion 3161 and the second portion 3162 of the second conductive portion 3160 may be different from each other.

The first portion 3161 and the second feed point 3170 and the second ground point 3180 of the second conductive portion 3160 serving as the second antenna A2 may be electrically connected to each other. As an example, the second feed point 3170 may be electrically connected to the first portion 3161 at a position adjacent to the first side surface 3103a of the electronic device 3100. As an example, the second ground point 3180 may be electrically connected to the first portion 3161 to be more distant than the second feed point 3170 in the first direction (e.g., the x-axis direction).

The first feed point 3130 of the first conductive portion 3120 may be disposed adjacent to the slit 3120*a*, and the second ground point 3180 of the second conductive portion 3160 may be disposed with a predetermined distance from the slit 3160*a*. The first feed point 3130 of the first conductive portion 3120 may be located at an inner side than the first ground point 3140 of the first conductive portion 3120 on the fourth side surface 3103*d* of the electronic device 3100. The second ground point 3180 of the second conductive portion 3160 may be located at an inner side than the second feed point 3170 of the second conductive portion 3160 on the fourth side surface 3103*d* of the electronic device 3100.

The first conductive portion 3120 may be used as the first antenna A1 that operates in at least one frequency band by being electrically connected to a wireless communication circuit (e.g., the wireless communication module 192 in FIG. 1) at the first feed point 3130. The second conductive portion 3160 may be used as a second antenna A2 that operates in at least one frequency band by being electrically connected to a wireless communication circuit (e.g., the wireless communication module 192 in FIG. 2) at the second feed point 3170.

The wireless communication circuit (e.g., the wireless communication module 192 in FIG. 1) may be configured to transmit and receive wireless signals in a low band, mid band, high band or ultra-high band via the first conductive portion 3120 and/or the second conductive portion 3160.

The electronic device 3100 according to certain embodiments of the disclosure may further include an antenna other than the first antenna A1 using the first conductive portion 3120 and the second antenna A2 using the second conductive portion 3160. As an example, the other antenna may be configured with at least a portion of the housing 3110 (e.g., the support member 2032 in FIG. 20). As another example, the other antenna may be configured with a laser direct structuring (LDS) pattern. The other antenna may be used as an antenna operating in a frequency band different from those of the first antenna A1 configured with the first conductive portion 3120 and the second antenna A2 configured with the second conductive portion 3160 by being electrically connected to the wireless communication circuit (e.g., the wireless communication module 192 of FIG. 1).

Figure 32:
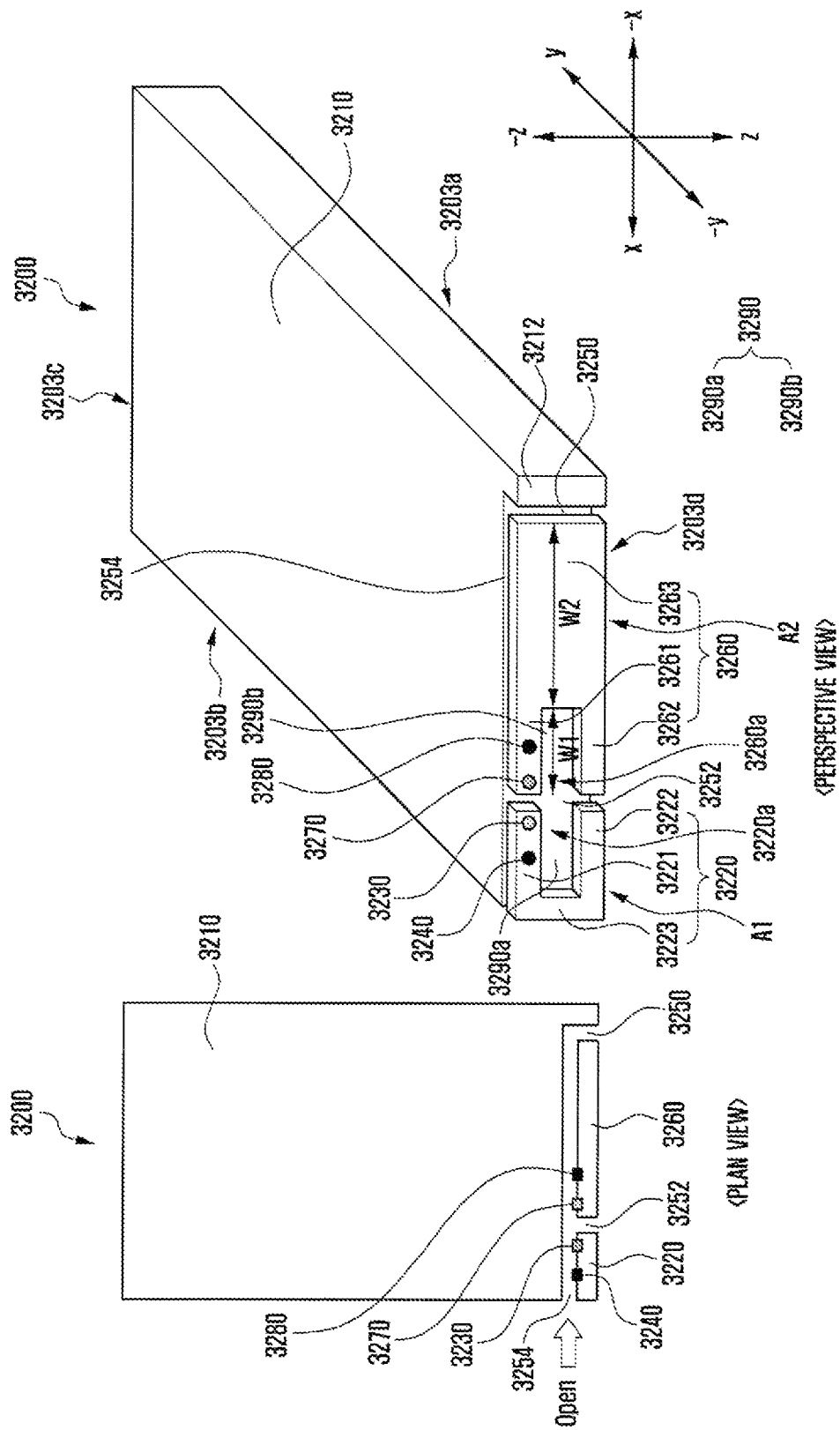
FIG. 32 is a view illustrating a plurality of frame antennas (a first antenna and a second antenna) of an electronic device according to certain embodiments of the disclosure.

FIG. 32 is a view illustrating a plurality of frame antennas (a first antenna and a second antenna) of an electronic device 3200 according to certain embodiments of the disclosure. In describing the electronic device 3200 of FIG. 32, a description of components which are the same as (or similar to) those of the electronic device 2800 of FIG. 28 may be omitted.

Referring to FIG. 32, the electronic device 3200 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a first housing 3210 (e.g., the support member 2032 in FIG. 20), and a plurality of conductive portions 3220 and 3260 (e.g., the plurality of conductive portions 2720 and 2760 in FIG. 27, the conductive portions 2820 and 2860 in FIG. 28, the plurality of conductive portions 2920 and 2960 in FIG. 29, the plurality of conductive portions 3020, 3060, and 3012 in FIG. 30, or the plurality of conductive portions 3120 and 3160 in FIG. 31) serving as antennas. Spaces 3250, 3252, and 3254 may be disposed in the first housing 3210 (e.g., the support member 2032 in FIG. 20). As an embodiment, a plurality of antennas may be configured with the plurality of conductive portions 3220, 3260, and 3212.

The electronic device 3200 may be a bar type electronic device including a display in which the size of the display region is fixed. The electronic device 3200 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The plurality of conductive portions 3220, 3260, and 3212 may include a first conductive portion 3220 serving as a first antenna A1, and a second conductive portion 3260 and a third conductive portion 3212 serving as a second antenna A2.

As an embodiment, a plurality of frame antennas (e.g., the first antenna A1 and the second antenna A2) may be configured with the plurality of conductive portions 3220, 3260, and 3212.

The first conductive portion 3220 serving as the first antenna A1, the second conductive portion 3260 serving as the second antenna A2, and the third conductive portion 3212 may be disposed on at least one of the side surfaces 2803*a*, 2803*b*, 2803*c*, and 2803*d* (e.g., the third side surface 203*c* and/or the fourth side surface 203*d* in FIGS. 2 to 4) of the electronic device 3200.

The fourth side surface 3203*d* of the electronic device 3200 may include the first conductive portion 3220, the second conductive portion 3260, or the third conductive portion 3212. In an embodiment, between the first conductive portion 3220 and the third conductive portion 3212, a first space (e.g., a first split portion) 3250 may be located. Between the first conductive portion 3220 and the second conductive portion 3260, a second space (e.g., a second split portion) 3252 may be located. Between the first and second conductive portions 3220 and 3260 and the first housing 3210 (e.g., the support member 2032 in FIG. 20), a third space (e.g., a third split portion) 3254 may be located.

As another example, when the second conductive portion 3260 or the third conductive portion 3212 is configured with a non-conductive member, the first space 3250 or the second space 3252 may be omitted. As another example, the third conductive portion 3212 may be coupled to or configured integrally with the first housing 3210 (e.g., the support member 2032 in FIG. 20). For example, the first conductive portion 3220 and the second conductive portion 3260 may be split from each other, and the first conductive portion 3220 and the second conductive portion 3260 may be in a floating state.

The first conductive portion 3220 may include a first portion 3221 configured in a predetermined width to have a length in the first direction (e.g., the x-axis direction), a second portion 3222 spaced apart from the first portion 3221 by a predetermined interval and configured in a predetermined width to have a length in the first direction (e.g., the x-axis direction), and a third portion 3223 interconnecting one end of the first portion 3221 and one end of the second portion 3222.

The first portion 3221, the second portion 3222, and the third portion 3223 of the first conductive portion 3220 may be configured integrally. The first conductive portion 3220 may be configured in the U shape or C shape in which the first portion 3221, the second portion 3222, and the third portion 3223 are electrically connected to each other.

The third portion 3223 of the first conductive portion 3220 may be disposed adjacent to the second side surface 3203b of the electronic device 3200. A slit 3220a in the first conductive portion 3220 may be disposed to face the first side surface 3203a of the electronic device 3200.

The second conductive portion 3260 may include a first portion 3261 configured in a predetermined width to have a length in the first direction (e.g., the x-axis direction), a second portion 3262 spaced apart from the first portion 3261 by a predetermined interval and configured in a predetermined width to have a length in the first direction (e.g., the x-axis direction), and a third portion 3263 interconnecting one end of the first portion 3261 and one end of the second portion 3262.

The first portion 3261, the second portion 3262, and the third portion 3263 of the second conductive portion 3260 may be configured integrally. The first conductive portion 3260 may be configured in the U shape or C shape in which the first portion 3261, the second portion 3262, and the third portion 3263 are electrically connected to each other.

The third portion 3263 of the second conductive portion 3260 may be disposed adjacent to the first side surface 3203a of the electronic device 3200. A slit 3260a in the second conductive portion 3260 may be disposed to face the second side surface 3203b of the electronic device 3200.

The slit 3220a in the first conductive portion 3220 and the slit 3260a in the second conductive portion 3260 may be disposed to face each other. The slit 3220a in the first conductive portion 3220 and the slit 3260a in the second conductive portion 3260 may be disposed with a predetermined interval therebetween.

The first conductive portion 3220 and the second conductive portion 3260 may be disposed with a predetermined interval therebetween, so that the first conductive portion 3220 and the second conductive portion 3260 may be split from each other. The second conductive portion 3260 and the third conductive portion 3212 may be disposed with a predetermined interval therebetween, so that the second conductive portion 3260 and the third conductive portion 3212 may be split from each other.

The first conductive portion 3220 may be spaced apart from the first housing 3210 (e.g., the support member 2032 of FIG. 20) by a predetermined interval, so that the first housing 3210 (e.g., the support member 2032 of FIG. 20) and the first conductive portion 3220 may be split from each other. For example, the first conductive portion 3220 may be in an electrically floating state. The second conductive portion 3260 may be spaced apart from the first housing 3210 (e.g., the support member 2032 of FIG. 20) by a predetermined interval, so that the first housing 3210 (e.g., the support member 2032 of FIG. 20) and the second conductive portion 3260 may be split from each other. For example, the second conductive portion 3260 may be in an electrically floating state.

As an embodiment, a portion in which the third portion 3263 of the second conductive portion 3260 and the third conductive portion 3212 are spaced apart from each other by a predetermined interval may be the first space 3250. A portion in which the slit 3220a in the first conductive portion 3220 and the slit 3260a in the second conductive portion 3260 are spaced apart from each other by a predetermined interval may be the second space 3252. A portion in which the first and second conductive portions 3220 and 23260 and the first housing 3210 (e.g., the support member 2032 in FIG. 20) are spaced apart from each other by a predetermined interval may be the third space 3254.

The second conductive portion 3260 and the third conductive portion 3212 may be electrically split from each other by the first space 3250. In an embodiment, between the first portion 3221 and the second portion 3222 of the first conductive portion 3220 and between the first portion 3261 and the second portion 3262 of the second conductive portion 3260, a slit 3290 (e.g., the slits 670 and 680 in FIG. 5) may be provided. The slit 3290 may be filled with anon-conductive material (e.g., a non-conductive material).

The first space 3250, the second space 3252, and the third space 3254 may be filled with a non-conductive material (e.g., a non-conductive material). The first space 3250 or the second space 3252 may be filled with a non-conductive material (e.g., a non-conductive material) to provide a non-conductive member. As another example, the non-conductive member disposed in the first space 3250 or the second space 3252 and the non-conductive member disposed in the third space 3254 may be coupled to or configured integrally with each other.

In some embodiments, the lengths of the first portion 3221 and the second portion 3222 of the first conductive portion 3220 may be substantially equal to each other. In some embodiments, the lengths of the first portion 3221 and the second portion 3222 of the first conductive portion 3220 may be different from each other.

The first portion 3221 and the first feed point 3230 and the first ground point 3240 of the first conductive portion 3220 serving as the first antenna A1 may be electrically connected to each other. As an example, the first ground point 3240 may be electrically connected to the first portion 3221 at a position adjacent to the second side surface 2803b of the electronic device 3200. As an example, the first feed point 3230 may be electrically connected to the first portion 3221 to be more distant than the first ground point 3240 in the second direction (e.g., the −x-axis direction). The first feed point 3230 may be disposed at a position adjacent to the slit 3220a. The second ground point 3240 may be located to be more distant than the first feed point 3232 in the first direction (e.g., the x axis direction).

In some embodiments, the lengths of the first portion 3261 and the second portion 3262 of the second conductive portion 3260 may be substantially equal to each other. In some embodiments, the lengths of the first portion 3261 and the second portion 3262 of the second conductive portion 3260 may be different from each other.

As an embodiment, a second width w2 of the third portion 3263 may be greater than a first width w1 of the first portion 3261 and the second portion 3262 of the second conductive portion 3260. The length of the first space 3290a provided in the conductive portion 3220 may be fixed. The length of the second space 3290b may vary depending on the second width w2 of the third portion 3263. For example, the length of the second space 3290b provided in the second conductive portion 3260 may be equal to the first width w1.

The first portion 3261 and the second feed point 3270 and the second ground point 3280 of the second conductive portion 3260 serving as the second antenna A2 may be electrically connected to each other. As an example, the second feed point 3270 may be electrically connected to the first portion 3261 at a position adjacent to the slit 3260a in the second conductive portion 3260. As an example, the second ground point 3280 may be electrically connected to the second portion 3261 to be more distant than the second feed point 3270 in the second direction (e.g., the −x-axis direction).

The first feed point 3230 of the first conductive portion 3220 may be disposed adjacent to the slit 3220a, and the second feed point 3270 of the second conductive portion 3260 may be disposed adjacent to the slit 3260a. The first feed point 3230 of the first conductive portion 3220 and the second feed point 3270 of the second conductive portion 3260 may be disposed adjacent to each other with a predetermined interval 3252 therebetween. The first feed point 3230 of the first conductive portion 3120 may be located at an inner side than the first ground point 3240 of the first conductive portion 3120 on the fourth side surface 3203d of the electronic device 3200. The second feed point 3270 of the second conductive portion 3260 may be located at an inner side than the second ground point 3280 of the second conductive portion 3260 on the fourth side surface 3203d of the electronic device 3200.

The first conductive portion 3220 may be used as the first antenna A1 that operates in at least one frequency band by being electrically connected to a wireless communication circuit (e.g., the wireless communication module 192 in FIG. 1) at the first feed point 3230. The second conductive portion 3260 may be used as a second antenna A2 that operates in at least one frequency band by being electrically connected to a wireless communication circuit (e.g., the wireless communication module 192 in FIG. 2) at the second feed point 3270.

The wireless communication circuit (e.g., the wireless communication module 192 in FIG. 1) may be configured to transmit and/or receive wireless signals in a low band, mid band, high band or ultra-high band via the first conductive portion 3220 and/or the second conductive portion 3260.

The electronic device 3200 according to certain embodiments of the disclosure may further include an antenna other than the first antenna A1 using the first conductive portion 3220 and the second antenna A2 using the second conductive portion 3260. As an example, the other antenna may be configured with at least a portion of the first housing 3210 (e.g., the support member 2032 in FIG. 20). As another example, the other antenna may be configured with a laser direct structuring (LDS) pattern. The other antenna may be used as an antenna operating in a frequency band different from those of the first antenna A1 configured with the first conductive portion 3220 and the second antenna A2 configured with the second conductive portion 3260 by being electrically connected to the wireless communication circuit (e.g., the wireless communication module 192 of FIG. 1).

Figure 33:
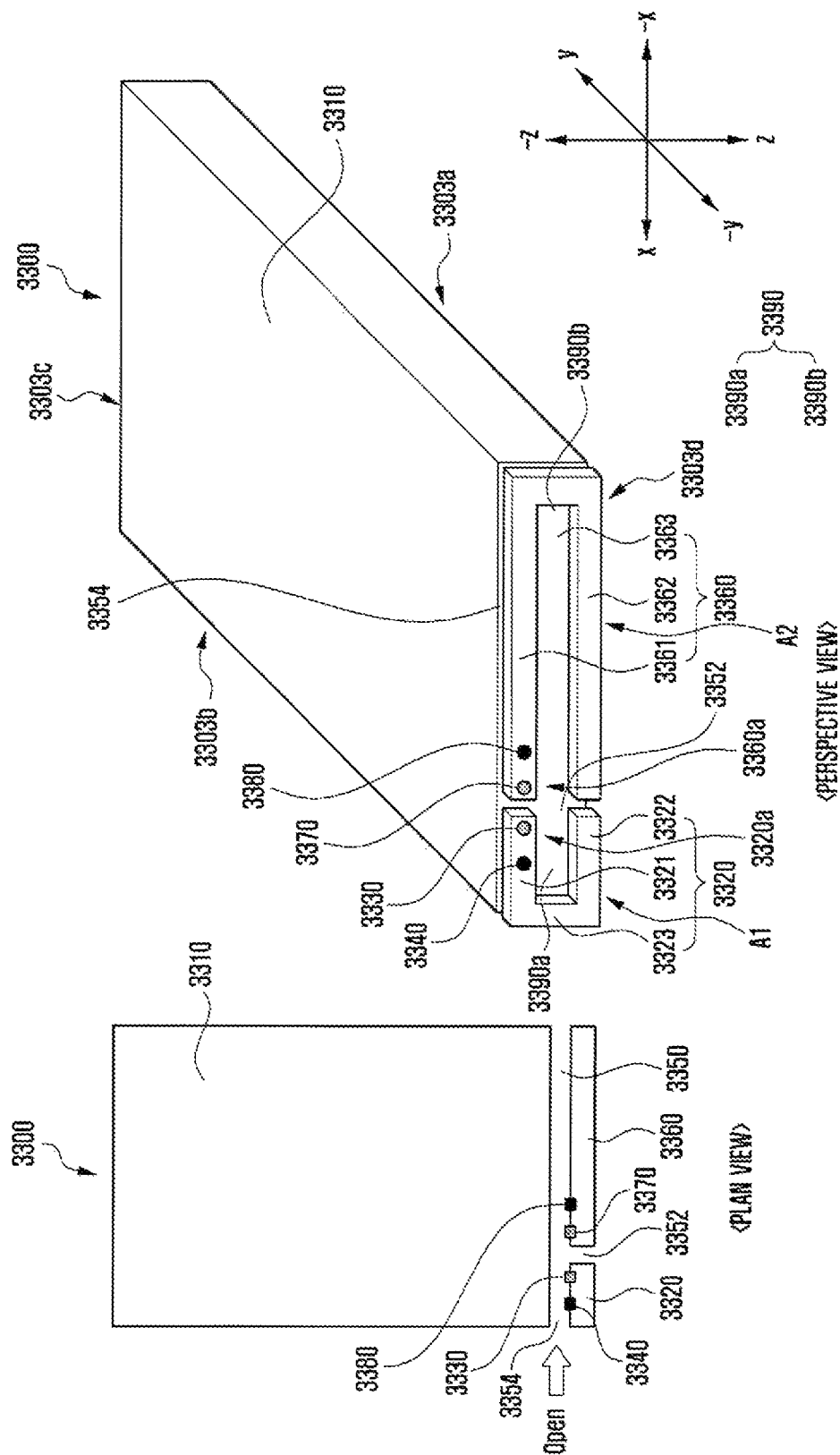
FIG. 33 is a view illustrating a plurality of frame antennas (a first antenna and a second antenna) of an electronic device according to certain embodiments of the disclosure.

FIG. 33 is a view illustrating a plurality of frame antennas (a first antenna and a second antenna) of an electronic device 3300 according to certain embodiments of the disclosure. In describing the electronic device 3300 of FIG. 33, a description of components which are the same as (or similar to) those of the electronic device 3200 of FIG. 32 may be omitted.

Referring to FIG. 33, the electronic device 3300 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a housing 3310 (e.g., the support member 2032 in FIG. 20), and a plurality of conductive portions 3320 and 3360 (e.g., the plurality of conductive portions 2720 and 2760 in FIG. 27, the conductive portions 2820 and 2860 in FIG. 28, the plurality of conductive portions 2920 and 2960 in FIG. 29, the plurality of conductive portions 3020, 3060, and 3012 in FIG. 30, the plurality of conductive portions 3120 and 3160 in FIG. 31, or the plurality conductive portions 3320 and 3260 in FIG. 32) serving as antennas. Spaces 3352 and 3353 may be disposed in the housing 3310 (e.g., the support member 2032 in FIG. 20). A plurality of antennas may be configured with the plurality of conductive portions 3320 and 3360.

The electronic device 3300 may be a bar type electronic device including a display in which the size of the display region is fixed. The electronic device 3300 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The plurality of conductive portions 3320 and 3360 may include a first conductive portion 3320 serving as a first antenna A1 and a second conductive portion 3360 serving as a second antenna A2.

As an embodiment, dual U-frame antennas (e.g., the first antenna A1 and the second antenna A2) may be configured with the plurality of conductive portions 3320 and 3360.

The first conductive portion 3320 serving as the first antenna A1 and the second conductive portion 3360 serving as the second antenna A2 may be disposed on at least one of the side surfaces (e.g., the third side surface 203c and/or the fourth side surface 203d in FIGS. 2 to 4) of the electronic device 3300. For example, first conductive portion 3320 and second conductive portion 3360 may substantially configure the fourth side surface 3303d and configure at least a portion of the first and second side surfaces 3303a and 3303b.

In an embodiment, between the first conductive portion 3320 and the second conductive portion 3360, a first space (e.g., a first split portion) 3352 may be located. Between the first and second conductive portions 3320 and 3360 and the housing 3310 (e.g., the support member 2032 in FIG. 20), a second space (e.g., a second split portion) 3354 may be located. As another example, when the second conductive portion 3360 is configured with a non-conductive member, the first space 3250 may be omitted. For example, the first conductive portion 3320 and the second conductive portion 3360 may be split from each other, and the first conductive portion 3320 and the second conductive portion 3360 may be in a floating state.

The first conductive portion 3320 may include a first portion 3321 configured in a predetermined width to have a length in the first direction (e.g., the x-axis direction), a second portion 3322 spaced apart from the first portion 3321 by a predetermined interval and configured in a predetermined width to have a length in the first direction (e.g., the x-axis direction), and a third portion 3323 interconnecting one end of the first portion 3321 and one end of the second portion 3322.

The first portion 3321, the second portion 3322, and the third portion 3323 of the first conductive portion 3320 may be configured integrally. The first conductive portion 3320 may be configured in the U shape or C shape in which the first portion 3321, the second portion 3322, and the third portion 3323 are electrically connected to each other.

The third portion 3323 of the first conductive portion 3320 may be disposed adjacent to the second side surface 3303b of the electronic device 3300. A slit 3320a in the first conductive portion 3320 may be disposed to face the first side surface 3303a of the electronic device 3300.

The second conductive portion 3360 may include a first portion 3361 configured in a predetermined width to have a length in the first direction (e.g., the x-axis direction), a second portion 3362 spaced apart from the first portion 3361 by a predetermined interval and configured in a predetermined width to have a length in the first direction (e.g., the x-axis direction), and a third portion 3363 interconnecting one end of the first portion 3361 and one end of the second portion 3362.

The first portion 3361, the second portion 3362, and the third portion 3363 of the second conductive portion 3360 may be configured integrally. The second conductive portion 3360 may be configured in the U shape or C shape in which the first portion 3361, the second portion 3362, and the third portion 3363 are electrically connected to each other.

The third portion 3363 of the second conductive portion 3360 may be disposed adjacent to the first side surface 3303a of the electronic device 3300. A slit 3360a in the second conductive portion 3360 may be disposed to face the second side surface 3303b of the electronic device 3300.

The slit 3320a in the first conductive portion 3320 and the slit 3360a in the second conductive portion 3360 may be disposed to face each other. The slit 3320a in the first conductive portion 3320 and the slit 3360a in the second conductive portion 3360 may be disposed with a predetermined interval 3352 therebetween.

The first conductive portion 3320 and the second conductive portion 3360 may be disposed with a predetermined interval 3352 therebetween, so that the first conductive portion 3320 and the second conductive portion 3360 may be split from each other.

The first conductive portion 3320 may be spaced apart from the first housing 3310 (e.g., the support member 2032 of FIG. 20) by a predetermined interval, so that the first housing 3310 (e.g., the support member 2032 of FIG. 20) and the first conductive portion 3320 may be split from each other. For example, the first conductive portion 3320 may be in an electrically floating state.

The second conductive portion 3360 may be spaced apart from the first housing 3310 (e.g., the support member 2032 of FIG. 20) by a predetermined interval, so that the first housing 3310 (e.g., the support member 2032 of FIG. 20) and the second conductive portion 3360 may be split from each other. For example, the second conductive portion 3360 may be in an electrically floating state.

As an embodiment, a portion in which the first conductive portion 3320 and the second conductive portion 3360 may be spaced apart from each other by a predetermined interval may be the first space 3252. A portion in which the first and second conductive portions 3320 and 3360 and the housing 3310 (e.g., the support member 2032 in FIG. 20) are spaced apart from each other by a predetermined interval may be the second space 3354.

The first conductive portion 3320 and the second conductive portion 3360 may be electrically split from each other by the first space 3352. The first and second conductive portions 3320 and 3360 and the housing 3310 (e.g., the support member 2032 in FIG. 20) may be electrically split from each other by the second space 3354.

As an embodiment, between the first portion 3321 and the second portion 3322 of the first conductive portion 3320, a first space (e.g., a first split portion) 3390a may be provided. Between the first portion 3361 and the second portion 3362 of the second conductive portion 3360, a second space (e.g., a second split portion) 3390b may be provided. The splits 3390 may be filled with a non-conductive material (e.g., a non-conductive material).

In some embodiments, the lengths of the first portion 3321 and the second portion 3322 of the first conductive portion 3320 may be substantially equal to each other. In some embodiments, the lengths of the first portion 3321 and the second portion 3322 of the first conductive portion 3320 may be different from each other. The first portion 3321 and the first feed point 3330 and the first ground point 3340 of the first conductive portion 3320 serving as the first antenna A1 may be electrically connected to each other. As an example, the first ground point 3340 may be electrically connected to the first portion 3321 at a position adjacent to the second side surface 3303b of the electronic device 3300. As an example, the first feed point 3330 may be electrically connected to the first portion 3321 to be more distant than the first ground point 3340 in the second direction (e.g., the −x-axis direction). As an example, the first ground point 3340 may be disposed adjacent to the slit 3320a. The first feed point 3330 may be located to be more distant than the first ground point 3340 in the first direction (e.g., the x-axis direction).

In some embodiments, the lengths of the first portion 3361 and the second portion 3362 of the second conductive portion 3360 may be substantially equal to each other. In some embodiments, the lengths of the first portion 3361 and the second portion 3362 of the second conductive portion 3360 may be different from each other. The first portion 3361 and the second feed point 3370 and the second ground point 3380 of the second conductive portion 3360 serving as the second antenna A2 may be electrically connected to each other. As an example, the second feed point 3370 may be electrically connected to the first portion 3361 at a position adjacent to the slit 3360a in the second conductive portion 3360. As an example, the second ground point 3380 may be electrically connected to the first portion 3361 to be more distant than the second feed point 3370 in the second direction (e.g., the −x-axis direction).

The first feed point 3330 of the first conductive portion 3320 may be disposed adjacent to the slit 3320a, and the second feed point 3370 of the second conductive portion 3360 may be disposed adjacent to the slit 3360a. The first feed point 3330 of the first conductive portion 3320 and the second feed point 3370 of the second conductive portion 3360 may be disposed adjacent to each other with a predetermined interval 3352 therebetween.

The first conductive portion 3320 may be used as the first antenna A1 that operates in at least one frequency band by being electrically connected to a wireless communication circuit (e.g., the wireless communication module 192 in FIG. 1) at the first feed point 3330. The second conductive portion 3360 may be used as a second antenna A2 that operates in at least one frequency band by being electrically connected to a wireless communication circuit (e.g., the wireless communication module 192 in FIG. 2) at the second feed point 3370.

The wireless communication circuit (e.g., the wireless communication module 192 in FIG. 1) may be configured to transmit and receive wireless signals in a low band, mid band, high band or ultra-high band via the first conductive portion 3320 and/or the second conductive portion 3360.

The electronic device 3300 according to certain embodiments of the disclosure may further include an antenna other than the first antenna A1 using the first conductive portion 3320 and the second antenna A2 using the second conductive portion 3360. As an example, the other antenna may be configured with at least a portion of the first housing 3310 (e.g., the support member 2032 in FIG. 20). As another example, the other antenna may be configured with a laser direct structuring (LDS) pattern. The other antenna may be used as an antenna operating in a frequency band different from those of the first antenna A1 configured with the first conductive portion 3320 and the second antenna A2 configured with the second conductive portion 3360 by being electrically connected to the wireless communication circuit (e.g., the wireless communication module 192 of FIG. 1).

Figure 34:
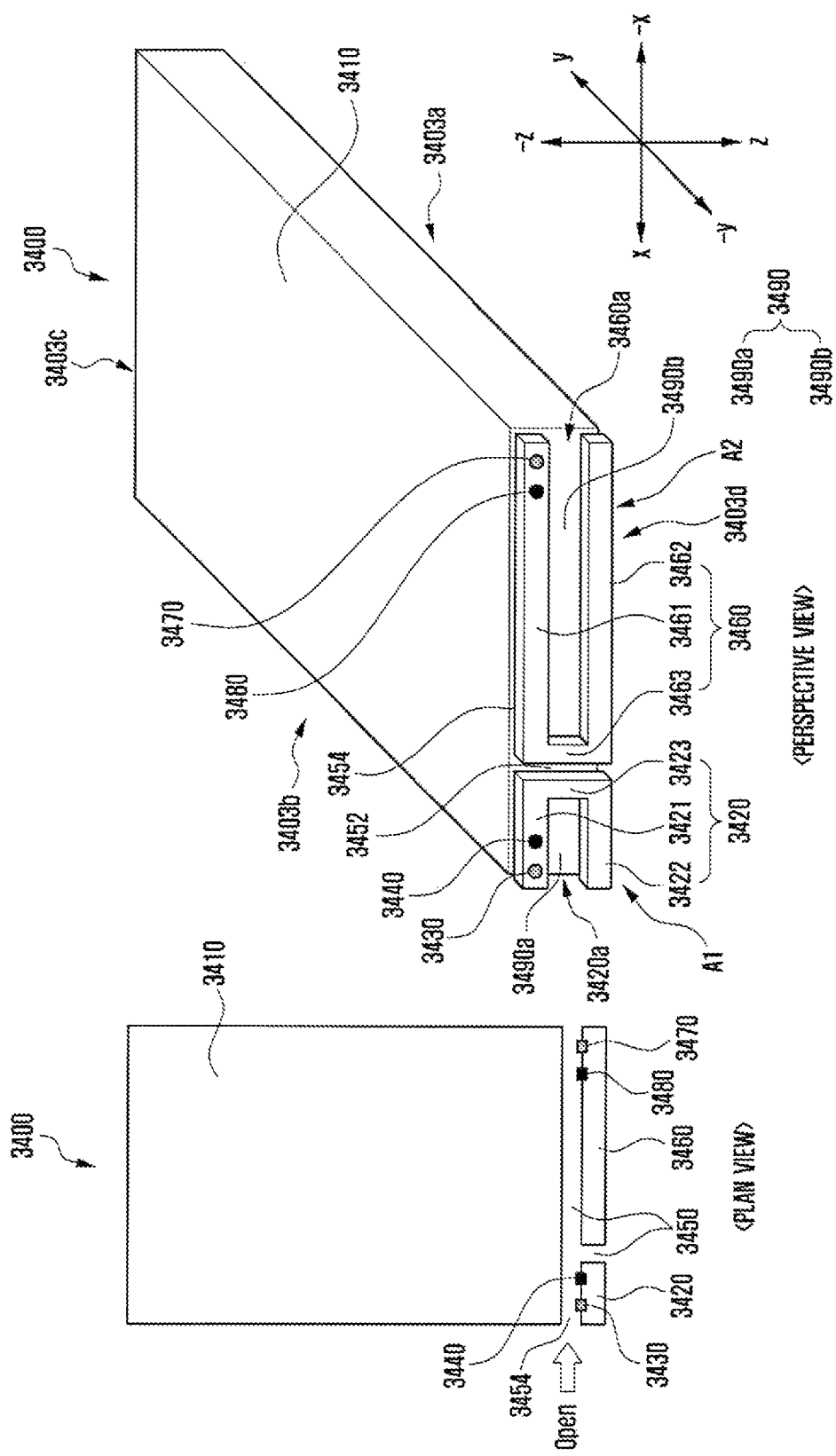
FIG. 34 is a view illustrating a plurality of frame antennas (a first antenna and a second antenna) of an electronic device according to certain embodiments of the disclosure.

FIG. 34 is a view illustrating a plurality of U-frame antennas (a first antenna and a second antenna) of an electronic device 3400 according to certain embodiments of the disclosure. In describing the electronic device 3400 of FIG. 34, a description of components which are the same as (or similar to) those of the electronic device 3300 of FIG. 33 may be omitted.

Referring to FIG. 34, the electronic device 3400 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a first housing 3410 (e.g., the support member 2032 in FIG. 20), and/or a plurality of conductive portions 3420 and 3460 serving as antennas. Spaces 3452 and 3454 may be disposed in the first housing 3410 (e.g., the support member 2032 in FIG. 20). A plurality of antennas may be configured with the plurality of conductive portions 3420 and 3460.

The electronic device 3400 may be a bar type electronic device including a display in which the size of the display region is fixed. The electronic device 3400 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The plurality of conductive portions 3420 and 3460 may include a first conductive portion 3420 serving as a first antenna A1 and a second conductive portion 3460 serving as a second antenna A2.

The first antenna A1 and the second antenna A2 as U-frame antennas may be configured with the plurality of conductive portions 3420 and 3460.

The first conductive portion 3420 serving as the first antenna A1 and the second conductive portion 3460 serving as the second antenna A2 may be disposed on at least one of the side surfaces 3403a, 3403b, 3403c, and 3403d (e.g., the third side surface 203c and/or the fourth side surface 203d in FIGS. 2 to 4) of the electronic device 3400. For example, first conductive portion 3420 and second conductive portion 3460 may substantially configure the fourth side surface 3403d and configure at least a portion of the first and second side surfaces 3403a and 3403b.

In an embodiment, between the first conductive portion 3420 and the second conductive portion 3460, a first space (e.g., a first split portion) 3452 may be located. Between the first and second conductive portions 3420 and 3460 and the first housing 3410 (e.g., the support member 2032 in FIG. 20), a second space (e.g., a second split portion) 3454 may be located. As another example, when the second conductive portion 3460 is configured with a non-conductive member, the first space 3450 may be omitted. For example, the first conductive portion 3420 and the second conductive portion 3460 may be split from each other, and the first conductive portion 3420 and the second conductive portion 3460 may be in a floating state.

The first conductive portion 3420 may include a first portion 3421 configured in a predetermined width to have a length in the first direction (e.g., the x-axis direction), a second portion 3422 spaced apart from the first portion 3421 by a predetermined interval and configured in a predetermined width to have a length in the first direction (e.g., the x-axis direction), and a third portion 3423 interconnecting one end of the first portion 3421 and one end of the second portion 3422.

The first portion 3421, the second portion 3422, and the third portion 3423 of the first conductive portion 3420 may be configured integrally. The first conductive portion 3420 may be configured in the U shape or C shape in which the first portion 3421, the second portion 3422, and the third portion 3423 are electrically connected to each other.

The slit 3420a in the first conductive portion 3420 may be disposed adjacent to the second side surface 3403b of the electronic device 3400. The third portion 3423 of the first conductive portion 3420 may be disposed to face the first side surface 3403a of the electronic device 3400.

The second conductive portion 3460 may include a first portion 3461 configured in a predetermined width to have a length in the first direction (e.g., the x-axis direction), a second portion 3462 spaced apart from the first portion 3461 by a predetermined interval and configured in a predetermined width to have a length in the first direction (e.g., the x-axis direction), and a third portion 3463 interconnecting one end of the first portion 3461 and one end of the second portion 3462.

The first portion 3461, the second portion 3462, and the third portion 3463 of the second conductive portion 3460 may be configured integrally. The second conductive portion 3460 may be configured in the U shape or C shape in which the first portion 3461, the second portion 3462, and the third portion 3463 are electrically connected to each other.

The slit 3460a in the second conductive portion 3460 may be disposed adjacent to the first side surface 3403a of the electronic device 3400. The third portion 3463 of the second conductive portion 3460 may be disposed to face the second side surface 3403a of the electronic device 3400.

The third portion 3423 of the first conductive portion 3420 and the third portion 3463 of the second conductive portion 3460 may be disposed to face each other. The third portion 3423 of the first conductive portion 3420 and the third portion 3463 of the second conductive portion 3460 may be disposed with a predetermined interval 3450 therebetween.

The first conductive portion 3420 and the second conductive portion 3460 may be disposed with a predetermined interval 3450 therebetween, so that the first conductive portion 3420 and the second conductive portion 3460 may be split from each other.

In an embodiment, the first conductive portion 3420 may be spaced apart from the first housing 3410 (e.g., the support member 2032 of FIG. 20) by a predetermined interval, so that the first housing 3410 (e.g., the support member 2032 of FIG. 20) and the first conductive portion 3420 may be split from each other. For example, the first conductive portion 3420 may be in an electrically floating state.

In an embodiment, the second conductive portion 3460 may be spaced apart from the first housing 3410 (e.g., the support member 2032 of FIG. 20) by a predetermined interval, so that the first housing 3410 (e.g., the support member 2032 of FIG. 20) and the second conductive portion 3460 may be split from each other. For example, the second conductive portion 3460 may be in an electrically floating state.

As an embodiment, a portion in which the first conductive portion 3420 and the second conductive portion 3460 may be spaced apart from each other by a predetermined interval may be the first space 3452. A portion in which the first and second conductive portions 3420 and 3460 and the first housing 3410 (e.g., the support member 2032 in FIG. 20) are spaced apart from each other by a predetermined interval may be the second space 3454.

The first conductive portion 3420 and the second conductive portion 3460 may be electrically split from each other by the first space 3452. The first and second conductive portions 3420 and 3460 and the first housing 3410 (e.g., the support member 2032 in FIG. 20) may be electrically split from each other by the second space 3454.

As an embodiment, between the first portion 3421 and the second portion 3422 of the first conductive portion 3420, a first space (e.g., a first split portion) 3490*a* may be provided. Between the first portion 3461 and the second portion 3462 of the second conductive portion 3460, a second space (e.g., a second split portion) 3490*b* may be provided. The splits 3490 may be filled with a non-conductive material (e.g., a non-conductive material).

In some embodiments, the lengths of the first portion 3421 and the second portion 3422 of the first conductive portion 3420 may be substantially equal to each other. In some embodiments, the lengths of the first portion 3421 and the second portion 3422 of the first conductive portion 3420 may be different from each other. In some embodiments, the lengths of the first portion 3461 and the second portion 3462 of the second conductive portion 3460 may be substantially equal to each other. In some embodiments, the lengths of the first portion 3461 and the second portion 3462 of the second conductive portion 3460 may be different from each other.

The first feed point 3430 and the first ground point 3440 of the first conductive portion 3420 may be provided adjacent to the slit 3420*a*. The second feed point 3470 and the second ground point 3480 of the second conductive portion 3460 may be provided adjacent to the slit 3460*a*.

The first portion 3421 and the first feed point 3430 and the first ground point 3440 of the first conductive portion 3420 serving as the first antenna A1 may be electrically connected to each other. As an example, the first feed point 3430 may be electrically connected to the first portion 3421 at a position adjacent to the second side surface 3403*b* of the electronic device 3400. As an example, the first ground point 3440 may be electrically connected to the first portion 3421 to be more distant than the first feed point 3430 in the second direction (e.g., the −x-axis direction).

The first portion 3461 and the second feed point 3470 and the second ground point 3480 of the second conductive portion 3460 serving as the second antenna A2 may be electrically connected to each other. As an example, the second feed point 3470 may be electrically connected to the first portion 3461 at a position adjacent to the slit 3460*a* in the second conductive portion 3460. As an example, the second ground point 3480 may be electrically connected to the first portion 3461 to be more distant than the second feed point 3470 in the first direction (e.g., the x-axis direction).

The first conductive portion 3420 may be used as the first antenna A1 that operates in at least one frequency band by being electrically connected to a wireless communication circuit (e.g., the wireless communication module 192 in FIG. 1) at the first feed point 3430. The second conductive portion 3460 may be used as the second antenna A2 that operates in at least one frequency band by being electrically connected to a wireless communication circuit (e.g., the wireless communication module 192 in FIG. 2) at the second feed point 3470.

The wireless communication circuit (e.g., the wireless communication module 192 in FIG. 1) may be configured to transmit and receive wireless signals in a low band, mid band, high band or ultra-high band via the first conductive portion 3420 and/or the second conductive portion 3460.

The electronic device 3400 according to certain embodiments of the disclosure may further include an antenna other than the first antenna A1 using the first conductive portion 3420 and the second antenna A2 using the second conductive portion 3460. As an example, the other antenna may be configured with at least a portion of the first housing 3410 (e.g., the support member 2032 in FIG. 20). As another example, the other antenna may be configured with a laser direct structuring (LDS) pattern. The other antenna may be used as an antenna operating in a frequency band different from those of the first antenna A1 configured with the first conductive portion 3420 and the second antenna A2 configured with the second conductive portion 3460 by being electrically connected to the wireless communication circuit (e.g., the wireless communication module 192 of FIG. 1).

Figure 35:
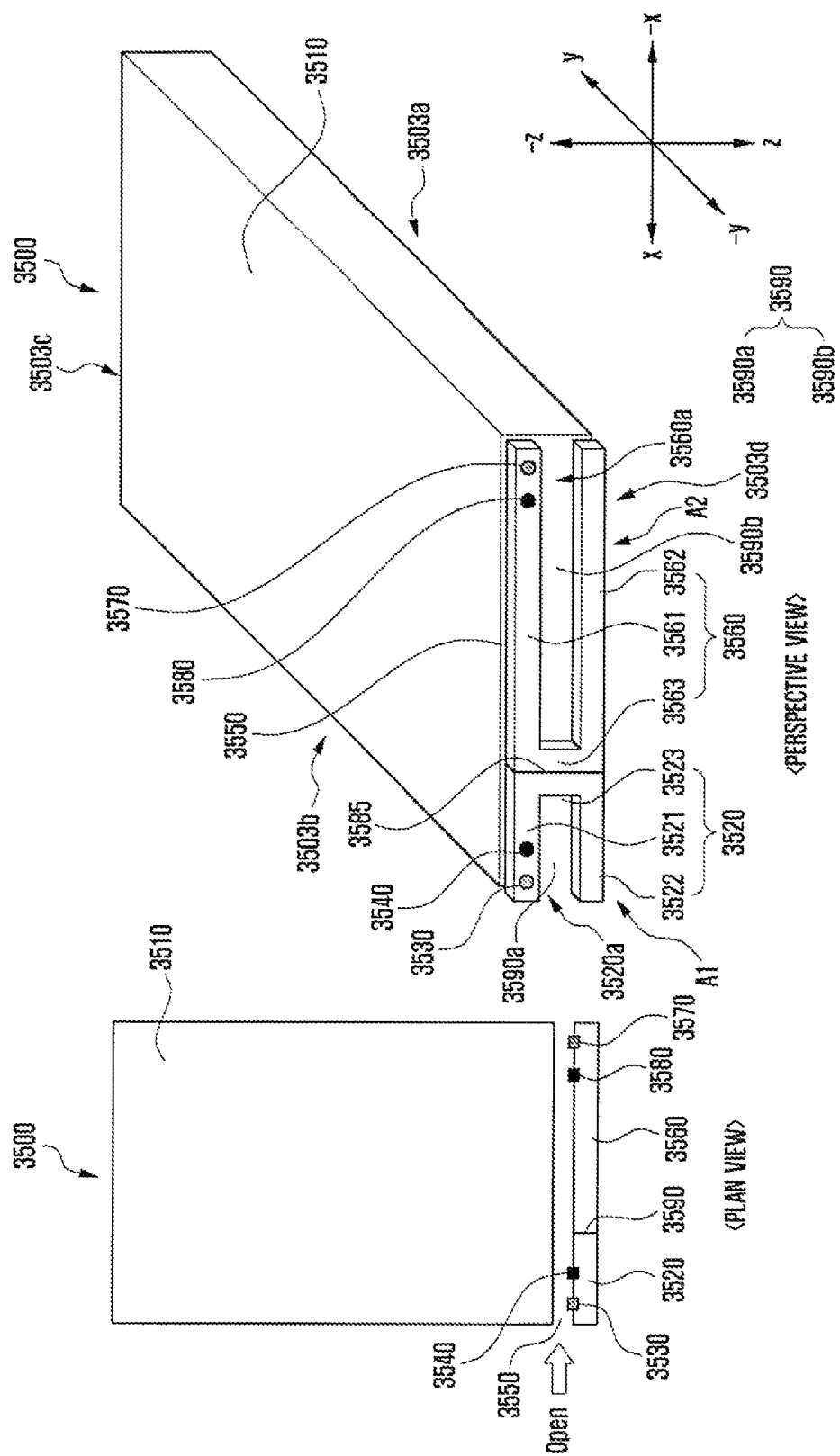
FIG. 35 is a view illustrating a plurality of frame antennas (a first antenna and a second antenna) of an electronic device according to certain embodiments of the disclosure.

FIG. 35 is a view illustrating dual U-frame antennas (a first antenna and a second antenna) of an electronic device 3500 according to certain embodiments of the disclosure. In describing the electronic device 3500 of FIG. 35, a description of components which are the same as or similar to those of the antennas of the electronic device 3400 of FIG. 34 may be omitted.

Referring to FIG. 35, the electronic device 3500 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a first housing 3510 (e.g., the support member 2032 in FIG. 20), and a plurality of conductive portions 3520 and 3560 serving as antennas. A space 3550 may be disposed in the first housing 3510 (e.g., the support member 2032 in FIG. 20). A plurality of antennas may be configured with the plurality of conductive portions 3520 and 3360.

The electronic device 3500 may be a bar type electronic device including a display in which the size of the display region is fixed. The electronic device 3500 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The plurality of conductive portions 3520 and 3560 may include a first conductive portion 3520 serving as a first antenna A1 and a second conductive portion 3560 serving as a second antenna A2.

As an embodiment, dual U-frame antennas (e.g., the first antenna A1 and the second antenna A2) may be configured with the plurality of conductive portions 3520 and 3560.

The first conductive portion 3520 serving as the first antenna A1 and the second conductive portion 3560 serving as the second antenna A2 may be disposed on at least one of the side surfaces 3503*a*, 3503*b*, 3503*c*, and 3503*d* (e.g., the third side surface 203*c* and/or the fourth side surface 203*d* in FIGS. 2 to 4) of the electronic device 3500. For example, the first conductive portion 3520 and the second conductive portion 3560 may substantially configure the fourth side surface 3503*d* and configure at least a portion of the first and second side surfaces 3503*a* and 3503*b*.

In an embodiment, between the first and second conductive portions 3520 and 3560 and the first housing 3510 (e.g., the support member 2032 in FIG. 20), a space 3550 may be located. For example, the first conductive portion 3520 and the second conductive portion 3560 may be split from each other, and the first conductive portion 3520 and the second conductive portion 3560 may be in a floating state.

The first conductive portion 3520 may include a first portion 3521 configured in a predetermined width to have a length in the first direction (e.g., the x-axis direction), a second portion 3522 spaced apart from the first portion 3521 by a predetermined interval and configured in a predetermined width to have a length in the first direction (e.g., the x-axis direction), and a third portion 3523 interconnecting one end of the first portion 3521 and one end of the second portion 3522.

The first portion 3521, the second portion 3522, and the third portion 3523 of the first conductive portion 3520 may be configured integrally. The first conductive portion 3520 may be configured in the U shape or C shape in which the first portion 3521, the second portion 3522, and the third portion 3523 are electrically connected to each other.

The slit 3520a in the first conductive portion 3520 may be disposed adjacent to the second side surface 3503b of the electronic device 3500. The third portion 3523 of the first conductive portion 3520 may be disposed to face the first side surface 3503a of the electronic device 3500.

The second conductive portion 3560 may include a first portion 3561 configured in a predetermined width to have a length in the first direction (e.g., the x-axis direction), a second portion 3562 spaced apart from the first portion 3561 by a predetermined interval and configured in a predetermined width to have a length in the first direction (e.g., the x-axis direction), and a third portion 3563 interconnecting one end of the first portion 3561 and one end of the second portion 3562.

The first portion 3561, the second portion 3562, and the third portion 3563 of the second conductive portion 3560 may be configured integrally. The second conductive portion 3560 may be configured in the U shape or C shape in which the first portion 3561, the second portion 3562, and the third portion 3563 are electrically connected to each other.

The slit 3560a in the second conductive portion 3560 may be disposed adjacent to the first side surface 3503a of the electronic device 3500. The third portion 3563 of the second conductive portion 3560 may be disposed to face the second side surface 3503b of the electronic device 3500.

The third portion 3523 of the first conductive portion 3520 and the third portion 3563 of the second conductive portion 3560 may be disposed to face each other.

The third portion 3523 of the first conductive portion 3520 and the third portion 3563 of the second conductive portion 3560 may be disposed to substantially abut against each other. As an example, the first conductive portion 3520 and the second conductive portion 3560 may be in contact with each other (3585). For example, the first conductive portion 3520 and the second conductive portion 3560 may be configured integrally with each other.

In an embodiment, the first conductive portion 3520 may be spaced apart from the first housing 3510 (e.g., the support member 2032 of FIG. 20) by a predetermined interval, so that the first housing 3510 (e.g., the support member 2032 of FIG. 20) and the first conductive portion 3520 may be split from each other. For example, the first conductive portion 3520 may be in an electrically floating state.

In an embodiment, the second conductive portion 3560 may be spaced apart from the first housing 3510 (e.g., the support member 2032 of FIG. 20) by a predetermined interval, so that the first housing 3510 (e.g., the support member 2032 of FIG. 20) and the second conductive portion 3560 may be split from each other. For example, the second conductive portion 3560 may be in an electrically floating state.

As an embodiment, a portion in which the first and second conductive portions 3520 and 3560 and the first housing 3510 (e.g., the support member 2032 in FIG. 20) are spaced apart from each other by a predetermined interval may be the space 3550. The space 3550 may be filled with a non-conductive material (e.g., a non-conductive material).

As an embodiment, between the first portion 3521 and the second portion 3522 of the first conductive portion 3520, a first space (e.g., a first split portion) 3590a may be provided. Between the first portion 3561 and the second portion 3562 of the second conductive portion 3560, a second space (e.g., a second split portion) 3590b may be provided. The splits 3590 may be filled with a non-conductive material (e.g., a non-conductive material).

In some embodiments, the lengths of the first portion 3521 and the second portion 3522 of the first conductive portion 3520 may be substantially equal to each other. In some embodiments, the lengths of the first portion 3521 and the second portion 3522 of the first conductive portion 3520 may be different from each other.

In some embodiments, the lengths of the first portion 3561 and the second portion 3562 of the second conductive portion 3560 may be substantially equal to each other. In some embodiments, the lengths of the first portion 3561 and the second portion 3562 of the second conductive portion 3560 may be different from each other.

The first feed point 5430 and the first ground point 3540 of the first conductive portion 3520 may be provided adjacent to the slit 3520a. The second feed point 3570 and the second ground point 3580 of the second conductive portion 3560 may be provided adjacent to the slit 3560a.

The first portion 3521 and the first feed point 3530 and the first ground point 3540 of the first conductive portion 3520 serving as the first antenna A1 may be electrically connected to each other. As an example, the first feed point 3530 may be electrically connected to the first portion 3521 at a position adjacent to the second side surface 3503b of the electronic device 3500. As an example, the first ground point 3540 may be electrically connected to the first portion 3521 to be more distant than the first feed point 3530 in the second direction (e.g., the −x-axis direction).

The first portion 3561 and the second feed point 3570 and the second ground point 3580 of the second conductive portion 3560 serving as the second antenna A2 may be electrically connected to each other. As an example, the second feed point 3570 may be electrically connected to the first portion 3561 at a position adjacent to the slit 3560a in the second conductive portion 3560. As an example, the second ground point 3580 may be electrically connected to the first portion 3561 to be more distant than the second feed point 3570 in the first direction (e.g., the x-axis direction).

The first conductive portion 3520 may be used as the first antenna A1 that operates in at least one frequency band by being electrically connected to a wireless communication circuit (e.g., the wireless communication module 192 in FIG. 1) at the first feed point 3530. The second conductive portion 3560 may be used as the second antenna A2 that operates in at least one frequency band by being electrically connected to a wireless communication circuit (e.g., the wireless communication module 192 in FIG. 2) at the second feed point 3570.

The wireless communication circuit (e.g., the wireless communication module 192 in FIG. 1) may be configured to transmit and receive wireless signals in a low band, mid band, high band or ultra-high band via the first conductive portion 3520 and/or the second conductive portion 3560.

The electronic device 3500 according to certain embodiments of the disclosure may further include an antenna other than the first antenna A1 using the first conductive portion 3520 and the second antenna A2 using the second conductive portion 3560. As an example, the other antenna may be configured with at least a portion of the first housing 3510 (e.g., the support member 2032 in FIG. 20). As another example, the other antenna may be configured with a laser direct structuring (LDS) pattern. The other antenna may be used as an antenna operating in a frequency band different from those of the first antenna A1 configured with the first conductive portion 3520 and the second antenna A2 configured with the second conductive portion 3560 by being electrically connected to the wireless communication circuit (e.g., the wireless communication module 192 of FIG. 1).

Figure 36:
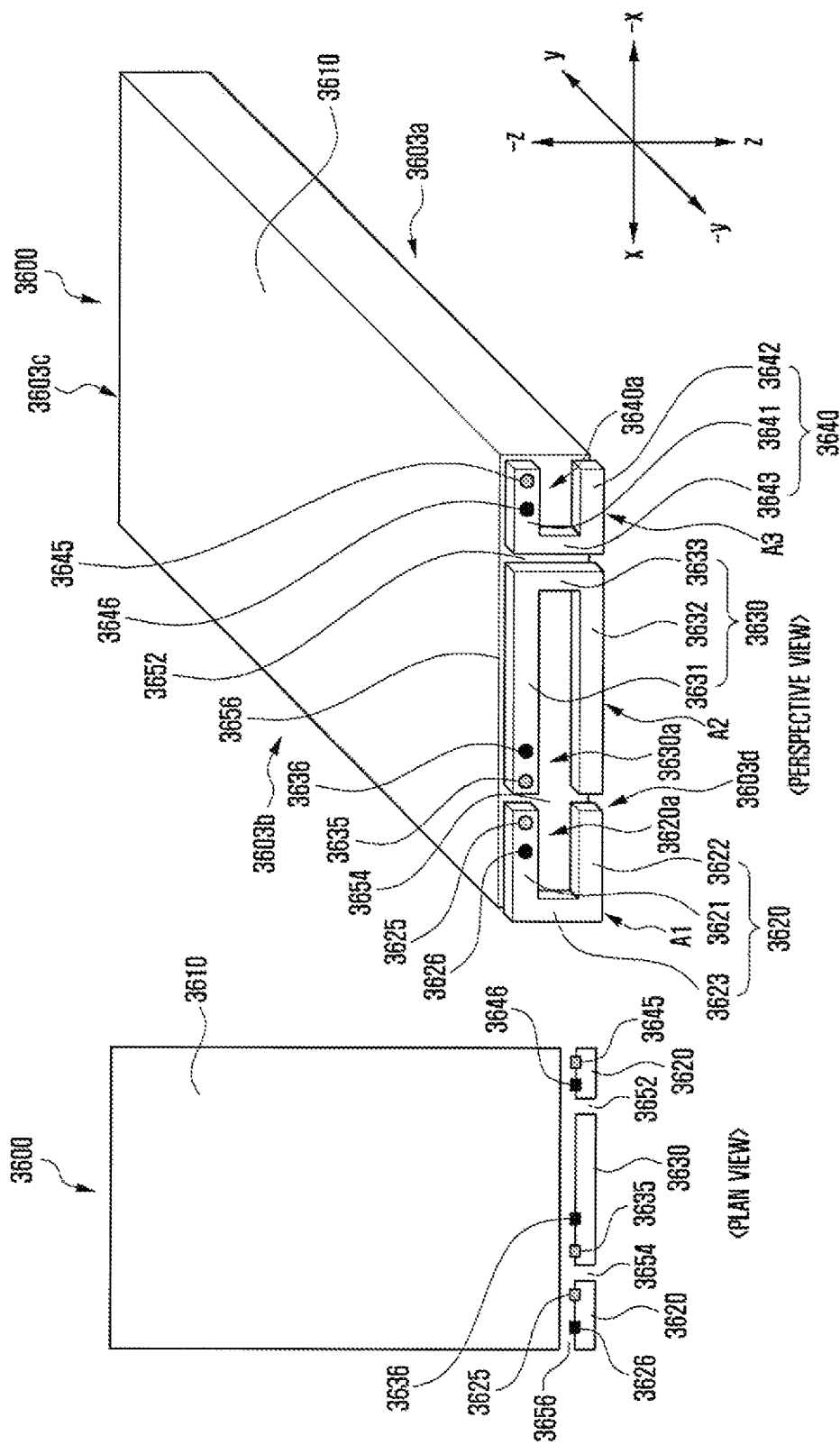
FIG. 36 is a view illustrating a plurality of frame antennas (a first antenna, a second antenna, and a third antenna) of an electronic device according to certain embodiments of the disclosure.

FIG. 36 is a view illustrating a plurality of frame antennas (a first antenna, a second antenna, and a third antenna) of an electronic device 3600 according to certain embodiments of the disclosure. In describing the electronic device 3600 of FIG. 36, a description of components which are the same as or similar to those of the antennas of the electronic device 3500 of FIG. 35 may be omitted.

Referring to FIG. 36, the electronic device 3600 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a first housing 3610 (e.g., the support member 2032 in FIG. 20), and/or a plurality of conductive portions 3620, 3630, and 3640 serving as antennas. Spaces 3652, 3654, and 3656 may be disposed in the first housing 3610 (e.g., the support member 2032 in FIG. 20). A plurality of antennas may be configured with the plurality of conductive portions 3620, 3630, and 3640.

The electronic device 3600 may be a bar type electronic device including a display in which the size of the display region is fixed. The electronic device 3600 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The first antenna A1, the second antenna A2, and the third antenna A3, which are a plurality of frame antennas, may be configured with the plurality of conductive portions 3620, 3630, and 3640. As an example, the plurality of conductive portions 3620, 3630, and 3640 may include a first conductive portion 3620 serving as the first antenna A1, a second conductive portion 3630 serving as the second antenna A2, and a third conductive portion 3640 serving as the third antenna A3.

The first conductive portion 3620 serving as the first antenna A1, the second conductive portion 3630 serving as the second antenna A2, and the third conductive portion 3640 serving as the third antenna A3 may be disposed on at least one of the side surfaces 3603a, 3060b, 3603c, and 3603d (e.g., the third side surface 203c and/or the fourth side surface 203d in FIGS. 2 to 4) of the electronic device 3600. For example, the fourth side surface 3603d may include the first conductive portion 3620, the second conductive portion 3630, or the third conductive portion 3640.

In an embodiment, between the second conductive portion 3630 and the third conductive portion 3640, a first space (e.g., a first split portion) 3652 may be located. Between the first conductive portion 3620 and the second conductive portion 3630, a second space (e.g., a second split portion) 3654 may be located. Between the first, second, and third conductive portions 3620, 3630, and 3640 and the first housing 3610 (e.g., the support member 2032 in FIG. 20), a third space (e.g., a third split portion) 3656 may be located. The first conductive portion 3620, the second conductive portion 3630, and the third conductive portion 3640 may be in a floating state.

The first conductive portion 3260 serving as the first antenna A1 may be disposed adjacent to the second side surface 3603b of the electronic device 3600. The third conductive portion 3640 serving as the third antenna A3 may be disposed adjacent to the first side surface 3603a of the electronic device 3600. The second conductive portion 3630 serving as the second antenna A2 may be disposed between the first conductive portion 3620 and the third conductive portion 3640.

The first conductive portion 3620 may include a first portion 3621 configured in a predetermined width to have a length in the first direction (e.g., the x-axis direction), a second portion 3622 spaced apart from the first portion 3621 by a predetermined interval and configured in a predetermined width to have a length in the first direction (e.g., the x-axis direction), and a third portion 3623 interconnecting one end of the first portion 3621 and one end of the second portion 3622.

The first portion 3621, the second portion 3622, and the third portion 3623 of the first conductive portion 3620 may be configured integrally. The first conductive portion 3620 may be configured in the U shape or C shape in which the first portion 3621, the second portion 3622, and the third portion 3623 are electrically connected to each other.

The third portion 3623 of the first conductive portion 3620 may be disposed adjacent to the second side surface 3603b of the electronic device 3600. A slit 3620a in the first conductive portion 3620 may be provided to be oriented in the first direction (e.g., the x-axis direction).

The second conductive portion 3630 may include a first portion 3631 configured in a predetermined width to have a length in the first direction (e.g., the x-axis direction), a second portion 3632 spaced apart from the first portion 3631 by a predetermined interval and configured in a predetermined width to have a length in the first direction (e.g., the x-axis direction), and a third portion 3633 interconnecting one end of the first portion 3631 and one end of the second portion 3632.

The first portion 3631, the second portion 3632, and the third portion 3633 of the second conductive portion 3630 may be configured integrally. The second conductive portion 3630 may be configured in the U shape or C shape in which the first portion 3631, the second portion 3632, and the third portion 3633 are electrically connected to each other.

The third portion 3633 of the second conductive portion 3630 may be disposed to face the first side surface 3603a of the electronic device 3600. A slit 3630a in the second conductive portion 3630 may be disposed to face the second side surface 3603b of the electronic device 3600 (e.g., the x-axis direction).

The third conductive portion 3640 may include a first portion 3641 configured in a predetermined width to have a length in the first direction (e.g., the x-axis direction), a second portion 3642 spaced apart from the first portion 3641 by a predetermined interval and configured in a predetermined width to have a length in the first direction (e.g., the x-axis direction), and a third portion 3643 interconnecting one end of the first portion 3641 and one end of the second portion 3642.

The first portion 3641, the second portion 3642, and the third portion 3643 of the third conductive portion 3640 may be configured integrally. The third conductive portion 3640 may be configured in the U shape or C shape in which the first portion 3641, the second portion 3642, and the third portion 3643 are electrically connected to each other.

The third portion 3643 of the third conductive portion 3640 may be disposed to be oriented in the first direction (e.g., the x-axis direction). A slit 3640a in the third conductive portion 3640 may be disposed adjacent to the first side surface 3603a of the electronic device 3600.

The slit 3620a in the first conductive portion 3620 and the slit 3630a in the second conductive portion 3630 may be disposed to face each other. The slit 3620a in the first conductive portion 3620 and the slit 3630a in the second conductive portion 3630 may be disposed with a predetermined interval 3654 therebetween.

The first conductive portion 3620 and the second conductive portion 3630 may be disposed with a predetermined interval 3654 therebetween, so that the first conductive portion 3620 and the second conductive portion 3630 may be split from each other.

The third portion 3633 of the second conductive portion 3630 and the third portion 3643 of the third conductive portion 3640 may be disposed to face each other with a predetermined interval 3652 therebetween. The slit 3630a in the second conductive portion 3630 may be provided to be oriented in the first direction (e.g., the x-axis direction), and the slit 3640a in the third conductive portion 3640 may be provided to face the first side surface 3603a (to be oriented in the second direction (e.g., the −x-axis direction).

The second conductive portion 3630 and the third conductive portion 3640 may be disposed with a predetermined interval 3652 therebetween, so that the second conductive portion 3630 and the third conductive portion 3640 may be split from each other.

The first conductive portion 3620 may be spaced apart from the first housing 3610 (e.g., the support member 2032 of FIG. 20) by a predetermined interval, so that the first housing 3610 and the first conductive portion 3620 may be split from each other.

The second conductive portion 3630 may be spaced apart from the first housing 3610 (e.g., the support member 2032 of FIG. 20) by a predetermined interval, so that the first housing 3610 and the second conductive portion 3630 may be split from each other.

The third conductive portion 3640 may be spaced apart from the first housing 3610 (e.g., the support member 2032 of FIG. 20) by a predetermined interval, so that the first housing 3610 (e.g., the support member 2032 of FIG. 20) and the third conductive portion 3640 may be split from each other.

The first space 3652, the second space 3654, and the third space 3656 may be filled with a non-conductive material (e.g., a non-conductive material).

In some embodiments, the lengths of the first portion 3621 and the second portion 3622 of the first conductive portion 3620 may be substantially equal to each other. In some embodiments, the lengths of the first portion 3621 and the second portion 3622 of the first conductive portion 3620 may be different from each other.

The first portion 3621 and the first feed point 3625 and the first ground point 3626 of the first conductive portion 3620 serving as the first antenna A1 may be electrically connected to each other. As an example, the first ground point 3626 may be electrically connected to the first portion 3621 at a position adjacent to the second side surface 3603b of the electronic device 3600. As an example, the first feed point 3625 may be electrically connected to the first portion 3621 at a position adjacent to the slit 3620a in the first conductive portion 3620. The first feed point 3625 may be electrically connected to the first portion 3621 to be more distant than the first ground point 3626 in the second direction (e.g., the −x-axis direction).

In some embodiments, the lengths of the first portion 3631 and the second portion 3632 of the second conductive portion 3630 may be substantially equal to each other. In some embodiments, the lengths of the first portion 3631 and the second portion 3632 of the second conductive portion 3630 may be different from each other.

The first portion 3631 and the second feed point 3635 and the second ground point 3636 of the second conductive portion 3630 serving as the second antenna A2 may be electrically connected to each other. As an example, the second feed point 3635 may be electrically connected to the first portion 3631 at a position adjacent to the slit 3630a in the second conductive portion 3630. As an example, the second ground point 3636 may be electrically connected to the first portion 3631 to be more distant than the second feed point 3635 in the second direction (e.g., the −x-axis direction).

In some embodiments, the lengths of the first portion 3641 and the second portion 3642 of the third conductive portion 3640 may be substantially equal to each other. In some embodiments, the lengths of the first portion 3641 and the second portion 3642 of the third conductive portion 3640 may be different from each other.

The first portion 3641 and the third feed point 3645 and the third ground point 3646 of the third conductive portion 3640 serving as the third antenna A3 may be electrically connected to each other. As an example, the third feed point 3645 may be electrically connected to the first portion 3641 at a position adjacent to the slit 3640a in the third conductive portion 3640. As an example, the third ground point 3646 may be electrically connected to the first portion 3641 to be more distant than the third feed point 3645 in the first direction (e.g., the x-axis direction).

The first feed point 3625 of the first conductive portion 3620 may be disposed adjacent to the slit 3320a, and the second feed point 3635 of the second conductive portion 3630 may be disposed adjacent to the slit 3630a. The first feed point 3625 of the first conductive portion 3620 and the second feed point 3635 of the second conductive portion 3630 may be disposed adjacent to each other with a predetermined interval 3654 therebetween.

The first conductive portion 3620 may be used as the first antenna A1 that operates in at least one frequency band by being electrically connected to a wireless communication circuit (e.g., the wireless communication module 192 in FIG. 1) at the first feed point 3625. The second conductive portion 3630 may be used as the second antenna A2 that operates in at least one frequency band by being electrically connected to a wireless communication circuit (e.g., the wireless communication module 192 in FIG. 2) at the second feed point 3635. The third conductive portion 3640 may be used as the third antenna A3 that operates in at least one frequency band by being electrically connected to a wireless communication circuit (e.g., the wireless communication module 192 in FIG. 3) at the third feed point 3645.

The wireless communication circuit (e.g., the wireless communication module 192 in FIG. 1) may be configured to transmit and receive wireless signals in a low band, mid band, high band or ultra-high band via the first conductive portion 3620, the second conductive portion 3630, and the third conductive portion 3640.

In the electronic device 3600 according to certain embodiments of the disclosure, the first antenna A1 using the first conductive portion 3620, the second antenna A2 using the second conductive portion 3630, and/or the third antenna A3 using the third conductive portion 3634 may be used as antennas operating in different frequency bands.

Figure 37:
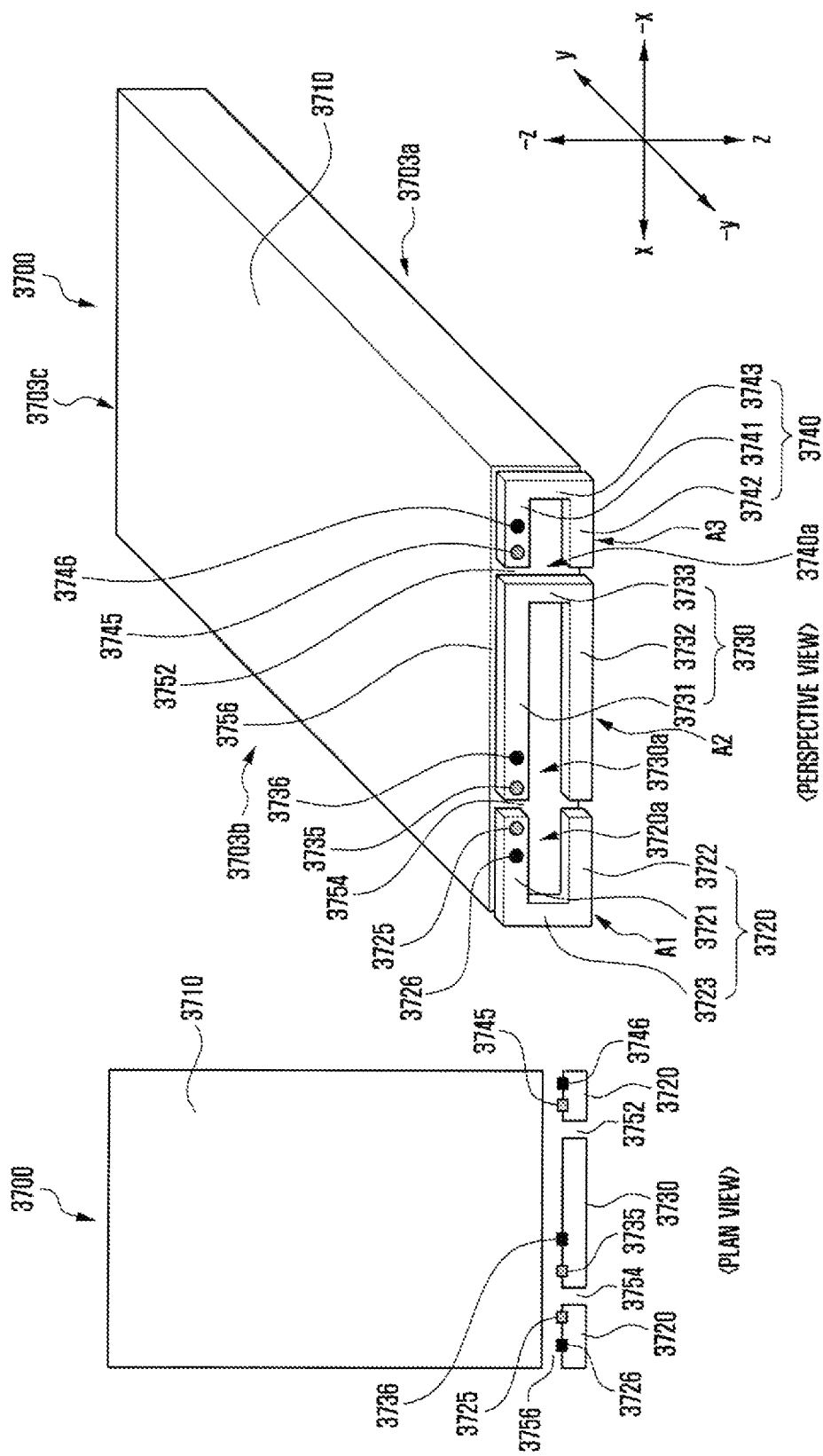
FIG. 37 is a view illustrating a plurality of frame antennas (a first antenna, a second antenna, and a third antenna) of an electronic device according to certain embodiments of the disclosure.

FIG. 37 is a view illustrating a plurality of frame antennas (a first antenna, a second antenna, and a third antenna) of an electronic device 3700 according to certain embodiments of the disclosure. In describing the electronic device 3700 of FIG. 37, a description of components which are the same as (or similar to) those of the electronic device 3600 of FIG. 36 may be omitted.

Referring to FIG. 37, the electronic device 7600 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a first housing 3710 (e.g., the support member 2032 in FIG. 20), and/or a plurality of conductive portions 3720, 3730, and 3740 serving as antennas. Spaces 3752, 3754, and 3756 may be disposed in the first housing 3710 (e.g., the support member 2032 in FIG. 20). A plurality of antennas may be configured with the plurality of conductive portions 3720, 3730, and 3740.

The electronic device 3700 may be a bar type electronic device including a display in which the size of the display region is fixed. The electronic device 3700 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

As an embodiment, a plurality of frame antennas (e.g., the first antenna A1, the second antenna A2, and the third antenna A3) may be configured with the plurality of conductive portions 3720, 3730, and 3740. As an example, the plurality of conductive portions 3720, 3730, and 3740 may include a first conductive portion 3720 serving as the first antenna A1, a second conductive portion 3730 serving as the second antenna A2, and a third conductive portion 3740 serving as the third antenna A3.

The first conductive portion 3720 serving as the first antenna A1, the second conductive portion 3730 serving as the second antenna A2, and the third conductive portion 3740 serving as the third antenna A3 may be disposed on at least one of the side surfaces 3703a, 3703b, 3703c, and 3703d (e.g., the third side surface 203c and/or the fourth side surface 203d in FIGS. 2 to 4) of the electronic device 3700. For example, the fourth side surface 3703d may include the first conductive portion 3720, the second conductive portion 3730, or the third conductive portion 3740.

In an embodiment, between the second conductive portion 3730 and the third conductive portion 3740, a first space (e.g., a first split portion) 3752 may be located. Between the first conductive portion 3720 and the second conductive portion 3730, a second space (e.g., a second split portion) 3754 may be located. Between the first, second, and third conductive portions 3720, 3730, and 3740 and the first housing 3710 (e.g., the support member 2032 in FIG. 20), a third space (e.g., a third split portion) 3756 may be located.

The first conductive portion 3720, the second conductive portion 3730, and the third conductive portion 3740 may be in a floating state.

The first conductive portion 3720 serving as the first antenna A1 may be disposed adjacent to the second side surface 3703b of the electronic device 3700. The third conductive portion 3740 serving as the third antenna A3 may be disposed adjacent to the first side surface 3703a of the electronic device 3700. The second conductive portion 3730 serving as the second antenna A2 may be disposed between the first conductive portion 3720 and the third conductive portion 3740.

The first conductive portion 3720 may include a first portion 3721 configured in a predetermined width to have a length in the first direction (e.g., the x-axis direction), a second portion 3722 spaced apart from the first portion 3721 by a predetermined interval and configured in a predetermined width to have a length in the first direction (e.g., the x-axis direction), and a third portion 3723 interconnecting one end of the first portion 3721 and one end of the second portion 3722.

The first portion 3721, the second portion 3722, and the third portion 3723 of the first conductive portion 3720 may be configured integrally. The first conductive portion 3720 may be configured in the U shape or C shape in which the first portion 3721, the second portion 3722, and the third portion 3723 are electrically connected to each other.

The third portion 3723 of the first conductive portion 3720 may be disposed adjacent to the second side surface 3703b of the electronic device 3700. A slit 3720a in the first conductive portion 3720 may be provided to be oriented in the second direction (e.g., the −x-axis direction).

The second conductive portion 3730 may include a first portion 3731 configured in a predetermined width to have a length in the first direction (e.g., the x-axis direction), a second portion 3732 spaced apart from the first portion 3731 by a predetermined interval and configured in a predetermined width to have a length in the first direction (e.g., the x-axis direction), and a third portion 3733 interconnecting one end of the first portion 3731 and one end of the second portion 3732.

The first portion 3731, the second portion 3732, and the third portion 3733 of the second conductive portion 3730 may be configured integrally. The second conductive portion 3730 may be configured in the U shape or C shape in which the first portion 3731, the second portion 3732, and the third portion 3733 are electrically connected to each other.

The third portion 3733 of the second conductive portion 3730 may be disposed to face the first side surface 3703a of the electronic device 3700. A slit 3730a in the second conductive portion 3730 may be provided to be oriented in the first direction (e.g., the x-axis direction).

The third conductive portion 3740 may include a first portion 3741 configured in a predetermined width to have a length in the first direction (e.g., the x-axis direction), a second portion 3742 spaced apart from the first portion 3741 by a predetermined interval and configured in a predetermined width to have a length in the first direction (e.g., the x-axis direction), and a third portion 3743 interconnecting one end of the first portion 3741 and one end of the second portion 3742.

The first portion 3741, the second portion 3742, and the third portion 3743 of the third conductive portion 3740 may be configured integrally. The third conductive portion 3740 may be configured in the U shape or C shape in which the first portion 3741, the second portion 3742, and the third portion 3743 are electrically connected to each other.

The third portion 3743 of the third conductive portion 3740 may be disposed adjacent to the first side surface 2703a of the electronic device 3700. A slit 3740a in the third conductive portion 3740 may be provided to be oriented in the first direction (e.g., the x-axis direction).

The slit 3720a in the first conductive portion 3720 and the slit 3730a in the second conductive portion 3730 may be disposed to face each other. The opening 3720a in the first conductive portion 3720 and the opening 3730a in the second conductive portion 3730 may be disposed with a predetermined interval 3754 therebetween.

The first conductive portion 3720 and the second conductive portion 3730 may be disposed with a predetermined interval 3754 therebetween, so that the first conductive portion 3720 and the second conductive portion 3730 may be split from each other.

The third portion 3733 of the second conductive portion 3730 and the slit 3740a in the third conductive portion 3740 may be disposed to face each other with a predetermined interval 3752 therebetween. The third portion 3733 of the second conductive portion 3730 may be disposed to face the first side surface 3703a of the electronic device 3700, and the slit 3740a in the third conductive portion 3740 may be disposed to be oriented in the first direction (e.g., the x-axis direction).

The second conductive portion 3730 and the third conductive portion 3740 may be disposed with a predetermined interval 3752 therebetween, so that the second conductive portion 3730 and the third conductive portion 3740 may be split from each other.

The first conductive portion 3720 may be spaced apart from the first housing 3710 (e.g., the support member 2032 of FIG. 20) by a predetermined interval, so that the first housing 3710 (e.g., the support member 2032 of FIG. 20) and the first conductive portion 3720 may be split from each other.

In an embodiment, the second conductive portion 3730 may be spaced apart from the first housing 3710 (e.g., the support member 2032 of FIG. 20) by a predetermined interval, so that the first housing 3710 (e.g., the support member 2032 of FIG. 20) and the second conductive portion 3730 may be split from each other.

In an embodiment, the third conductive portion 3740 may be spaced apart from the first housing 3710 (e.g., the support member 2032 of FIG. 20) by a predetermined interval, so that the first housing 3710 (e.g., the support member 2032 of FIG. 20) and the third conductive portion 3740 may be split from each other.

The first space 3752, the second space 3754, and the third space 3756 may be filled with a non-conductive material (e.g., a non-conductive material).

In some embodiments, the lengths of the first portion 3721 and the second portion 3722 of the first conductive portion 3720 may be substantially equal to each other. In some embodiments, the lengths of the first portion 3721 and the second portion 3722 of the first conductive portion 3720 may be different from each other.

The first portion 3721 and the first feed point 3725 and the first ground point 3726 of the first conductive portion 3720 serving as the first antenna A1 may be electrically connected to each other. As an example, the first ground point 3726 may be electrically connected to the first portion 3721 at a position adjacent to the second side surface 3703b of the electronic device 3700. As an example, the first feed point 3725 may be electrically connected to the first portion 3721 at a position adjacent to the slit 3720a in the first conductive portion 3720. The first feed point 3725 may be electrically connected to the first portion 3721 to be more distant than the first ground point 3726 in the second direction (e.g., the −x-axis direction).

In some embodiments, the lengths of the first portion 3731 and the second portion 3732 of the second conductive portion 3730 may be substantially equal to each other. In some embodiments, the lengths of the first portion 3731 and the second portion 3732 of the second conductive portion 3730 may be different from each other.

The first portion 3731 and the second feed point 3735 and the second ground point 3736 of the second conductive portion 3730 serving as the second antenna A2 may be electrically connected to each other. As an example, the second feed point 3735 may be electrically connected to the first portion 3731 at a position adjacent to the slit 3730a in the second conductive portion 3730. As an example, the second ground point 3736 may be electrically connected to the first portion 3731 to be more distant than the second feed point 3735 in the second direction (e.g., the −x-axis direction).

In some embodiments, the lengths of the first portion 3741 and the second portion 3742 of the third conductive portion 3730 may be substantially equal to each other. In some embodiments, the lengths of the first portion 3641 and the second portion 3642 of the third conductive portion 3740 may be different from each other.

The first portion 3741 and the third feed point 3745 and the third ground point 3746 of the third conductive portion 3740 serving as the third antenna A3 may be electrically connected to each other. As an example, the third feed point 3745 may be electrically connected to the first portion 3741 at a position adjacent to the third portion 3743 of the third conductive portion 3740. As an example, the third ground point 3746 may be electrically connected to the first portion 3741 at a position adjacent to the slit 3740a in the third conductive portion 3740. The third ground point 3746 may be electrically connected to the first portion 3741 to be more distant than the third feed point 3745 in the first direction (e.g., the x-axis direction).

The first feed point 3725 of the first conductive portion 3720 may be disposed adjacent to the slit 3720a, and the second feed point 3735 of the second conductive portion 3730 may be disposed adjacent to the slit 3730a. The first feed point 3725 of the first conductive portion 3720 and the second feed point 3735 of the second conductive portion 3730 may be disposed adjacent to each other with a predetermined interval 3754 therebetween.

The first conductive portion 3720 may be used as the first antenna A1 that operates in at least one frequency band by being electrically connected to a wireless communication circuit (e.g., the wireless communication module 192 in FIG. 1) at the first feed point 3725. The second conductive portion 3730 may be used as the second antenna A2 that operates in at least one frequency band by being electrically connected to a wireless communication circuit (e.g., the wireless communication module 192 in FIG. 2) at the second feed point 3735. The third conductive portion 3740 may be used as the third antenna A3 that operates in at least one frequency band by being electrically connected to a wireless communication circuit (e.g., the wireless communication module 192 in FIG. 3) at the third feed point 3745.

The wireless communication circuit (e.g., the wireless communication module 192 in FIG. 1) may be configured to transmit and receive wireless signals in a low band, mid band, high band or ultra-high band via the first conductive portion 3720, the second conductive portion 3730, and the third conductive portion 3740.

In the electronic device 3700 according to certain embodiments of the disclosure, the first antenna A1 using the first conductive portion 3720, the second antenna A2 using the second conductive portion 3730, and the third antenna A3 using the second conductive portion 3740 may be used as antennas operating in different frequency bands.

Figure 38:
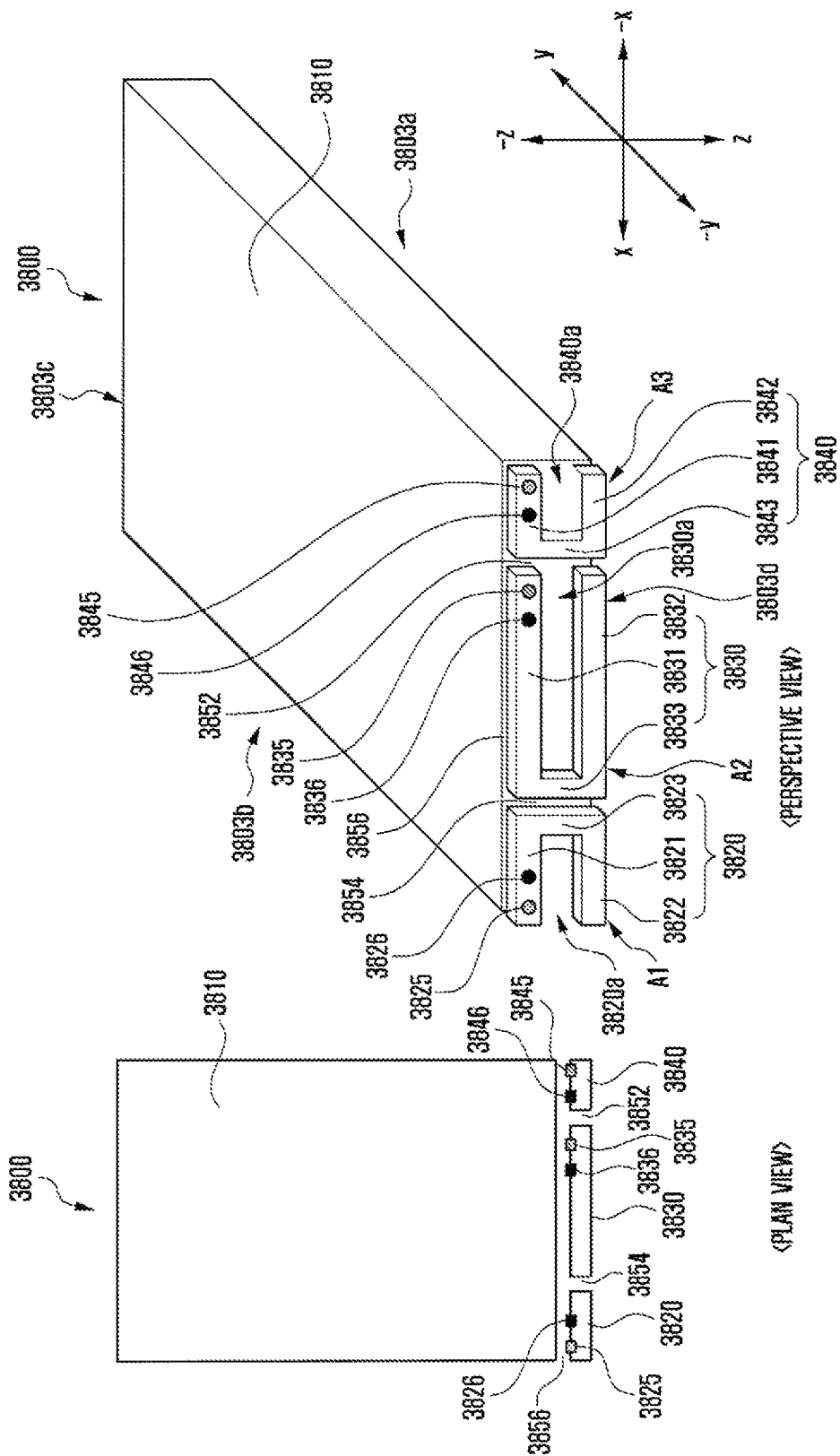
FIG. 38 is a view illustrating a plurality of frame antennas (a first antenna, a second antenna, and a third antenna) of an electronic device according to certain embodiments of the disclosure.

FIG. 38 is a view illustrating a plurality of frame antennas (a first antenna, a second antenna, and a third antenna) of an electronic device 3800 according to certain embodiments of the disclosure. In describing the electronic device 3700 of FIG. 37, a description of components which are the same as or similar to those of the antennas of the electronic device 3600 of FIG. 36 may be omitted.

Referring to FIG. 38, the electronic device 3800 according to certain embodiments of the disclosure may include a display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a first housing 3810 (e.g., the support member 2032 in FIG. 20), and a plurality of conductive portions 3820, 3830, and 3840 serving as antennas. Spaces 3852, 3854, and 3856 may be disposed in the first housing 3810 (e.g., the support member 2032 in FIG. 20). A plurality of antennas may be configured with the plurality of conductive portions 3820, 3830, and 3840.

The electronic device 3800 may be a bar type electronic device including a display in which the size of the display region is fixed. The electronic device 3800 may be a rollable electronic device (e.g., a slidable electronic device) or a foldable electronic device including a flexible display (e.g., the flexible display 210 in FIGS. 2 and 4 or the flexible display 510 in FIG. 5) in which the display region can be expanded.

The first antenna A1, the second antenna A2, and the third antenna A3, which are a plurality of frame antennas, may be configured with the plurality of conductive portions 3820, 3830, and 3840. As an example, the plurality of conductive portions 3820, 3830, and 3840 may include a first conductive portion 3820 serving as the first antenna A1, a second conductive portion 3830 serving as the second antenna A2, and a third conductive portion 3840 serving as the third antenna A3.

The first conductive portion 3820 serving as the first antenna A1, the second conductive portion 3830 serving as the second antenna A2, and the third conductive portion 3840 serving as the third antenna A3 may be disposed on at least one of the side surfaces 3803a, 3803b, 3803c, and 3803d (e.g., the third side surface 203c and/or the fourth side surface 203d in FIGS. 2 to 4) of the electronic device 3800. For example, the fourth side surface 3803d may include the first conductive portion 3820, the second conductive portion 3830, or the third conductive portion 3840.

In an embodiment, between the second conductive portion 3830 and the third conductive portion 3840, a first space (e.g., a first split portion) 3852 may be located. Between the first conductive portion 3820 and the second conductive portion 3830, a second space (e.g., a second split portion) 3854 may be located. Between the first, second, and third conductive portions 3820, 3830, and 3840 and the first housing 3810 (e.g., the support member 2032 in FIG. 20), a third space (e.g., a third split portion) 3856 may be located. The first conductive portion 3820, the second conductive portion 3830, and the third conductive portion 3840 may be in a floating state.

The first conductive portion 3820 serving as the first antenna A1 may be disposed adjacent to the second side surface 3803b of the electronic device 3800. The third conductive portion 3840 serving as the third antenna A3 may be disposed adjacent to the first side surface 3803a of the electronic device 3800. The second conductive portion 3830 serving as the second antenna A2 may be disposed between the first conductive portion 3820 and the third conductive portion 3840.

The first conductive portion 3820 may include a first portion 3821 configured in a predetermined width to have a length in the first direction (e.g., the x-axis direction), a second portion 3822 spaced apart from the first portion 3821 by a predetermined interval and configured in a predetermined width to have a length in the first direction (e.g., the x-axis direction), and a third portion 3823 interconnecting one end of the first portion 3821 and one end of the second portion 3822.

The first portion 3821, the second portion 3822, and the third portion 3823 of the first conductive portion 3820 may be configured integrally. The first conductive portion 3820 may be configured in the U shape or C shape in which the first portion 3821, the second portion 3822, and the third portion 3823 are electrically connected to each other.

The third portion 3823 of the first conductive portion 3820 may be disposed to be oriented in the second direction (e.g., the −x-axis direction). A slit 3820a in the first conductive portion 3820 may be disposed adjacent to the second side surface 3803b of the electronic device 3800.

The second conductive portion 3830 may include a first portion 3831 configured in a predetermined width to have a length in the first direction (e.g., the x-axis direction), a second portion 3832 spaced apart from the first portion 3831 by a predetermined interval and configured in a predetermined width to have a length in the first direction (e.g., the x-axis direction), and a third portion 3833 interconnecting one end of the first portion 3831 and one end of the second portion 3832.

The first portion 3831, the second portion 3832, and the third portion 3833 of the second conductive portion 3830 may be configured integrally. The second conductive portion 3830 may be configured in the U shape or C shape in which the first portion 3831, the second portion 3832, and the third portion 3833 are electrically connected to each other.

The third portion 3833 of the second conductive portion 3830 may be disposed to face the second side surface 3803b of the electronic device 3800. A slit 3830a in the second conductive portion 3830 may be disposed to face the first side surface 3603a of the electronic device 3800.

The third conductive portion 3840 may include a first portion 3841 configured in a predetermined width to have a length in the first direction (e.g., the x-axis direction), an second portion 3842 spaced apart from the first portion 3841 by a predetermined interval and configured in a predetermined width to have a length in the first direction (e.g., the x-axis direction), and a third portion 3843 interconnecting one end of the first portion 3841 and one end of the second portion 3842.

The first portion 3841, the second portion 3842, and the third portion 3843 of the third conductive portion 3840 may be configured integrally. The third conductive portion 3840 may be configured in the U shape or C shape in which the first portion 3841, the second portion 3842, and the third portion 3843 are electrically connected to each other.

The third portion 3843 of the third conductive portion 3840 may be disposed to be oriented in the first direction (e.g., the x-axis direction). A slit 3840a in the third conductive portion 3840 may be disposed adjacent to the first side surface 3803a of the electronic device 3800.

The slit 3820a in the first conductive portion 3820 and the slit 3830a in the second conductive portion 3830 may be disposed to face each other. The slit 3820a in the first conductive portion 3820 and the slit 3830a in the second conductive portion 3830 may be disposed with a predetermined interval 3854 therebetween.

The first conductive portion 3820 and the second conductive portion 3830 may be disposed with a predetermined interval 3854 therebetween, so that the first conductive portion 3820 and the second conductive portion 3830 may be split from each other.

The slit 3830a in the second conductive portion 3830 and the third portion 3843 of the third conductive portion 3840 may be disposed to face each other with a predetermined interval 3852 therebetween. The slit 3830a in the second conductive portion 3830 and the slit 3840a in the third conductive portion 3840 may be provided to face the first side surface 3803a of the electronic device 3600. The slit 3840a in the third conductive portion 3840 may be disposed closer to the first side surface 3803a of the electronic device 3600 than the slit 3830a in the second conductive portion 3830.

The second conductive portion 3830 and the third conductive portion 3840 may be disposed with a predetermined interval 3852 therebetween, so that the second conductive portion 3830 and the third conductive portion 3840 may be split from each other.

The first conductive portion 3820 may be spaced apart from the first housing 3810 (e.g., the support member 2032 of FIG. 20) by a predetermined interval, so that the first housing 3810 (e.g., the support member 2032 of FIG. 20) and the first conductive portion 3820 may be split from each other.

The second conductive portion 3830 may be spaced apart from the first housing 3810 (e.g., the support member 2032 of FIG. 20) by a predetermined interval, so that the first housing 3810 (e.g., the support member 2032 of FIG. 20) and the second conductive portion 3830 may be split from each other.

The third conductive portion 3840 may be spaced apart from the first housing 3810 (e.g., the support member 2032 of FIG. 20) by a predetermined interval, so that the first housing 3810 (e.g., the support member 2032 of FIG. 20) and the third conductive portion 3840 may be split from each other.

The first space 3852, the second space 3854, and the third space 3856 may be filled with a non-conductive material (e.g., a non-conductive material).

In some embodiments, the lengths of the first portion 3821 and the second portion 3822 of the first conductive portion 3820 may be substantially equal to each other. In some embodiments, the lengths of the first portion 3821 and the second portion 3822 of the first conductive portion 3820 may be different from each other.

The first portion 3821 and the first feed point 3825 and the first ground point 3826 of the first conductive portion 3820 serving as the first antenna A1 may be electrically connected to each other. As an example, the first feed point 3825 may be electrically connected to the first portion 3821 at a position adjacent to the slit 3820a. The first feed point 3825 may be electrically connected to the first portion 3821 at a position adjacent to the second side surface 3803b of the electronic device 3800. As an example, the first ground point 3826 may be electrically connected to the first portion 3821 to be more distant than the first feed point 3825 in the second direction (e.g., the −x-axis direction).

In some embodiments, the lengths of the first portion 3831 and the second portion 3832 of the second conductive portion 3830 may be substantially equal to each other. In some embodiments, the lengths of the first portion 3831 and the second portion 3832 of the second conductive portion 3830 may be different from each other.

The first portion 3831 and the second feed point 3835 and the second ground point 3836 of the second conductive portion 3830 serving as the second antenna A2 may be electrically connected to each other. As an example, the second feed point 3835 may be electrically connected to the first portion 3831 at a position adjacent to the slit 3830a in the second conductive portion 3830. As an example, the second ground point 3836 may be electrically connected to the first portion 3831 to be more distant than the second feed point 3835 in the first direction (e.g., the x-axis direction).

In some embodiments, the lengths of the first portion 3841 and the second portion 3842 of the third conductive portion 3840 may be substantially equal to each other. In some embodiments, the lengths of the first portion 3841 and the second portion 3842 of the third conductive portion 3840 may be different from each other.

The first portion 3841 and the third feed point 3845 and the third ground point 3846 of the third conductive portion 3840 serving as the third antenna A3 may be electrically connected to each other. As an example, the third feed point 3845 may be electrically connected to the first portion 3841 at a position adjacent to the slit 3840a in the third conductive portion 3840. The third feed point 3845 may be electrically connected to the first portion 3841 at a position adjacent to the first side surface 3803a of the electronic device 3800. As an example, the third ground point 3846 may be electrically connected to the first portion 3841 to be more distant than the third feed point 3845 in the first direction (e.g., the x-axis direction).

The first conductive portion 3820 may be used as the first antenna A1 that operates in at least one frequency band by being electrically connected to a wireless communication circuit (e.g., the wireless communication module 192 in FIG. 1) at the first feed point 3852. The second conductive portion 3830 may be used as the second antenna A2 that operates in at least one frequency band by being electrically connected to a wireless communication circuit (e.g., the wireless communication module 192 in FIG. 2) at the second feed point 3835. The third conductive portion 3840 may be used as the third antenna A3 that operates in at least one frequency band by being electrically connected to a wireless communication circuit (e.g., the wireless communication module 192 in FIG. 3) at the third feed point 3845.

The wireless communication circuit (e.g., the wireless communication module 192 in FIG. 1) may be configured to transmit and receive wireless signals in a low band, mid band, high band or ultra-high band via the first conductive portion 3820, the second conductive portion 3830, and the third conductive portion 3840.

In the electronic device 3800 according to certain embodiments of the disclosure, the first antenna A1 using the first conductive portion 3820, the second antenna A2 using the second conductive portion 3830, and the third antenna A3 using the third conductive portion 3840 may be used as antennas operating in different frequency bands.

Figure 39:
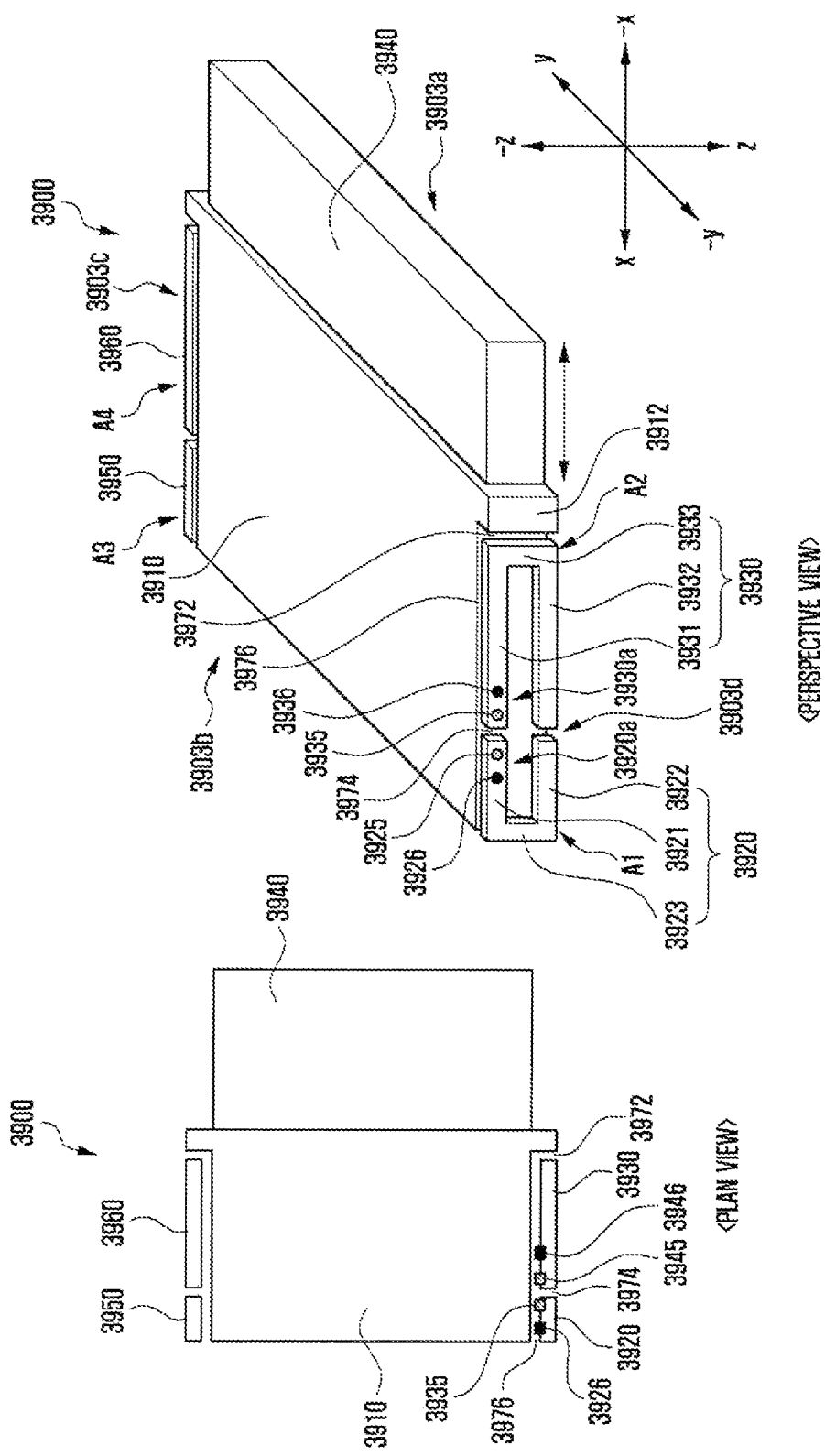
FIG. 39 is a view illustrating a plurality of frame antennas (a first antenna and a second antenna) of an electronic device according to certain embodiments of the disclosure.

FIG. 39 is a view illustrating a plurality of U-frame antennas (a first antenna and a second antenna) of an electronic device 3900 according to certain embodiments of the disclosure. In describing the plurality of frame antennas (the first antenna and the second antenna) of the electronic device 3900 of FIG. 39, a description of components which are the same as or similar to those of the antennas of the electronic device 500 of FIG. 5, the electronic device 2000 of FIG. 20, the electronic device 2800 of FIG. 28, or the electronic device 3800 of FIG. 38 may be omitted.

Referring to FIG. 39, the electronic device 3900 according to certain embodiments of the disclosure may include a flexible display (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a first housing 3910 (e.g., the support member 2032 in FIG. 20), a second housing 3940, and/or a plurality of conductive portions 3920, 3930, and 3912 serving as antennas. Spaces 3972, 3974, and 3976 may be disposed in the first housing 3910 (e.g., the support member 2032 in FIG. 20). A plurality of antennas may be configured with the plurality of conductive portions 3920, 3930, and 3912.

The electronic device 3900 may be a rollable electronic device (e.g., a slidable electronic device) including a flexible display (e.g., the flexible display 210 in FIGS. 2 and 4 or the flexible display 510 in FIG. 5) in which a display area is expandable and a bendable member or bendable support member (e.g., the bendable member 520 in FIG. 5) (e.g., a multi joint hinge module) (e.g., a multi-bar structure).

According to an embodiment, in the slide-in state (e.g., a screen-reduced state), at least a portion of the flexible display may be disposed to be invisible from the outside by being accommodated in the internal space of the second housing 3940 while being supported by the bendable member (e.g., the bendable member 520 in FIG. 5).

According to an embodiment, in the slide-out state, at least a portion of the flexible display may be disposed to be visible from the outside while being supported by the bendable member (e.g., the bendable member 520 in FIG. 5), which at least partially defines the same plane as the first housing 3910 (e.g., the support member 2032 in FIG. 20).

The plurality of conductive portions 3920, 3930, and 3912 may include a first conductive portion 3920 serving as the first antenna A1, and a second conductive portion 3930 and a third conductive portion 3912 serving as the second antenna A2. The first antenna A1 and the second antenna A2, which are the plurality of frame antennas, may be configured with the plurality of conductive portions 3920, 3930, and 3912.

The first conductive portion 3920 serving as the first antenna A1, and the second conductive portion 3930 and the third conductive portion 3912 serving as the second antenna A2 may be disposed on one side surface 3903*a*, 3930*b*, 3903*c*, or 3903*d* (e.g., the fourth side surface 203*d* in FIGS. 2 to 4) of the electronic device 3900. For example, the fourth side surface 3903*d* may include the first conductive portion 3920, the second conductive portion 3930, or the third conductive portion 3912.

In an embodiment, between the second conductive portion 3930 and the third conductive portion 3912, a first space (e.g., a first split portion) 3972 may be located. Between the first conductive portion 3920 and the second conductive portion 3930, a second space (e.g., a second split portion) 3974 may be located. Between the first, second, and third conductive portions 3920, 3930, and 3940 and the first housing 3910 (e.g., the support member 2032 in FIG. 20), a third space (e.g., a third split portion) 3976 may be located.

The first conductive portion 3920, the second conductive portion 3930, and the third conductive portion 3912 may be in a floating state.

The electronic device 3900 may further include a plurality of conductive portions 3950 and 3960. A plurality of frame antennas (e.g., a third antenna A3 and a fourth antenna A4) may be configured with the plurality of conductive portions 3950 and 3960.

The third conductive portion 3950 serving as the third antenna A3 and the fourth conductive portion 3960 serving as the fourth antenna A4 may be disposed on one side surface (e.g., the third side surface 203*c* in FIGS. 2 to 4) of the electronic device 3900. As an example, the third conductive portion 3950 and the fourth conductive portion 3960 may be located on the third side surface 3903*c*.

The first conductive portion 3920 may include a first portion 3921 configured in a predetermined width to have a length in the first direction (e.g., the x-axis direction), a second portion 3922 spaced apart from the first portion 3921 by a predetermined interval and configured in a predetermined width to have a length in the first direction (e.g., the x-axis direction), and a third portion 3923 interconnecting one end of the first portion 3921 and one end of the second portion 3922.

The first portion 3921, the second portion 3922, and the third portion 3923 of the first conductive portion 3920 may be configured integrally. The first conductive portion 3920 may be configured in the U shape or C shape in which the first portion 3921, the second portion 3922, and the third portion 3923 are electrically connected to each other.

The third portion 3923 of the first conductive portion 3920 may be disposed adjacent to the second side surface 3903*b* of the electronic device 3900. A slit 3920*a* in the first conductive portion 3920 may be provided to be oriented in the second direction (e.g., the −x-axis direction). The slit 3920*a* in the first conductive portion 3920 may be disposed to face the first side surface 3903*a*.

The second conductive portion 3930 may include a first portion 3931 configured in a predetermined width to have a length in the first direction (e.g., the x-axis direction), a second portion 3932 spaced apart from the first portion 3931 by a predetermined interval and configured in a predetermined width to have a length in the first direction (e.g., the x-axis direction), and a third portion 3933 interconnecting one end of the first portion 3931 and one end of the second portion 3932.

The first portion 3931, the second portion 3932, and the third portion 3933 of the second conductive portion 3930 may be configured integrally. The second conductive portion 3930 may be configured in the U shape or C shape in which the first portion 3931, the second portion 3932, and the third portion 3933 are electrically connected to each other.

The third portion 3933 of the second conductive portion 3930 may be disposed adjacent to the first side surface 3903*a* of the electronic device 3900. A slit 3930*a* in the second conductive portion 3930 may be disposed to be oriented in the first direction (e.g., x-axis direction) of the electronic device 3900. A slit 3930*a* in the second conductive portion 3930 may be disposed to face the second side surface 3903*b* of the electronic device 3900.

The slit 3920*a* in the first conductive portion 3920 and the slit 3930*a* in the second conductive portion 3930 may be disposed to face each other. The slit 3920*a* in the first conductive portion 3920 and the slit 3930*a* in the second conductive portion 3930 may be disposed with a predetermined interval 3974 therebetween.

The first conductive portion 3920 and the second conductive portion 3930 may be disposed with a predetermined interval 3974 therebetween, so that the first conductive portion 3920 and the second conductive portion 3930 may be split from each other.

The first conductive portion 3920 may be spaced apart from the first housing 3910 (e.g., the support member 2032 of FIG. 20) by a predetermined interval, so that the first housing 3910 (e.g., the support member 2032 of FIG. 20) and the first conductive portion 3920 may be split from each other.

The first housing 3910 (e.g., the support member 2032 in FIG. 20) and the second conductive portion 3930 may be spaced apart from each other by a predetermined interval 3972, so that the first housing 3910 (e.g., the support member 2032 in FIG. 20) and the second conductive portion 3930 may be split from each other.

The first space 39722, the second space 3974, and the third space 3976 may be filled with a non-conductive material (e.g., a non-conductive material).

The first portion 3921 and the first feed point 3925 and the first ground point 3926 of the first conductive portion 3920 serving as the first antenna A1 may be electrically connected to each other. As an example, the first feed point 3925 may be electrically connected to the first portion 3921 to be more distant than the first ground point 3926 in the second direction (e.g., the −x-axis direction).

The first portion 3931 and the second feed point 3935 and the second ground point 3936 of the second conductive portion 3930 serving as the second antenna A2 may be electrically connected to each other. As an example, the second ground point 3936 may be electrically connected to the first portion 3931 to be more distant than the second feed point 3935 in the second direction (e.g., the −x-axis direction).

The first feed point 3925 of the first conductive portion 3920 and the second feed point 3935 of the second conductive portion 3930 may be disposed adjacent to each other with a predetermined interval 3974 therebetween.

The first conductive portion 3920 may be used as the first antenna A1 that operates in at least one frequency band by being electrically connected to a wireless communication circuit (e.g., the wireless communication module 192 in FIG. 1) at the first feed point 3925. The second conductive portion 3930 may be used as the second antenna A2 that operates in at least one frequency band by being electrically connected to a wireless communication circuit (e.g., the wireless communication module 192 in FIG. 2) at the second feed point 3935.

The fourth conductive portion 3950 and the fifth conductive portion 3960 may be used as a third antenna A3 and a fourth antenna A4 that operate in at least one frequency band by being electrically connected to a wireless communication circuit (e.g., the wireless communication module 192 in FIG. 3).

The wireless communication circuit (e.g., the wireless communication module 192 in FIG. 1) may be configured to transmit and receive wireless signals in a low band, mid band, high band or ultra-high band via the first conductive portion 3920 and/or the second conductive portion 3930.

The wireless communication circuit (e.g., the wireless communication module 192 in FIG. 1) may be configured to transmit and receive wireless signals in a low band, mid band, high band or ultra-high band via the third conductive portion 3950 and/or the fourth conductive portion 3960.

Figure 40A:
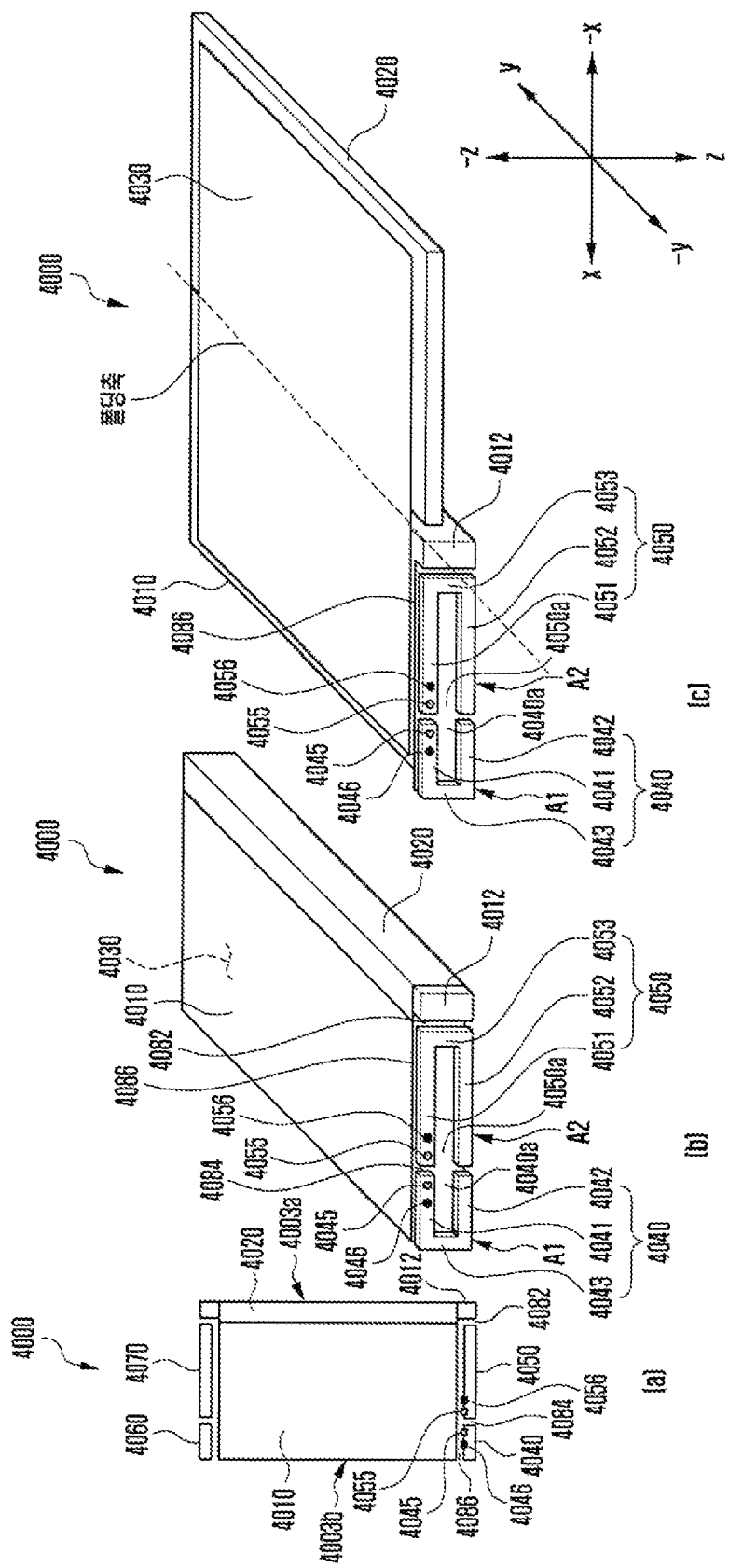
FIGS. 40A and 40B are views illustrating a plurality of frame antennas of an electronic device according to certain embodiments of the disclosure.
Figure 40B:
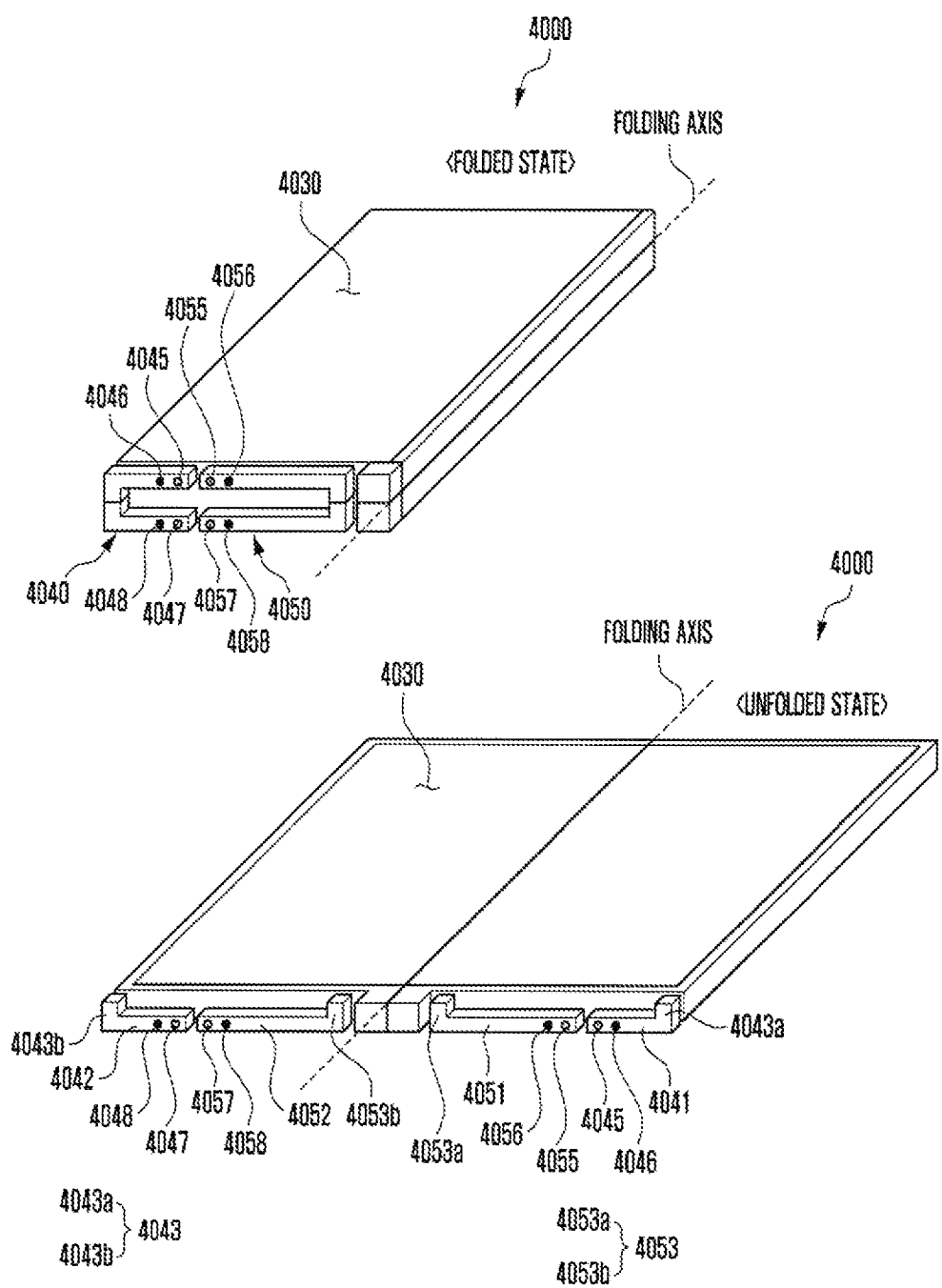

FIGS. 40A and 40B are views illustrating a plurality of frame antennas of an electronic device according to certain embodiments of the disclosure.

In describing the plurality of antennas (a first antenna and a second antenna) of the electronic device 4000 of FIGS. 40A and 40B, a detailed description of components which are substantially the same as those of the plurality of antennas (the first antenna and the second antenna) of the electronic device 2800 of FIG. 28 may be omitted.

Referring to FIGS. 40A and 40B, the electronic device 4000 according to certain embodiments of the disclosure may include a flexible display 4030 (e.g., the display module 160 in FIG. 1, the flexible display 210 in FIGS. 2 and 4, or the flexible display 510 in FIG. 5), a processor (e.g., the processor 120 in FIG. 1), a memory (e.g., the memory 130), a communication module (e.g., the communication module 190 in FIG. 1), a first housing 4010 (e.g., the support member 2032 in FIG. 20), a second housing 4020, and/or a plurality of conductive portions 4040, 4050, and 4012 serving as antennas. In an embodiment, when the electronic device 4000 is in the folded state, when viewed in the −z-axis direction, at least a portion of the second housing 4020 overlapping the first conductive portion 4040 and the second conductive portion 4050 may be formed of a non-conductive material.

The electronic device 4000 may be a foldable electronic device in which the flexible display 4030 is foldable or unfoldable about a folding axis. In the electronic device 4000, spaces 4082, 4084, and 4086 may be disposed. A plurality of antennas may be configured with the plurality of conductive portions 4040 and 4050.

The plurality of conductive portions 4040 and 4050 may include a first conductive portion 4040 serving as the first antenna A1, and a second conductive portion 4050 and a third conductive portion 4012 serving as the second antenna A2.

As an embodiment, a plurality of frame antennas (e.g., the first antenna A1 and the second antenna A2) may be configured with the plurality of conductive portions 4040, 4050, and 4012.

The first conductive portion 4040 serving as the first antenna A1, and the second conductive portion 4050 and the third conductive portion 4012 serving as the second antenna A2 may be disposed on one side surface (e.g., the fourth side surface 203*d* in FIGS. 2 to 4) of the electronic device 4000.

The first conductive portion 4040 may include a first portion 4041 configured in a predetermined width to have a length in the first direction (e.g., the x-axis direction), a second portion 4042 spaced apart from the first portion 4041 by a predetermined interval and configured in a predetermined width to have a length in the first direction (e.g., the x-axis direction), and a third portion 4043 interconnecting one end of the first portion 4041 and one end of the second portion 4042.

The first portion 4041, the second portion 4042, and the third portion 4043 of the first conductive portion 4040 may be configured integrally. The first conductive portion 4040 may be formed in a U shape or a C shape in which the first portion 4041, the second portion 4042, and the third portion 4043 are electrically connected to each other.

The third portion 4043 of the first conductive portion 4040 may be disposed adjacent to the second side surface 4003*b* of the electronic device 4000. A slit 4040*a* in the first conductive portion 4040 may be disposed to be oriented in the second direction (e.g., −x-axis direction) of the electronic device 4000. The slit 4040*a* in the first conductive portion 4040 may be disposed to face the first side surface 4003a of the electronic device 4000.

The second conductive portion 4050 may include a first portion 4051 configured in a predetermined width to have a length in the first direction (e.g., the x-axis direction), a second portion 4052 spaced apart from the first portion 4051 by a predetermined interval and configured in a predetermined width to have a length in the first direction (e.g., the x-axis direction), and a third portion 4053 interconnecting one end of the first portion 4051 and one end of the second portion 4052.

The first portion 4051, the second portion 4052, and the third portion 4053 of the second conductive portion 4050 may be configured integrally. The second conductive portion 4050 may be configured in the U shape or C shape in which the first portion 4051, the second portion 4052, and the third portion 4053 are electrically connected to each other.

The third portion 4053 of the second conductive portion 4050 may be disposed adjacent to the first side surface 4003a of the electronic device 4000. A slit 4050a in the second conductive portion 4050 may be disposed to oriented in the x-axis direction. The slit 4050a in the second conductive portion 4050 may be disposed to face the second side surface 4003b of the electronic device 4000.

The slit 4040a in the first conductive portion 4040 and the slit 4050a in the second conductive portion 4050 may be disposed to face each other. The slit 4040a in the first conductive portion 4040 and the slit 4050a in the second conductive portion 4050 may be disposed with the first space 4084 interposed therebetween.

The first conductive portion 4040 and the second conductive portion 4050 may be disposed with a predetermined interval 4084 therebetween, so that the first conductive portion 4040 and the second conductive portion 4050 may be split from each other.

The first conductive portion 4040 may be spaced apart from the first housing 4010 (e.g., the support member 2032 of FIG. 20) by a predetermined interval, so that the first housing 4010 (e.g., the support member 2032 of FIG. 20) and the first conductive portion 4040 may be split from each other.

The first housing 4010 (e.g., the support member 2032 in FIG. 20) and the second conductive portion 4050 may be spaced apart from each other by a predetermined interval 4082, so that the first housing 4010 (e.g., the support member 2032 in FIG. 20) and the second conductive portion 4050 may be split from each other.

The first portion 4041 and the first feed point 4045 and the first ground point 4046 of the first conductive portion 4040 serving as the first antenna A1 may be electrically connected to each other. As an example, the first feed point 4045 may be electrically connected to the first portion 4041 to be more distant than the first ground point 4046 in the second direction (e.g., the −x-axis direction).

The first portion 4051 and the second feed point 4055 and the second ground point 4056 of the second conductive portion 4050 serving as the second antenna A2 may be electrically connected to each other. As an example, the second ground point 4056 may be electrically connected to the first portion 4051 to be more distant than the second feed point 4055 in the second direction (e.g., the −x-axis direction).

The first feed point 4045 of the first conductive portion 4040 and the second feed point 4045 of the second conductive portion 4050 may be disposed adjacent to each other with a predetermined interval 4082 therebetween.

The first conductive portion 4040 may be used as the first antenna A1 that operates in at least one frequency band by being electrically connected to a wireless communication circuit (e.g., the wireless communication module 192 in FIG. 1) at the first feed point 3045. The second conductive portion 4050 may be used as the second antenna A2 that operates in at least one frequency band by being electrically connected to a wireless communication circuit (e.g., the wireless communication module 192 in FIG. 2) at the second feed point 4045.

The wireless communication circuit (e.g., the wireless communication module 192 in FIG. 1) may be configured to transmit and receive wireless signals in a low band, mid band, high band or ultra-high band via the first conductive portion 4040 and/or the second conductive portion 4050.

As illustrated in FIG. 40B, as an embodiment, in the electronic device 4000, the flexible display 4030 may be foldable or unfoldable about the folding axis. A plurality of antennas may be configured with the plurality of conductive portions 4040 and 4050.

As an embodiment, when the electronic device 4000 is in the folded state, the first antenna A1 may be configured with the first conductive portion 4040. In addition, the second antenna A2 may be configured with the second conductive portion 4050.

As an embodiment, in the folded state of the electronic device 4000, the first antenna A1 may be configured in the U shape or C shape. In the unfolded state of the electronic device 4000, the first antenna A1 may be divided into two L-shaped sub-antennas.

As an embodiment, when the electronic device 4000 is in the unfolded state, the first conductive portion 4040 may be divided so that the first antenna A1 may be divided into two sub-antennas. A first sub-antenna may be configured with the first portion 4041 of the first conductive portion 4040 and a portion 4043a of the third portion 4043. The first sub-antenna may be electrically connected to the first feed point 4045 and the first ground point 4046. The first sub-antenna may be electrically connected to a wireless communication circuit (e.g., the wireless communication module 192 in FIG. 1) at a first feed point 4045. As an embodiment, a second sub-antenna may be configured with the second portion 4042 of the first conductive portion 4040 and a portion 4043b of the third portion 4043. The second sub-antenna may be electrically connected to the second feed point 4047 and the second ground point 4048. The second sub-antenna may be electrically connected to a wireless communication circuit (e.g., the wireless communication module 192 in FIG. 2) at the second feed point 4047. As an example, the positions of the first feed point 4045, the first ground point 4046, the second feed point 4047, and the second ground point 4048 may be changed.

As an embodiment, in the folded state of the electronic device 4000, the second antenna A2 may be configured in the U shape or C shape. In the unfolded state of the electronic device 4000, the second antenna A2 may be divided into two L-shaped sub-antennas.

As an embodiment, when the electronic device 4000 is in the unfolded state, the second conductive portion 4050 may be divided so that the second antenna A2 may be divided into two sub-antennas. A third sub-antenna may be configured with the first portion 4051 of the second conductive portion 4050 and a portion 4053a of the third portion 4053. The third sub-antenna may be electrically connected to the third feed point 4055 and the first ground point 4056. The third sub-antenna may be electrically connected to a wireless communication module 192 in FIG. 3) at the third feed point 4055. As an embodiment, a fourth sub-antenna may be configured with the second portion 4052 of the second conductive portion 4050 and a portion 4053*b* of the third portion 4053. The fourth sub-antenna may be electrically connected to the fourth feed point 4057 and the second ground point 4058. The fourth sub-antenna may be electrically connected to a wireless communication circuit (e.g., the wireless communication module 192 in FIG. 4) at the fourth feed point 4057. As an example, the positions of the third feed point 4055, the third ground point 4056, the fourth feed point 4057, and the fourth ground point 4058 may be changed.

As an embodiment, when the electronic device 4000 is in the folded state, each of the first antenna A1 and the second antenna A2 may operate as a separate antenna. When the electronic device 4000 is in the unfolded state, each of the first sub-antenna, the second sub-antenna, the third sub-antenna, and the fourth sub-antenna may operate as a separate antenna.

Figure 41:
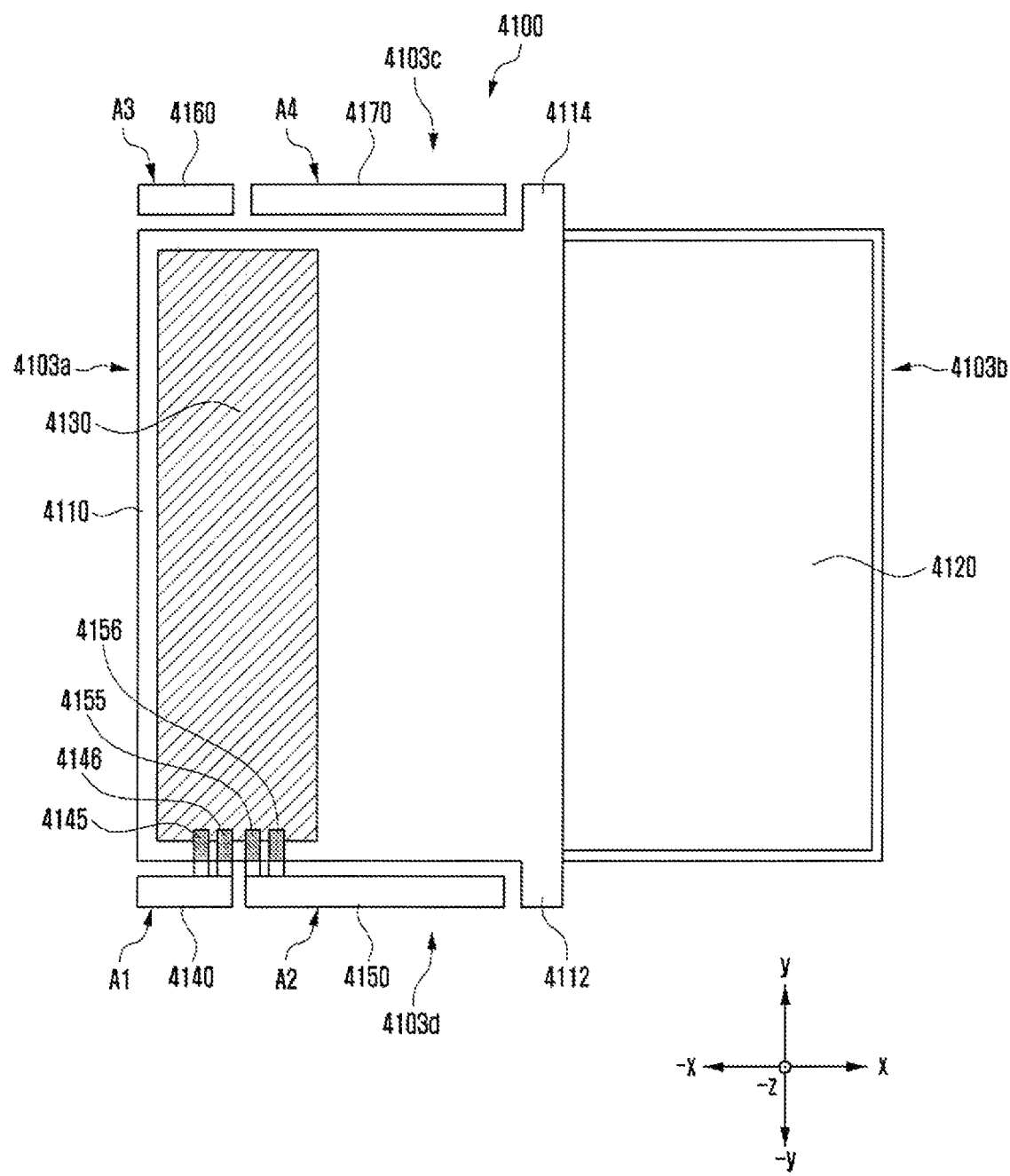
FIG. 41 is a view illustrating a connection structure between a plurality of frame antennas (a first antenna and a second antenna) and a printed circuit board (PCB) of an electronic device according to certain embodiments of the disclosure.

FIG. 41 is a view illustrating a connection structure between a plurality of frame antennas (a first antenna and a second antenna) and a printed circuit board (PCB) of an electronic device according to certain embodiments of the disclosure.

Referring to FIG. 41, the electronic device 4100 according to certain embodiments of the disclosure may include a flexible display (e.g., the display module 160 in FIG. 1, the flexible display 210 in FIGS. 2 and 4, or the flexible display 510 in FIG. 5), a printed circuit board 4130, a first housing 4110 (e.g., the support member 2032 in FIG. 20), a second housing 4120, and/or a plurality of conductive portions 4140, 4150, and 4112 serving as antennas.

The electronic device 4100 may be a rollable electronic device (e.g., a slidable electronic device) including a flexible display (e.g., the flexible display 210 in FIGS. 2 and 4 or the flexible display 510 in FIG. 5) in which a display area is expandable and a bendable member or bendable support member (e.g., the bendable member 520 in FIG. 5) (e.g., a multi joint hinge module) (e.g., a multi-bar structure).

According to an embodiment, in the slide-in state (e.g., a screen-reduced state), at least a portion of the flexible display may be disposed to be invisible from the outside by being accommodated in the internal space of the second housing 4120 while being supported by the bendable member (e.g., the bendable member 520 in FIG. 5).

According to an embodiment, in the slide-out state, at least a portion of the flexible display may be disposed to be visible from the outside while being supported by the bendable member (e.g., the bendable member 520 in FIG. 5), which at least partially defines the same plane as the first housing 4110 (e.g., the support member 2032 in FIG. 20).

The printed circuit board 4130 may include a processor (e.g., the processor 120 in FIG. 1), a memory (e.g., the memory 130), and a communication module (e.g., the communication module 190 in FIG. 1).

The plurality of conductive portions 4140, 4150, and 4112 may include a first conductive portion 4140 serving as the first antenna A1, and a second conductive portion 4150 and a third conductive portion 4112 serving as the second antenna A2.

The first antenna A1 and the second antenna A2, which are frame antennas, may be configured with the plurality of conductive portions 4140, 4150, and 4012.

The first conductive portion 4140 serving as the first antenna A1, and the second conductive portion 4150 and the third conductive portion 4112 serving as the second antenna A2 may be disposed on one side surface 4103*a*, 4103*b*, 4103*c*, or 4103*d* (e.g., the fourth side surface 203*d* in FIGS. 2 to 4) of the electronic device 4100. As an example, the fourth side surface 4103*d* of the electronic device 4100 may include the first conductive portion 4140, the second conductive portion 4150, and the third conductive portion 4112.

The electronic device 4100 may further include a plurality of conductive portions 4160, 4170, and 4114. A third antenna A3 and/or a fourth antenna A4, which are a plurality of frame antennas, may be configured with the plurality of conductive portions 4160, 4170, and 4114.

A fourth conductive portion 4160 serving as the third antenna A3, and a fifth conductive portion 4170 and a sixth conductive portion 4114 serving as the fourth antenna A4 may be disposed on one side surface 4103*a*, 4103*b*, 4103*c*, or 4103*d* (e.g., the third side surface 203*c* in FIGS. 2 to 4) of the electronic device 4100. As an example, the third side surface 4103*c* of the electronic device 4100 may include the fourth conductive portion 4160, the fifth conductive portion 4170, and the sixth conductive portion 4114.

The first housing 4110 (e.g., the support member 2032 in FIG. 20) and the first and second conductive portions 4140 and 4150 may be spaced apart from each other by a predetermined interval, so that the first housing 4110 (e.g., the support member 2032 in FIG. 20) and the first and second conductive portions 4140 and 4150 may be split from each other. In addition, the second conductive portion 4150 and the third conductive portion 4112 may be spaced apart from each other by a predetermined interval, so that the second conductive portion 4150 and the third conductive portion 4112 may be split from each other.

The first housing 4110 (e.g., the support member 2032 in FIG. 20) and the fourth and fifth conductive portions 4160 and 4170 may be spaced apart from each other by a predetermined interval, so that the first housing 4110 (e.g., the support member 2032 in FIG. 20) and the fourth and fifth conductive portions 4160 and 4170 may be split from each other. In addition, the fifth conductive portion 4170 and the sixth conductive portion 4114 may be spaced apart from each other by a predetermined interval, so that the fifth conductive portion 4170 and the sixth conductive portion 4114 may be split from each other.

The first conductive portion 4140 serving as the first antenna A1 may be electrically connected to a feed terminal of the printed circuit board 4130 via a first feed line 4145. The first conductive portion 4140 serving as the first antenna A1 may be electrically connected to a ground terminal of the printed circuit board 4130 via a first ground line 4146.

The second conductive portion 4150 serving as the second antenna A2 may be electrically connected to a feed terminal of the printed circuit board 4130 via a second feed line 4155. The second conductive portion 4150 serving as the second antenna A2 may be electrically connected to a ground terminal of the printed circuit board 4130 via a second ground line 4156.

As an embodiment, a first feed point of the first conductive portion 4140 serving as the first antenna A1 and a second feed point of the second conductive portion 4150 serving as the second antenna A2 may be disposed adjacent to each other. A first ground point of the first conductive portion 4140 serving as the first antenna A1 and a second ground point of the second conductive portion 4150 serving as the second antenna A2 may be disposed adjacent to each other. The first feed line 4145, the first ground line 4146, the second feed line 4155, and the second ground line 4156 may be disposed adjacent to each other.

Figure 42:
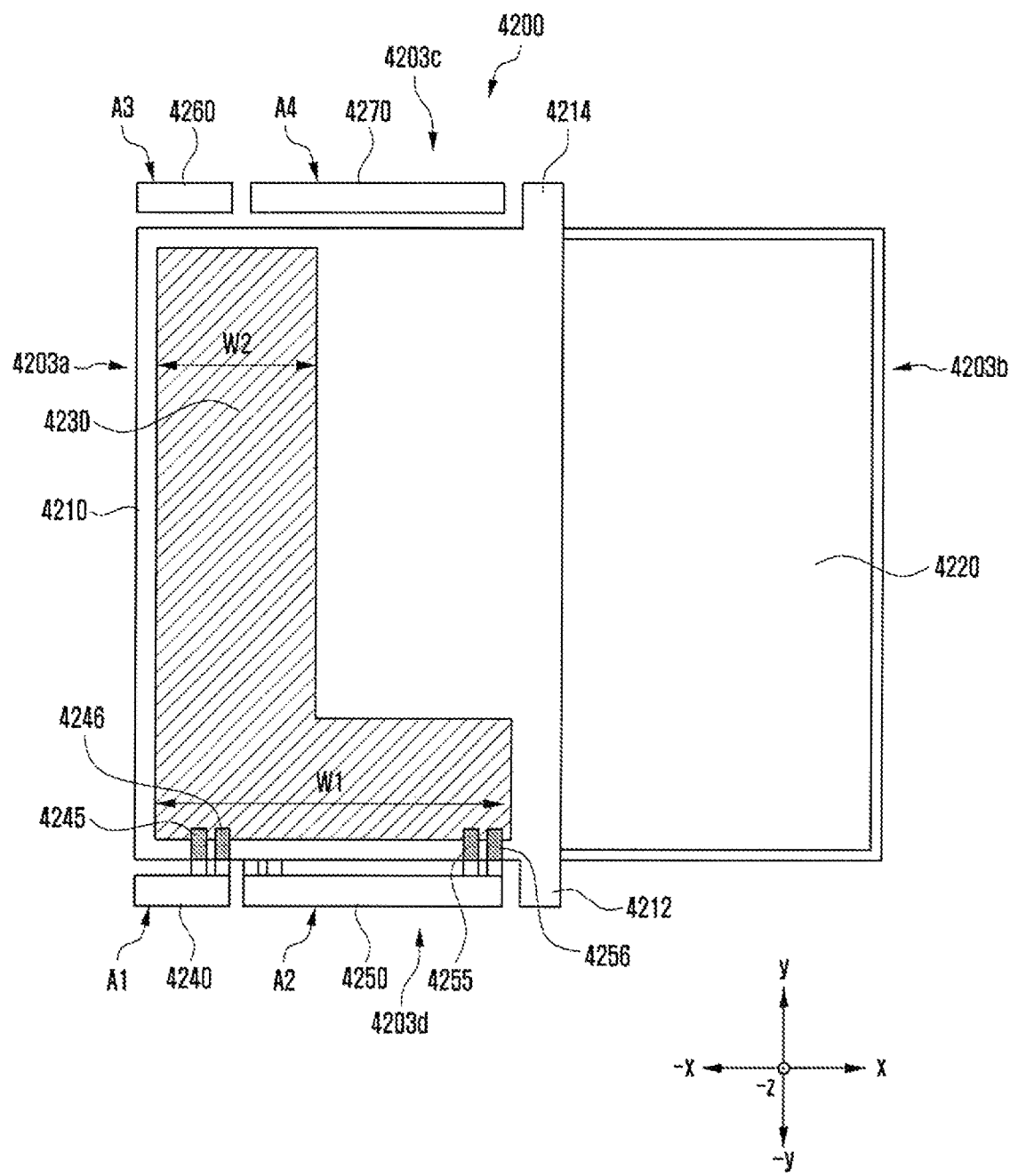
FIG. 42 is a view illustrating a connection structure between a plurality of frame antennas (a first antenna and a second antenna) and a printed circuit board (PCB) of an electronic device according to certain embodiments of the disclosure.

FIG. 42 is a view illustrating a connection structure between a plurality of antennas (a first antenna and a second antenna) and a printed circuit board (PCB) of an electronic device according to certain embodiments of the disclosure.

Referring to FIG. 42, the electronic device 4200 according to certain embodiments of the disclosure may include a flexible display (e.g., the display module 160 in FIG. 1, the flexible display 210 in FIGS. 2 and 4, or the flexible display 510 in FIG. 5), a printed circuit board 4230, a first housing 4210 (e.g., the support member 2032 in FIG. 20), a second housing 4220, and/or a plurality of conductive portions 4240, 4250, and 4212 serving as antennas.

The electronic device 4200 may be a rollable electronic device (e.g., a slidable electronic device) including a flexible display (e.g., the flexible display 210 in FIGS. 2 and 4 or the flexible display 510 in FIG. 5) in which a display area is expandable and a bendable member or bendable support member (e.g., the bendable member 520 in FIG. 5) (e.g., a multi joint hinge module) (e.g., a multi-bar structure).

According to an embodiment, in the slide-in state (e.g., a screen-reduced state), at least a portion of the flexible display may be disposed to be invisible from the outside by being accommodated in the internal space of the second housing 4220 while being supported by the bendable member (e.g., the bendable member 520 in FIG. 5).

According to an embodiment, in the slide-out state, at least a portion of the flexible display may be disposed to be visible from the outside while being supported by the bendable member (e.g., the bendable member 520 in FIG. 5), which at least partially defines the same plane as the first housing 4210 (e.g., the support member 2032 in FIG. 20).

The printed circuit board 4230 may include a processor (e.g., the processor 120 in FIG. 1), a memory (e.g., the memory 130), and a communication module (e.g., the communication module 190 in FIG. 1).

As an embodiment, in the printed circuit board 4230, a portion adjacent to the plurality of conductive portions 4240, 4250, and 4212 has a first width w1, and another portion of the printed circuit board 4230 has a second width w2 smaller than the first width w1.

The plurality of conductive portions 4240, 4250, and 4212 may include a first conductive portion 4240 serving as the first antenna A1, and a second conductive portion 4250 and a third conductive portion 4212 serving as the second antenna A2. As an embodiment, a plurality of frame antennas (e.g., the first antenna A1 and the second antenna A2) may be configured with the plurality of conductive portions 4240, 4250, and 4212.

The first conductive portion 4240 serving as the first antenna A1, and the second conductive portion 4250 and the third conductive portion 4212 serving as the second antenna A2 may be disposed on one side surface 4103a, 4103b, 4103c, or 4103d (e.g., the fourth side surface 203d in FIGS. 2 to 4) of the electronic device 4200. As an example, the fourth side surface 4203d of the electronic device 4200 may include the first conductive portion 4240, the second conductive portion 4250, and the third conductive portion 4212.

The electronic device 4200 may further include a plurality of conductive portions 4260, 4270, and 4214. A plurality of frame antennas (e.g., a third antenna A3 and a fourth antenna A4) may be configured with the plurality of conductive portions 4260, 4270, and 4214.

A fourth conductive portion 4260 serving as the third antenna A3, and a fifth conductive portion 4270 and a sixth conductive portion 4214 serving as the fourth antenna A4 may be disposed on one side surface 4103a, 4103b, 4103c, or 4103d (e.g., the third side surface 203c in FIGS. 2 to 4) of the electronic device 4200. As an example, the third side surface 4203d of the electronic device 4200 may include the fourth conductive portion 4260, the fifth conductive portion 4270, and the sixth conductive portion 4214.

The first housing 4210 (e.g., the support member 2032 in FIG. 20) and the first and second conductive portions 4240 and 4250 may be spaced apart from each other by a predetermined interval, so that the first housing 4210 (e.g., the support member 2032 in FIG. 20) and the first and second conductive portions 4240 and 4250 may be split from each other. In addition, the second conductive portion 4250 and the third conductive portion 4212 may be spaced apart from each other by a predetermined interval, so that the second conductive portion 4250 and the third conductive portion 4212 may be split from each other.

The first housing 4210 (e.g., the support member 2032 in FIG. 20) and the fourth and fifth conductive portions 4260 and 4270 may be spaced apart from each other by a predetermined interval, so that the first housing 4210 (e.g., the support member 2032 in FIG. 20) and the fourth and fifth conductive portions 4260 and 4270 may be split from each other. In addition, the fifth conductive portion 4270 and the sixth conductive portion 4214 may be spaced apart from each other by a predetermined interval, so that the fifth conductive portion 4270 and the sixth conductive portion 4214 may be split from each other.

The first conductive portion 4240 serving as the first antenna A1 may be electrically connected to a feed terminal of the printed circuit board 4230 via a first feed line 4245. The first conductive portion 4240 serving as the first antenna A1 may be electrically connected to a ground terminal of the printed circuit board 4230 via a first ground line 4246.

The second conductive portion 4250 serving as the second antenna A2 may be electrically connected to a feed terminal of the printed circuit board 4230 via a second feed line 4255. The second conductive portion 4250 serving as the second antenna A2 may be electrically connected to a ground terminal of the printed circuit board 4230 via a second ground line 4256.

As an embodiment, since the width of the portion of the printed circuit board 4230 adjacent to the second conductive portion 4250 is the first width w1 greater than the second width w2, the positions of the second feed point and the second ground point of the second conductive portion 4250 serving as the second antenna A2 may be set more freely.

As another embodiment, the printed circuit board 4230 and the first conductive portion 4240 are connected to each other by a first flexible printed circuit board (FPCB) so that a first feed point and a first ground point of the first conductive portion 4240 may be provided.

As another embodiment, the printed circuit board 4230 and the second conductive portion 4250 may be connected to each other by a second flexible printed circuit board (FPCB) so that a second feed point and a second ground point of the second conductive portion 4250 may be provided.

As another embodiment, the printed circuit board 4230 and the first conductive portion 4240 may be connected to each other by a rear pattern (an LDS) or a connection member so that the first feed point and the first ground point of the first conductive portion 4240 may be provided.

Figure 43:
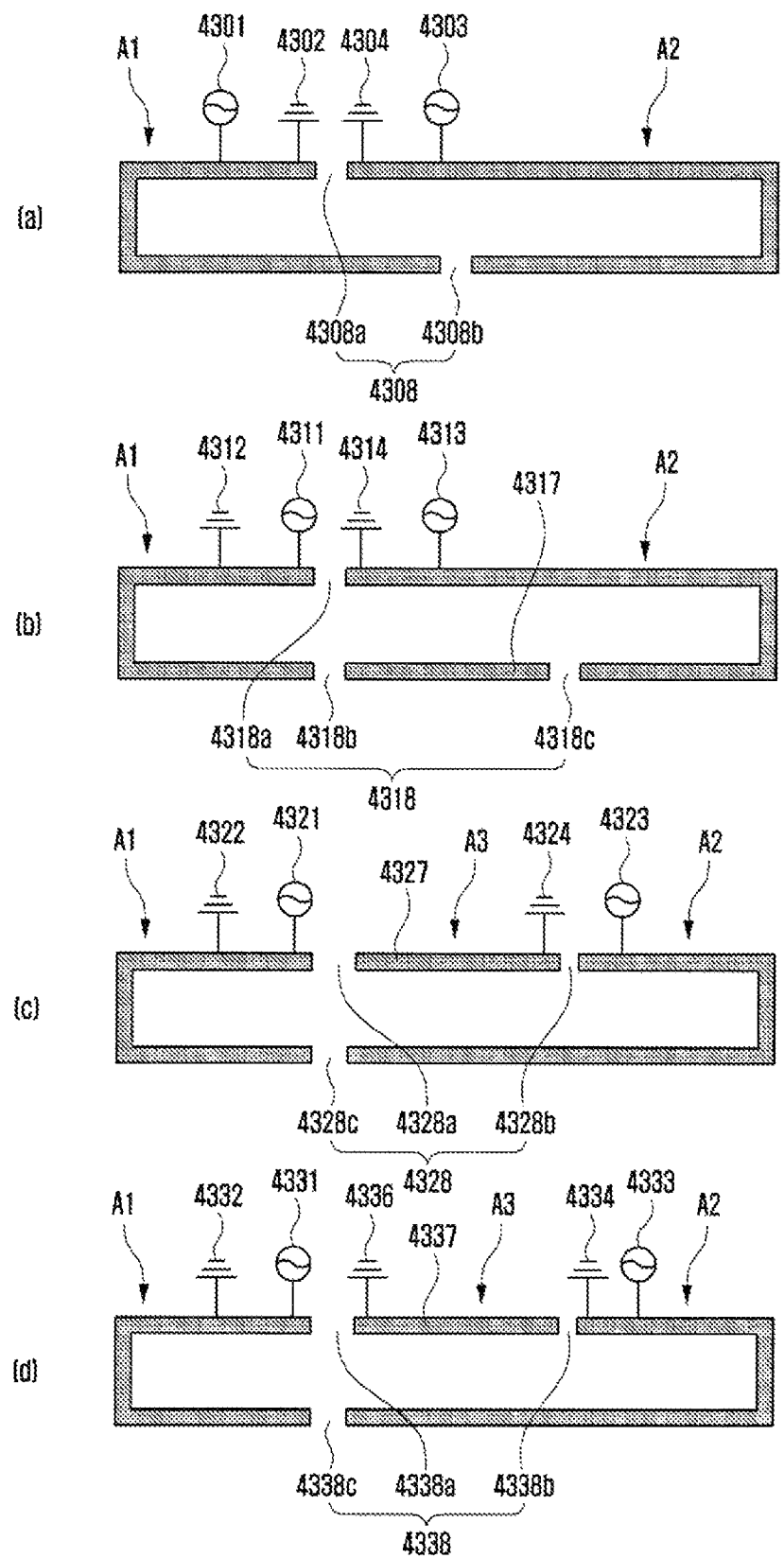
FIG. 43 is a view illustrating arrangement types of antennas of an electronic device according to certain embodiments of the disclosure.

The printed circuit board 4230 and the first conductive portion 4250 may be connected to each other by a rear pattern (an LDS) or a connection member so that the second feed point and the second ground point of the second conductive portion 4250 may be provided. FIG. 43 is a view illustrating arrangement types of antennas of an electronic device according to certain embodiments of the disclosure.

Referring to (a) of FIG. 43, the electronic device may include a first antenna A1 and a second antenna A2. The first antenna A1 and the second antenna A2 may be spaced apart from each other by a predetermined interval, and spaces 4308 may be disposed between the first antenna A1 and the second antenna A2. As an example, the positions of a first space (e.g., a first split portion) 4308a and a second space (e.g., a second split portion) 4308b may not match each other, and the first space 4308a and the second space 4308b may be positioned so that the spaces do not correspond to each other. The first antenna A1 may be electrically connected to a first feeder 4301 and a first ground 4302. The second antenna A2 may be electrically connected to a second feeder 4303 and a second ground 4304.

Referring to (b) of FIG. 43, the electronic device may include a first antenna A1 and a second antenna A2. The first antenna A1 and the second antenna A2 may be configured in an IFA type.

The first antenna A1 and the second antenna A2 may be spaced apart from each other by a predetermined interval, and spaces 4318 may be disposed between the first antenna A1 and the second antenna A2. As an example, three spaces 4318 may be disposed between the first antenna A1 and the second antenna A2. The first space 4318a and the second space 4318b may be disposed to correspond to each other, and the first space 4318a and the third space 4318c may be disposed not to correspond to each other. The conductive portion 4317 located between the second space 4318b and the third space 4318c may be in a floating state. The first antenna A1 may be electrically connected to the first feeder 4311 and the first ground 4312. The second antenna A2 may be electrically connected to the second feeder 4313 and the second ground 4314.

Referring to (c) of FIG. 43, the electronic device may include a first antenna A1 and a second antenna A2. The first antenna A1 may be configured in an IFA type, and the second antenna A2 may be configured in a monopole type.

The first antenna A1 and the second antenna A2 may be spaced apart from each other by a predetermined interval, and spaces 4328 may be disposed between the first antenna A1 and the second antenna A2. As an example, three spaces 4328 may be disposed between the first antenna A1 and the second antenna A2.

As an embodiment, a conductive portion 4327 may be disposed between the first space 4328a and the second space 4328b. The conductive portion 4327 may be in a floating state due to the first space 4328a and the second space 4328b. The first antenna A1 may be electrically connected to the first feeder 4321 and the first ground 4322. The second antenna A2 may be electrically connected to the second feeder 4323. The conductive portion 4327 may be electrically connected to the second ground 4324. The conductive portion 4327 may be disposed between the first antenna A1 and the second antenna A2 so that the first antenna A1 and the second antenna A2 are isolated from each other.

Referring to (d) of FIG. 43, the electronic device may include a first antenna A1, a second antenna A2, and a third antenna A3. The first antenna A1 and the second antenna A2 may be configured in an IFA type, and the third antenna A3 may be configured in a monopole type.

The first antenna A1, the second antenna A2, and the third antenna A3 may be spaced apart from each other by a predetermined interval, and between the first and second antennas A1 and A2, between the second and third antennas A2 and A3, and between the third and first antennas A3 and A1, spaces 4338 may be disposed, respectively.

As an embodiment, a conductive portion 4327 may be disposed between the first space 4338a and the second space 4338b, and the conductive portion 4327 may serve as the third antenna A3. A first space (e.g., a first split portion) 4338a may be disposed between the first antenna A1 and the third antenna A3. A second space (e.g., a second split portion) 4338b may be disposed between the second antenna A2 and the third antenna A3. A third space (e.g., a third split portion) 4338c may be disposed between the first antenna A1 and the second antenna A2. The first antenna A1 may be electrically connected to the first feeder 4321 and the first ground 4332. The second antenna A2 may be electrically connected to the second feeder 4333 and the second ground 4334. The third antenna A3 may be electrically connected to the third ground 4336.

Figure 44:
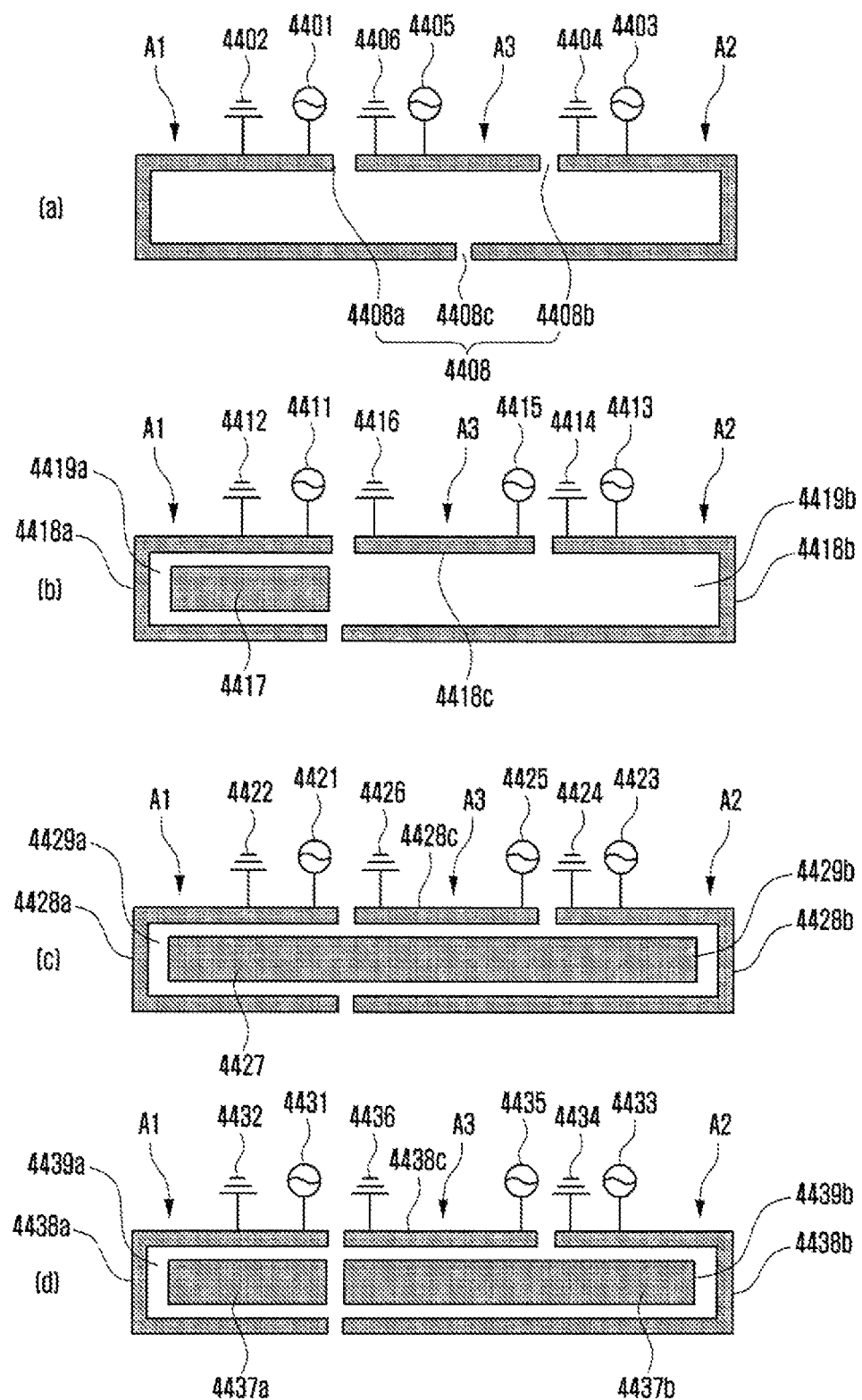
FIG. 44 is a view illustrating arrangement types of antennas of an electronic device according to certain embodiments of the disclosure.

FIG. 44 is a view illustrating arrangement types of antennas of an electronic device according to certain embodiments of the disclosure.

Referring to (a) of FIG. 44, the electronic device may include a first antenna A1, a second antenna A2, and a third antenna A3. The first antenna A1, and the second antenna A2 may be configured in an IFA type, and the third antenna A3 may be configured in a monopole type.

The first antenna A1, the second antenna A2, and the third antenna A3 may be spaced apart from each other by a predetermined interval, and between the first and second antennas A1 and A2, between the second and third antennas A2 and A3, and between the third and first antennas A3 and A1, spaces 4408 may be disposed, respectively.

The third antenna A3 may be disposed between a first space (e.g., a first split portion) 4408a and a second space (e.g., a second split portion) 4408b. The first space 4408a may be disposed between the first antenna A1 and the third antenna A3. The second space 4408b may be disposed between the second antenna A2 and the third antenna A3. A third space (e.g., a third split portion) 4408c may be disposed between the first antenna A1 and the second antenna A2. For example, the positions of the first space 4408a, the second space 4408b, and the third space 4408c may not correspond to each other and may be staggered each other. The first antenna A1 may be electrically connected to the first feeder 4401 and the first ground 4402. The second antenna A2 may be electrically connected to the second feeder 4403 and the second ground 4404. The third antenna A3 may be electrically connected to the third feeder 4405 and the third ground 4406.

Referring to (b) of FIG. 44, the electronic device may include a first antenna A1, a second antenna A2, and a third antenna A3. The third antenna A3 may operate as a loop antenna.

The first antenna A1, the second antenna A2, and the third antenna A3 may be spaced apart from each other by a predetermined interval, and between the first and second antennas A1 and A2, between the second and third antennas A2 and A3, and between the third and first antennas A3 and A1, spaces may be disposed, respectively.

As an embodiment, a first space (e.g., a first split portion) 4419a may be provided in at least a portion of the first conductive portion 4418a, and the first conductive portion 4418a may serve as the first antenna A1. A second space (e.g., a second split portion) 4419b may be provided in at least a portion of the second conductive portion 4418b, and the second conductive portion 4418b may serve as the second antenna A2. The third conductive portion 4418c may serve as the third antenna A3. A conductive pattern 4417 may be disposed in the first space 4419a. The conductive pattern 4417 may be in a floating state.

The first antenna A1 may be electrically connected to a first feeder 4411 and a first ground 4412. The second antenna A2 may be electrically connected to a second feeder 4413 and a second ground 4414. The third antenna A3 may be electrically connected to a third feeder 4415 and a third ground 4416.

Referring to (c) of FIG. 44, the electronic device may include a first antenna A1, a second antenna A2, and a third antenna A3. The third antenna A3 may operate as a loop antenna.

The first antenna A1, the second antenna A2, and the third antenna A3 may be spaced apart from each other by a predetermined interval, and between the first and second antennas A1 and A2, between the second and third antennas A2 and A3, and between the third and first antennas A3 and A1, spaces may be disposed, respectively. As an example, a conductive pattern 4427 may be disposed in the regions of the first antenna A1, the second antenna A2, and the third antenna A3. The first antenna A1 may be electrically connected to a first feeder 4421 and a first ground 4422. The second antenna A2 may be electrically connected to a second feeder 4423 and a second ground 4424. The third antenna A3 may be electrically connected to a third feeder 4425 and a third ground 4426.

As an embodiment, a first space (e.g., a first split portion) 4429a may be provided in at least a portion of the first conductive portion 4428a, and the first conductive portion 4428a may serve as the first antenna A1. A second space (e.g., a second split portion) 4429b may be provided in at least a portion of the second conductive portion 4428b, and the second conductive portion 4428b may serve as the second antenna A2. The third conductive portion 4428c may serve as the third antenna A3. A conductive pattern 4427 may be disposed in the first space 4429a. The conductive pattern 4427 may be in a floating state.

Referring to (d) of FIG. 44, the electronic device may include a first antenna A1, a second antenna A2, and a third antenna A3. The third antenna A3 may operate as a loop antenna.

The first antenna A1, the second antenna A2, and the third antenna A3 may be spaced apart from each other by a predetermined interval, and between the first and second antennas A1 and A2, between the second and third antennas A2 and A3, and between the third and first antennas A3 and A1, spaces may be disposed, respectively. The first antenna A1 may be electrically connected to a first feeder 4431 and a first ground 4432. The second antenna A2 may be electrically connected to a second feeder 4433 and a second ground 4434. The third antenna A3 may be electrically connected to a third feeder 4435 and a third ground 4436.

As an embodiment, a first space (e.g., a first split portion) 4439a may be provided in at least a portion of the first conductive portion 4438a, and the first conductive portion 4438a may serve as the first antenna A1. A second space (e.g., a second split portion) 4439b may be provided in at least a portion of the second conductive portion 4438b, and the second conductive portion 4438b may serve as the second antenna A2. The third conductive portion 4438c may serve as the third antenna A3. A first conductive pattern 4437a may be disposed in the first space 4439a. The first conductive pattern 4437a may be in a floating state. A second conductive pattern 4437b may be disposed in the second space 4439b. The second conductive pattern 4437b may be in a floating state.

An electronic device according to an embodiment of the disclosure (e.g., the electronic device 101 in FIG. 1, the electronic device 200 in FIGS. 2 to 4, the electronic device 500 in FIGS. 5 to 6B, the electronic device 2000 in FIG. 20, the electronic device 3000 in FIG. 30, the electronic device 4000 in FIG. 40, the electronic device 4100 in FIG. 41, or the electronic device 4200 in FIG. 42) may include: a first housing (e.g., the first housing 220 in FIGS. 2 to 4, the first housing 540 in FIGS. 5 to 6B, the first housing 1410 in FIG. 14, the first housing 2030 in FIG. 20, the first housing 3010 in FIG. 30, the first housing 4010 in FIG. 40, the first housing 4110 in FIG. 41, or the first housing 4210 in FIG. 42); a second housing (e.g., the second housing 230 in FIGS. 2 to 4), the second housing 550 in FIGS. 5 to 6B, the second housing 1420 in FIG. 14, the second housing 2070 in FIG. 20, the second housing 4020 in FIG. 40, the second housing 4120 in FIG. 41, or the second housing 4220 in FIG. 42); a flexible display 210 or 510; and a wireless communication circuit (e.g., the wireless communication module 192 in FIG. 1). The first housing 220, 540, 1410, 2030, 3010, 4010, 4110, or 4210 may include: a plurality of conductive portions 2720 and 2760, 2820 and 2860, or 2920, 2960, and 2912 electrically separated from each other. The second housing 230, 550, 1420, 2070, 4020, 4120, or 4220 slidably coupled to the first housing 220, 540, 1410, 2030, 3010, 4010, 4110, or 4210. The flexible display 210 or 510 may be supported by the first housings 220, 540, 1410, 2030, 3010, 4010, 4110, or 4210 and the second housing 230, 550, 1420, 2070, 4020, 4120, or 4220, and may have a display area that is variable by sliding the second housing. The wireless communication circuit (e.g., the wireless communication module 192 in FIG. 1) may be disposed in the first housing 220, 540, 1410, 2030, 3010, 4010, 4110, or 4210, and may be configured to transmit and receive wireless signals in a plurality of frequency bands via the plurality of conductive portions 2720 and 2760, 2820 and 2860, or 2920, 2960, and 2912. The plurality of conductive portions 2720 and 2760, 2820 and 2860, or 2920, 2960, and 2912 may include: a first conductive portion 610 or 1430 and a second conductive portion 620 or 1440 that are located on at least one side surface of the first housing 220, 540, 1410, 2030, 3010, 4010, 4110, or 4210, wherein the first conductive portion and the second conductive portion have a U or C shape and are split from each other. The first conductive portion 610 or 1430 may be spaced apart from the first housing.

The first conductive portions 610 or 1430 may be abutting a first side surface of the electronic device 101, 200, 500, 2000, 3000, 4000, 4100, or 4200. The second conductive portion 620 or 1440 be abutting a second side surface of the electronic device located opposite to the first side surface of the electronic device.

According to an embodiment, at least a portion of the second conductive portion 620 or 1440 may be electrically connected to the first housing 220, 540, 1410, 2030, 3010, 4010, 4110, or 4210.

According to an embodiment, the second conductive portion 620 or 1440 is spaced apart from the first housing 220, 540, 1410, 2030, 3010, 4010, 4110, or 4210.

According to an embodiment, the second housing slides from the first housing in a sliding direction, and the first conductive portion 610 or 1430 may include: a first portion having a length in the sliding direction; a second portion spaced apart from the first portion having a length in the sliding direction; and a third portion interconnecting one end of the first portion and one end of the second portion and having a length in a direction different from the sliding direction. A wireless signal of a first frequency band may be transmitted and/or received via the first conductive portion 610 or 1430.

According to an embodiment, the first conductive portion 610 or 1430 may include a first opening. The third portion of the first conductive portion 610 or 1430 may be disposed abutting first side surface. The first opening may be disposed adjacent to the second conductive portion 620 or 1440.

According to an embodiment, the first conductive portion 610 or 1430 may include a first opening. The first opening may abut the first side surface. The third portion of the first conductive portion 610 or 1430 may be disposed adjacent to the second conductive portion 620 or 1440.

According to an embodiment, the second conductive portion 620 or 1440 may include: a first portion disposed to have a length in sliding direction; a second portion spaced apart from the first portion having a length in the sliding direction; and a third portion interconnecting one end of the first portion and one end of the second portion. A wireless signal of a second frequency band may be transmitted and/or received via the second conductive portion 620 or 1440.

According to an embodiment, the second conductive portion 620 or 1440 may include a second opening. The third portion of the second conductive portion 620 or 1440 may be disposed adjacent to the second side surface. The second opening may be disposed adjacent to the first conductive portion 610 or 1430.

According to an embodiment, the second conductive portion 620 or 1440 may include a second opening. The second opening may be disposed adjacent to the second side surface. The third portion of the second conductive portion 620 or 1440 may be disposed adjacent to the first conductive portion 610 or 1430.

According to an embodiment, a third conductive portion 630 or 1940 spaced apart from the second conductive portion 620 or 1440 by a third space (e.g., a third split portion).

According to an embodiment, at least a portion of the third conductive portion 630 or 1940 may be electrically connected to the first housing 220, 540, 1410, 2030, 3010, 4010, 4110, or 4210.

According to an embodiment, the third conductive portion 630 or 1940 may be separated from the first housing 220, 540, 1410, 2030, 3010, 4010, 4110, or 4210.

According to an embodiment, the third conductive portion 630 or 1940 may include: a first portion disposed to have a length in the sliding direction; a second portion spaced apart from the first portion by a predetermined interval and disposed to have a length in the sliding direction; and a third portion interconnecting one end of the first portion and one end of the second portion. A wireless signal of a third frequency band may be transmitted and/or received via the second conductive portion 620 or 1440.

According to an embodiment, the third conductive portion 630 or 1940 may include a third opening. The third opening may be disposed adjacent to the second side surface. The third portion of the second conductive portion 620 or 1440 may be disposed adjacent to the second conductive portion 620 or 1440.

According to an embodiment, the third conductive portion 630 or 1940 may include a third opening. The third portion of the second conductive portion 620 or 1440 may be disposed adjacent to the second side surface. The third opening may be disposed adjacent to the conductive portion.

An electronic device 101, 200, 500, 2000, 3000, 4000, 4100, or 4200 according to an embodiment of the disclosure may include a housing, a display, and a wireless communication circuit (e.g., the wireless communication module 192 in FIG. 1). The housing may include: a plurality of conductive portions 2720 and 2760, 2820 and 2860, or 2920, 2960, and 2912 electrically separated from each other and disposed on at least a portion of a side surface thereof. The display may be disposed in a space defined by the housing. The wireless communication circuit (e.g., the wireless communication module 192 in FIG. 1) may be configured to transmit and/or receive wireless signals in a plurality of frequency bands via the plurality of conductive portions 2720 and 2760, 2820 and 2860, or 2920, 2960, and 2912. The plurality of conductive portions 2720 and 2760, 2820 and 2860, or 2920, 2960, and 2912 may include: a first conductive portion 610 or 1430 and a second conductive portion 620 or 1440 that are located on at least one side surface of the first housing, wherein the first conductive portion and the second conductive portion have a U or C shape and are split from each other. The first housing 220, 540, 1410, 2030, 3010, 4010, 4110, or 4210, may be spaced apart from the first conductive portion 610 or 1430.

According to an embodiment, the first conductive portions 610 or 1430 may be disposed abutting to the first side surface of the electronic device 101, 200, 500, 2000, 3000, 4000, 4100, or 4200. The second conductive portion 620 or 1440 may be disposed abutting to a second side surface of the electronic device located opposite to the first side surface.

According to an embodiment, the first conductive portion 610 or 1430 may include: a first portion disposed to have a length in the first direction; a second portion spaced apart from the first portion and having a length in a sliding direction; and a third portion interconnecting one end of the first portion and one end of the second portion and having a length in a direction different from the sliding direction. A wireless signal of a first frequency band may be transmitted and/or received via the first conductive portion 610 or 1430.

According to an embodiment, the second conductive portion 620 or 1440 may include: a first portion having a length in a first direction; a second portion spaced apart from the first portion having a length in the first direction; and a third portion interconnecting one end of the first portion and one end of the second portion. A wireless signal of a second frequency band may be transmitted and/or received via the second conductive portion 620 or 1440.

Although certain embodiments have been described with a degree of particularity, it shall be understood that the foregoing description is not limiting. Moreover, the embodiments described herein may have certain elements omitted, added, replaced, or be otherwise modified without departing from the scope of this document.

What is claimed is:

1. An electronic device comprising:
    a first housing including a top surface and a bottom surface and a plurality of conductive portions electrically separated from each other and disposed on at least a portion of a side surface of the first housing;
    a second housing slidably coupled to the first housing;
    a flexible display disposed on and supported by the top surface of the first housing and supported by the second housing and having a display area that is changeable by sliding the second housing; and
    a wireless communication circuit disposed in the first housing and configured to transmit and receive wireless signals in a plurality of frequency bands via the plurality of conductive portions,
    wherein the plurality of conductive portions include a first conductive portion and a second conductive portion, wherein the first conductive portion and the second conductive portion have a U shape or C shape and are electrically separated from each other, and wherein the first conductive portion includes a first portion that is spaced apart from the top surface and a second portion that is spaced apart from the bottom surface.

2. The electronic device of claim 1, wherein the first conductive portion is abutting a first side surface of the electronic device, and
the second conductive portion is abutting a second side surface of the electronic device opposite to the first side surface of the electronic device.

3. The electronic device of claim 2, wherein at least a portion of the second conductive portion is electrically connected to the first housing.

4. The electronic device of claim 2, wherein the second conductive portion is spaced apart from the first housing.

5. The electronic device of claim 1, wherein the first housing slides from the second housing in a sliding direction, wherein the second conductive portion includes:
a first portion disposed to have a length in the sliding direction;
a second portion spaced apart from the first portion having a length in the sliding direction; and
a third portion interconnecting one end of the first portion and one end of the second portion,
wherein a wireless signal of a second frequency band is transmitted and received via the second conductive portion.

6. The electronic device of claim 5, wherein the second conductive portion includes a second opening,
the third portion of the second conductive portion is disposed adjacent to a second side surface, and
the second opening is disposed adjacent to the first conductive portion.

7. The electronic device of claim 5, wherein the second conductive portion includes a second opening,
the second opening is disposed adjacent to a second side surface, and
the third portion of the second conductive portion is disposed adjacent to the first conductive portion.

8. The electronic device of claim 5, further comprising:
a third conductive portion spaced apart from the second conductive portion by a third space.

9. The electronic device of claim 8, wherein at least a portion of the third conductive portion is electrically connected to the first housing.

10. The electronic device of claim 8, wherein the third conductive portion is separated from the first housing.

11. The electronic device of claim 10, wherein the first housing slides from the second housing in a sliding direction, wherein the third conductive portion includes:
a first portion disposed to have a length in the sliding direction;
a second portion spaced apart from the first portion by a predetermined interval and disposed to have a length in the sliding direction; and
a third portion interconnecting one end of the first portion and one end of the second portion,
wherein a wireless signal of a third frequency band is transmitted and/or received via the second conductive portion.

12. The electronic device of claim 11, wherein the third conductive portion includes a third opening,
the third opening is disposed adjacent to a second side surface, and
the third portion of the second conductive portion is disposed adjacent to the second conductive portion.

13. The electronic device of claim 11, wherein the third conductive portion includes a third opening,
the third portion of the second conductive portion is disposed adjacent to a second side surface, and
the third opening is disposed adjacent to the second conductive portion.

14. An electronic device comprising:
a first housing including a plurality of conductive portions electrically separated from each other and disposed on at least a portion of a side surface of the first housing;
a second housing slidably coupled to the first housing, wherein the second housing slides from the first housing in a sliding direction,
a flexible display supported by the first housing and the second housing and having a display area that is changable by sliding the second housing; and
a wireless communication circuit disposed in the first housing and configured to transmit and receive wireless signals in a plurality of frequency bands via the plurality of conductive portions,
wherein the plurality of conductive portions include a first conductive portion and a second conductive portion, wherein the first conductive portion and the second conductive portion have a U shape or C shape and are electrically separated from each other, and
wherein the first conductive portion is spaced apart from the first housing and includes:
a first portion having a length in the sliding direction;
a second portion spaced apart from the first portion having a length in the sliding direction; and
a third portion interconnecting one end of the first portion and one end of the second portion and disposed to have a length in a different direction from the sliding direction, and
wherein a wireless signal of a first frequency band is transmitted/received via the first conductive portion.

15. The electronic device of claim 14, wherein the first conductive portion includes a first opening,
the third portion of the first conductive portion is disposed abutting a first side surface, and
the first opening is disposed adjacent to the second conductive portion.

16. The electronic device of claim 14, wherein the first conductive portion includes a first opening,
the first opening is disposed abutting a first side surface, and
the third portion of the first conductive portion is disposed adjacent to the second conductive portion.

17. An electronic device comprising:
a housing including a top surface and a bottom surface and a plurality of conductive portions electrically separated from each other and disposed on at least a portion of a side surface of the housing;
a display disposed on and supported by the top surface of the housing; and
a wireless communication circuit configured to transmit and/or receive wireless signals in a plurality of frequency bands via the plurality of conductive portions,
wherein the plurality of conductive portions include a first conductive portion and a second conductive portion which are located on at least one side surface of the housing, wherein the first conductive portion and the second conductive portion have a U shape or C shape, and wherein the first conductive portion includes a first portion that is spaced apart from the top surface and a second portion that is spaced apart from the bottom surface.

18. The electronic device of claim 17, wherein the first conductive portion is disposed abutting a first side surface of the electronic device, and
the second conductive portion is disposed abutting a second side surface of the electronic device located opposite to the first side surface of the electronic device.

19. The electronic device of claim 18, wherein the first portion is disposed to have a length in a first direction; and
the second portion spaced apart from the first portion having a length in the first direction, and wherein the first conductive portion further includes:
a third portion interconnecting one end of the first portion and one end of the second portion and having a length in a second direction, and
wherein a wireless signal of a first frequency band is transmitted and received via the first conductive portion.

20. The electronic device of claim 18, wherein the second conductive portion includes:
a first portion having a length in a first direction;
a second portion spaced apart from the first portion having a length in the first direction; and
a third portion interconnecting one end of the first portion and one end of the second portion,
wherein a wireless signal of a second frequency band is transmitted and received via the second conductive portion.

* * * * *